US012646191B2

(12) United States Patent
Falaggis et al.

(10) Patent No.: US 12,646,191 B2
(45) Date of Patent: Jun. 2, 2026

(54) METHOD AND DEVICE FOR MEASUREMENTS OF OPTICAL SAMPLES BY MEANS OF VISION RAYS

(71) Applicant: The University of North Carolina At Charlotte, Charlotte, NC (US)

(72) Inventors: Konstantinos Falaggis, Concord, NC (US); Ana Hiza Ramirez-Andrade, Charlotte, NC (US)

(73) Assignee: The University of North Carolina At Charlotte, Charlotte, NC (US)

( * ) Notice: Subject to any disclaimer, the term of this patent is extended or adjusted under 35 U.S.C. 154(b) by 26 days.

(21) Appl. No.: 18/970,294

(22) Filed: Dec. 5, 2024

(65) Prior Publication Data

US 2025/0095178 A1 Mar. 20, 2025

Related U.S. Application Data

(63) Continuation-in-part of application No. 17/945,156, filed on Sep. 15, 2022, now abandoned.

(60) Provisional application No. 63/280,637, filed on Nov. 18, 2021.

(51) Int. Cl.
| | |
|---|---|
| *G06T 7/521* | (2017.01) |
| *G06T 7/00* | (2017.01) |
| *G06T 7/60* | (2017.01) |
| *G06T 7/80* | (2017.01) |
| *G06T 12/10* | (2026.01) |

(52) U.S. Cl.
CPC ............ *G06T 7/521* (2017.01); *G06T 7/0002* (2013.01); *G06T 7/60* (2013.01); *G06T 7/80* (2017.01); *G06T 12/10* (2026.01)

(58) Field of Classification Search
CPC ........... G06T 7/521; G06T 7/80; G06T 12/10; G06T 7/0002; G06T 7/60
USPC .......................................................... 348/136
See application file for complete search history.

(56) References Cited

U.S. PATENT DOCUMENTS

| | | | | |
|---|---|---|---|---|
| 7,698,068 | B2 * | 4/2010 | Babayoff | A61B 5/0088 |
| | | | | 702/19 |
| 10,816,486 | B2 * | 10/2020 | Artemiev | G01N 23/20008 |
| 11,073,487 | B2 * | 7/2021 | Bykanov | G01N 23/201 |
| 11,544,874 | B2 * | 1/2023 | Liu | G06T 7/80 |
| 11,640,057 | B2 * | 5/2023 | Palacios | G02B 27/017 |
| | | | | 349/139 |
| 12,118,778 | B2 * | 10/2024 | Haven | G06T 7/75 |

* cited by examiner

*Primary Examiner* — Trang U Tran
(74) *Attorney, Agent, or Firm* — ALSTON & BIRD LLP

(57) ABSTRACT

In some embodiments, the present invention comprises a new metrology device (apparatus) comprising a camera, an optical imaging system, and a reference target for the non-destructive evaluation of samples as well as methods and systems thereto. In some embodiments, the device includes a methodology to measure vision rays that enter the optical system at a specific angle by analyzing the patterns of a reference target at different locations. This apparatus also allows measuring the vision rays deflected by samples placed in front of the optical system. The deflection may have occurred through refraction by transparent samples or by reflection of reflective samples. The obtained vision rays provide information on the geometric wavefront, and hence, the sample surface.

16 Claims, 70 Drawing Sheets a)

b)

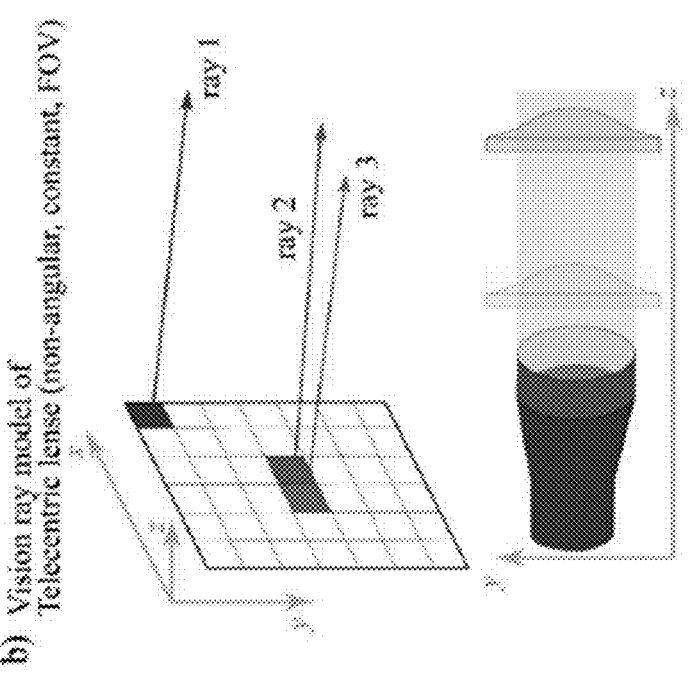
b) Vision ray model of
Telecentric lense (non-angular, constant, FOV)
ray 1
ray 2
ray 3
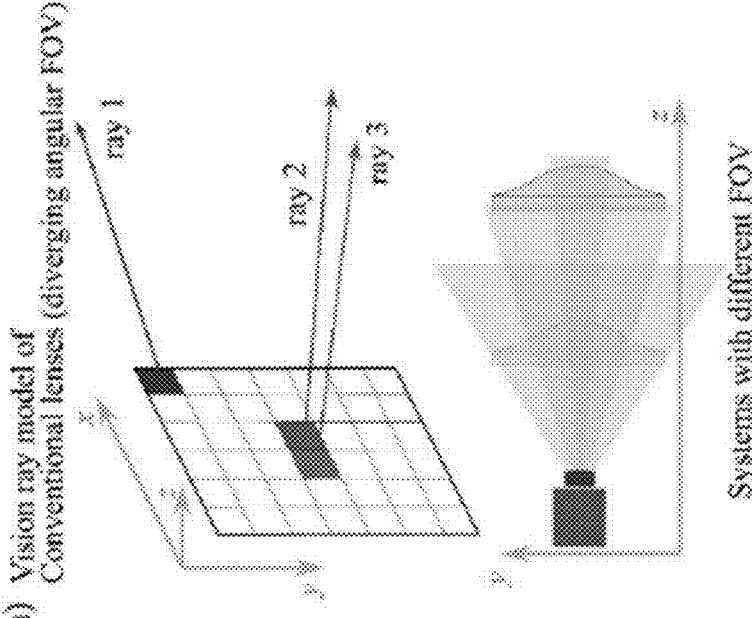
a) Vision ray model of
Conventional lenses (diverging angular FOV)
ray 1
ray 2
ray 3
Systems with different FOV
FIG. 4

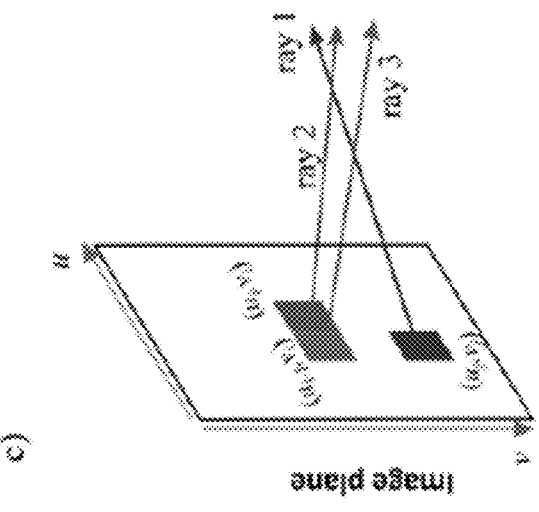
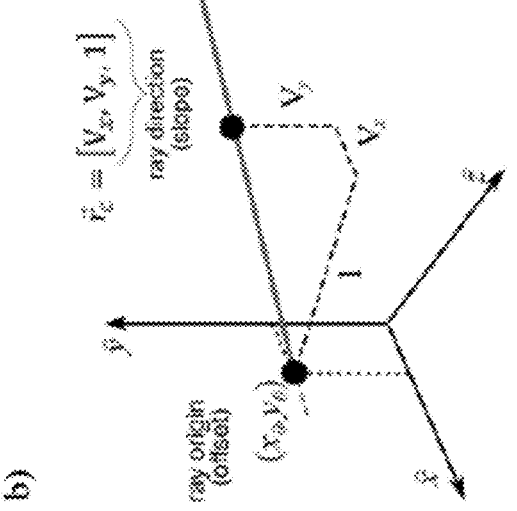
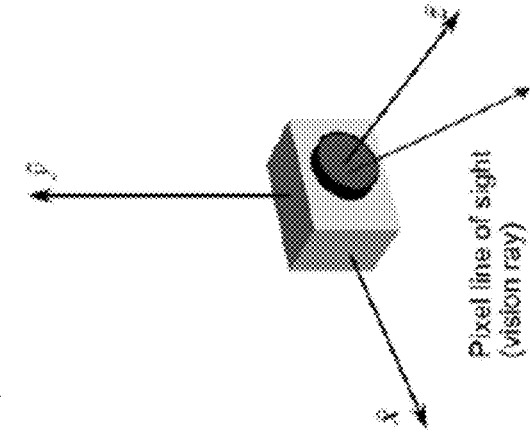
FIG. 22

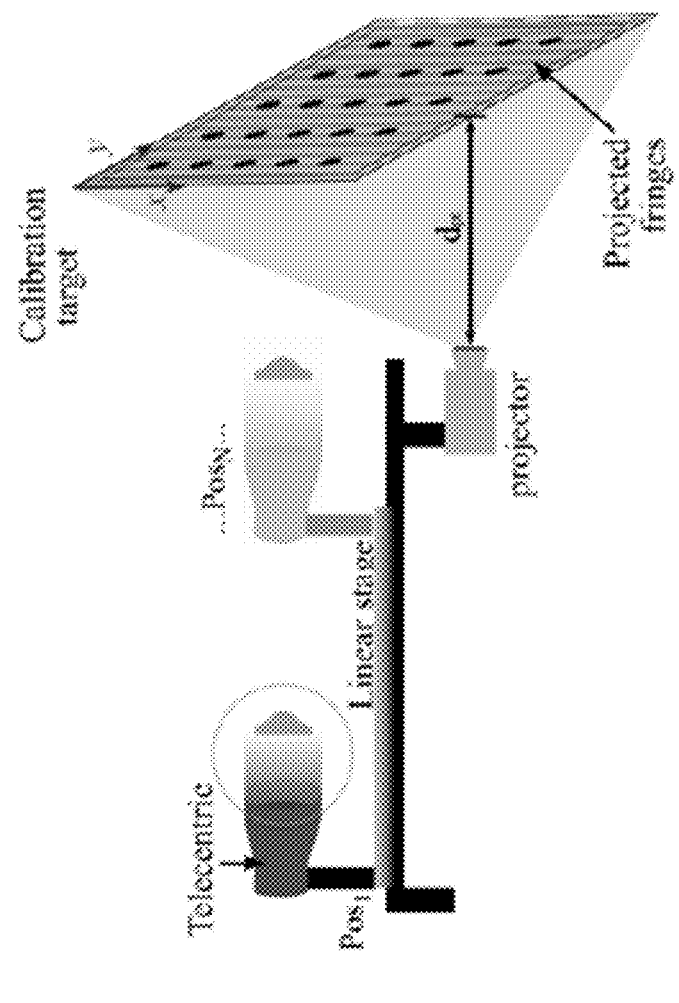
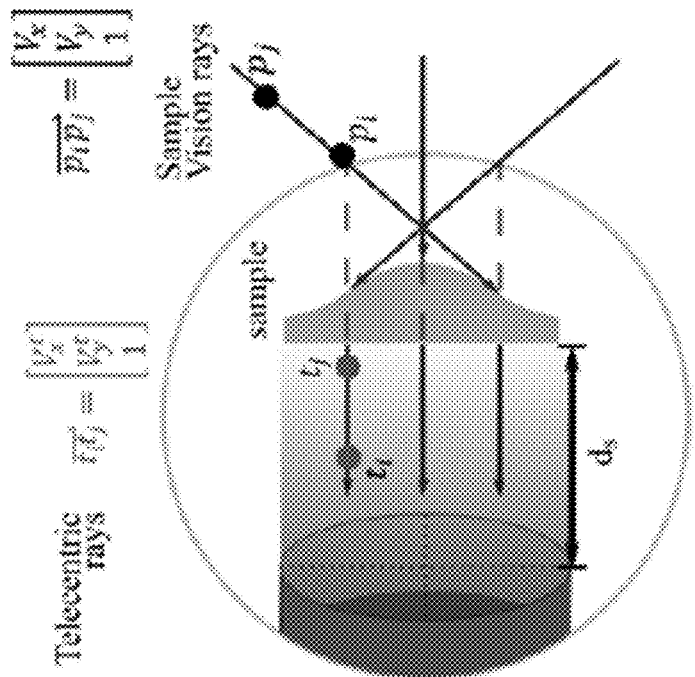
FIG. 23 a) Phase Measuring Deflectometry (PMD)
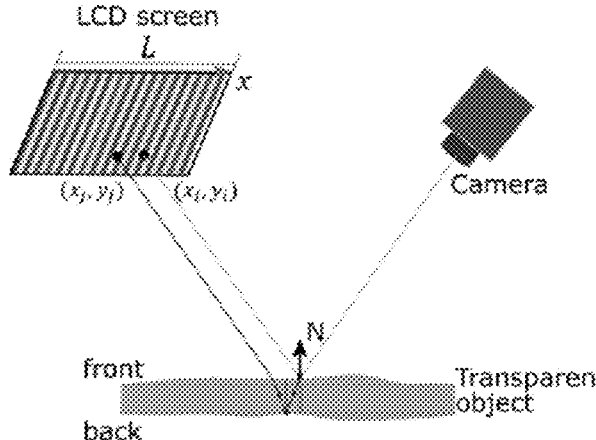
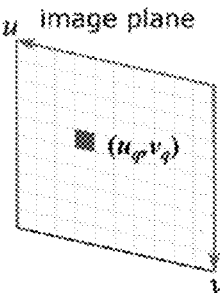
$$I(u,v) = \bar{I} + a_1 \cos(2\pi x_i/T) + a_2 \cos(2\pi x_j/T)$$
multiple reflections from different surfaces
b) Multi-frequency Fringe Deflectometry (MFD)    Front- and back-reflection separation
by recognizing peak position in power spectrum
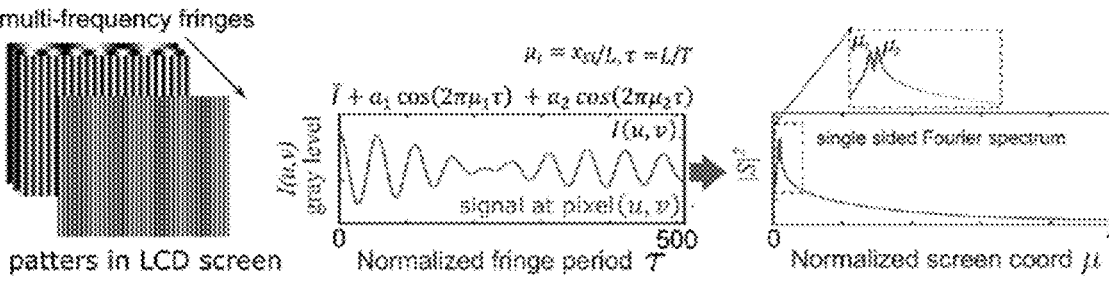
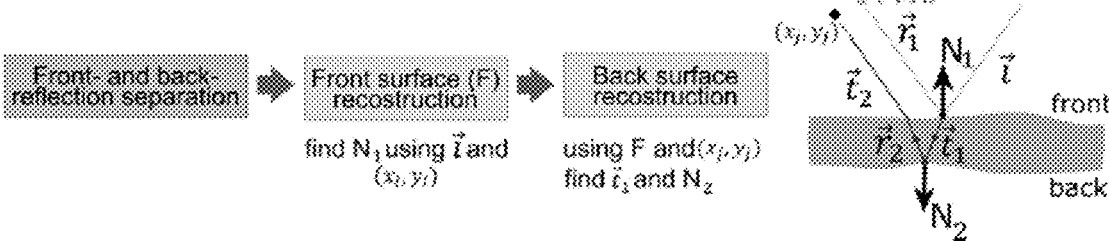
FIG. 26

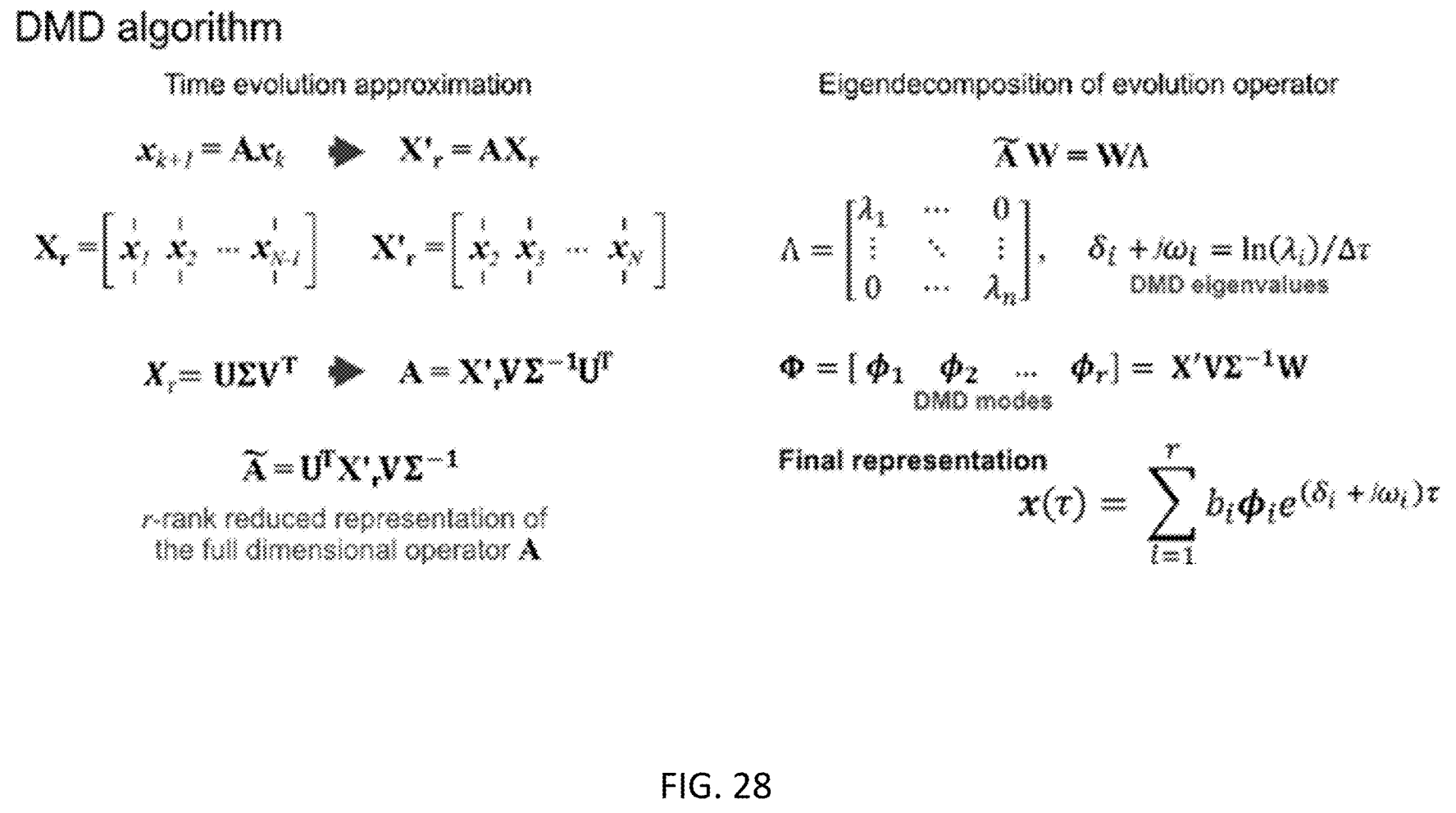

DMD algorithm

Time evolution approximation $$x_{k+1} = A x_k \quad \blacktriangleright \quad X'_r = A X_r$$

$$X_r = \begin{bmatrix} | & | & & | \\ x'_1 & x'_2 & \cdots & x'_{N-1} \\ | & | & & | \end{bmatrix} \quad X'_r = \begin{bmatrix} | & | & & | \\ x'_2 & x'_3 & \cdots & x'_N \\ | & | & & | \end{bmatrix}$$

$$X_r = U \Sigma V^{\mathsf{T}} \quad \blacktriangleright \quad A = X'_r V \Sigma^{-1} U^{\mathsf{T}}$$

$$\tilde{A} = U^{\mathsf{T}} X'_r V \Sigma^{-1}$$

r-rank reduced representation of
the full dimensional operator A

Eigendecomposition of evolution operator $$\tilde{A} W = W \Lambda$$

$$\Lambda = \begin{bmatrix} \lambda_1 & \cdots & 0 \\ \vdots & \ddots & \vdots \\ 0 & \cdots & \lambda_n \end{bmatrix}, \quad \delta_i + i\omega_i = \ln(\lambda_i)/\Delta \tau$$

DMD eigenvalues $$\Phi = [\, \phi_1 \;\; \phi_2 \;\; \cdots \;\; \phi_r \,] = X'_r V \Sigma^{-1} W$$

DMD modes

Final representation

$$x(\tau) = \sum_{i=1}^{r} b_i \phi_i e^{(\delta_i + i\omega_i)\tau}$$

FIG. 28

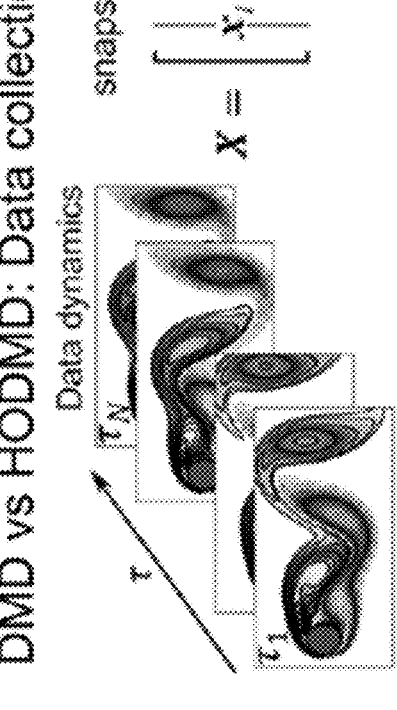
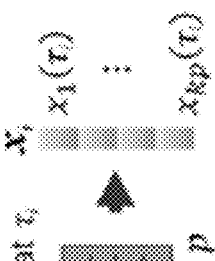
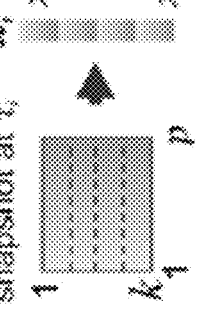

DMD vs HODMD: Data collection and preprocessing

Data dynamics snapshots in colum vector form $$X = \begin{bmatrix} x_1 & x_2 & \cdots & x_N \end{bmatrix}$$

time-lagged snapshots $$X_{tl} = \begin{bmatrix} x_1 & x_2 & \cdots & x_{N-d+1} \\ x_2 & x_3 & \cdots & x_{N-d+2} \\ \vdots & \vdots & \ddots & \vdots \\ x_{d+1} & x_{d+2} & \cdots & x_N \end{bmatrix}$$

Time evolution approximation first-order approximation $$x_{k+1} = \mathbf{A}x_k$$

high-order approximation $$x_{k+d} = \mathbf{A}_1 x_k + \mathbf{A}_2 x_{k+1} + \cdots \mathbf{A}_d x_{k+d-1}$$

FIG. 29

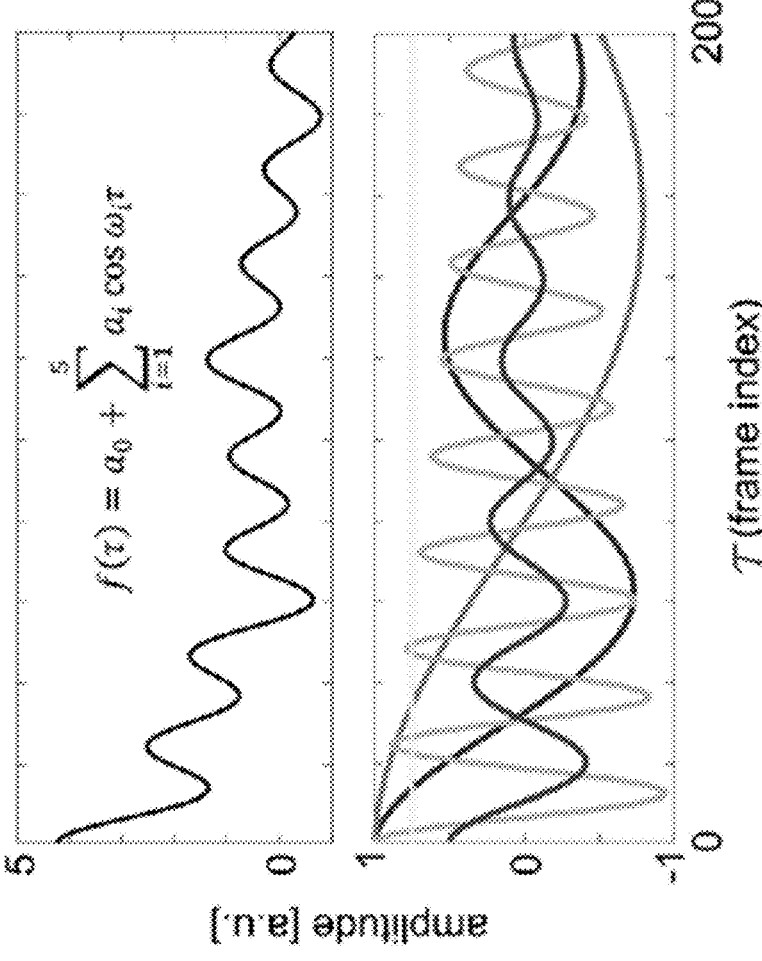
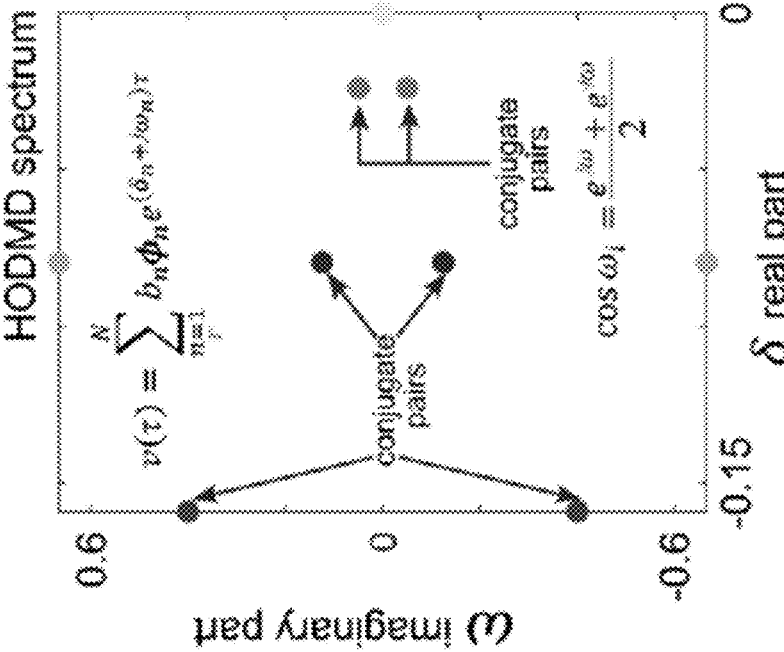
FIG. 31

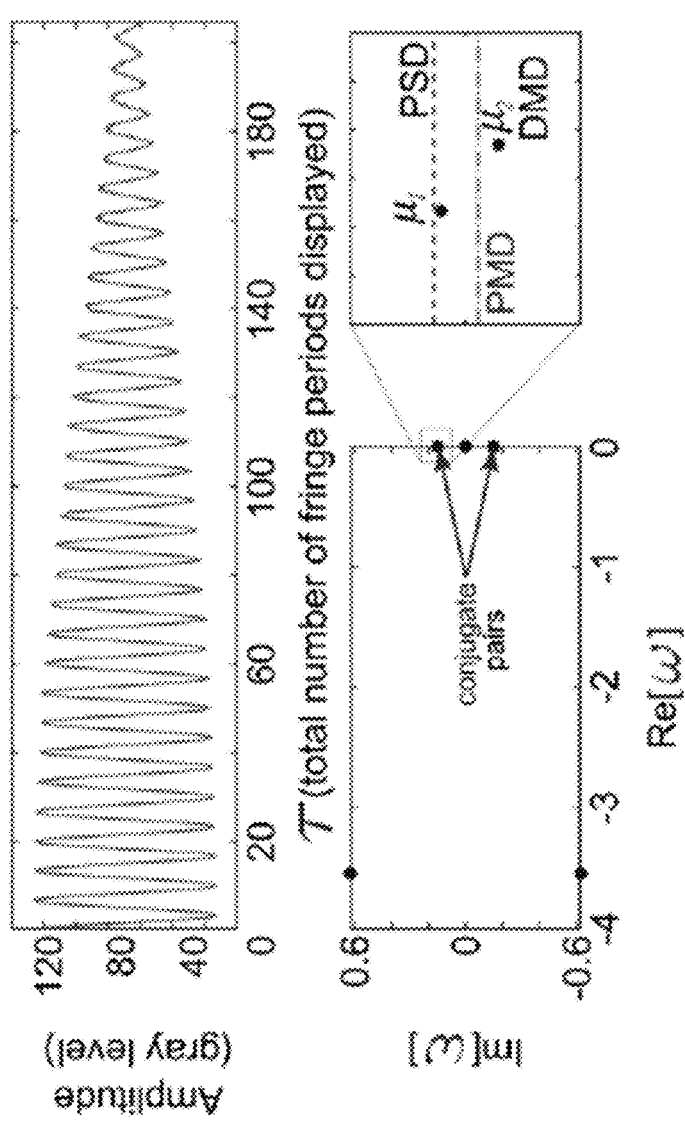
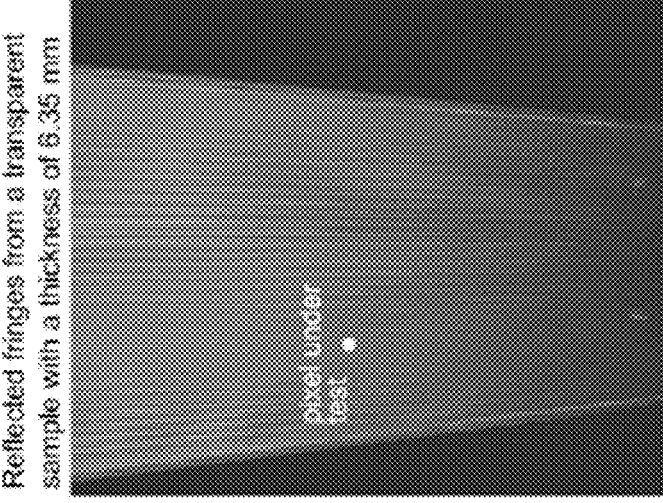
FIG. 33

| Test/ Dataset | Fringe tilt | Sample thickness | Optimization time ratio HODMD/DFT | No of fringes | Reconstruction error PV [um] Front surface PV: 515nm | | % No of outliers (after optimization) | | conclusions DFT |
|---|---|---|---|---|---|---|---|---|---|
| | | | | | HODMD | DFT outlier removal? | HOD MD | DFT | |
| 1/1 | 45 | 5 mm | 0.76 | 512 | 0.011 (2%) | 107 um/no | 0% | 90% | Inaccurate peak identification and frequency leakage generate errors in optimization causing poor surface reconstructio n. |
| 1/2 | 45 | 5 mm | 0.89 | 1024 | 0.007(1%) | 7um/no | 0% | 3% | |
| 1/3 | 10 | 5 mm | 0.76 | 1024 | 0.036 (7%) | 4um/no | 0% | 25% | |
| 2 | 45 | 5 mm | 0.79 | 1024 | 0.008(15%) | 96um/no | 0% | 20% | |
| 3/1 | 45 | 10 mm | 0.91 | 1024 | 0.009(1.7%) | 0.011um/yes 3um/no | 0% | 1.75% | |
| 3/2 | 45 | 10 mm | 0.77 | 512 | 0.009(1.9%) | /no | 0% | 90% | |
| 3/3 | 45 | 2.5 mm | 0.64 | 1024 | 0.014(2.7%) | 13um/no | 0% | 47% | |
| 3/4 | 45 | 2.5 | 1.2 | 512 | 0.014(2.7%) | 33um/no | 0.5% | 95% | |

FIG. 33

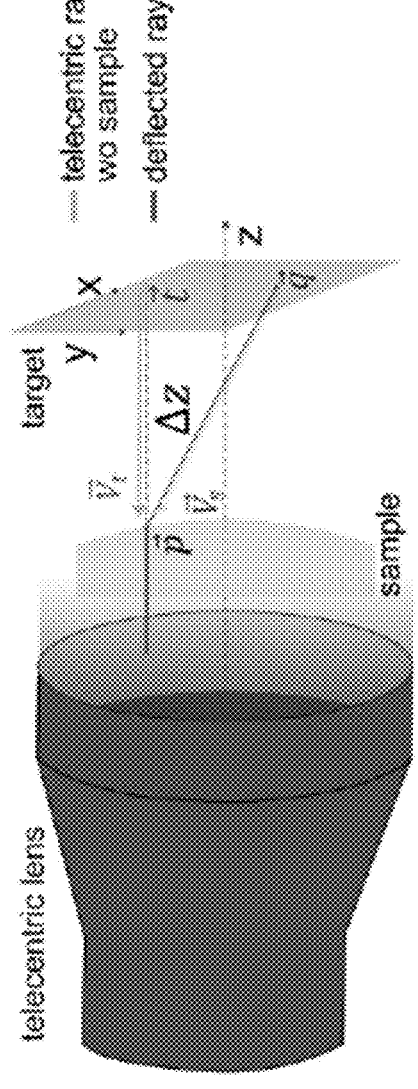

$$\vec{p} = \vec{q} + \Delta z \vec{V_s}, \qquad \vec{p} = \Delta z \vec{V_t} + \vec{t}$$

$$(\vec{q} - \vec{t}) = \Delta z(\vec{V_t} - \vec{V_s})$$

$$\begin{bmatrix} V_t^x - V_s^x \\ V_t^y - V_s^y \\ 0 \end{bmatrix} \Delta z = \begin{bmatrix} x_q - x_t \\ y_q - y_t \\ 0 \end{bmatrix}$$

$$\Delta z = \frac{x_q - x_t}{V_t^x - V_s^x} = \frac{y_q - y_t}{V_t^y - V_s^y}$$

— telecentric rays
wo sample

— deflected rays target x
y
z $\vec{t}$
$\vec{q}$ $\Delta z$ $\vec{V_t}$ $\vec{p}$
$\vec{V_s}$ telecentric lens sample

FIG. 42

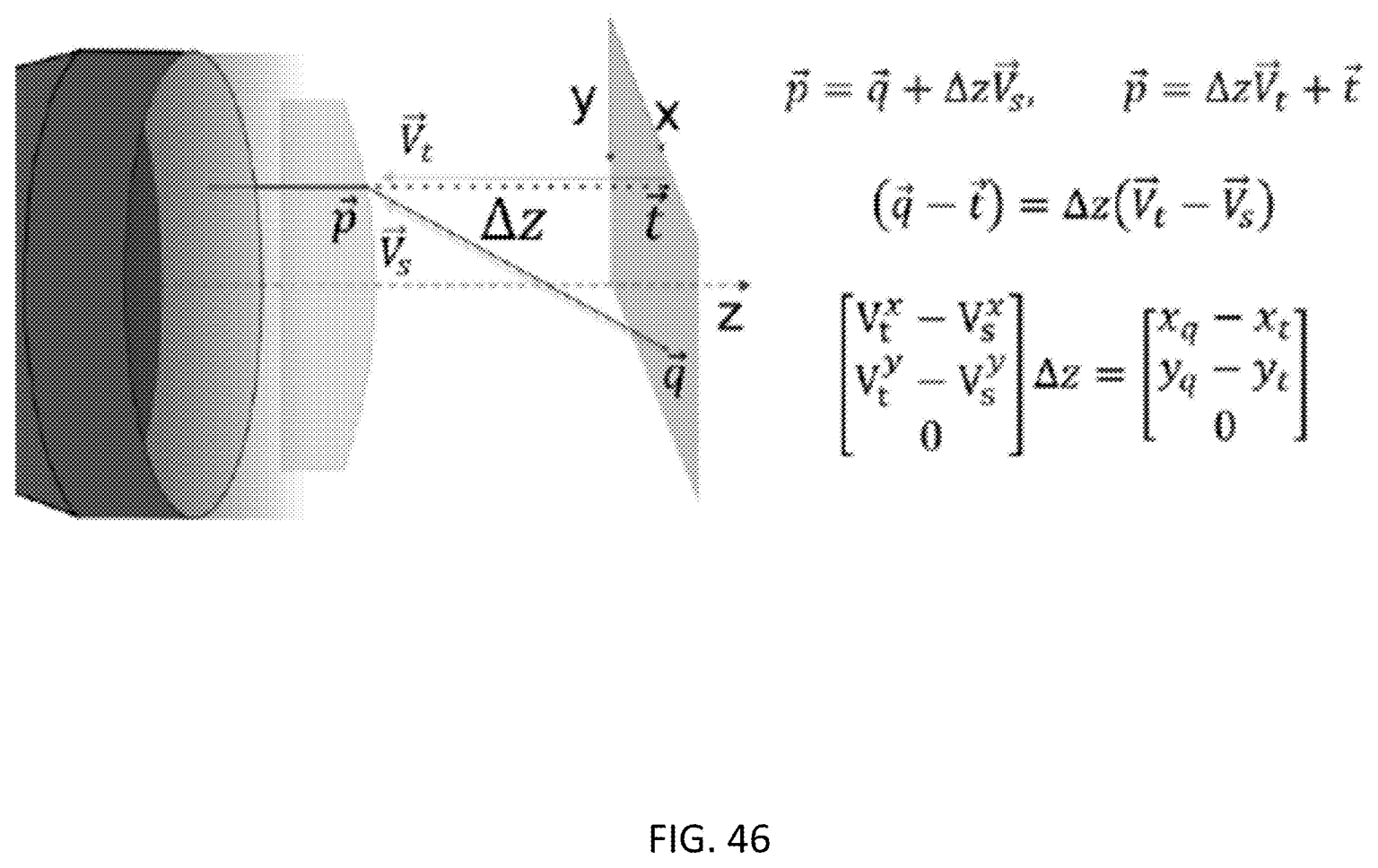

$$\vec{p} = \vec{q} + \Delta z \vec{V}_s, \qquad \vec{p} = \Delta z \vec{V}_t + \vec{t}$$

$$(\vec{q} - \vec{t}) = \Delta z (\vec{V}_t - \vec{V}_s)$$

$$\begin{bmatrix} V_t^x - V_s^x \\ V_t^y - V_s^y \\ 0 \end{bmatrix} \Delta z = \begin{bmatrix} x_q - x_t \\ y_q - y_t \\ 0 \end{bmatrix}$$

FIG. 46

| Test No | Back surface flatness | | Telecentricity | | | Calibration | Section |
| --- | --- | --- | --- | --- | --- | --- | --- |
| | Case I | Case II | Case A | Case B | | | |
| 1 | 1 | N/A | N/A | N/A | | N/A | 2.4 |
| 2 | N/A | 1 | N/A | N/A | | N/A | 2.4 |
| 3 | 1 | N/A | N/A | 1 | | N | 2.5 |
| 4 | 1 | N/A | 1 | N/A | | N | 2.5 |
| 5a | 1 | N/A | 1 | N/A | | Y | 2.6 |
| 5b | 1 | N/A | N/A | 1 | | Y | 2.6 |
| 6 | N/A | N/A | N/A | 1 | | 1 | 2.7-2.8 |

FIG. 49

METHOD AND DEVICE FOR MEASUREMENTS OF OPTICAL SAMPLES BY MEANS OF VISION RAYS

CROSS REFERENCE TO RELATED APPLICATIONS

This application claims priority to, and the benefit of, co-pending U.S. non-provisional application Ser. No. 17/945,156, filed on Sep. 15, 2022, and U.S. provisional application No. 63/280,637, filed on Nov. 18, 2021, both of which are hereby incorporated by reference in their entirety.

GOVERNMENT SUPPORT CLAUSE

This invention was made with government support under contract 1338877, 1338898, 1822026, and 1822049 awarded by the National Science Foundation (NSF) Industry/University Cooperative Research Center (IUCRC). The government has certain rights in the invention.

BACKGROUND OF THE INVENTION

The present invention relates to non-destructive evaluation of samples, and more particularly, optical measurement of systems and methods for determining the shape and refractive index distribution of optical samples.

Example 1: optical measurement of one or more surfaces of optical samples that have an axis of symmetry or may have no axis of symmetry.

Example 2: optical measurement of the geometric wavefront or change in geometric wavefront due to the presence of a sample that may have an axis of symmetry or may have no axis of symmetry.

Example 3: measurement of optical samples to obtain the three-dimensional (3D) body surface that may be related to the physical properties of optical samples.

Example 4: measurement of optical samples to obtain the three-dimensional (3D) refractive index distribution that may be related to the physical properties of optical samples.

Example 5: measurement of surfaces or relative changes in the surface of optical samples located in a manufacturing machine in order to correct manufacturing errors or optimize the manufacturing process.

Optical system performance measurement, and more particularly, is related to systems and methods for determining the vision rays traveling through an optical system.

Example 6: measurement of the vision rays traveling through an optical system including of one or more optical elements to measure the geometric wavefront and determine alignment errors.

Example 7: measurement of the vision rays traveling through an optical system including of one or more optical elements to measure the geometric wavefront and determine optical aberrations.

Example 8: measurement of the vision rays traveling through an optical system including of one or more optical elements to measure the geometric wavefront and determine the modulation transfer function.

Non-destructive evaluation of samples, related to systems and methods for providing a computed tomography system with vision rays measurement at various sample orientations and performing algorithmic adjustments based on prior knowledge data and post-processing reconstruction results.

Example 9: measurement the of three-dimensional (3D) refractive index distribution of a sample using vision ray data at various sample rotations using one rotation axis over the angle range of 360 degrees and one rotation axis over the angle range of 180 degrees.

Example 10: measurement the of three-dimensional (3D) refractive index distribution of a sample using vision ray data at various sample rotations using one rotation axis over the angle range of 360 degrees.

Example 11: measurement the of three-dimensional (3D) refractive index distribution of a sample using vision ray data at various sample rotations using one or more rotation axes over a constrained (e.g., limited) angle range.

The precise, contact-free, and full-field measurement of freeform optics is a challenge in modern metrology [1]. A popular solution is full-field interferometry that enables measurements with a repeatability of a few nanometers for both the form and mid-spatial frequency (MSF) regime. For freeform optics, the complex freeform surface of the sample may have high surface slopes that include the use of computer-generated holograms (CGHs) to provide a stable reference wavefront that serves as an optical null [2]. However, the cost of CGHs is relatively high, and measurement uncertainty increases are highly dependent on calibration errors and misalignments. These costs may constrain the practical applicability of interferometry to high-volume measurements or high-performance applications where the budget is justified.

Coordinate measuring machines (CMMs) provide point-wise measurements over large measurement volumes and handle steep surface slopes. For contact probes, the measurement is independent of the sample alignment and provides actual measurements of power, coma, astigmatism (see discussion in [3-6]). CMMs are well-established in the metrology community and have a widely accepted terminology for errors [7,8]. However, CMM-based techniques include relatively long measurement times (e.g., centimeter-class aspheres using 15 min) and various systematic error sources. Probes are used to measure at a normal incidence condition, using additional tilt axes or adapted configurations that work in cylindrical or spherical coordinates. These constraints diminish their value in industrial practice.

Nonetheless, this model has been insufficient to model some sensors, as shown in [9]. Phase Measuring deflectometry (PMD) [10-16] is a null-free full-field metrology solution with high resolution and short measurement times that plays out its strength for large and complex freeform optics [16]. Measuring the refractive power through absolute phase measurements using incoherent sources was introduced in and extended to deflectometry in transmission in [18-22]. PMD systems were further advanced in [23,24] through complex calibration procedures based on ray tracing. This idea has been broadened for metrology of multi-surface freeform optics as in [25-27], where the camera sensor model uses a non-linear extension of a pinhole model. Nonetheless, this model has been proven to be insufficient to model some sensors, as shown in [9]. To the credit of camera manufacturers, there are some camera lenses like the Nikon D60 (see reference [28]) that can be described well with the pinhole model.

PMD enables form and MSF measurements. In particular, for the MSF regime, PMD has been reported to "measure MSF errors on freeform parts orders of magnitude faster than traditional tactile metrology tools" [29]. PMD systems are highly sensitive slope measuring systems with high repeatability, even for samples with high surface slopes. Reference [30] reported an environmental instability and noise of 0.6 nm root mean square (RMS) and an overall slope measurement uncertainty near ~100 nanoradian (nrad). Deflectometry is a robust and low-cost alternative for low and medium-volume applications with unique advantages for measuring MSF structures.

A drawback of PMD systems is systematic errors that produce slowly varying form errors in the measurement; in this regard, many calibration efforts are used to reduce (e.g., minimize) these systematic terms [31-34]. The systematic error can be attributed to simple error sources as the flatness of the cover-glass of the display or the drift of the baseline (relative position between camera and display) after the system calibration [14,35-43]. A further aspect of PMD systems is the numerical reconstruction algorithm. Depending on the algorithms' sophistication, many solvers rely on mathematical optimization routines that reduce (e.g., minimize) a cost function. Many of these solvers are either based on simpler models (convex optimization problems [44-46]) that have unique mathematical solutions (global minima) but do not model the physical problem well or use more sophisticated models (nonconvex optimization problems [47]) that have no straightforward solution because the solver can get trapped in a local minimum. Both types of optimization solvers contribute to systematic error. An exciting aspect of PMD is that PMD is extremely sensitive to out-of-plane deformations, and many systematic errors cancel out in comparative measurements. Using a reference artifact that is accurately measurable with a slower metrology instrument (e.g., a CMM), it is possible to calibrate systematic errors down to the 20 nm level in the Zernike coefficients [48].

Deflectometry has also been reported to transmission measurements. Fischer [31] reported a transmission PMD system for the measurement of aspheric optics. Other transmission deflectometry systems have been reported by Petz [33,34]. PMD has been an innovative area of research. Seßner [49] proposed the use of telecentric imaging systems to overcome the slope-height ambiguity. Komander [32] proposed that a display is mounted onto a motorized linear stage and can thus be moved to various positions during the measurement process.

Experimental Ray Tracing (ERT) is another competitive technique introduced by Hausler et al. in 1988 [50]. In ERT, a ray with a known angle and position is deflected by the sample, where the direction of the deflected ray is measured using two parallel planes that are orthogonal to z [51]. ERT has also been performed to find the rays that propagate near the focus of test pieces which allows point-wise measurements of the deflected rays [50] and can be used for the characterization of gradient index of optical elements as described in [51].

Tomography is the three-dimensional reconstruction of an object from data taken at different angles [52]. The term "classical tomography" is used when the imaging beam travels in straight lines through the object; this assumption is valid for the x-ray regime. Typical x-ray based techniques either work with absorption images at different angles or with phase images (or phase-contrast images) at different angles. Optical Diffraction Tomography (ODT) [53] is the method for characterization of 3D distribution of material parameters in optical semitransparent elements, which includes refractive-index, absorption or birefringence distributions. The 3D object information is reconstructed from a set of object wavefronts of the scattered complex optical fields at each sample rotation. In optics, an object's angular position projection image may be captured by means of interferometry [54], digital holography [55] or photoelasticity [56]. Various techniques exist that reconstruct the samples from this data [52, 57, 58]. These techniques are commonly constrained to weakly scattering objects with weaker refractive index differences regarding the surrounding medium. Cha and Vest reported a technique [59] for computer tomography of strongly refracting objects using a ray optical formulation.

BRIEF SUMMARY OF THE INVENTION

In some embodiments, the present invention comprises a new metrology device (apparatus) comprising a camera, an optical imaging system, and a reference target (sometimes referred to as sample) for the non-destructive evaluation of samples as well as methods and systems thereto. In some embodiments, the device includes a methodology to measure vision rays that enter the optical system at a specific angle by analyzing the patterns of a reference target at different locations. This apparatus also allows measuring the vision rays deflected by samples placed in front of the optical system. The deflection may have occurred through refraction by transparent samples or by reflection of reflective samples. The obtained vision rays provide information on the geometric wavefront, and hence, the sample surface. This embodiment can be employed for the alignment optical systems including of one or more optical elements as well as the assessment of the optical performance. This embodiment also compromises a tomography technique using vision rays for 3D reconstructions of transparent samples (3D shape and 3D refractive index) and allows measuring optical samples' 3D refractive index distribution, e.g., of gradient index optics or optical fibers.

BRIEF DESCRIPTION OF THE DRAWINGS

FIG. 4 shows one example of a comparison between using a non-telecentric and a telecentric imaging system during sample assessment based on the vision ray model.

FIG. 22 shows one example of a vision ray imaging model.

FIG. 23 shows one example of a schematic of the vision ray measurement principle.

FIG. 26 shows one example of phase measuring deflectometry (PMD) for transparent samples.

FIG. 28 shows one example of a description of a Dynamic Mode Decomposition (DMD) model.

FIG. 29 shows one example of a standard DMD decomposition uses a first-order approximation.

FIG. 31 shows one example of HODMD of a real signal $f(\tau)$ captures the dynamics of the frequency components.

FIG. 33 shows one example of a HODMD.

FIG. 38 shows one example of a performance comparison between using DFT or HODMD as the initial value for the optimization that separates the front and back reflections.

FIG. 42 shows one example of a relationship between the vision rays of an ideal telecentric lens and the ray deflected from an optical element with a back-plano surface.

FIG. 46 shows one example of the relationship between the vision rays of an ideal telecentric lens and the ray deflected from an optical element with a back-plano surface.

FIG. 49 shows one example of a table providing an overview of systematic error configurations for various test.

DETAILED DESCRIPTION AND BEST MODE OF IMPLEMENTATION

Figure 1:
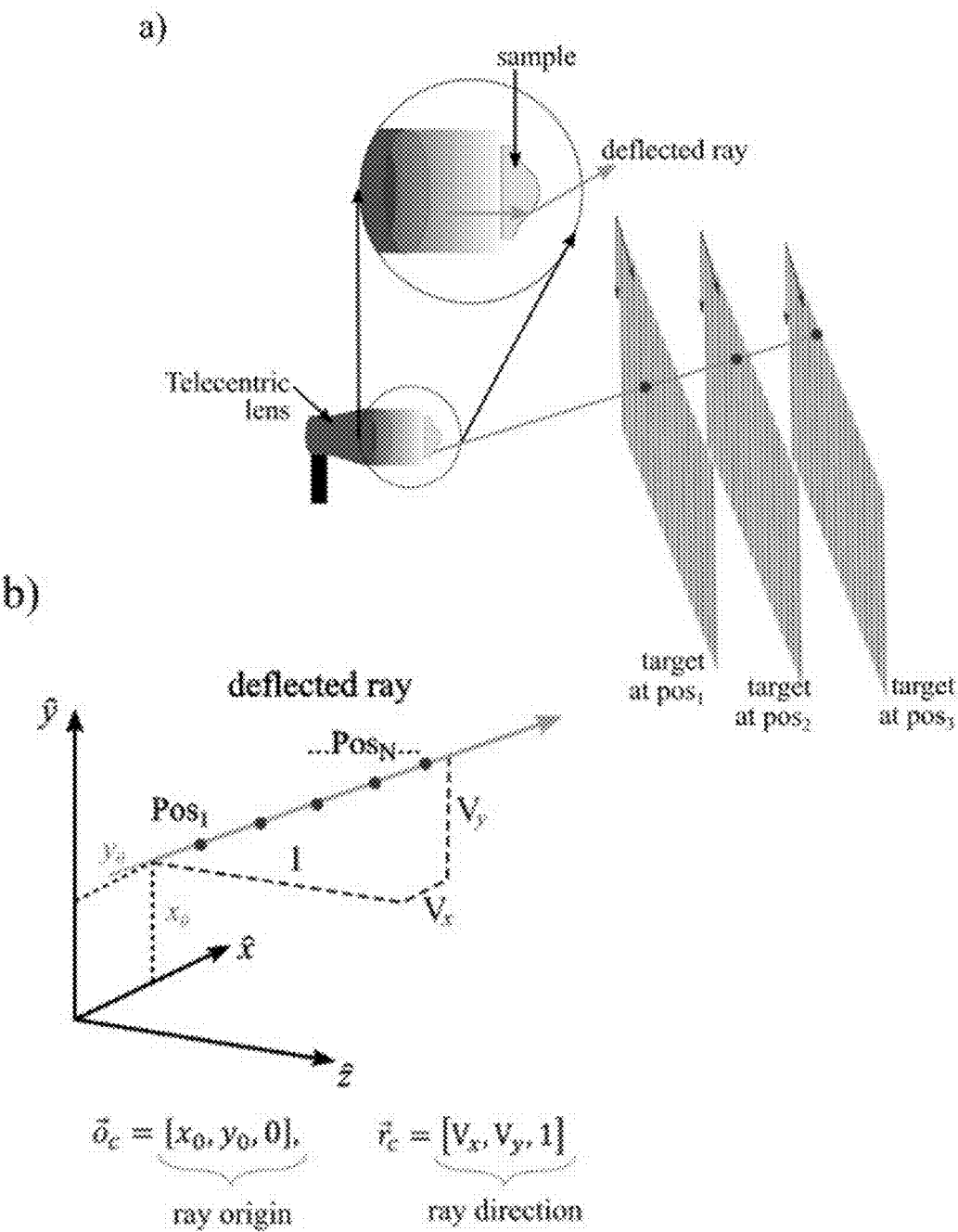
FIG. 1 shows one example of a system setup that the device uses to measure the vision rays.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating possible combinations of the individual steps in an unnecessary fashion. Nevertheless, the specification and claims should be read with the understanding that such combinations are entirely within the scope of the invention and the claims.

The metrology device presented herein is based on the concept of vision rays, a well-known technique of the computer vision community. The vision ray metrology system measures the induced deflection in the vision rays by the sample. Although this device measures ray deflection as in Phase Measuring deflectometry (PMD), PMD uses accurate knowledge of the location of the camera and the active target to trace the rays through both the sample and the measurement system. PMD uses the so call geometrical calibration, a complex task, to obtain such accurate knowledge. The metrology device presented herein does not use such calibration.

Another advantage of this metrology device is the active target that avoids the cover glass ambiguity found on some classical setups [9,10]. Combining a classic passive target and a fringe projector, absolute phase measurements from the projected fringes allow an interpolation process that generates high-density spatial information from the sparse features on the passive target.

In one embodiment, the device measures the vision rays are using the setup proposed in (a) of FIG. 1. The sample is mounted in front of a telecentric lens, causing a deflection of vision rays of the imaging system. Stepping both the camera and the measurement sample along the z-axis to a series of z-planes, starting from $z=z_0$ to the plane $z=z_0+\Delta z$ causes the vision rays to land on the target plane at different xy-locations. Each xy-location is then measured. All these points are then used to fit a line in 3D through the points, as shown in (b) of FIG. 1. Then, for one or more camera pixels (e.g., every camera pixel), vision rays are defined by the geometrical parameters describing their origin $\vec{o}_c$ and direction $\vec{r}_c$.

After obtaining high-accuracy vision rays that are related to the sample's slope, the sample's wavefront and height maps under test can be calculated. The wavefront is reconstructed from its slopes since $(V_x, V_y) = \vec{\nabla} W$. Depending on the sample under test, zonal [16,69], modal [70], or a combination of both integration techniques [79] can be applied to recover the wavefront.

Any other integration techniques develop in the future can be applied as well. For the Plano-curved surfaces, the normal to the surface itself can be calculated as demonstrated before [18], and the same integration methods used for the wavefront data can be applied to recover the actual surface profile.

For multi-freeform surfaces, placing the sample at different orientations allows distinguishing between the front and back surfaces, as shown in [25]; thus, a similar calculation based on the vision rays recovered from the device can provide the profile of the front and back surfaces of a non-Plano-curved element.

A further extension of this approach is vision ray Tomography, which includes measuring non-homogenous 3D sample structures (non-uniform refractive indices) by rotating the sample around an optical axis and measure the vision rays for each rotation angle. The final 3D object can be reconstructed using post-processing algorithms. The advantage to conventional diffraction tomography approaches is that the vision ray approach is applicable to samples with larger refractive index changes (relative to the surrounding medium), so that no immersion of the sample into an index matching fluid is used. A further advantage to such an approach is that the vision ray metrology approach includes the analytical equation of vision rays (e.g., all vision rays) prior to entering the sample and after leaving the sample.

Additionally, because this metrology technique can be used for the measurement of the vision rays, it provides valuable information of the geometric wavefront. The geometric wavefront in turn provides valuable insides for the for the alignment of optical components (e.g. imaging systems with one or more optical components) and the performance of those systems (e.g. estimating aberrations or the modulation transfer function).

In one embodiment, the device measures the geometric wavefront of an unknown freeform sample using incoherent light. This achieved by observing the deflection of so-called "vision rays," where the unknown sample induces the of the vision rays. Vision rays may include a bundle of rays incident onto a camera pixel is represented by a single chief ray. This chief ray is described by the direction vector given by $(V_x, V_y, 1)$. Vision rays generate image-formation models with the highest accuracy even for more complicated imaging systems that conventional camera calibration techniques cannot describe. The geometric wavefront is obtained using Modal or Zonal (or any other) integration techniques, since $V_x$ and $V_y$ are related to the slopes of the wavefront. Furthermore, the vector normal to the surface can be calculated using vectorial Snell's Law from $V_x$ and $V_y$, and then be translated into a heightmap if the material properties of the sample are known. Provided herein is a new metric, vision ray amplitude may serve as decisive metric for assessing the geometrical properties of the surface under test. When the sample is rotated a vision ray tomography approach is feasible that processes the ray data before and after deflection buy the sample, where (unlike conventional diffraction tomography with coherent light) this tomography approach applicable to samples with larger changes in the refractive index.

Additional embodiments and examples may be shown in FIGS. 3-23 from the provisional priority application (the entire contents of which are incorporated by reference).

The present disclosure provides for a vision ray metrology system that includes of an active target and a camera with well-characterized vision rays. The sample under test is placed between the camera and the screen, resulting in a deflection of the vision rays that can be accurately measured by analyzing the patterns projected onto the active target. The concept of vision rays has been borrowed from the camera calibration techniques of the vision community, where the bundle of rays incident onto a camera pixel is represented by a single chief ray. This vision ray camera model and was introduced by Grossberg and Nayar [52], was later improved [9,28,53-57]. The proposed vision ray metrology system measures the sample-induced deflection in the vision rays; in contrast, PMD uses accurate knowledge of the camera's location and the active target to trace the rays through the sample and the measurement system. The reconstruction algorithm of the proposed metrology system uses a simple fitting procedure (fitting a ray through a line), whereas PMD uses elaborated optimization routines that may be sensitive to system drifts and suffer from convergence problems.

Figure 3:
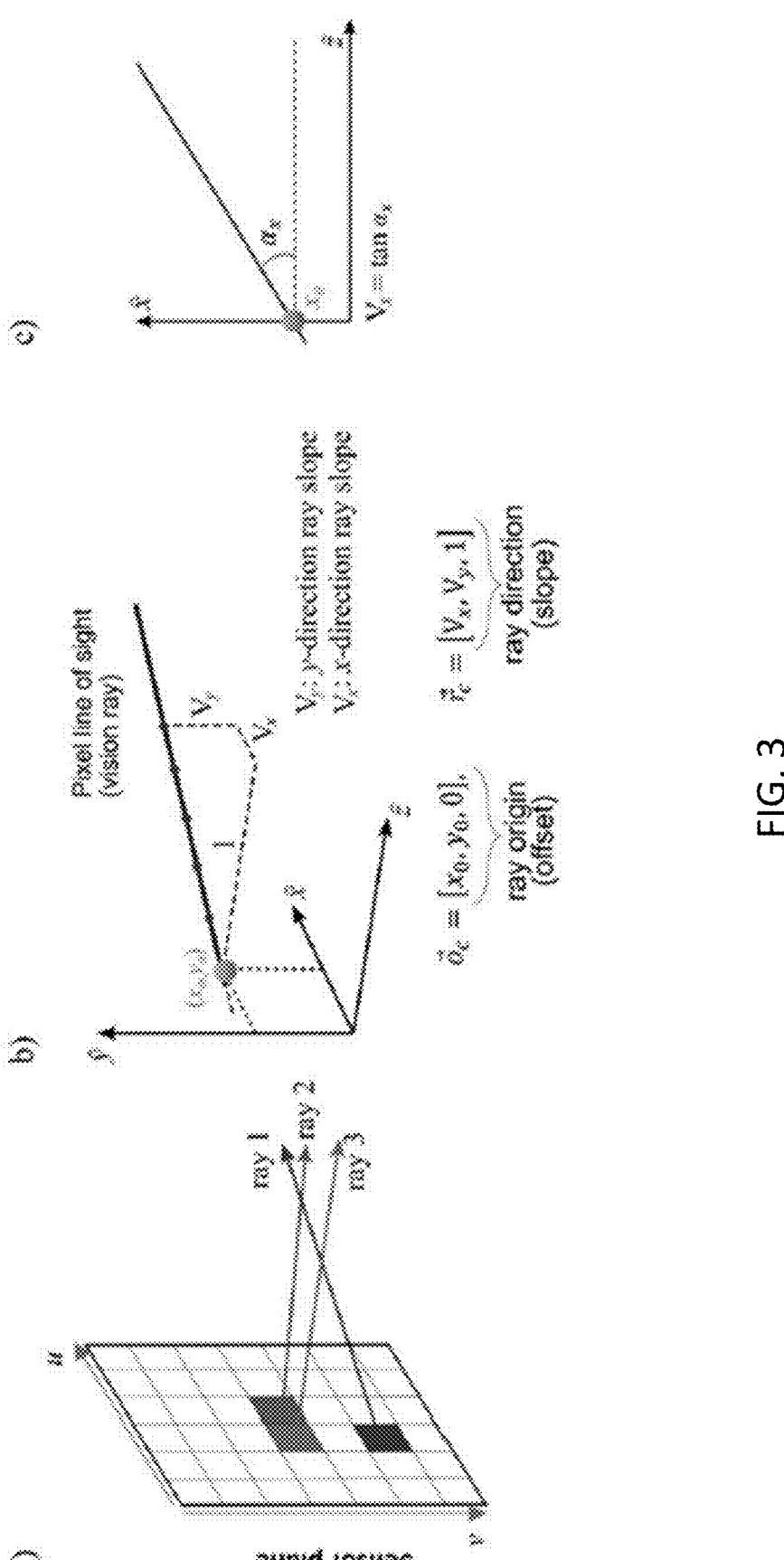
FIG. 3 shows one example of the vision ray image formation model.

FIG. 3 shows vision ray image formation model. Each pixel collects light from a closely arranged ray bundle represented by a principal (chief) ray. Single vision ray that passes through control points (e.g., all control points). Parameters defining the vision ray: $(x_0, y_0)$ offset, slope ($V_x$, $V_y$). Vision rays are widely used in camera calibrations for metrology systems, especially for cases where conventional techniques fail. The vision ray camera model [9,28,56] is a geometric model that assigns to a sensor pixel (e.g., every sensor pixel) with the pixel coordinates (u, v) a so-called 3D vision ray $\{\vec{o}_c, \vec{r}_c\}$ (pixel line of sight) that originates at the coordinate vector $\vec{o}_c$ and has the direction vector arc. Any point on the ray $\{\vec{o}_c, \vec{r}_c\}$ projects back to (u, v) as shown in FIG. 3 (i.e., pierces the sensor plane at the location of the pixel of origin). A common convention is to define the vision rays so that the third component of $\vec{o}_c$ equals 0 and the third component of $\vec{r}_c$ equals 1. The other components of $\vec{r}_c$ are given by tan $\alpha_x$ and tan $\alpha_y$. The angles $\alpha_x$ and $\alpha_y$ describe the ray direction in the x- and y-direction [9]. For visualization, the direction vector (gradient) amplitude S is calculated as $$S = \sqrt{V_x^2 + V_y^2}$$

A quantitative assessment for freeform surfaces is possible by quantifying the change in the direction of the rays (deflection) caused by the samples under test. In essence, Snell's Law in 3D space [58] can be used to write a minimization problem that looks for the surface normal that generates the corresponding change in direction. For such an assessment, it is useful to use a telecentric lens. The telecentricity of the imaging systems allows for sample placement within the constant field of view of the sensor without additional alignment concerns, e.g., a position-dependent magnification.

FIG. 4 shows a comparison between using (a) a non-telecentric and (b) a telecentric imaging system during sample assessment based on vision ray model. For the non-telecentric imaging system, the number of vision rays on the sample depends on the field of view. In contrast, for the telecentric imaging systems, the number of vision rays incident on the sample surface marginally depends on the sample placement along the z-axis.

Figure 5:
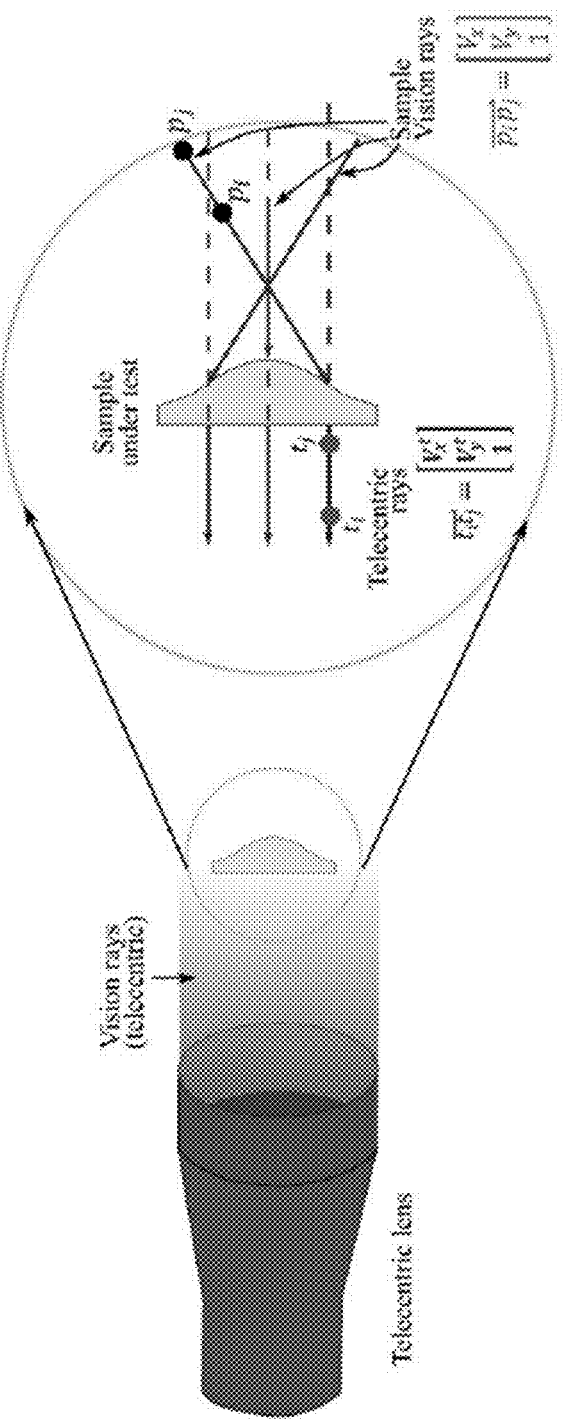
FIG. 5 shows one example of a schematic of the vision ray measurement principle.

FIG. 5 shows a schematic of the measurement principle. From incoming rays, the imaging detector captures those rays that match the vision rays of the imaging system.

Although the vision ray model pictures the chief ray from image space, in reality, the rays are produced in object space. The vision rays for telecentric imaging system are $$T_x = \tan a_x^T \text{ and } T_y = \tan a_y^T,$$

where $\alpha_x$ and $\alpha_y$ are related to telecentricity. When placing a sample, the direction of the vision rays changes. The changes can be measured and are defined herein as follows: $\Delta\alpha_x$ and $\Delta\alpha_y$ with $$\alpha_x = \alpha_x - a_x^T \text{ and } \alpha_y = \alpha_y - a_y^T,$$

where $\alpha_x$ and $\alpha_y$ and is the angle of the vision ray in the x- and y-direction in the presence of the measurement sample. Although the vision ray model may be used in camera calibration to reduce the uncertainty in incoherent metrology setups, the vision ray model has not been used directly as a metrology tool.

The vision rays are measured using a setup in which the sample is mounted in front of a telecentric lens, causing a deflection of vision rays of the imaging system. These vision rays (and thereby the ray deflection) are then estimated. The system steps both the camera and the measurement sample along the z-axis to a series of z-planes, starting from $z=z_0$ to the plane $z=z_0+\Delta z$. In other words, the system performs describe adjustments to a linear position of the reference target system relative to the camera (and measurement sample) via a translation stage. This translation causes the vision rays to pierce the target plane at different xy-locations. Each xy-location is then measured. This process is repeated, measuring at least 30 different 3D piercing points for each vision ray with low uncertainty. These points are then used to fit a line in 3D through the points, as shown in (b) of FIG. 3. The resultant set of 3D coordinates per pixel is transformed into rays parameters $\{\vec{o}_c, \vec{r}_c\}$. The origin of the measurement system of coordinates was chosen to be the center of one control point in the flat target so that the screen itself was in the plane located at $z=z_i$, with $z_i$ a position along the z axis of the calibration coordinate system. The accuracy of the system may be based on the design of the active target.

Figure 6:
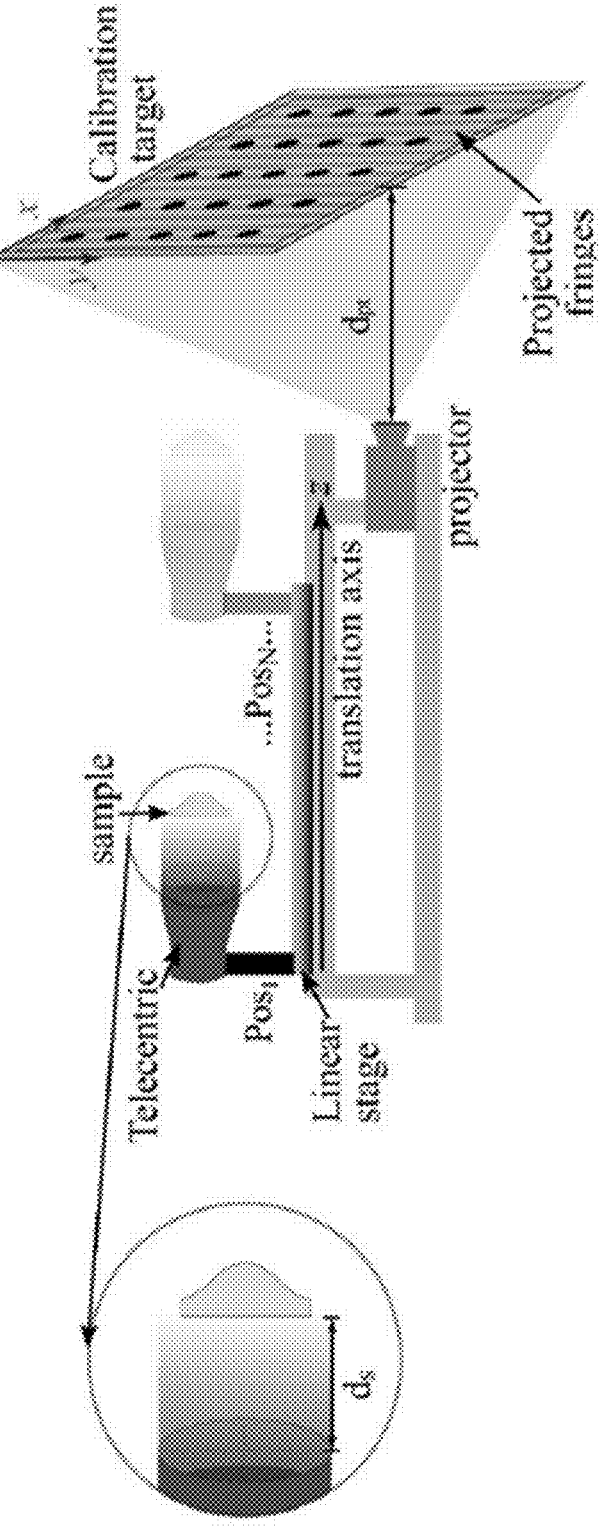
FIG. 6 shows one example of a measurement setup in which an active target comprises a projector and a diffuse passive calibration board.

FIG. 6 shows a measurement setup in which an active target comprises a projector and a well-defined diffuse passive calibration board. Fringes are projected onto a diffuse reference target, and the camera and the sample are stepped along the z-axis. Both the distance between the sample and telecentric lens $d_s$ and the distance between projector and calibration target $d_{pt}$ remain constant (e.g., at all times).

The present disclosure proposes an active target including a passive diffusive calibration target and a fringe projector, as shown in FIG. 6, to avoid the cover glass uncertainty [35-37]. The passive calibration target has a matt finish on top of aluminum/LDPE composite sheets, which offer high flatness and stiffness (~500 μm from the vendor Calib.io). The surface has been treated using an ultra-violet inkjet printing (from the vendor Calib.io) process to generate the reference markers. To obtain spatial information on a point (e.g., every point) of the passive target, a projector is employed to generate and project a series of horizontal and vertical fringes onto the target. Combined with phase-shifting techniques, it is possible to estimate the absolute phase in x- and y-direction and obtain the corresponding spatial coordinates for a camera pixel (e.g., every camera pixel). This process is the projector calibration, which differs from the classical sense (i.e., treating a projector as an inverse camera).

Figure 7:
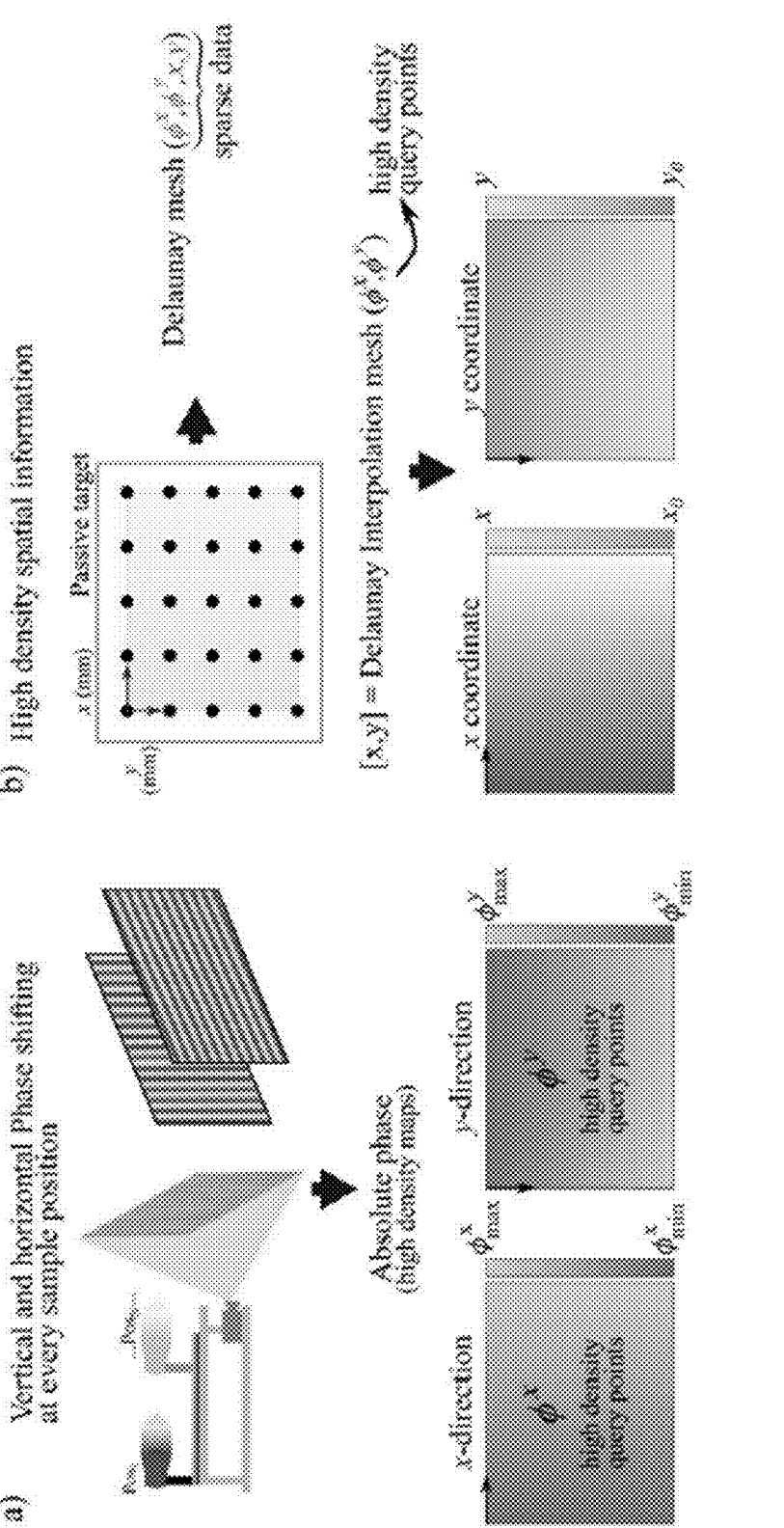
FIG. 7 shows one example of a high-resolution extraction of spatial information using an active target.

FIG. 7 shows a high-resolution extraction of the spatial information using the proposed active target; (a) shows that, at a z-position (e.g., every z-position), vertical and horizontal fringes are projected onto the target to generate absolute phase measurements in x and y directions; (b) shows that the spatial XY-location of each reference marker is used to obtain a high-resolution spatial map for both the x- and y-coordinate. This is a two-step procedure; firstly, a Delaunay triangulation mesh is created using the spatial information at the sparse features on the target and the absolute phase values at those locations. In case data is available from different cameras or z-planes, this could reduce the error. Afterward, the absolute phase maps obtained from (a) serve as a query point to estimate each pixel's high-resolution x- and y-coordinates (i.e., vision ray).

As shown in FIG. 7, the xy-location of each reference marker may be used to generate a 2D xy-map for each point on the board via interpolation (see (b) of FIG. 7). Similarly, the projected fringe patterns are used to obtain a 2D phase map in x- and y-direction (see (a) of FIG. 7). Having a 2D xy-map for each point on the target and two 2D phase maps enables creation of a function that maps the phase in x- and y-direction into spatial coordinates. The data to generate this mesh does not need to originate from a single plane. Numerous planes can be used for this purpose to reduce the error, even data from auxiliary cameras that capture the fringe patterns at, e.g., at a different angle. Delaunay triangulation [24] with natural neighbor interpolation using MATLAB built-in routines may be employed to generate the mapping function. Once the calibration mapping function is available, the spatial position on the target can be estimated for each ray using solely the phase data [x, y]=Phase_to_XY Mapping($\phi^x$, $\phi^y$) even for the case where the control points are not visible.

The active calibration target proposed here combines the advantages of currently known passive and active targets, where there is no cover-glass (and thus no cover-glass problem), and a high spatial resolution is maintained. The absolute phase measurements enable sub-$\frac{1}{100}$ fringe uncertainties with robustness against defocus errors while maintaining the ability to work with high tilt angles. In some cases, the absolute phase and spatial coordinates are simple low-order polynomials because both follow an almost linear trend. The latter aspect simplifies noise filtering.

To demonstrate the feasibility of this method, the vision rays of five different samples were measured, including sample 1 (a plano-concave lens with a 50 mm focal length (Ø25.4 mm, N-BK7)), sample 2 (a plano-convex lens with a 100 mm focal length (Ø25.4 mm, N-BK7)), sample 3 (a pair of commercially available spectacle lenses with adjustable focus), sample 4 (an array including of cubic phase plates (manufactured at UNC Charlotte)), and sample 5 (an Alvarez micro-lens array including of two cubic phase plate arrays (manufactured at UNC Charlotte)). The experimental setup follows the stricture shown in FIG. 7 and included an Edmund Optics TitanTL Telecentric Lens, (0.136×, f/11-f/ 22, telecentricity <0.10), a forward looking infrared (FLIR) camera (modelBFS-U3-200S6M-C with 5472×3648, 20MP, pixel pitch of 2.4 μm), and an Optoma Technology EH200ST projector (1920×1080, 3,000 lumens, Contrast ratio 20,000:1). The telecentric lens was stepped along the z-axis using a Physics Instruments (PI) M-404-6DG Precision Linear Stage (resolution 0.1 μm, yaw 75 μrad, pitch 75 μrad). Each sample was measured using the data from 30 equidistant with a plane separation of 1 mm. A series of phase-shifted fringe patterns were projected at each plane with the periods [10, 40, 160, 640, 2560](sample 1-4) and [42, 126, 378, 1134, 3402](sample 5) projector pixels. The projector gamma nonlinearity was compensated using a two-stage compensation with (i) firstly, a passive gamma calibration using the method is applied, where nonsinusoidal fringes are sent to the projector to produce sinusoidal fringes [61], and (ii) secondly, the 10-step Bruning temporal phase-shifting algorithm is employed [62] to suppress the remaining harmonics 0, ±1, ±2, ±3, ±4, ±5, ±6, ±7, ±8, ±9 [63]. A repeatability test across the calibration volume showed that a total of 10 phase steps for each period was sufficient to obtain a sufficiently low phase noise level (<2π/400). An exception was the Alvarez micro-lens array that had lower fringe visibility due to the high surface roughness. To overcome the resulting low signal-to-noise ratio (SNR) value, a 14-step Bruning algorithm has been employed [63]. The obtained wrapped phases are processed using the multi-wavelength phase unwrapping technique general optimum multifrequency (GOMF) [64] to obtain the absolute phase map [65]. The absolute phase is then converted into spatial xy-coordinates, using a mapping procedure (e.g., including generating a mapping function as described herein). These measurements provide xyz coordinates for each vision ray as both the camera and the sample are stepped along the z-axis. The vision rays at each pixel are estimated by fitting a line through each data-point using robust regression techniques [66], $$\vec{x} = \vec{o}_c + \vec{r}_c \Delta z = \vec{o}_c + \begin{pmatrix} V_x \\ V_y \\ 1 \end{pmatrix} n \Delta z = \begin{pmatrix} x_0 \\ y_0 \\ 0 \end{pmatrix} + \begin{pmatrix} V_x \\ V_y \\ 1 \end{pmatrix} n \Delta z,$$

where n is the plane number of the 30 measurement planes with n=0, 1, 2, . . . , 29. It may be convenient to define the direction vector (gradient) amplitude as $$S = \sqrt{V_x^2 + V_y^2}$$

for visualization purposes as it provides information on the structure of the sample.

Figure 8:
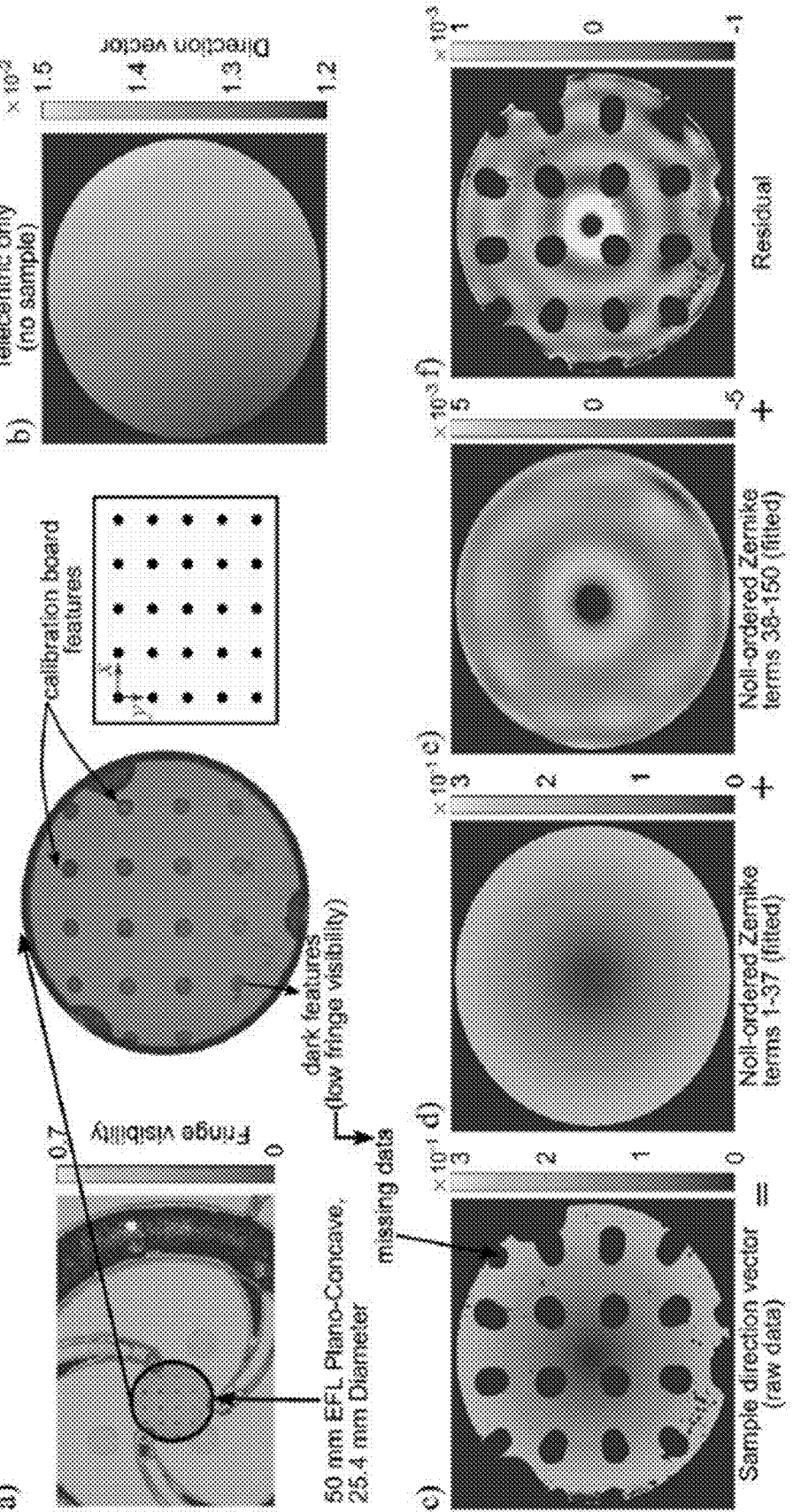
FIG. 8 shows one example of measurement results for an Ø25.4 mm Plano-Concave Lens with a 50 mm effective focal length (EFL).

FIG. 8 shows measurement sample 1 (Ø25.4 mm Plano-Concave Lens, 50 mm EFL): Direction vector amplitude; (a) shows a sensor view of the sample under test, the missing data correspond to obscured features in the passive calibration board; (b) shows a direction vector amplitude for the telecentric system (before placing the sample); (c) shows a sample direction vector. Noll-ordered Zernike decomposition for sample evaluation across spatial frequencies: (d)

Zernike terms 1:37 and (e) Zernike terms 38:150. In FIG. 8, (f) shows a residual after removing 150 Zernike terms.

The complete vision ray data of the two spherical lenses have been measured. The results for the 50 mm focal length plano-concave lens are shown in FIG. 8. The sample is placed near the center of the field of view (FOV) of the telecentric lens. In FIG. 8, (a) shows the fringe visibility for each pixel. The reference markers of this calibration target are printed in black and provide, therefore, low fringe visibility. This constrained may be reduced by printing the reference dots of the target in a lighter color (e.g., grey). In FIG. 8, (b) shows the direction vector amplitude $$S = \sqrt{V_x^2 + V_y^2}$$

[9] for the measurement system without the sample. This data is, in essence, related to the direction of the vision rays of the telecentric lens. The deflection can be calculated using $$\alpha_x = \alpha_x - a_x^T \text{ and } \alpha_y = \alpha_y - a_y^T.$$

In FIG. 8, (c) shows the raw data of the corresponding direction vector amplitude of the deflection induced by the measurement sample.

In FIG. 8, (d) and (e) show the case where the Zernike polynomials 1-37 and 38-150 have been fitted to the raw data shown in (c), respectively. The residual shown in (f) of FIG. 8 includes the data that is not described by the Zernike fitting process of (d) and (e), i.e., adding the data of (d), (e), and f together, one obtains the data in (c).

Figure 9:
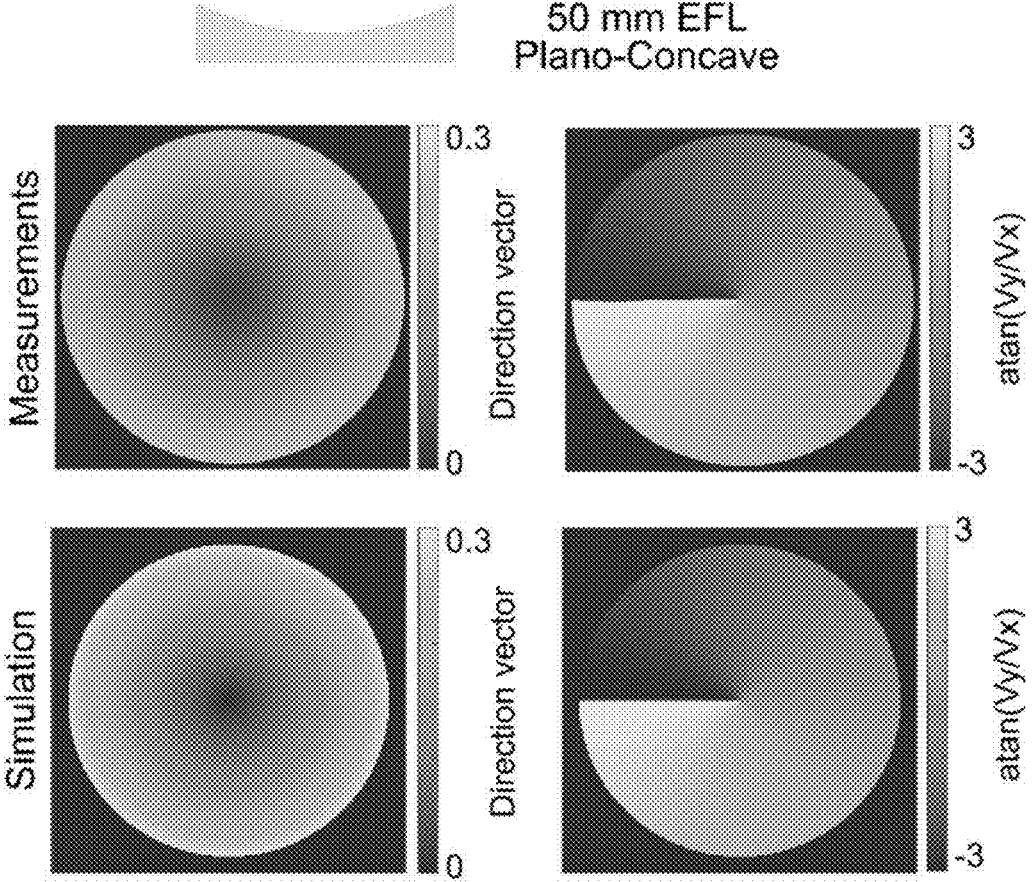
FIG. 9 shows one example of measurement results for an Ø25.4 mm Plano-Concave Len with a 50 mm EFL.

FIG. 9 shows measurement sample 1 (Ø25.4 mm Plano-Concave Lens, 50 mm EFL): measured (a) and simulated (c) direction vector amplitude $$S = \sqrt{V_x^2 + V_y^2}.$$

To distinguish between concave and convex wavefronts, the direction vector angle α=a tan $2(V_y, V_x)$ is shown in (b) and (d) for the measurement and simulated data, respectively.

Figure 10:
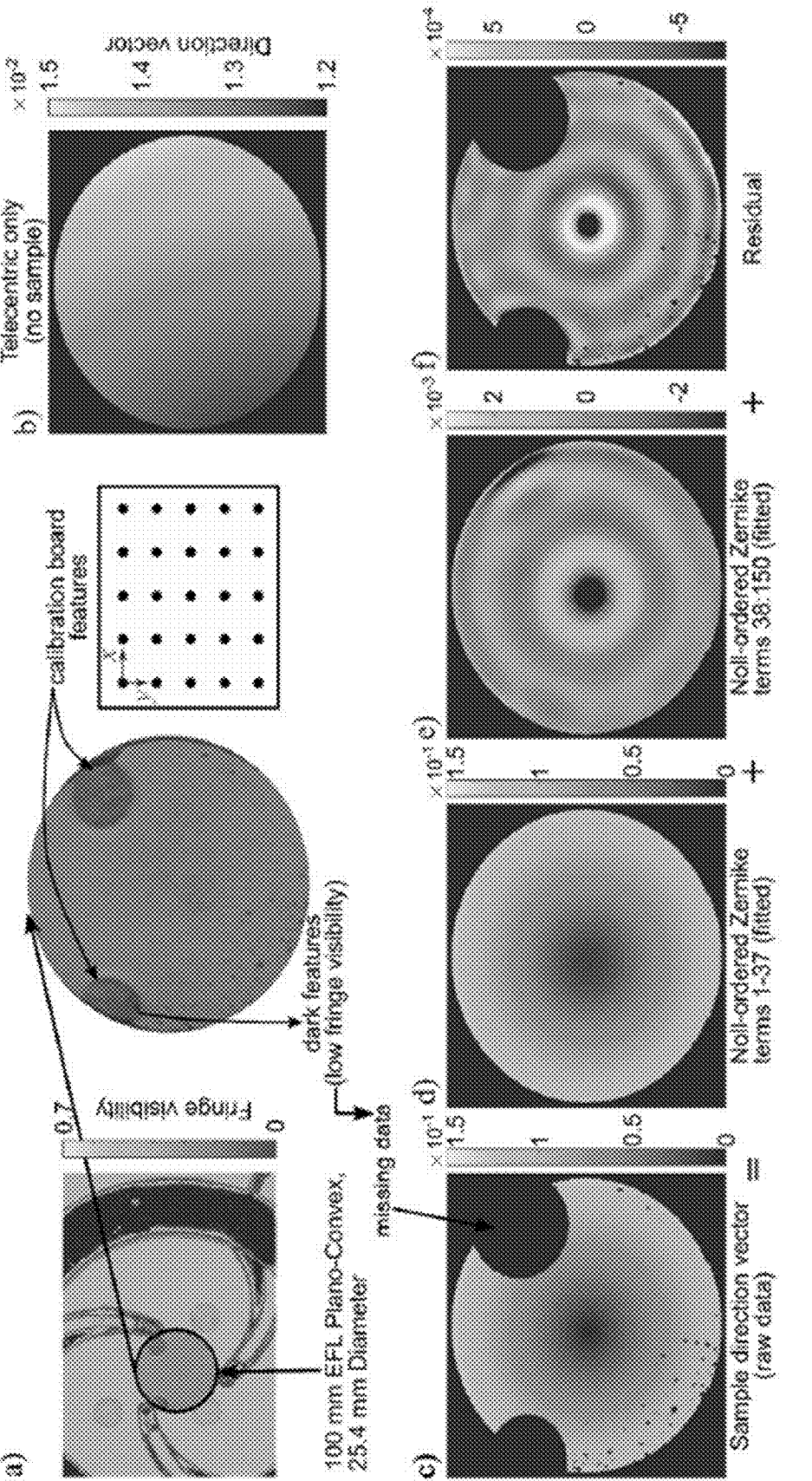
FIG. 10 shows one example of measurement results for an Ø25.4 mm Plano-Convex Lens with a 100 mm EFL.
Figure 11:
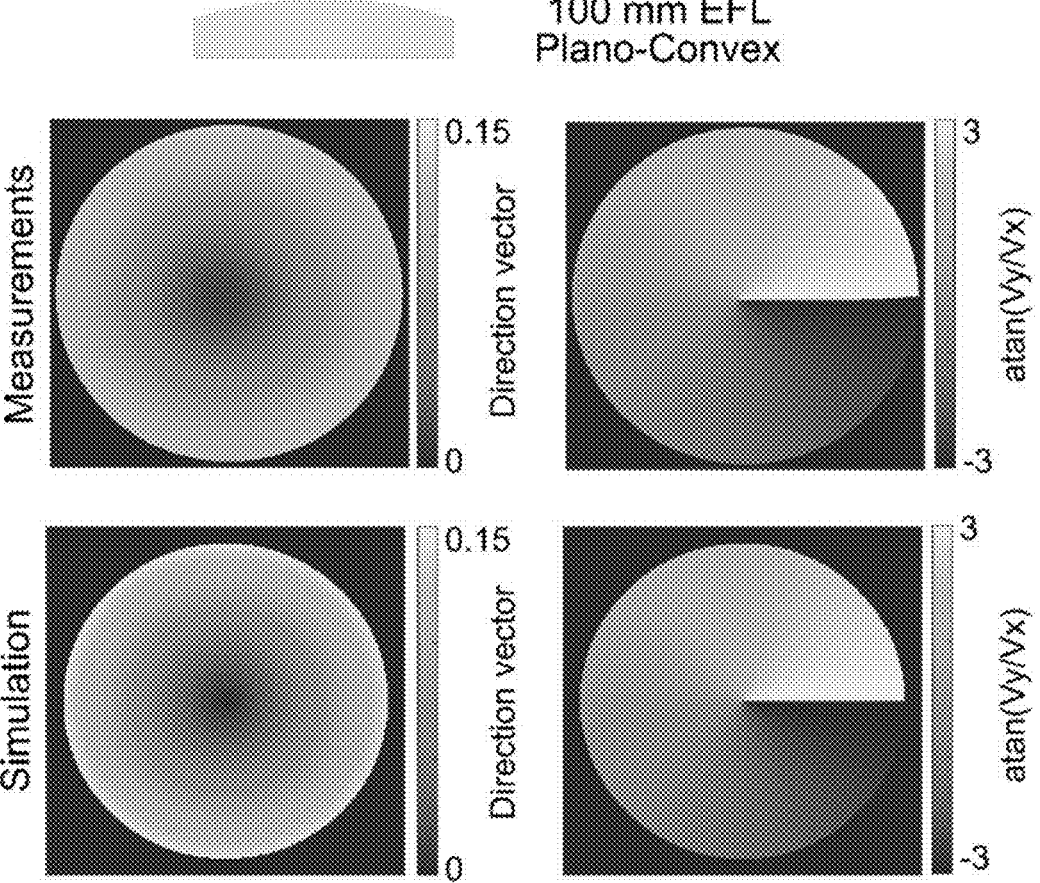
FIG. 11 shows one example of measurement results for an Ø25.4 mm Plano-Convex Lens with a 100 mm EFL.

A comparison of the measurement results with the theoretical values is shown in FIG. 9. In FIG. 9, (a) and (c) show the results of the direction vector amplitude $$S = \sqrt{V_x^2 + V_y^2}$$

for the (fitted) low-order measurement data and the theoretically expected value for an EFL of 50 mm, respectively. The direction vector angle α, calculated as α=a tan $2(V_y, V_x)$ may be used to distinguish between concave and convex surfaces. Furthermore, α also encodes information of the tangential component of the aberration of the sample; thus, it can be used as a metric during test piece assessment. The corresponding measurement results for Ø25.4 mm Plano-Convex Lens, 100 mm EFL are shown in FIGS. 10 and 11. The measurement sample 1 (50 mm EFL) has a direction vector amplitude that is twice as large as the case of measurement sample 2 (100 mm EFL), i.e., the measurement results indicate that the lens of sample 1 is faster than the lens of sample 2 by a factor of two.

FIG. 10 shows measurement sample 2 (Ø25.4 mm Plano-Convex Lens, 100 mm EFL): Direction vector amplitude; (a) shows a sensor view of the sample under test, the missing data correspond to obscured features in the passive calibration board; (b) shows a direction vector amplitude for the telecentric system (before placing the sample); (c) shows a sample direction vector. Noll-ordered Zernike decomposition for sample evaluation across spatial frequencies are shown in: (d) Zernike terms 1:37, (e) Zernike terms 38:150, and (f) residual after removing 150 Zernike terms.

FIG. 11 shows measurement sample 2 (Ø25.4 mm Plano-Convex Lens, 100 mm EFL): measured (a) and simulated (c) direction vector amplitude $$S = \sqrt{V_x^2 + V_y^2}.$$

To distinguish between concave and convex wavefronts, the direction vector angle α=a tan $2(V_y, V_x)$ is shown in (b) and (d) for the measurement and simulated data, respectively.

Figure 12:
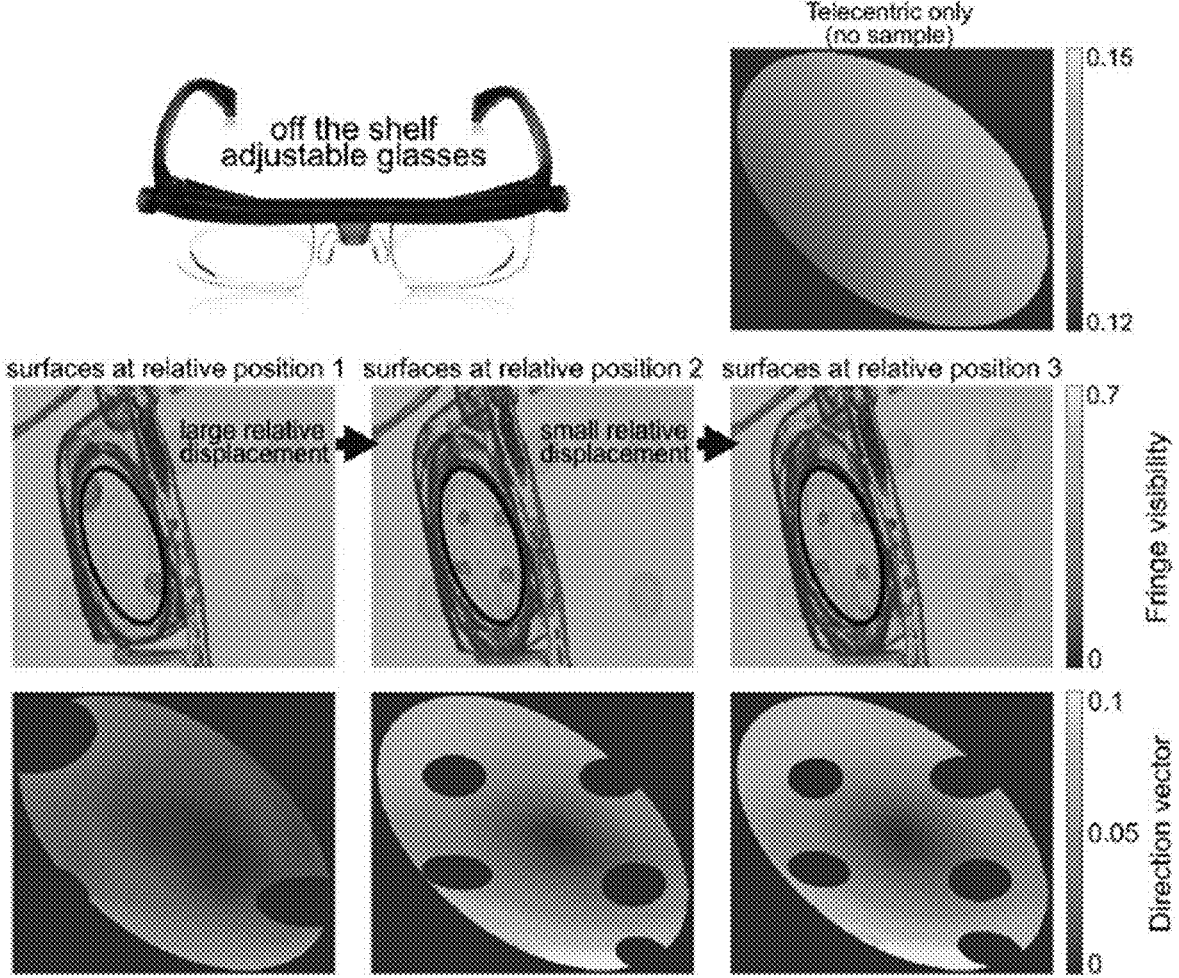
FIG. 12 shows one example of measurement results for off-the-shelf spectacle lenses with adjustable power.

FIG. 12 shows, measurement sample 3 (off-the-shelf spectacle lenses with adjustable power): direction vector amplitude for three different configurations of the adjustable glasses. The missing data correspond to obscured features in the passive calibration board shown in the second row.

Figure 13:
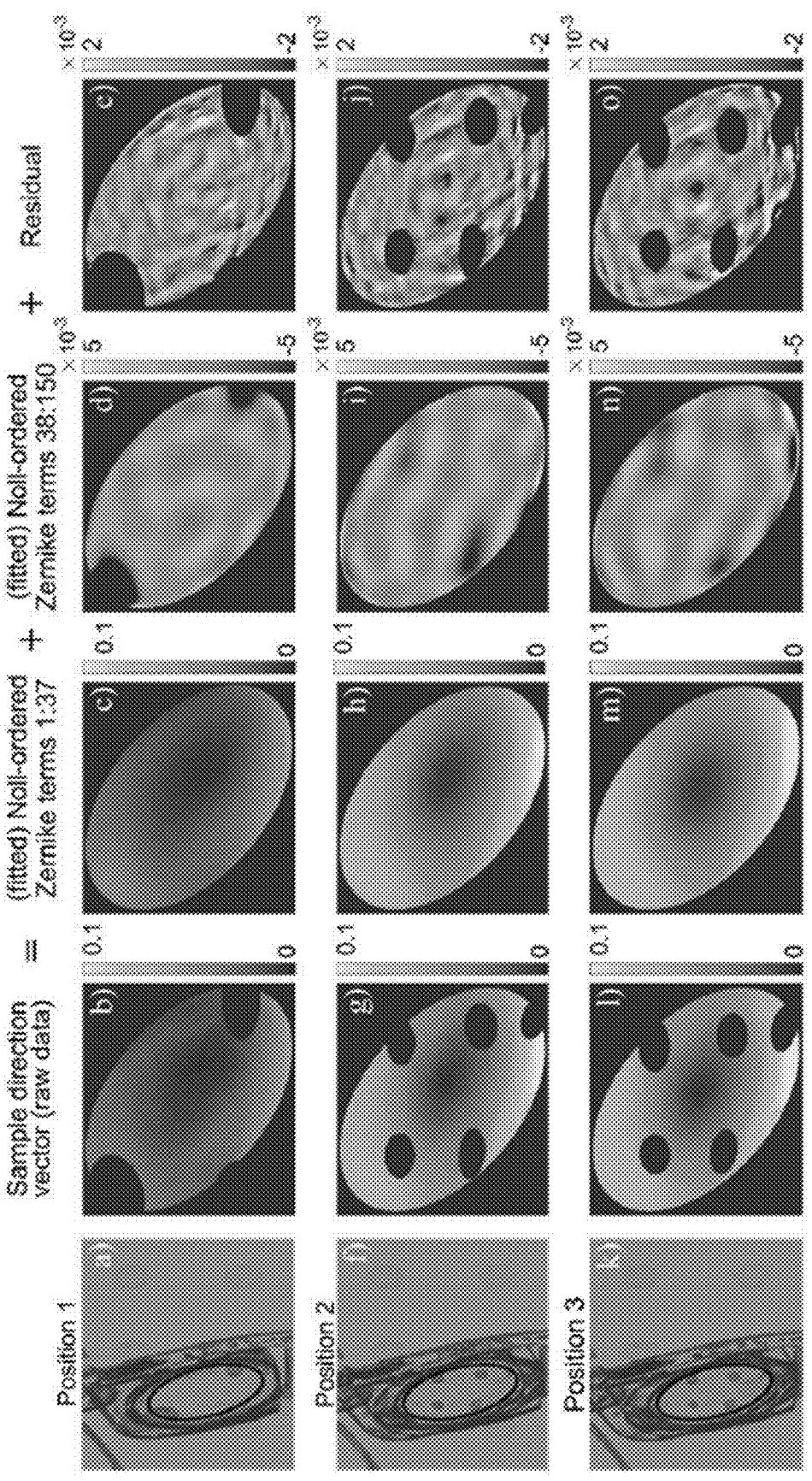
FIG. 13 shows one example of a Noll-ordered Zernike decomposition for off-the-shelf spectacle lenses with adjustable power.

FIG. 13 shows Noll-ordered Zernike decomposition for sample 3. In FIG. 13, (a), (f), and (k) (first column) show the fringe visibility of the sample for the different relative positions of the two surfaces that compose the variable EFL lens. The raw data of the measured sample direction vectors are shown in (b), (g), and (l). The third column, (c), (h), and (m), shows the fitted Noll-ordered Zernike polynomials that dominate the direction vector amplitude. The fitted higher-ordered Noll-ordered Zernike terms 38:150 are shown in (d), (i), and (n) that provide valuable insights into the mid-spatial frequency components. Finally, the residuals for the datasets are shown in the last column. The obscured features from the calibration target are responsible for the missing data.

Figure 14:
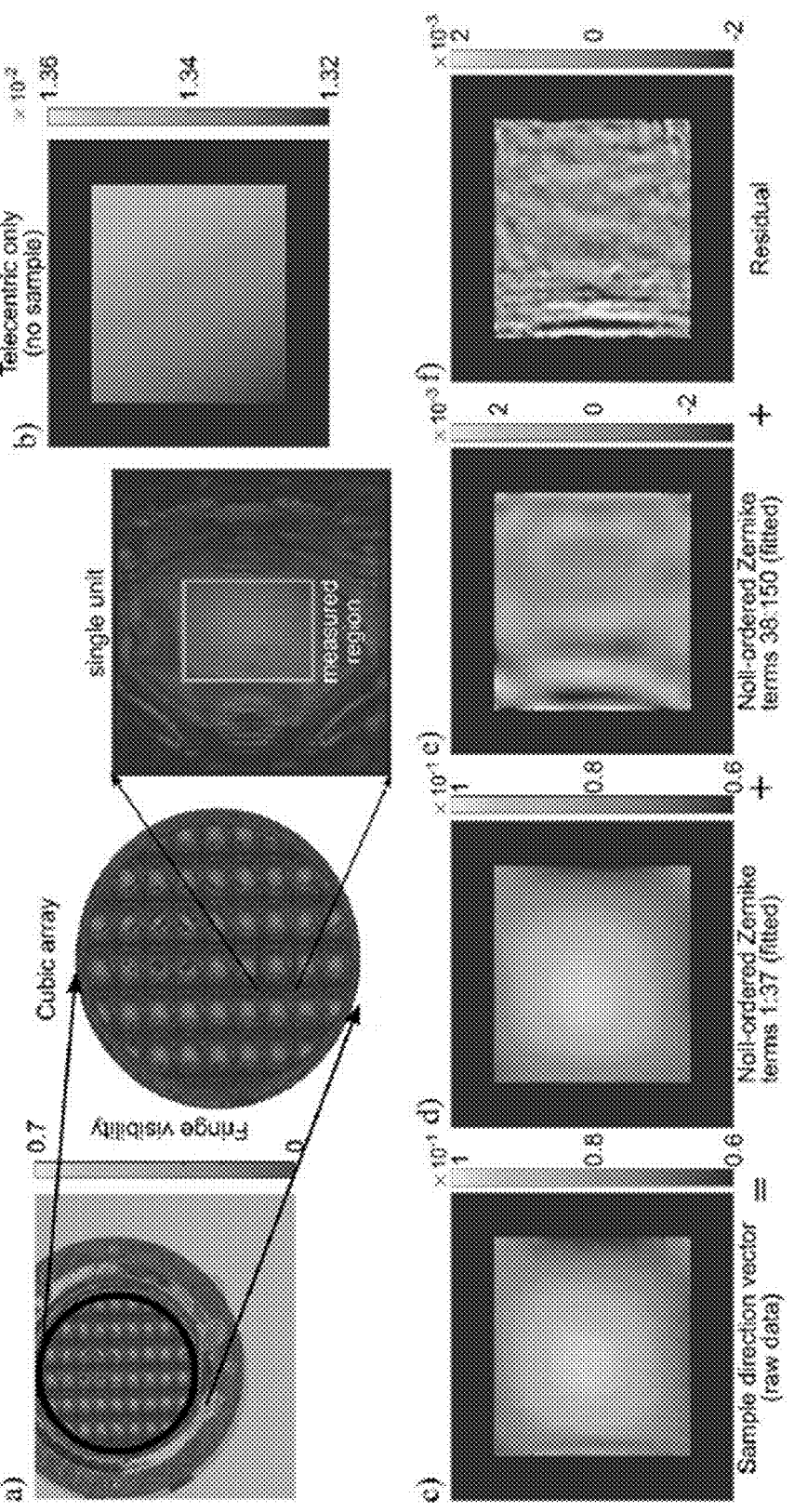
FIG. 14 shows one example of measurement results for a micro-optic array including cubic phase plates.

FIG. 14 shows measurement sample 4 (micro-optic array including of cubic phase plates): (a) shows sensor view of the sample under test; (b) shows direction vector amplitude for the telecentric system (before placing the sample); (c) shows direction vector amplitude of the sample. The Noll-ordered Zernike decomposition for sample evaluation across spatial frequencies ranges is found in (d) Zernike terms 1:37 and (e) Zernike terms 38:150, where the residual is shown in (f).

Figure 15:
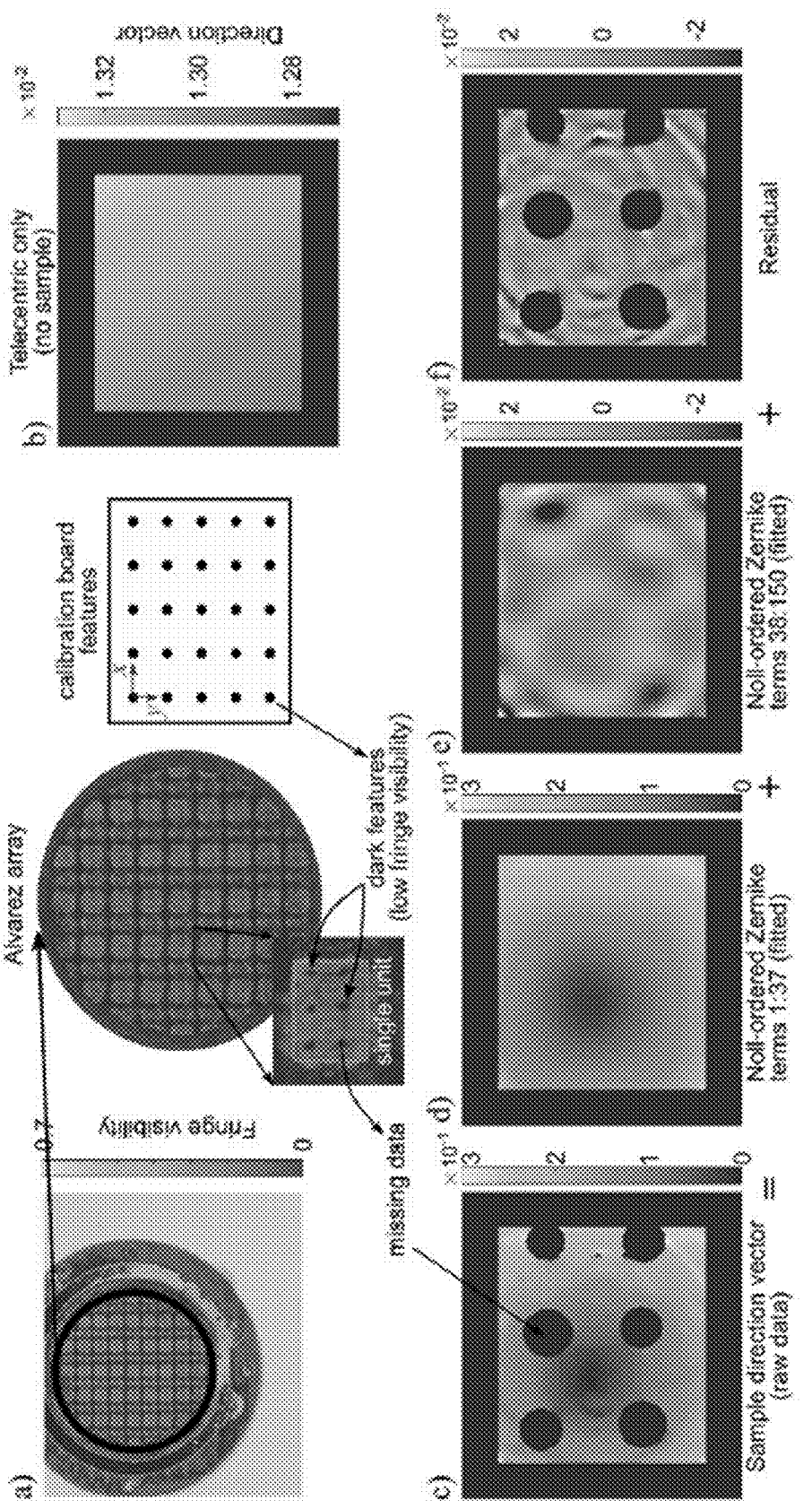
FIG. 15 shows one example of measurement results for an Alvarez lens array single unit.

FIG. 15 shows measurement sample 4 (Alvarez lens array single unit): Direction vector amplitude. In FIG. 15, (a) shows sensor view of the sample under test, the missing data correspond to obscured features in the passive calibration board; (b) shows direction vector amplitude for the telecentric system (before placing the sample); (c) shows sample direction vector. Noll-ordered Zernike decomposition for sample evaluation across spatial frequencies: (d) Zernike terms 1:37, (e) Zernike terms 38:150, and (f) Residual after removing 150 Zernike terms.

The first freeform optic measured is a pair of adjustable spectacle lenses based on an Alverez lens design [67], as shown in FIG. 12. Each lens includes of two cubic phase plates that can be sheared laterally relative to one another to adjust the power. FIG. 12 shows the measurement results for three different lens shears (e.g., configurations) for one adjustable lens. The maximum amplitudes for the three different configurations are 0.06, 0.11, and 0.26, respectively. A decomposition using Noll-ordered Zernike polynomials is shown in FIG. 13. The Noll-ordered Zernike polynomials allows separating the direction vector amplitude into its low-frequency terms and the MSF components that can be used to assess the errors introduced during the manufacturing process where the design prescription is available.

Figure 16:
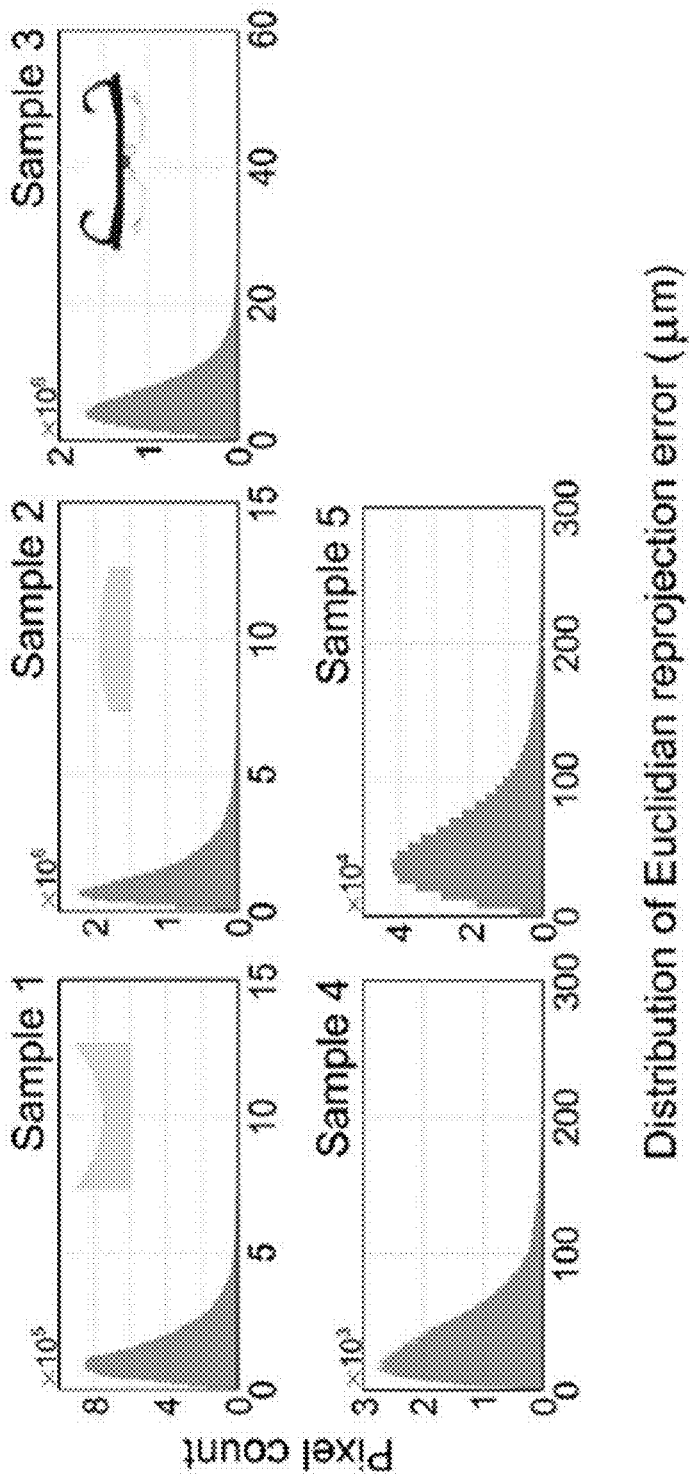
FIG. 16 shows one example of Euclidean reprojection error obtained for various samples.

The second freeform optic measured is a micro-optic array including of cubic phase plates. For this sample, a single unit without the markers was used to avoid data dropout. The measurement results shown in FIG. 14 show that a single array cell produces a direction vector amplitude between 0.062 and 0.097. Similar to the case of the specular lenses, the vision rays of a micro-optic Alvarez lens array that includes of two micro-optic array elements with cubic phase profiles (i.e., two array) were measured. The results in FIG. 15 show the direction vectors of the cell where the two cubic phase elements overlap. Similar to the previous cases, the regions with missing data are related to low fringe visibility caused by the reference markers of the calibration board. To evaluate the vision ray calibration, the reprojection error in the calibration coordinate system was calculated as the Euclidean distance between the recorded coordinates $$(\vec{x}_w^m)$$

and the vision rays reprojection $\vec{x}$ $$\left( \text{where } \vec{x} = \vec{\partial}_c + \vec{r}_c \Delta z = \vec{\partial}_c + \begin{pmatrix} V_x \\ V_y \\ 1 \end{pmatrix} n\Delta z = \begin{pmatrix} x_0 \\ y_0 \\ 0 \end{pmatrix} + \begin{pmatrix} V_x \\ V_y \\ 1 \end{pmatrix} n\Delta z \right)$$

for a pixel (e.g., every pixel) as $$\delta_m = \left\| \vec{x}_w^m - \vec{x}_m \right\|^2,$$

in which the resulting error distributions, shown in FIG. 16, indicate that, for spherical lenses (e.g., samples 1&2), the root mean square error (RMSE) reprojection error is smaller than ~5 µm while for sample 3 the RMSE reprojection error is ~10 µm. For sample 4, the micro-lens array with cubic phase plates, the RMSE is ~55 µm. The micro-lens array including of Alvarez lens cells, sample 5, has an RMSE of ~90 µm.

FIG. 16 shows reprojection error (Euclidean distance) for samples 1 through 5.

Figure 17:
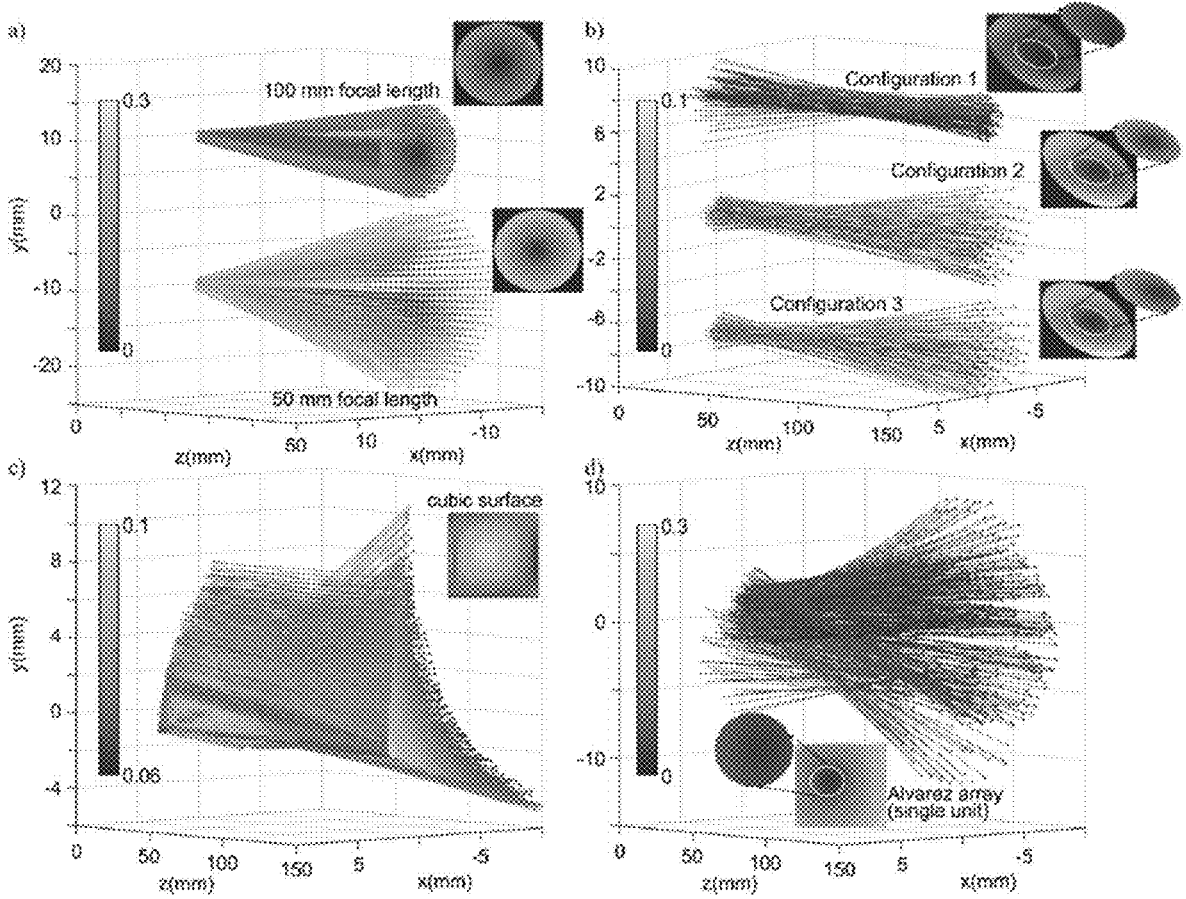
FIG. 17 shows one example of vision rays obtained for various samples.

FIG. 17 shows (all measurement samples): vision rays for (a) the spherical lenses with 50 mm and 100 mm EFL, (b) the commercial spectacle lenses with adjustable power, (c) a single cubic phase element of the micro-optic array, and (d) a single cell of the Alvarez micro-lens array. Each ray has been color-coded as a function of the direction vector amplitudes. For (b) and (d), the vision rays of the relevant center region of the lenses are plotted.

Figure 18:
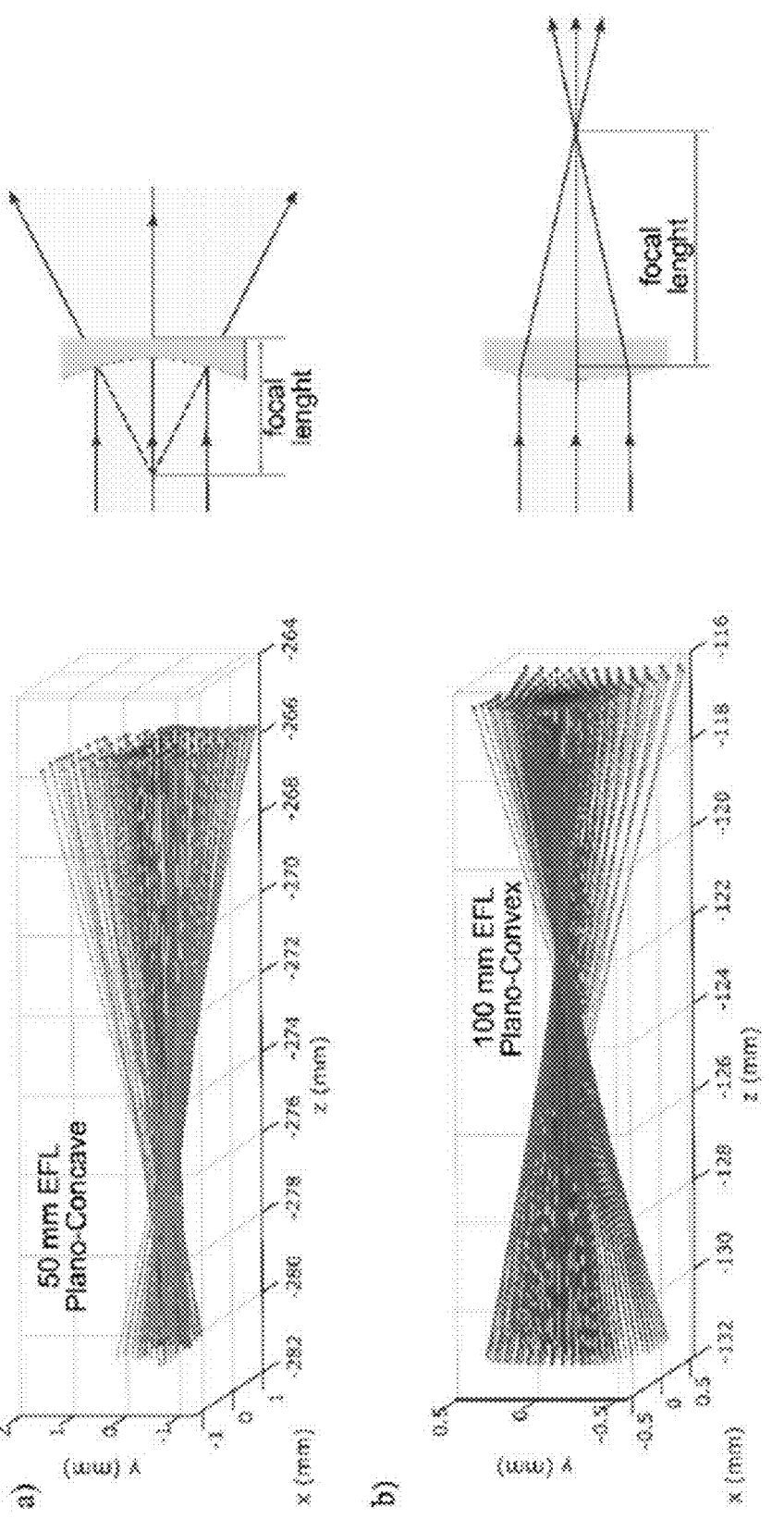
FIG. 18 shows one example of a difference between the focus point of an Ø25.4 mm Plano-Concave Len with a 50 mm EFL and an Ø25.4 mm Plano-Convex Lens with a 100 mm EFL.

FIG. 18 shows difference in the focus point between sample 1 and sample 2. In FIG. 18, (a) shows the focus point for the 50 mm EFL lens is located at z=−275.83 mm; (b) shows the focus point for the 100 mm EFL lens is located z=−126.33. The distance between the two focus points is 149.5 mm. For visualization purposes, the measured trajectories of the vision rays for the samples are plotted in 3D in (b) of FIG. 17 shows the vision rays for the pixels that go through the center of the sample. For this dataset, the minimum bundle diameter for configuration 1, 2, and 3 is found near ~50 mm, ~5 mm, and ~1 mm, respectively. The wavefront of the Alvarez cell in (d) of FIG. 17 has more mid-spatial frequency components and, therefore, a less regular vision ray profile compared to the other cases, as shown in (a) of FIG. 17. For sample 1 and 2, FIG. 18 shows a plot of the vision rays in their individual coordinates system such that z=0 is the plane where the bundle diameter is smaller for visualization purposes. The measured refracted rays are the vectors normal to the propagating wavefront [9,17]. The directions of the refracted rays can be interpreted as a pointing vector, which is normal on the propagating wavefront [9,17]. Thus, the wavefront can be reconstructed by integration of the local wavefront slopes.

Figure 19:
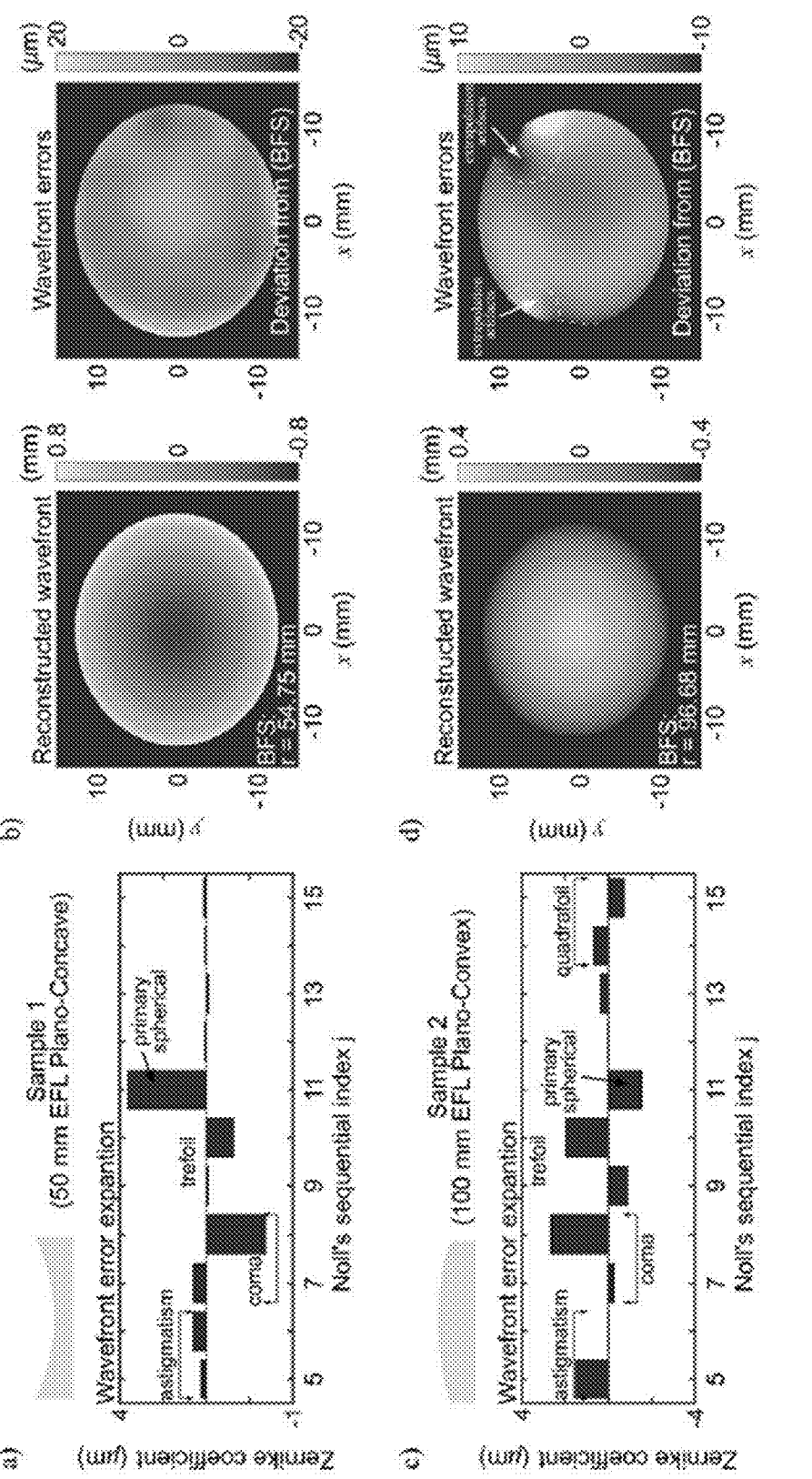
FIG. 19 shows one example of geometric-wavefront reconstructions using vision ray measurements obtained for an Ø25.4 mm Plano-Concave Len with a 50 mm EFL and an Ø25.4 mm Plano-Convex Lens with a 100 mm EFL.

FIG. 19 shows measurement results sample 1 and 2: Geometric-wavefront reconstruction using vision ray measurements.

Figure 20:
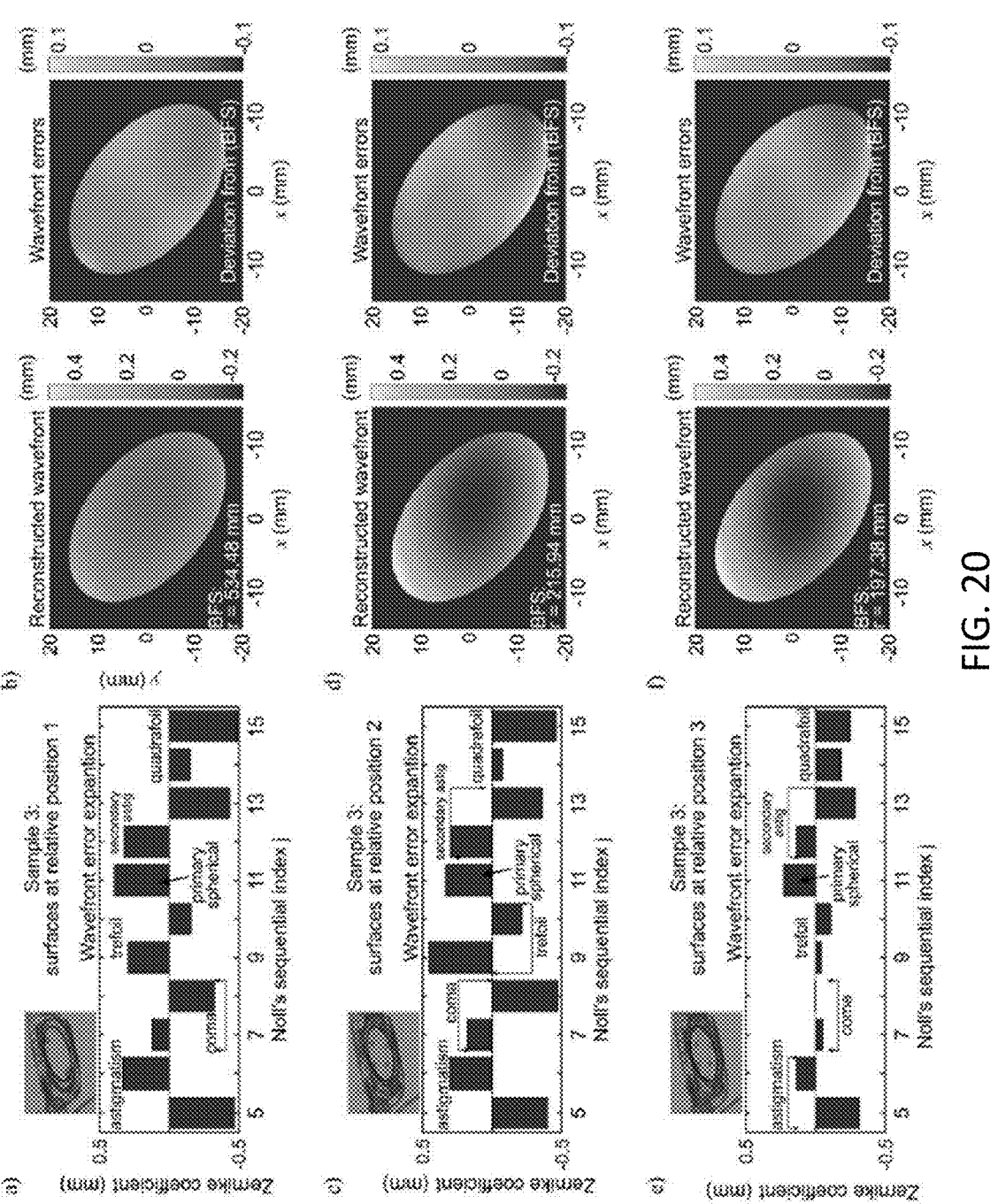
FIG. 20 shows one example of geometric-wavefront reconstructions using vision ray measurements obtained for off-the-shelf spectacle lenses with adjustable power.

FIG. 20 shows measurement results sample 3: Geometric-wavefront reconstruction using vision ray measurements.

Figure 21:
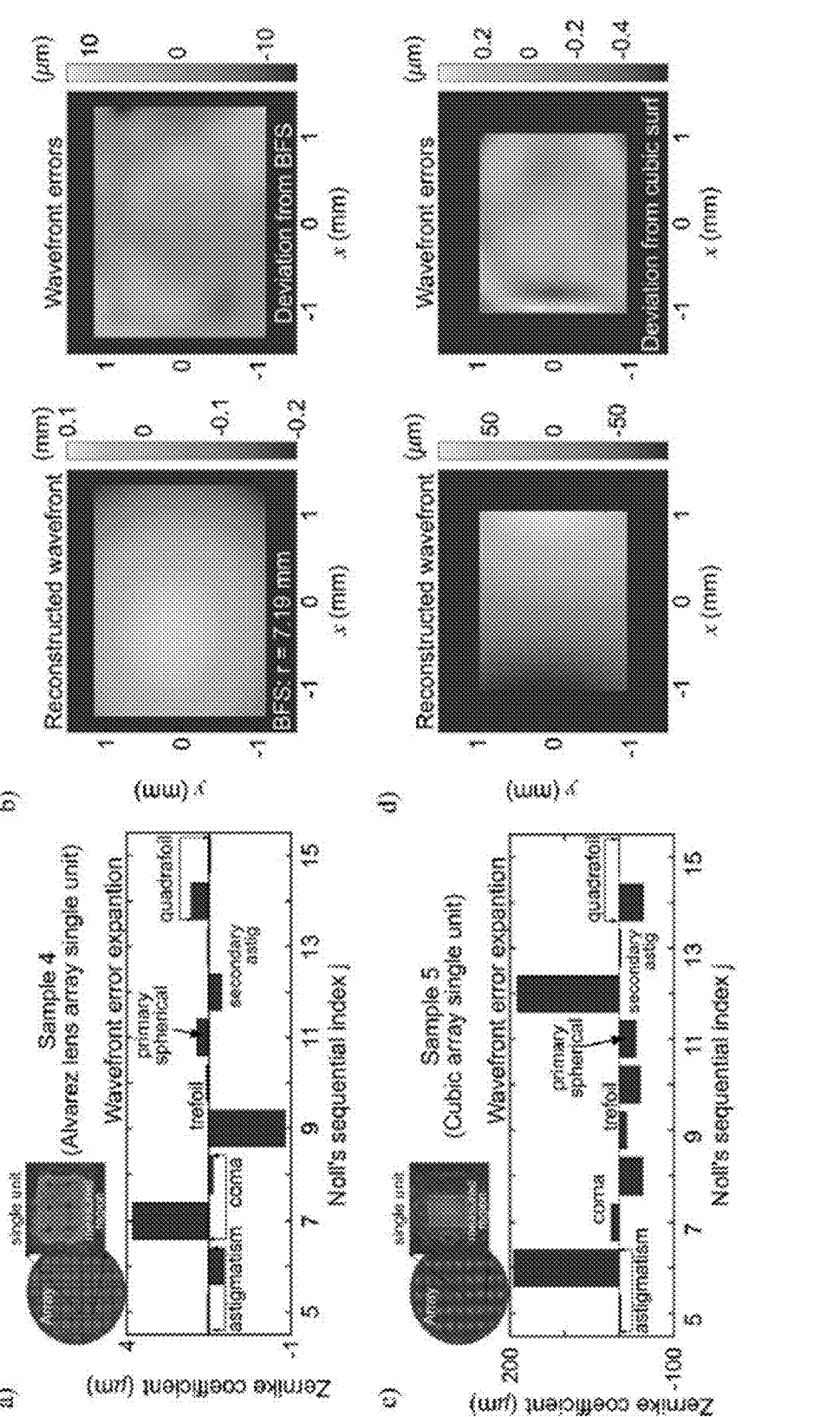
FIG. 21 shows one example of geometric-wavefront reconstructions using vision ray measurements obtained for a Noll-ordered Zernike decomposition for off-the-shelf spectacle lenses with adjustable power and a micro-optic array including of cubic phase plates.

FIG. 21 shows measurement results sample 4 and 5: Geometric-wavefront reconstruction using the vision ray measurements.

There are several different deterministic wavefront reconstruction algorithms described in the literature. Some such algorithms can be classified into two categories: zonal and modal integration techniques. In zonal algorithms, the wavefront is recovered from a set of linear equations that describe the local (zonal) relation between wavefront and its derivatives in x and y directions [44,68,69]. The intrinsic zonal property of this method translates into highly accurate local wavefront estimation; however, the same property makes this technique susceptible to noise. On the other hand, modal integration reconstructs the wavefront as a superposition of linearly independent (orthogonal) analytical polynomials that form a basis. The basis is differentiable, which allows a fitting in the slope domain that returns the corresponding weighting coefficients for a mode (e.g., every mode) in the basis. As a result of this "global" fitting, the susceptibility to noise and random error is reduced. Another advantage of model fitting is the direct relation between the basis and its connection to physical parameters in the measurements. Common polynomial bases for wavefront reconstruction include Zernike [70], Legendre [71], Chebyshev [72], radial basis functions [73], B-splines [74], complex exponential [75], and Q-Forbes [76]. Here modal integration developed in [70] is applied, where the wavefront is calculated as $$W(x, y) = \sum_{i=1}^{N} a_i f_i(x, y)$$

with $f_i(x, y)$ the Noll ordered Zernike basis. The estimated vision rays are the gradient of the geometric wavefront [77], i.e., for this case $(V_x, V_y) = \vec{\nabla} W$, $$V_k = \sum_{i=1}^{N} \frac{d}{dk} a_i f_i(x, y), k = x, y,$$

since this method creates numerical orthogonal transformation based on analytical polynomial sets the technic can be applied to arbitrary shaped apertures. The reconstructed geometric wavefronts are shown in FIGS. 19-21. The present disclosure proposes a vision ray metrology system that includes of a cover-glass-free active target, a translation stage, and a telecentric camera. The translation stage steps both the camera, the telecentric lens, and the measurement sample together along the z-axis to record the xyz-coordinates for each vision ray (i.e., camera pixel) without changing their relative positions. Each vision ray is then estimated using a simple line fitting in 3D. This method relies on the information in the vision ray direction and is inherently robust against long-term drifts that typically occur in deflectometry (e.g., drift of the camera-display baseline). Deflectometry techniques rely on mathematical optimization techniques to estimate the camera's position and display and may include recalibration with a flat reference sample.

The differential nature of the measurement has another advantage compared to deflectometry. In vision ray metrology, the deflection of vision rays is measured, but the distance between the telecentric lens and the sample remains unchanged throughout the measurement. Hence, the vision rays reaching the camera have the same entry point on the surface of the sample—the line fitting in 3D can be applied with no problems. In contrast, deflectometry often includes moving the sample within the measurement volume to estimate the geometric constraints using optimization solvers. The geometric constraints may be used to trace the rays in reverse from the camera pixel to the display pixel. However, as the sample is placed at different locations, the measured rays at a given camera pixel are not incident on the same surface point. As a result, sub-pixel interpolation or other methods may be considered to obtain the sample surface shape. A comparison between vision ray metrology and deflectometry is shown in the following Table 1.

TABLE 1

| Technology Comparison | vision ray Metrology | Transmission Deflectometry |
|---|---|---|
| What is common: | One ray per pixel | |
| | Integration of slope data | |
| | Pre-calibrated cameras | |
| | High-resolution phase measurements to estimate the spatial x- and y-location on the display or screen | |
| | What is different: | |
| Distance between camera and sample | May be unknown, but remains constant | May vary, and may be estimated iteratively |
| Distance between screen and ample | May be unknown, but the z-step is known accurately | May vary, and may be estimated iteratively using optimization solvers |
| Distance between camera and screen | May be unknown, but the z-step is known accurately | Remains constant, and may be estimated during the calibration using optimization solvers |
| Sample placement and alignment | May not be used for telecentric imaging systems | May depend on the performance of optimization solvers |
| Sensitivity to baseline drifts (camera screen) | Relatively low due to differential measurement | Relatively high and depends on recalibration |
| Reference target | Cover-glass free active target | Display with cover-glass as active target (produces view-angle dependent errors) |
| Measurement principle | Measure sample induced deflection of vision rays (the vision rays do not change the entry-location on the sample surface when stepping along z). | Trace rays individually from a point on the display to the camera pixel (the vision rays do change the entry-location on the sample surface when moving the sample within the measurement volume, interpolation of the sample surface may be used) |

The measurement results shown in at least FIGS. 8 through 10 show that the vision ray data can accurately be obtained for various measurement freeform optical samples while having fewer constraints on the sample alignment. FIGS. 9 and 11 show an excellent agreement with the simulation. An interesting detail is that the slope information $V_x$, $V_y$, or $$S = \sqrt{V_x^2 + V_y^2}$$

can be used to highlight some surface properties. FIGS. 8, 10, 13, 14, and 15 show that further data processing permits the separation of the slowly varying terms from the mid-spatial frequency components in the direction vector amplitude. This information could be further used for assessment during the fabrication process of freeform surfaces.

The vision ray metrology approach described herein allows recovering the geometric wavefront of a sample under test using solely the $V_x$ and $V_y$ (wavefront slopes). Using these vector components, it is possible to recover the vector normal to the surface as described in [78]. Modal integrations of the wavefront slopes can also be used to interpolate the missing data points, which are mainly dominated by the dark reference points on the calibration target for the current dataset. Notably, when using a different reference target with a lighter grey level, it is possible to obtain a fringe signal on the reference points. The use of a different target may overcome the missing data points. The resulting high-resolution dataset could then be processed using a combination of zonal and modal integration methods [79], which makes that technique applicable for highly irregular surfaces.

The random component of the vision ray error and the resulting wavefront may reach ~500 nrad when using 50 planes and ~150 nrad when using 150 planes for $\Delta z$=10 mm. Nevertheless, the dominant errors are systematic and include systems drifts. In some cases, systematic errors may be due to system drifts. For example, the vision ray metrology system is insensitive to lateral drifts but sensitive to axial drifts and changes in the projector orientation angle. In some examples, in which differential measurements are applied (i.e., when vision rays are measured back-to-back for the telecentric lens with no sample and the telecentric lens with the sample), the systematic error cancels and a wavefront error in the order of about 123 nm PV (15.9 nm RMS) can be achieved. The results presented herein may be susceptible to drifts even for back-to-back measurements. Other systematic errors that are presented but uncompensated originate from various sources, such as the flatness of the target (or flatness of the display, if a display is used), the ability to measure the reference markers of the target accurately, and thermal drifts, in particular, if they occur within back-to-back measurements. This includes thermal expansion of the sample or the calibration board, changes in the aberrations of the telecentric lens of the system projector, drifts of the projector orientation and location. Linear stage errors (positioning errors, as well as yaw, roll, and pitch errors). Sample drifts (displacement or tilt) relative to the telecentric system during measurements other temporal changes (vibrations, etc.) One source of error may include relatively long measurement time (~7 hours per sample with post-processing) due to relatively slow implementation of the image acquisition system. However, optimized systems (with hardware triggered projectors) that operate at about 5 fps could measure a sample (with post-processing) within about 17 min. Sophisticated acquisition system could further reduce the measurement time to below 5 min. The reported vision ray amplitude may serve as a (decisive) metric for assessing the geometrical properties of the surface under test. Optical shops and lens manufacturers may therefore use this information to improve manufacturing processes, for example, even when conventional techniques fail. The present disclosure extends this approach and proposes a vision ray metrology system that estimates the geometric wavefront of a measurement sample using the sample-induced deflection in the vision rays [52]. The system includes a telecentric imaging system for the sensor, which allows sample placement within the constant field of view of the sensor without additional alignment concerns. In contrast to PMD, the vision ray metrology system described herein provides for differential measurements, and hence, the absolute position and orientation between target and camera may not be known (or used). This optical configuration reduces the complexity of the reconstruction algorithms; unlike deflectometry, the proposed vision ray metrology system may not use mathematical optimization algorithms for calibration and reconstruction—the vision rays are obtained using a simple 3D fitting of a line. Furthermore, the cover glass of the display [35-37] is an error source in deflectometry. The vision ray metrology system described herein provides for an active target including of a passive diffusive calibration target and a fringe projector (see FIG. 6), to avoid any cover glass related problems. The present disclosure demonstrates the feasibility of this approach via simulation and experiments for both spherical and freeform surfaces. For the samples, the estimated vision rays $V_x$ and $V_y$ have been used to estimate the geometric wavefront [77] using modal integration techniques [70], which can be translated into a heightmap if the material properties are known. The accurate phase measurements produce a notably small random error of ~500 nrad in the estimated vision rays. However, the presence of systematic errors as well as drifts that constrain the actual measurement uncertainty. Characterizing and compensating these error sources is part of future research. The present disclosure applies to multi-freeform surfaces, such as for cases in which multiple measurements are recovered for different sample positions and orientations. Thus, the proposed testing method provides a simple, low-cost, and optical shop floor-friendly way to measure the wavefronts of optical samples. The present disclosure is for numerous applications, but in particular, the metrology and alignment of freeform optics.

Optical metrology has become a versatile tool in manufacturing, fundamental research, and engineering applications. Advances in optical manufacturing have given designers the possibility to realize complex surfaces. However, precise, contact-free, and full-field measurement of freeform optics is still a challenge nowadays [80]. As manufacturing techniques improve, so do the metrology constraints. Interferometry and deflectometry are two popular optical test methods that provide high accuracy. Interferometry includes null testing, whereas for aspheres and free form optics, this implies the implementation of computer-generated holograms (CGHs), and high-cost compensation optics, which diminish the practical applications in industrial settings. On the other hand, deflectometry is a non-null technique that has shown accuracies similar to commercial interferometers, but not without using optimization processes [81], initial surface models [82], or complex calibration procedures [83,84] based on ray tracing. Deflectometry may be used in reflection and in transmission configurations [85-87]. Experimental Ray Tracing (ERT) is another competitive technique introduced by Häusler et al. in 1988 [88]. In ERT, a ray with a known angle and position is deflected by the sample, where the direction of the deflected ray is measured using two parallel planes that are orthogonal to z [89]. ERT has also been performed to find the rays that propagate near the focus of test pieces which allows point-wise measurements of the deflected rays [90] and can be used to characterize the gradient index of optical elements as described in [91].

The present disclosure provides for a vision ray metrology system that includes of an active target and a camera with well-characterized vision rays. The sample under test is placed between the camera and the screen, resulting in a change of the vision rays due to the refractive surface under test. The concept of vision rays has been borrowed from the camera calibration techniques of the vision community, where the bundle of rays incident onto a camera pixel is represented by a single chief ray. This vision ray camera model was first introduced by Grossberg and Nayar [92] and later improved [93-97]. The proposed vision ray metrology system measures the sample-induced deflection in the vision rays; in contrast, PMD uses accurate knowledge of the camera's location and the active target to trace the rays through the sample and the measurement system. The reconstruction algorithm of the proposed metrology system uses a simple fitting procedure (fitting a ray through a line), whereas PMD uses elaborated optimization routines that may be sensitive to system drifts and suffer from convergence problems.

A generic vision ray model may be used as an alternative to the classical pinhole model to describe the mapping between 3D scenes to 2D mages performed by the imaging systems used on imaged base metrology techniques, especially for cases where the standard model fails. The vision ray camera model [88,107,134] is a geometric model that assigns a so-called 3D vision ray $\{\vec{o}_c, \vec{r}_c\}$, or pixel line of sight to a sensor pixel (e.g., every sensor pixel) with the pixel coordinates (u, v), that originates at the coordinate vector $\vec{o}_c$ and has the direction vector $\vec{r}_c$. Any point on the ray $\{\vec{o}_c, \vec{r}_c\}$ projects back to (u, v) as shown in FIG. 22 (i.e., pierces the sensor plane at the location of the pixel of origin). Commonly, the vision rays are defined so that the third component of $\vec{o}_c$ equals 0, and the third component of $\vec{r}_c$ equals 1. The other components of $\vec{r}_c$ are given by tan $\alpha_x$ and tan $\alpha_y$, with the angles $\alpha_x$ and $\alpha_y$ describing the ray direction in the x- and y-direction [91]. For visualization, the direction vector (gradient) amplitude S is calculated as $$S = \sqrt{V_x^2 + V_y^2}$$

[91].

FIG. 22 shows a vision ray imaging model. The rays entering the camera and impinging on a given pixel are described as a vision ray that passes through the control points. Parameters defining the vision ray is the offset ($x_0$, $y_0$) and the slopes ($V_x$, $V_y$). Each pixel collects light from a ray bundle represented by a principal (chief) ray.

Figure 2:
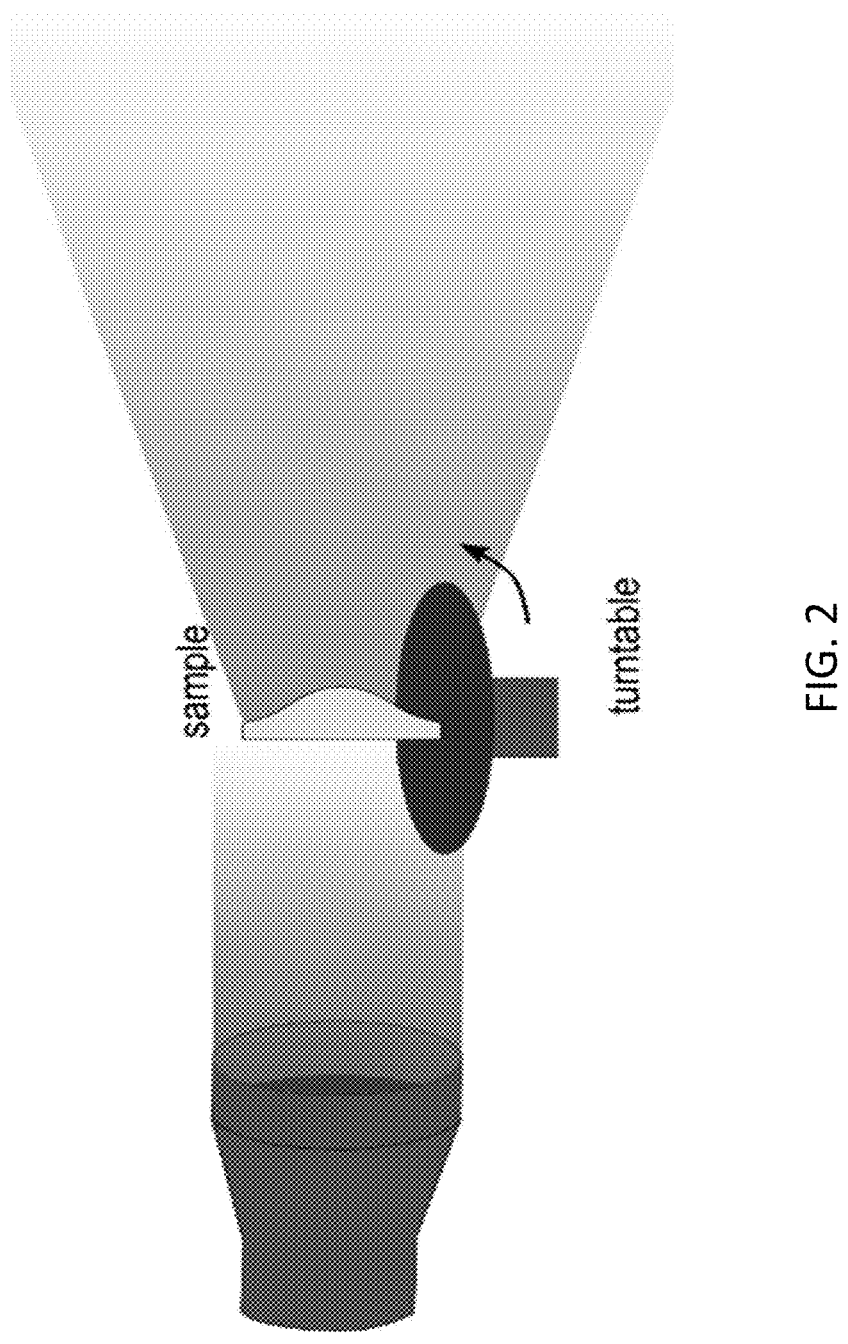
FIG. 2 shows one example of the vision ray tomography.

A quantitative assessment for freeform surfaces is possible by quantifying the change in the direction of the rays (deflection) caused by the sample under test. For this purpose, it is useful to use a telecentric lens; the ideally constant FOV of the imaging systems allows for sample placement to be arbitrary without additional alignment concerns (e.g., a position-dependent magnification). The vision ray model pictures the chief ray from image space from the camera mapping perspective. However, the rays are produced in object space, as shown in FIG. 2. The vision rays for the telecentric imaging system are $$T_x = \tan a_x^T \text{ and } T_y = \tan a_y^T,$$

where $\alpha_x$ and $\alpha_y$ are related to telecentricity. When placing a sample, the direction of the vision rays changes. The changes can be measured and are defined herein as follows: $\Delta\alpha_x$ and $\Delta\alpha_y$ with $$\alpha_x = \alpha_x - a_x^T \text{ and } \alpha_y = \alpha_y - a_y^T,$$

where $\alpha_x$ and $\alpha_y$ and is the angle of the vision ray in the x- and y-direction in the presence of the measurement sample, respectively.

FIG. 23 shows the measurement principle. From the incoming rays, the imaging detector captures those rays that match the vision rays of the imaging system. In the measurement setup, fringes are projected onto a well-defined diffuse passive calibration board, and the camera and the sample are stepped along the z-axis. Both the distance between the sample and telecentric lens ds and the distance between projector and calibration target $d_{pt}$ remain constant (e.g., at all times).

Although the vision ray model may be used in camera calibration to reduce bias errors in image-based metrology setups [98,99], it is not known to be used directly as a metrology tool. The vision rays are measured using the configuration shown in FIG. 2. The sample under test is mounted in front of a telecentric lens, causing a deflection of vision rays of the imaging system. This system steps the camera and the measurement sample along the z-axis to a series of z-planes, starting from $z=z_0$ to the plane $z=z_0+\Delta z$. At a z, a pixel line of sight intersects a different set of (x,y) coordinates (e.g., at every z, every pixel line of sight intersects a different set of (x,y) coordinates). These coordinates then are fitted to a line according to the model in FIG. 22. The spatial information, (x,y), is recovered using a mapping between the absolute phase ($\phi^x$, $\phi^y$) retrieved from the sinusoidal fringes projected on the target and the sparse information given by the target circular features. The obtained unwrapped phases multi-wavelength phase unwrapping technique GOMF [100] is used.

The direction of the deflected rays is normal to the propagating wavefront [101]. Thus, the wavefront can be reconstructed by integration of the local wavefront slopes. Slope and gradient measuring devices are common in optical metrology; therefore, several different reconstruction algorithms have been developed over the last decades to perform numerical integration. Numerical integration is generally classified into zonal and modal integration techniques. In zonal algorithms, the wavefront is recovered from linear equations describing the local (zonal) relation between the wavefront and its derivatives in x and y directions [102,103]. Modal integration, on the other hand, reconstructs the wavefront as a superposition of linearly independent polynomials. The polynomials are smooth functions and consequently differentiable; this allows a fitting in the slope domain that returns the corresponding weighting coefficients for one or more polynomials (e.g., every) polynomial in the basis. As a result of this "global" fitting, the susceptibility to noise and random error is minimal. Another advantage of model fitting is the direct relation between the basis and its connection to physical parameters in the measurements. Common polynomial bases for wavefront reconstruction include Zernike, Legendre, Chebyshev, radial basis functions, and Q-Forbes, to name a few. The present disclosure provides for an approach in which the wavefront is calculated as $$W(x, y) = \sum_{i=1}^{N} a_i f_i(x, y)$$

with $f_i(x, y)$ the Noll ordered Zernike basis. This technique creates numerical orthogonal transformation based on analytical polynomial sets and can be applied to arbitrarily shaped apertures. In this case, $(V_x, V_y) = \vec{\nabla} W$, since the estimated vision rays are the gradient of the geometric wavefront.

Figure 24:
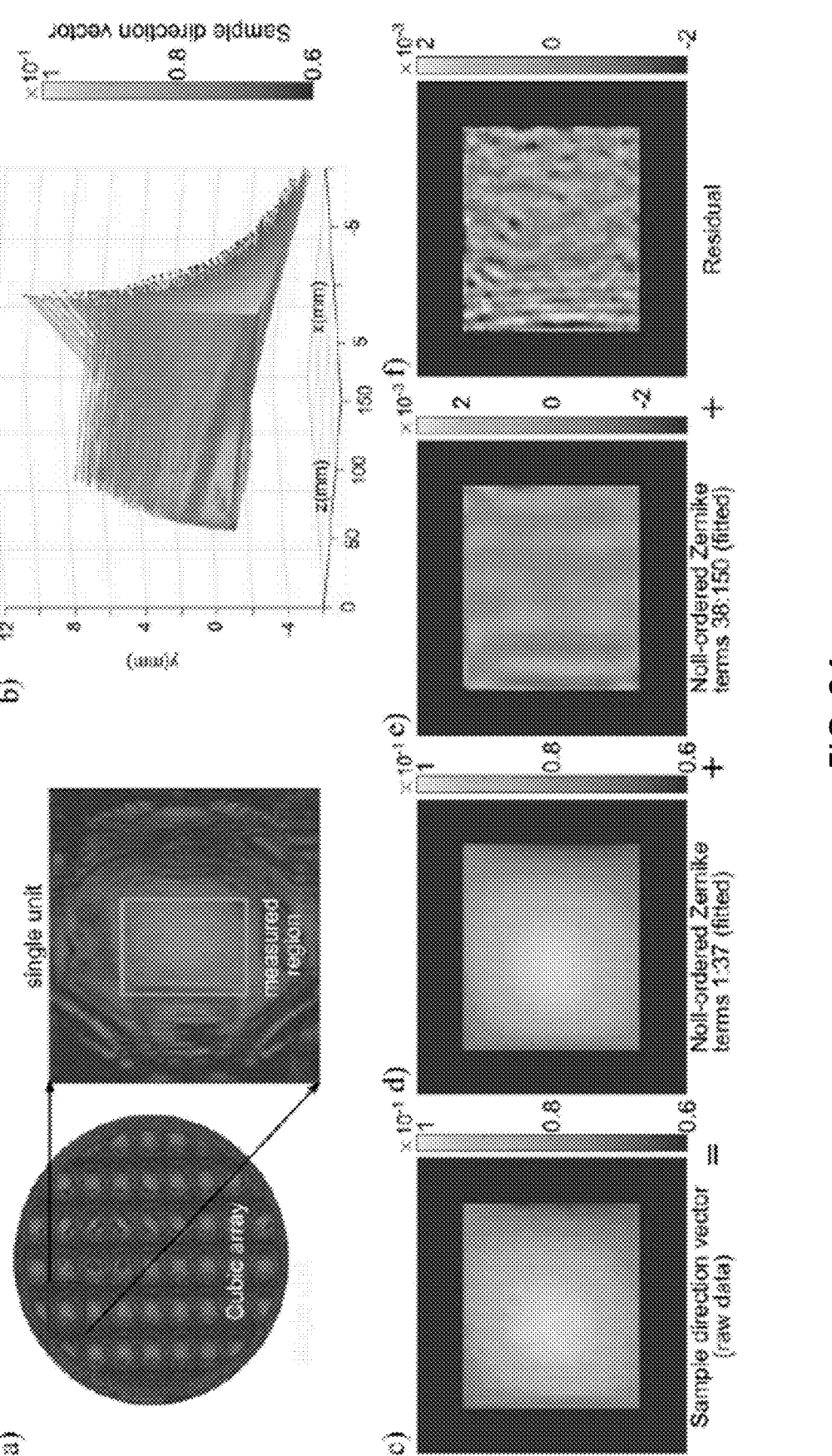
FIG. 24 shows one example of measurement results for an array including cubic phase plates.

FIG. 24 shows (a) sensor view of a micro-optic array including of cubic phase, (b) vision rays, and (c) direction vector amplitude of the sample. The Noll-ordered Zernike decomposition for sample evaluation across spatial frequencies ranges is found in (d) Zernike terms 1:37, (e) Zernike terms 38:150, where the residual is shown in (f).

Figure 25:
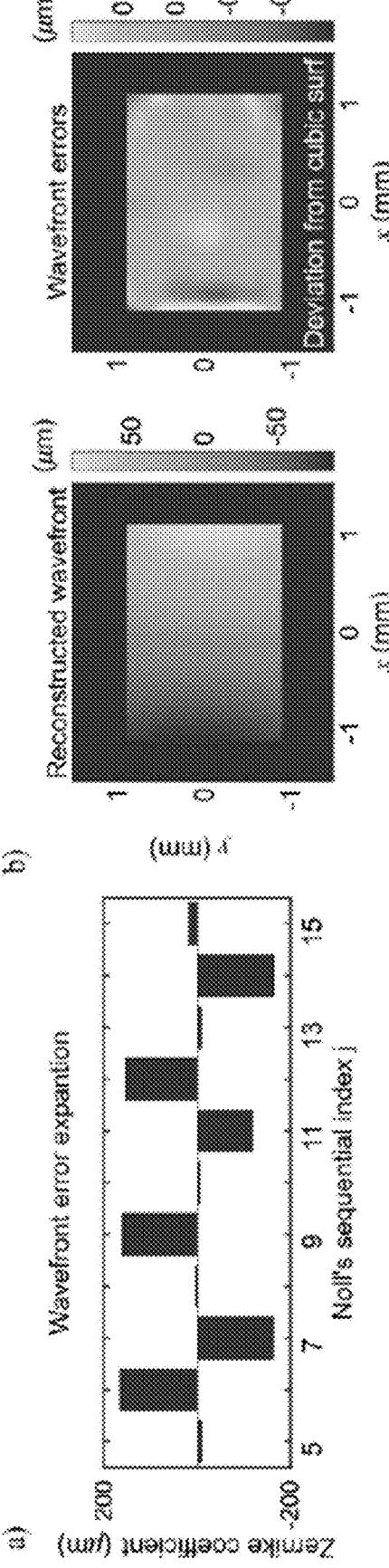
FIG. 25 shows one example of geometric-wavefront reconstructions using vision ray measurements obtained for an array including cubic phase plates.

FIG. 25 shows a geometric-wavefront reconstruction using the vision ray measurements for the sample in FIG. 24.

To demonstrate the feasibility of this method, the vision rays of an array including of cubic phase plates (manufactured at UNC Charlotte) were measured. The experimental setup follows the structure of FIG. 23 and includes of an Edmund Optics TitanTL® Telecentric Lens (0.136×, f/11-f/22, telecentricity <0.1°), a FUR camera (model BFS-U3-200S6M-C with 5472×3648, 20MP, pixel pitch of 2.4 μm), and an Optoma Technology EH200ST projector (1920× 1080). The telecentric lens is stepped along the z-axis using a Physics Instruments (PI) M-404-6DG Precision Linear Stage. The vision rays were calculated using the data from 30 equidistant with a plane separation of 1 mm. For this test, a single unit was selected. The measurement results for the vision rays and the direction vector amplitude are shown in FIG. 24. The reconstructed geometric wavefront is shown in FIG. 25.

The present disclosure provides a metrology system that includes of a cover-glass-free active target, a translation stage, and a telecentric camera in which the measurement principles are based on a generic camera calibration model. The vision ray metrology approach allows recovering the geometric wavefront of a sample under test using solely $V_x$ and $V_y$ (wavefront slopes). Furthermore, an interesting detail is that the slope information $(V_x, V_y, S)$ can be used to highlight some surface properties and develop an alignment strategy based on the changes in these parameters for a known sample as a function of its position.

In the field of optical metrology, the precise separation of front- and back-surface reflections is a factor in the accurate measurement of transparent samples. The present disclosure provides an approach to this challenge, proposing the use of HODMD to address the constraints of traditional MFD methods. HODMD's unique ability to isolate multiple frequency components in a signal makes it well-suited for separating parasitic reflections in deflectometry. By leveraging the temporal dynamics captured by HODMD, this method provides a robust, data-driven approach to disentangling overlapping signals without using specialized hardware or complex filtering. Notably, HODMD converts the frequency estimation problem into an eigenvalue problem, eliminating the use of peak-finding algorithms in the spectrum. As a result, the method is virtually free of outliers. HODMD is robust against user-defined settings, avoids frequency leakage, and provides accurate optimization starting points, resulting in faster convergence that does not get trapped in local minima. Additionally, HODMD's inherent ability to extract temporal information makes it ideal for describing Modulation Transfer Function (MTF) effects. Experimental results demonstrate that HODMD outperforms traditional Fourier-based methods, particularly in scenarios involving thin samples. This advancement not only enhances the accuracy of surface topography measurements but also reduces processing time, offering improvements over existing techniques. The broader implications of this method extend to various optical metrology applications, including interferometry, tomography, Light Detection and Ranging (LIDAR), Optical Frequency Domain Reflectometry (OFDR), Optical Coherence Tomography (OCT), and Fourier Transform Infrared (FTIR) spectroscopy, thereby enhancing the efficiency and accuracy of these techniques.

Optical metrology [105-107] encompasses various techniques for precise measurement of surface topography, material properties, and other parameters. Interferometry, holography, and photogrammetry are widely used techniques within this field. Interferometry utilizes light wave interference to measure surface irregularities or displacement [108]. Holography [109] captures full wavefront information for 3D reconstructions. Photogrammetry [110] uses photographs from different angles to construct 3D models. Frequency-shifting techniques, such as frequency scanning interferometry (FSI) and optical coherence tomography (OCT), have become essential in optical metrology. FSI varies the wavelength of light to obtain phase information, which is crucial for accurate surface measurements [111, 112]. OCT [113,114] uses low-coherence interferometry with broadband light sources to achieve high-resolution cross-sectional imaging. Both techniques heavily rely on spectral analysis to identify peaks corresponding to different frequency components.

However, accurate spectral peak identification poses a common challenge across these methods. In interferometry, the spectrum from the interference pattern may be analyzed to extract phase information, which involves identifying the peak corresponding to the central wavelength. Inaccurate peak detection can lead to measurement errors. In OCT, precise spectral peak identification is used to differentiate back-reflected light from various depths within a sample. Noise and spectral leakage complicate this task [115], which may lead to the use of advanced peak-finding algorithms. Similar challenges exist in FTIR [116]. FTIR [117] analyzes the absorption spectrum of a sample to identify characteristic peaks corresponding to different molecular vibrations, which are crucial for identifying chemical compounds and understanding molecular structures. Both methods use robust algorithms for accurate spectral peak detection in the presence of background noise and overlapping signals.

Another area where spectral peak detection is used is the optical metrology of transparent objects that use ray tracing as a physical principle for surface measurements. There the accurate separation of front and back surface reflections is crucial for achieving precise and reliable measurements. Various approaches have been proposed to untangle parasitic reflections. The deflectometry approach of reference [118] utilizes moving binary patterns to isolate the front surface reflections in specific subregions of the camera's field of view. Once isolated, fringe patterns are displayed on the white pixels of the binary pattern to recover the phase distribution. Finally, a stitching process combines the data from the subregions. Similarly, reference [119] proposes to isolate the superimposed reflections by illuminating one isolated line at a time on the screen during a scanning process, using a so-called line-shift approach. While these techniques aim to isolate primary and parasitic reflections, complete separation is not guaranteed. Overlap between reflections may persist along what is known as "pathologic curves" [119]. Later research proposed a model that described the superimposed front and back reflections that assume negligible attenuation due to Modulation Transfer Function (MTF) effects when considering closely spaced frequencies [120,121]. When using two frequencies, phase shifting is applied to each to avoid an underdetermined system of equations. A numerical solution is then obtained through an iterative process combining a nonlinear least-squares approach with a flood-fill algorithm to retrieve the phase [120]. Alternatively, using a larger number of frequencies eliminates the use for phase-shifting [121], but selecting initial values becomes crucial and uses reverse ray tracing based on optical system parameters to provide those initial values. In references [122,123], a frequency-shifting method based on the Fourier transform was applied to separate front and back surface reflections, a linear modulation transfer function (MTF) effect was assumed, and the method was demonstrated on a 25.4 mm thick sample [122] and later on, a 10 mm thick planar window glass [123]. MFD expanded upon this work by considering the variation of modulation intensity as a function of fringe frequency without assuming a linear MTF [124]. In this approach, initial phase estimates are obtained by identifying peaks in the Fourier domain, which are then refined through an optimization process to enhance the accuracy of the separated phase angles. Achieving a sufficiently high resolution in the Fourier domain is crucial for accurately extracting the initial peaks, which may lead to the use of many images. However, many patterns are used, which ultimately constrains the achievable resolution.

Multi-frequency approaches remain appealing due to their seamless integration with existing PMD setups and their independence from specialized hardware. This has propelled the development of another group of multi-frequency methods centered around envelope curve analysis. [125,126]. In [125] a mathematical model based on phase shifting is presented, where the unknowns are independent of the attenuation effects of the imaging system. To solve this model, an optimization process is employed, with starting points derived from a set of simplified assumptions, including the assumption of a monotonic behavior on the ray intersection with the screen whose nature is related to flat objects. Similar to MFD, the optimization is then applied pixel by pixel. Although this method uses fewer images, reducing data acquisition times comes at the cost of sacrificing broader applicability. Instead, reference [126] omits the phase-shifting step and models the superposition of parasitic fringes as a beat frequency, assuming identical front and back surface modulations. A two-step alternating optimization process is employed to refine the variables' values. Despite using a large dataset of fringe patterns, MFD offers several advantages: (1) MFD doesn't necessitate specialized hardware (like ultraviolet (UV) sources) or sophisticated filtering techniques, (2) MFD doesn't include altering the measurement setup geometry, and MFD provides a more generalized model without assumptions about the sample's properties. This makes it an intuitive and versatile solution for various applications. However, MFD is fundamentally constrained by the properties of the DFT. The overall effectiveness of this method could be further enhanced by incorporating a more refined initial guess for the optimization process. In the field of fluid flow dynamics, DMD [127,128] is a versatile technique that belongs to the class of modal decomposition methods, in which a complex spatiotemporal signal is decomposed into distinct spatial patterns (modes), their corresponding magnitudes (amplitudes), and associated temporal dynamics. Connected to the spectral properties of the Koopman operator, DMD has inspired numerous variations and enhancements since its inception. Its impact extends beyond its original application in fluid dynamics to diverse fields [129] like video surveillance, epidemiology, neuroscience, finance, and, recently, optical metrology [130].

The present disclosure employs DMD's capability to extract this spectral information from observed data sequences. The present disclosure provides techniques which use the HODMD variant to separate parasitic fringes in ray tracing metrology techniques for transparent samples based on the multi-frequency approach, such as deflectometry and vision ray metrology, to overcome the constraints of the Fourier spectrum from spectral leakage and resolution. The present disclosure provides an overview of MFD and its limitations when working with thin samples, introduces the HODMD to carry out spectral analyses, introduces a data-driven approach to separate front and back surfaces, and compares the performance of both methods, showing the clear advantages of HODMD-based MFD.

Phase measuring deflectometry is an optical metrology technique that quantifies the slope distribution of a specular surface by utilizing the set of 2D coordinates encoded in sinusoidal fringe patterns. The fringe patterns are generated using a high-resolution screen and capturing the reflected pattern with a camera; the local surface normal at each point can be calculated using reverse ray tracing, ultimately enabling the reconstruction of the surface topography through integration.

For an opaque specular element, the ray emitted from a pixel at $(x_i, y_i)$ is reflected off the front surface at point M1 and then intersects the camera pixel (u,v). The corresponding light intensity at this pixel is then given by $I(u,v)=\bar{I}+a_i \cos(2\pi x_i/T)$ with $\bar{I}$ the background intensity, $a_i$ the fringe modulation intensity, T the fringe spatial period, and $x_i$ is the pixel location of the ray source reflected from the front surface. Phase-retrieval methods are used to recover the phase argument, $\phi=2\pi x_i/T$, of the cosine function. After the imaging system is calibrated, the relative ray directions are used to construct a normal field by finding the vector bisecting the opening angle between the source at $(x_i, y_i)$ and center of projection of the camera pixel (u,v).

FIG. 26 shows phase measuring deflectometry (PMD) for transparent samples. In FIG. 26, (a) shows that traditional PMD suffers from parasitic reflections that interfere with the measurement of the front surface; (b) shows that MFD separates the signal's front- and back-reflection contributions by displaying multiple frequencies. Before reconstructing the surface profile using ray tracing, the power spectrum is analyzed to identify the peaks $(\mu_1, \mu_2)$ corresponding to the normalized coordinates of the ray intersections on the screen.

In the presence of secondary reflections originating from the rear surface of transparent objects, multiple signals reach the same camera pixel (u,v). In the simplest case, it is a second signal superimposed with the primary reflections from the front surface, as seen in (a) of FIG. 26. This secondary signal leads to ambiguities in the phase demodulation of the sinusoidal fringe patterns. Thus, during the ray tracing, these parasitic reflections create errors that propagate to the reconstruction. Effective isolation of these parasitic reflections is performed to provide accurate front surface measurements.

Like the interferometry approach, where wavelength tuning was used to assess multiple surfaces at once, utilizing multiple measurements with varying fringe periods in deflectometry allows the disentanglement of multiple superimposed signals. This frequency-variation method has been successfully applied in deflectometry [124-126,131] and is known as MFD. Notably, the data-processing of this approach resembles a frequency-shifting interferometry (there the frequency is stepped) and differs from data processing approaches that have been adopted from Multi-Wavelength Interferometry (as e.g. [132-137]), where the phase at multiple periods is estimated to unwrap the phase at the smallest period.

Figure 27:
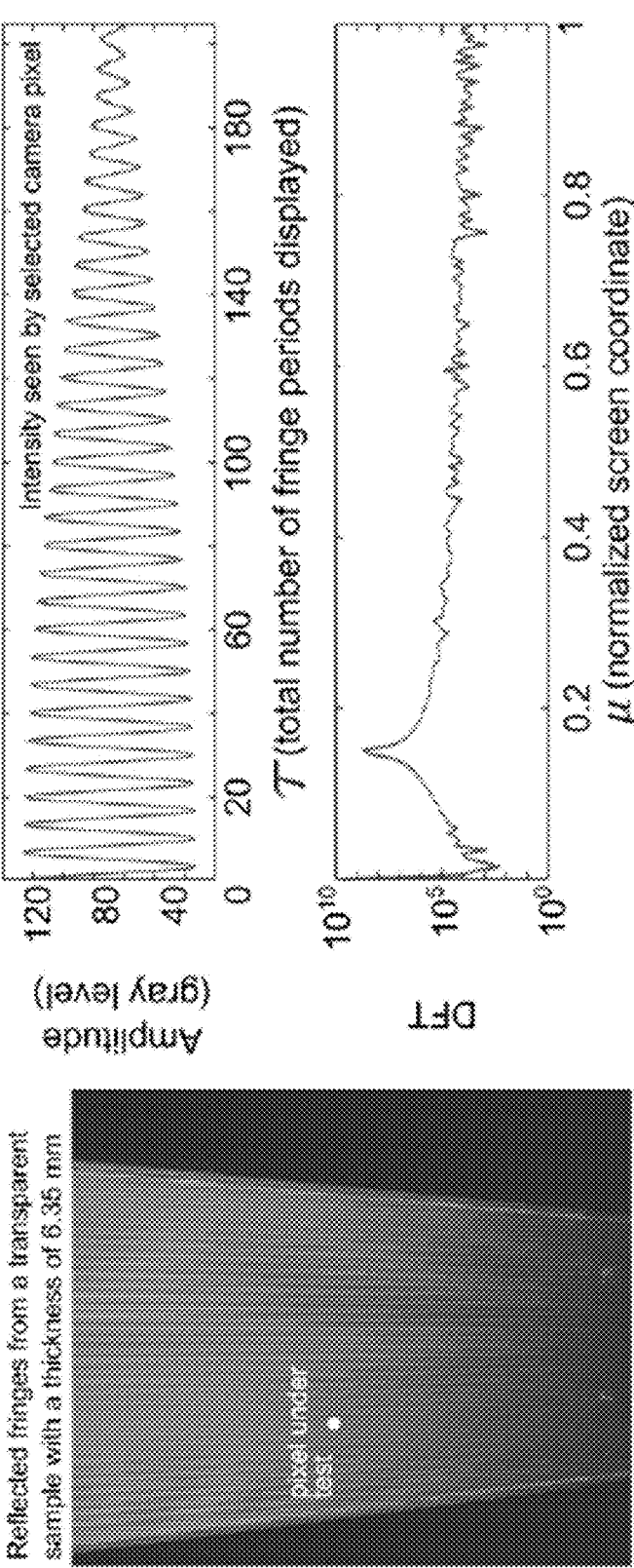
FIG. 27 shows one example of measurement data for a case where the spectral analysis fails to produce two well-defined peaks corresponding to the front- and back-surface reflections.

In the first step, MFD recovers a pair of initial estimations corresponding to the ray intersection on the screen. Further, it optimizes them to describe the intensity modulation resulting from the fringe frequency variation and the reflectivity variations as a function of the angle of incidence. Typically, these variables are separated into groups and solved alternatively until convergence is reached. Once the intersection of the rays on the screen plane is separated on the front- and back-reflections components, the front surface can be recovered traditionally [138], and if desired, the back surface can be reconstructed following a raytracing that accounts for the refractions from the reconstructed front surface by assuming a homogeneous refractive index [124,131]. As with any other algorithm that uses optimization, its accuracy relies on efficiently estimating the initial value of the mixed signals using the Fourier spectrum or the first zero point of the envelope curve that results from the superposition of the two cosine functions. To guarantee the extraction of two closely spaced frequencies in a time-domain signal, the beat period should be larger than the signal's time duration. This provides for at least one complete beat cycle to be captured, allowing the fast Fourier transform (FFT) to resolve the individual frequencies. Alternatively, the frequency separation between the two frequencies should be larger than the frequency resolution of the FFT to avoid single peaks on the spectrum, as seen in FIG. 27. Consequently, MFD includes the use of many fringe frequencies to provide high-frequency resolution, and the fringes are typically rotted synthetically on the screen plane to further separate the relative location of the reflections. Nevertheless, rotating the fringes may increase the separation of the ray intersection for some regions while having the opposite effect on non-flat transparent elements.

FIG. 27 shows measurement data for an experimental demonstration of a case where the spectral analysis fails to produce two well-defined peaks corresponding to the front- and back-surface reflections for a nominally flat sample with a thickness of 6.35 mm.

In the power spectrum of the FFT, the sampled signal data may cover an integer number of corresponding periods to avoid spectral leakage. This constraint may prove impractical for a superposition of multiple sinusoidal signals, especially if the frequencies are unknown or unrelated by a simple rational number. Moreover, this constraint implies that the longest period the temporal DFT can capture is the time interval of the data set. For thin samples, the MFD technique fails, in fact, MFD's effectiveness has been demonstrated for samples with a minimum thickness of 8 mm [123,125,125,139]. In contrast, it has been demonstrated that DMD is not subject to this constraint [128,140,141]. Furthermore, although DMD and its variant are subject to the Nyquist frequency constraint, there is no theoretical lower bound on the frequencies they can compute.

Another constraint of the temporal DFT is its inability to determine the rate at which individual modes evolve. On the other hand, the DMD model is based on the linear combination of eigenvectors that grow or decay according to their eigenvalues. The modulation intensities $a_i$, in FIG. 26, vary with the fringe frequency due to the low-pass properties of the imaging system's modulation transfer function. A Gaussian low-pass model is commonly adopted to describe the decay of the fringe amplitudes, making DMD intrinsically adept at modeling the underlying nature of the front—and back-reflection superposition recorded by the imaging system. Primarily applied to high-dimensional measurements, DMD is widely used in analyzing sequential data. It is considered a data-driven approach because it directly analyzes time-series data without using a priori knowledge or an explicit model of the underlying system. While using DMD, the temporal evolution of a variable x given by $x_{k+1}=F(x_k)$, where F is the unknown dynamics, is approximated as a linear operator A. This approximation leads to the solution $$x(\tau) = \sum_{n=1}^{N} b_n \phi_n e^{(\delta_n + i\omega_n)\tau}$$

[127].

To estimate the parameters of the solution, the DMD algorithm produces a low-rank eigen decomposition of the matrix A by using the pseudoinverse of $X_r$. In $X_r$ each column represents the first N−1 measurements with N as the total number of observations. Instead of directly solving for A the low-rank representation Ã is used to compute the DMD eigenvalues ($\delta_i$, $\omega_i$) and DMD modes $\phi_i$ as shown in FIG. 28. Thus, DMD provides a superposition of oscillating signals consistent with the superposition of the front- and back-surface reflections. Thus, intuitively, DMD should be able to separate the parasitic fringes from the front reflections.

FIG. 28 shows a description of the DMD model. Considering the data from a dynamical system, DMD creates an approximation of the underlying dynamics in terms of the eigenvalues λi and eigenvectors $\phi_i$ of the discrete-time linear map A. A is obtained by using the pseudoinverse of $X_r$. For computational efficiency, the low-rank representation Ã is used to compute the DMD eigenvalues and DMD modes. The signal dynamics are represented using the damping rates and frequencies ($\delta_i$, $\omega_i$) [127]. It can be seen in FIG. 28 that for the case of 1D signal, the matrix $X_r$ is a single row, and then it is expected that the reduced-rank representation Ã would produce a single eigenvalue. To capture the dynamics of this type of signal, pairs of conjugate eigenvalues corresponding to the sine and cosine corresponding to the eigenvectors $\phi_i$ may be recovered. The solution to this problem is to increase the dimension of the matrix by introducing a time-delay embedding data matrix, where a time-shifted copy of the data is stacked as another row in the data matrices $X_r$ and $X'_r$ as shown in FIG. 29.

FIG. 29 shows a standard DMD decomposition uses a first-order approximation that signifies that each snapshot is related to the previous one. High-order DMD, on the other hand, states that each snapshot is related not only to the previous snapshot but also to the d−1 additional former time lagged snapshot. This is represented by a shift-stacked data matrix, where a time-shifted copy of the trimmed data is stacked as another row in the data matrices X in FIG. 27, resulting in $X_{tl}$. The plots have been generated using the data provided in [127]. Although this result highlights a constraint of traditional DMD in accurately representing sinusoidal oscillation in 1D data, as seen in FIG. 30, the DMD's high-order variation can fully describe the dynamics of 1D signals.

Figure 30:
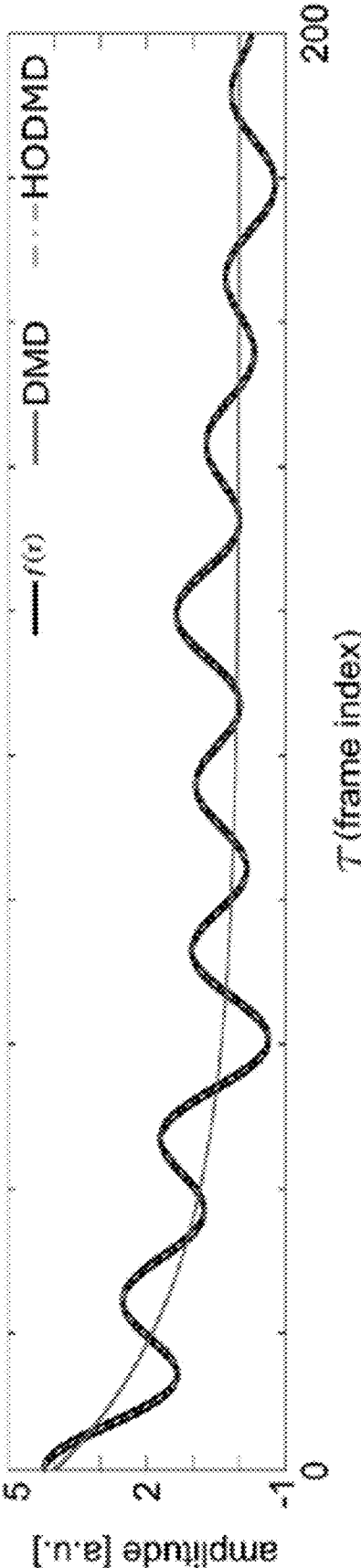
FIG. 30 shows one example of a comparison between DMD and Higher Order Dynamic Mode Decomposition (HODMD) on 1D signals.

FIG. 30 shows a comparison between DMD and HODMD on 1D signals. For the real signal $f(x)$, the X matrix in FIG. 28 includes a single row. Thus, the DMD algorithm returns a single eigenvalue that does not capture the sinusoidal oscillation in the data. On the other hand, the extra rows from the time-lagged snapshots permit multiple eigenvalues to be recovered, giving a complete approximation if HODMD is used. Beyond addressing the constraints of Fourier analysis, HODMD directly provides the amplitudes, damping rates, and frequencies of overlapping oscillatory signals as conjugate pairs (see FIG. 31). This reduces the use of peak-finding algorithms to obtain reliable initial values before further refining parameters related to entangled back- and front-surface reflections, making the process less dependent on user configurations.

FIG. 31 shows HODMD of a real signal $f(\tau)$ captures the dynamics of the frequency components. In this example, the coefficient ai is a time-damping factor that results when $\delta > 0$, nevertheless, the frequencies $\omega$ are accurately recovered. In MFD, firstly, a spectral analysis is used to uncouple the multiple reflections captured by pixels (e.g., every pixel) of the imaging system. Traditionally, the Discrete Fourier Transform (DFT) is used to analyze the coupled signals. If the two components' frequencies are different enough, then two peaks are found on the spectrum. The corresponding frequency values ($\mu_1$, $\mu_2$) can then be found by using peak-finding algorithms. Subsequent steps include iteratively optimizing for the background intensity and the fringe modulation intensities ($\hat{I}$, $B_1$, $B_2$), then refine ($\mu_1$, $\mu_2$) until convergence is reached, convergence is defined using a predefined accuracy threshold F.

Here, HODMD replaces the DFT technique, and the DMD-d algorithm in [128] is used to recover the corresponding amplitudes, damping rates, and frequencies. As can be inferred from the construction of the operator $A_i$ describing the system's dynamics in FIG. 28, the rank truncation plays a role in the proper modal decomposition. In the DMD-d algorithm, this is specified as the tolerance for the dimension reduction $\varepsilon$SVD and the mode truncation $\varepsilon_{DMD}$, respectively. The index d shouldn't be close to the number measurements since the information in the last d−1 snapshots is partially lost because the data is trimmed before adding the time-shifted copies (see FIG. 29); however the difference between the decomposition using different values near the optical may be flat thus, even relatively large variations lead to essentially the same results [128].

To investigate the performance of the proposed method, conditions that are achievable on an experimental setup were first analyzed to set then reasonable values of the SNR, the thresholds for the dimension reduction $\varepsilon_{SVD}$ and the mode truncation $\varepsilon_{DMD}$, as well as the number of time-shifted copies used to recover the HODMD decomposition. This is a starting point for simulating multiple cases in which HODMD outperforms the DFT spectrum estimation in some (e.g., all) instances. The SNR was estimated by first smoothing the measurement data shown in FIG. 33. Using a moving-mean filter with a window length of 3 (along the temporal axis), the resulting signal is treated as the noiseless signal, and the difference with respect to the original is the corresponding noise. An SNR of ~37 dB was found; similar values have been used to analyze MFD approaches before

[142]. HODMD can manage this noise level if $\varepsilon_{DMD}$=1e-5, $\varepsilon\varepsilon_{SVD}$=1e-10, index d=250, as shown in FIG. 33.

Figure 32:
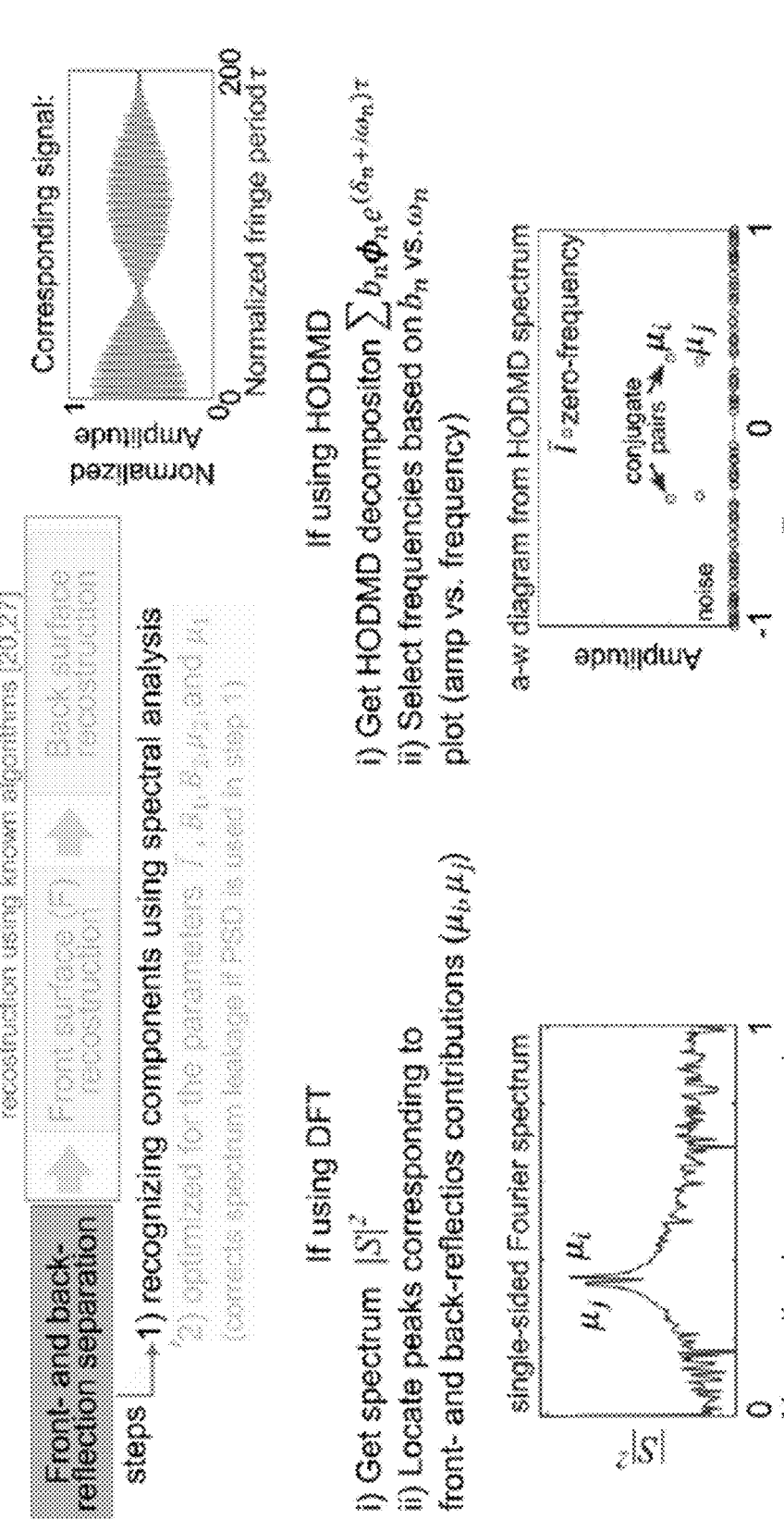
FIG. 32 shows one example of how multi-frequency deflectometry (MFD) identifies the two frequency components representing front- and back-surface reflections.

FIG. 32 shows MFD first identifies the two frequency components representing front- and back-surface reflections. The Fourier-based method uses peak-finding algorithms for this, while DMD-based analysis directly provides the amplitudes and frequencies of these components using the eigenvalues.

FIG. 33 shows HODMD on the experimental measurements for the 6.35 mm sample. The values recovered by the DFT, and the traditional phase-shifting algorithm are also shown for comparison.

In the simulations, the fringe patterns with the untangled reflections are generated as $$I(u, v) = \bar{I} + a_1 \cos\left(\frac{2\pi x_i}{p}\right) + a_2 \cos\left(\frac{2\pi x_j}{p}\right),$$

the modulation intensity varies with the variation of the fringe frequency; thus, a Gaussian low-pass model is adopted to describe the modulation intensities $a_1$ and $a_2$ as $a_i = B_i e^{-(\tau/\tau_{mx})^2}$. Additionally, the corresponding front and back profiles of a nominally flat sample are modeled using a superposition of low-order Zernike polynomials, (c) of FIG. 34. Furthermore, reflectance R of the material is considered. The modulation of the parasitic reflection is described as a multiple of the front surface related by the factor $\gamma$. The tested values of $\gamma$ are selected to represent two cases. In Case I, incidence rays are considered close to normal, which is the case typically studied [124,125]. Case II represents the geometry depicted in (b) of FIG. 34, in which the camera is at 45 degrees with respect to the z-axis.

Figure 34:
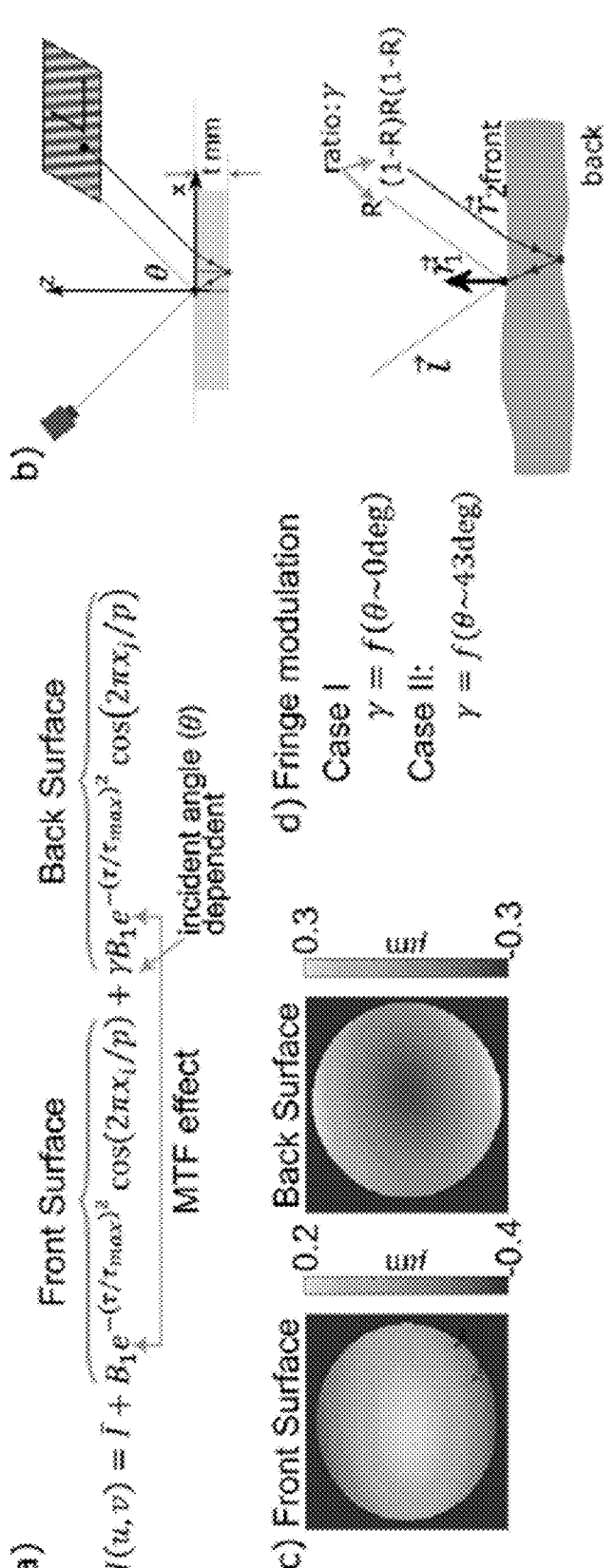
FIG. 34 shows one example of configurations used to simulate a superposition of the front and back surfaces.

FIG. 34 shows configurations that is used to simulate the superposition of the front and back surfaces. In FIG. 34, (a) shows that the model describes the intensity of a single pixel with background intensity I, intensity modulation that varies with the fringe frequency described by a Gaussian low-pass model, and the difference in amplitude from the two surface interfaces. In FIG. 34, (b) shows the simulated testing setup, the screen displays rotated fringes at 45 or 10 degrees. In FIG. 34, (c) shows the front- and back-surface shapes used in the simulation; (d) Fringe modulation modeling. Case I: back surface modulation due to approximately vertical incidence, Case II: back surface modulation for an angle of incidence close to 43 degrees. For the test cases, gaussian noise was added (SNR-37 dB).

Test 1 is directed to a robust spectral analysis with variable sampling using HODMD compared to DFT. A flat sample with a thickness of 5 mm was used to compare the influence of the initial values from both the DFT and HODMD. Three different datasets were analyzed to demonstrate the feasibility of reducing the acquisition time when using HODMD. In the cases, $\gamma$=0.92. That is, the modulation is considered to be produced by close to normal incidence.

For Test1, Dataset 1 includes: The local coordinate system of the screen was rotated 45 degrees; 512 different frequencies were used. The number of fringe periods increased linearly with a sampling $\Delta\tau$=0.2 in the interval $\tau$=[102.4, 204.6]; Dataset 2 includes: The local coordinate system of the screen was rotated 45 degrees; 1024 different frequencies were used with a sampling $\Delta\tau$=0.2 in the interval $\tau$=[0.2,204.8]; and Dataset 3 includes: The local coordinate system of the screen was rotated 10 degrees; 1024 different frequencies were used with a sampling $\Delta\tau$=0.2 in the interval $\tau$=[0.2,204.8].

Dataset 2 replicates typical settings on MFD, except for the sample thickness, which is typically >5 mm instead [123,124,126]. Compared with the results of Dataset 1, it was found that HODMD can generate initial values that produce similar results for 1024 and 512 fringe periods without generating any outliers and reconstruction PV errors <5%. Thus, HODMD can reduce the acquisition time by half without affecting surface reconstruction. Furthermore, the results show that in the presence of spectral leakage, the bad initial values lead to outliers in estimating the ray intersec- tions on the screen, producing high reconstruction errors on the sample height. The sensitivity to this outlier depends on the reconstruction method. Even though a global modal approach (e.g. [143]) may overcome the presence of a low percentage of outliers (3% in this case); if not removed, outliers create large errors, see FIG. 36.

Figure 35:
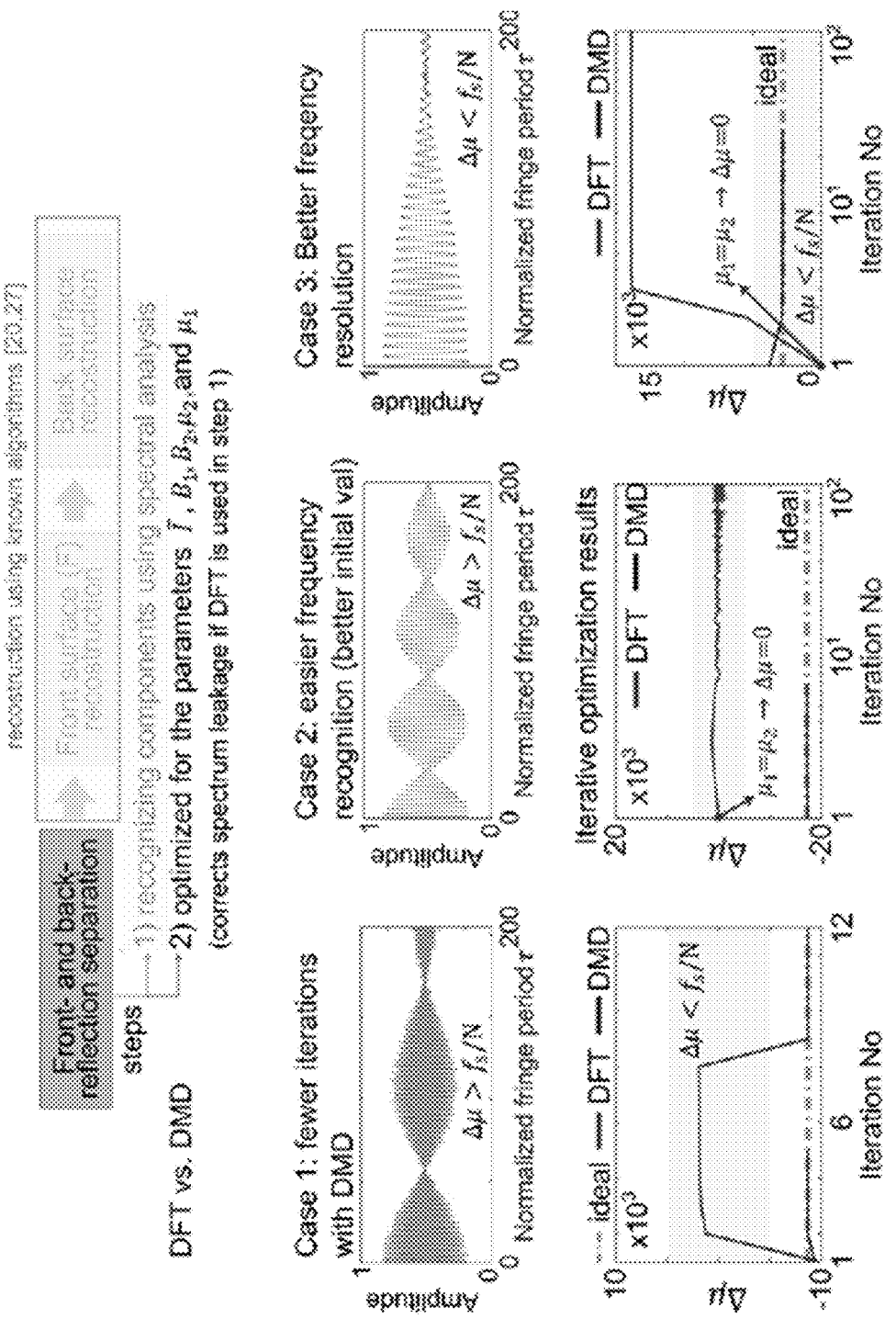
FIG. 35 shows one example of advantages of using HODMD instead of Discrete Fourier Transform (DFT).

Additionally, the alternating optimization converges faster when using HODMD, as seen in (a) of FIG. 35, resulting in processing times ~10% faster for cases where both DFT and HODMD produce comparable results (Data- set 2 since it has 3% outliers). The processing time can be up to 25% faster for the cases where HODMD completely surpasses the applicability of the DFT.

Dataset 3 was selected to demonstrate further the robust- ness of HODMD against smaller separation between the two frequency components. A smaller rotation of the local coor- dinate on the screen reduces $\mu_1$-$\mu_2$, although the error slightly increased, it's still under 10% of the surface PV. During the optimization, HODMD still recovers the two components and easily approaches the ideal values, as seen in (c) of FIG. 35. This is an indicator that HODMD can resolve thinner flat samples and non-flat samples where fringe rotation can cause the opposite effect (decrease of $\mu_1$-$\mu_2$ instead of increasing it).

Test 2 is directed to a robust spectral analysis with variable fringe modulation using HODMD compared to DFT. The fringe modulation changes with the angle of incidence of the rays reflecting from the sample. Although it is fair to assume that the ratio $\gamma$ between the two modulation intensities is close to 1, the DFT approach may use a different peak-finding thresholding to account for changes in this factor. Thus, if left unchanged, bad initial values will cause the optimization to get trapped in local minima; see (b) of FIG. 35. In contrast, the DMD-d algorithm doesn't include any changes in this case. For this test, the same settings as in Test 1 (Dataset 2) were used, but the y value is set to emulate the modulation caused by incident ray angles ~43 degrees. The results show that the error for both cases (Test 1 Dataset 2: surface modulation due to approxi- mately vertical incidence, Case II: surface modulation for an angle of incidence close to 43 degrees) varies by 0.5%. On the other hand, the DFT approach sees an increase in outliers from 3% to 20%.

Test 3 is directed to robust spectral analysis for thin samples using HODMD compared to DFT. Two flat samples with the same front surface description as in Test 1 are used to compare the HODMD applicability for thicknesses of 10 mm and 2.5 mm. For the 10 mm thick sample, the number of samples along the temporal axis was reduced by half (from 1024 to 512, with sampling $\Delta\tau$=0.2 and the intervals were kept the same as in Test 1 Datasets 1 and 2, respec- tively). The results show virtually no change in the recon- structions (only a 0.2% change in the PV error) when using HODMD. The DFT algorithm, on the other hand, showed an increased number of outliers, making it unlikely to recover the front surface if half of the samples were used, meaning the alternating optimization is trapped in local minima due to poor initial values as a consequence of the reduction of the DFT frequency resolution. This, along with the results in Test 1 Dataset 1 (sample with 5 mm thickness), suggests that the original number of images (1024) can be used to assess thinner samples. Datasets 3 assess a 2.5 mm thickness sample. As expected, using DFT produces a larger number of outliers (~50% of the data). In contrast, HODMD pro- duces initial values close to the solutions, resulting in an optimization process that reaches the global minimum. Furthermore, when keeping the same sampling size $\Delta\tau$=0.2 but reducing the number of samples by half (as in Test 1 Dataset 1), the front surface is recovered, and 0.5% of the data are outliers when using HODMD. The table of FIG. 38 highlights the results of the tests.

FIG. 35 shows advantages of using HODMD instead of the DFT as the initial guess for the optimization $\mu_1$ and $\mu_2$. In FIG. 35, Case 1 includes both DMD and DFT recover similar initial guesses, but DMD uses fewer iterations. Case 2 includes Fourier-based initial values rely on peak-finding algorithms whose success depends on user-specified settings (e.g., thresholding); thus, bad initial values might lead to numerical instabilities or errors during the optimization process. DMD returns the pairs $(a_i, \omega_i)$ which makes it easier to recognize frequency components. Case 3 includes HODMD, which is not constrained by the frequency reso- lution (fs/N) and using $\mu_1$=$\mu_2$ can lead to local minima during optimization. For the cases, gaussian noise was added (SNR-37 dB).

Figure 36:
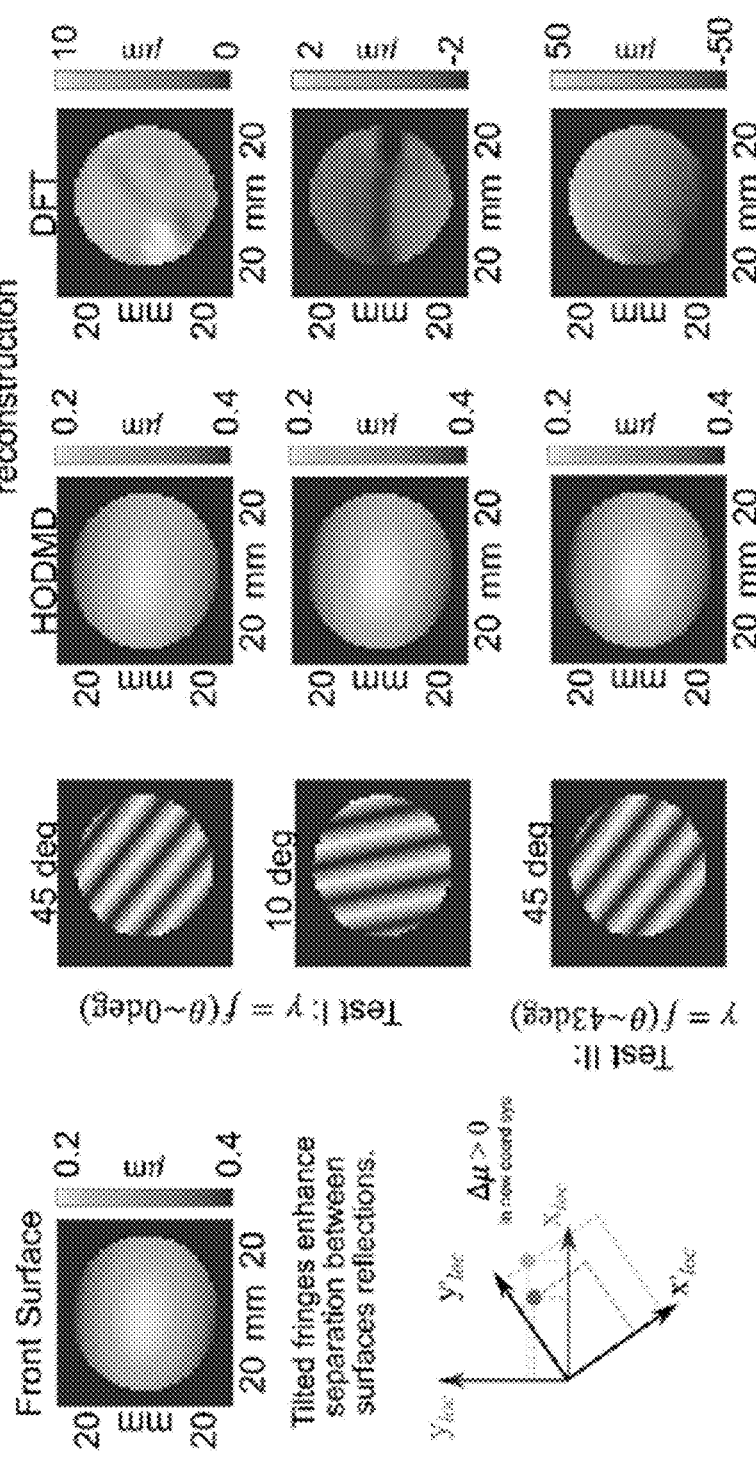
FIG. 36 shows one example of HODMD-based optimization.

FIG. 36 shows, for Test 1 and 2, the HODMD-based optimization is minimally affected by changes in fringe tilt and intensity modulation across frequencies due to HODMD's inherent ability to extract temporal information (growth/decay or damping). Unlike Fourier analysis, this is ideal for describing MTF (Modulation Transfer Function) effects. HODMD's robustness against frequency leakage and reliability in finding the original frequency components allows it to handle a larger fringe tilt effectively. To dem- onstrate the HODMD robustness, no outliers were removed from either the HODMD or DFT results.

Figure 37:
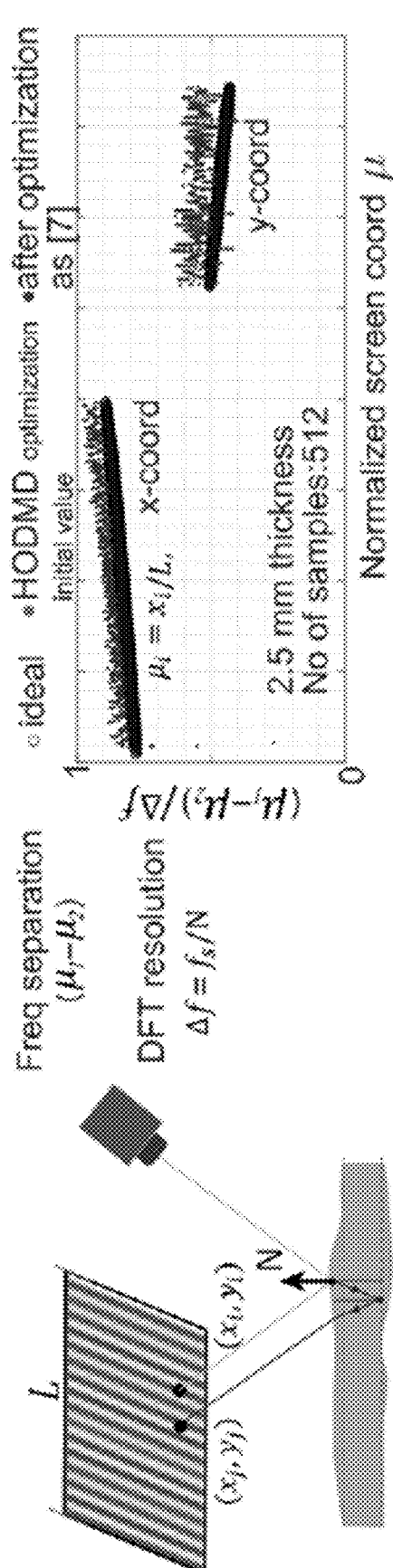
FIG. 37 shows one example of an HODMD frequency resolution comparison against DFT.

FIG. 37 shows, for Test 3, HODMD frequency resolution comparison against DFT's. For a 2.5 mm thickness sample on a PMD configuration, as in (b) of FIG. 34, the separation between the pixel sources responsible for the superposition of the front- and back reflections is as small as 0.4$\Delta f$ the frequency resolution obtained using 512 samples.

FIG. 38 shows a performance comparison between using DFT or HODMD as the initial value for the optimization that separates the front and back reflections.

Test 4 is directed to experimental results on a sample with a thickness of 6.35 mm. To further illustrate the effectiveness of HODMD, the results of a region from the sample in FIG. 27 and FIG. 33 were compared. The region was analyzed using 1024 and 512 samples along the temporal axis. The number of fringe periods increased linearly with a sampling $\Delta\tau$=0.2.

Figure 39:
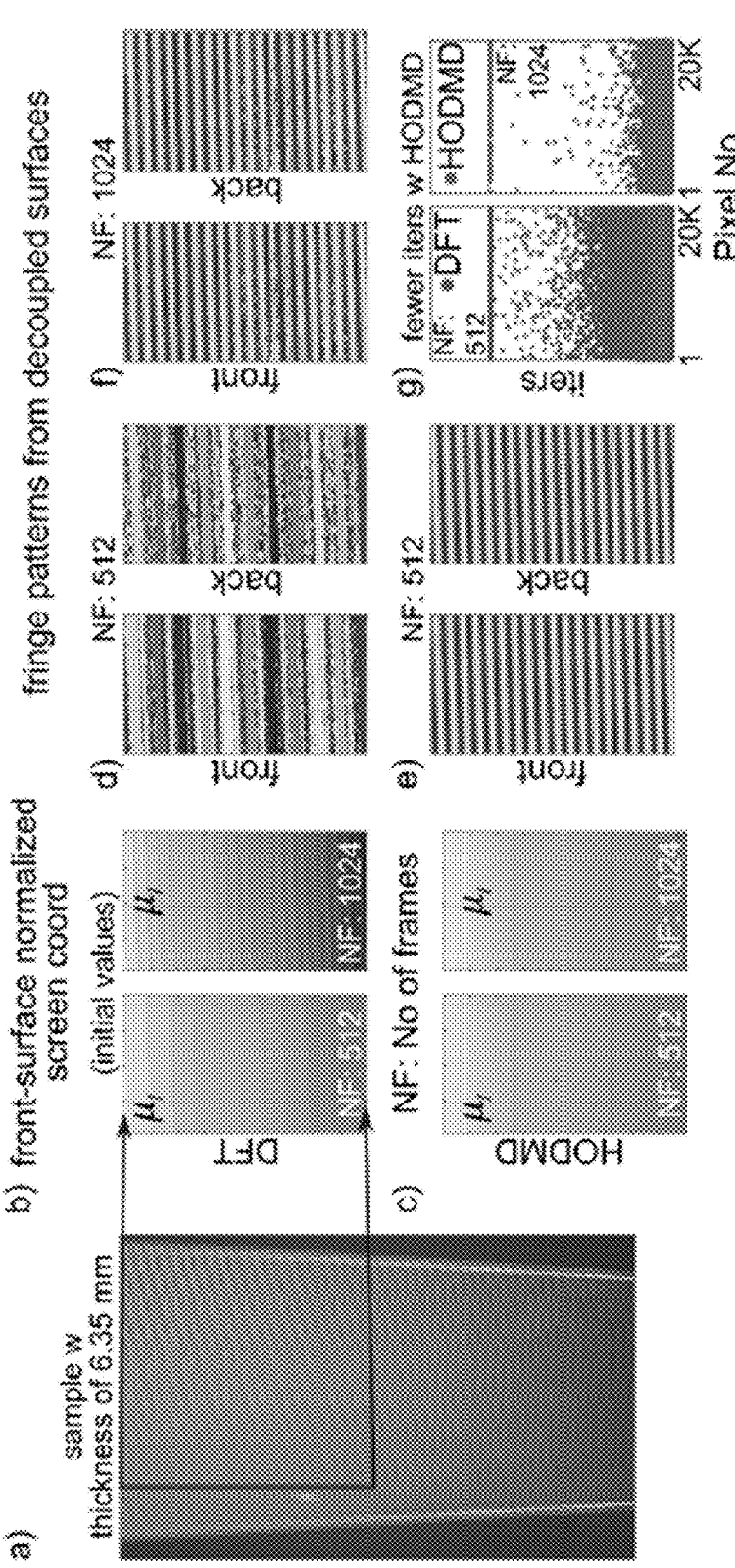
FIG. 39 shows one example of experimental deflectometry results for a 6.35 mm thick sample.

In FIG. 39, (b) highlights the impact of DFT spectral leakage, showing a discretization effect in the initial values. This effect is directly related to the number of samples used. Increasing the sampling rate (doubling the number of samples) reduces the discretization of the DFT results. In contrast, HODMD produces smooth and continuously vary- ing initial values even with a low sampling rate, as seen in (c) of FIG. 39. As a result, HODMD achieves clear sepa- ration between the fringes ((e) of FIG. 39), whereas the DFT method shows some outliers even with 1024 samples, as shown in (d) and (f) of FIG. 39.

Moreover, FIG. 13.g shows that HODMD uses fewer iterations than DFT for both 1024 and 512 samples, taking approximately 50% of the iterations used by DFT. This confirms the findings in the simulations from the previous tests, demonstrating that HODMD can reduce both acquisition time by half and post-processing computation time.

FIG. 39 shows experimental deflectometry results for a 6.35 mm thick sample. In FIG. 39, (a) shows a captured superimposed fringe pattern. First approximation of where the separated front surface intersects, calculated with 512 and 1024 temporal samples using (b) DFT and (c) HODMD methods. The fringe patterns from the decoupled surfaces after refining the first approximation from (d) DFT with 512 frames, (e) HODMD with 512 frames, and (f) DFT with 1024 frames. In FIG. 39, (g) shows a comparison of the number of iterations used for the refining optimization process using 512 and 1024. Orange dots represent HODMD results, and blue dots represent DFT results.

HODMD is a powerful data-driven method for analyzing time series signals, eliminating the use of prior knowledge or a model of the underlying system. The analysis is achieved by constructing a local high-order approximation of the time series using time-delayed signal copies. The dynamics of this approximation are then accurately represented as a linear combination of eigenvectors that grow or decay exponentially based on their corresponding eigenvalues.

The system's eigenvalues provide valuable insights into the signal's growth or decay rates and frequency components, enabling a more detailed and nuanced spectral analysis than the Discrete Fourier Transform (DFT). The HODMD solution naturally incorporates oscillatory signals as conjugate pairs modulated by an exponential term, making it particularly well-suited for describing the modulation transfer function in deflectometry measurements of transparent samples.

FIG. 38 shows that replacing DFT with HODMD reduces spectral leakage in multi-frequency deflectometry setups. Specifically, FIG. 38 shows that it goes beyond the frequency resolution on DFT, achieving values down to 50% smaller. This leads to improved estimations of the separation between front and back surface reflections, enabling the characterization of thinner samples and reducing the number of used images. While typically, 1000 images are used for analyzing 10 mm samples, the feasibility of measuring 2.5 mm with half this number of images per fringe direction was shown via simulations. Furthermore, experimentally this is demonstrated for a sample of thickness 6.35 mm. Consequently, HODMD provides superior initial values for the optimization process used to reduce spectral leakage in DFT, leading to computational time savings of up to 25%. This computational gain does not include the handling of numerous outliners of the DFT algorithm, which includes separate treatment and further increase the computation time.

The advantages of HODMD enable MFD setups to achieve faster measurements and work with thinner samples, pushing the boundaries of traditional multi-frequency approaches. The method's ability to provide better frequency resolution is also an advantage when dealing with non-flat surfaces where, in some regions, the front- and back reflections may be closer to each other than in other sample zones. Furthermore, HODMD can effectively handle cases where the front and back surface reflections are close to each other, a scenario that can often lead to spectral leakage in DFT.

Figure 40:
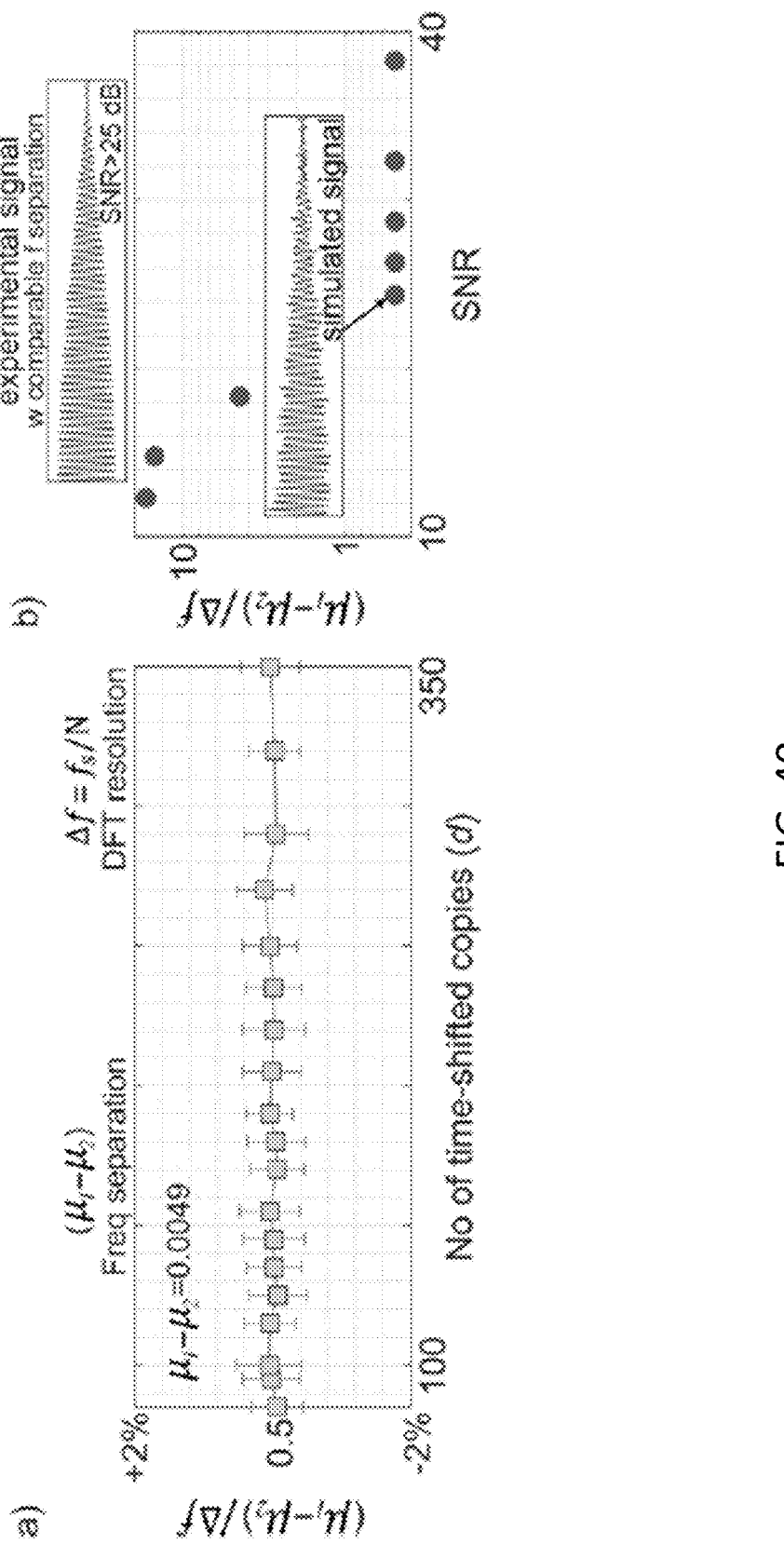
FIG. 40 shows one example of variation of the estimated frequency separation.

Furthermore, HODMD is robust against parameter changes (e.g., the number of time-shifted copies d). The data-driven approach remains mostly unaffected by the number of time-shifted copies used, as shown in (a) of FIG. 40. Additionally, its ability to resolve frequencies at 0.5 of the DFT frequency resolution holds even with varying levels of Additive White Gaussian Noise (AWGN) in the measured intensity. HODMD consistently produces reliable results until the temporal modulation becomes indistinguishable from the noise level. In FIG. 40, (b) demonstrates this by showing the ratio between the estimated frequency separation ($\mu_1$-$\mu_2$) and the frequency resolution ($\Delta f$), it's 0.5 even for high-noise signals (compare the shown simulated signal with an experimental signal of similar frequency separation).

FIG. 40 shows variation of the estimated frequency separation with (a) the number of time-shifted copies and (b) the noise level. The target frequency separation is similar to the normalized y coordinate in Test 3, $\Delta\mu=0.5\Delta f=0.0049$. Results were found through a Monte Carlo simulation; 100 runs were used per d/SNR values. In (b), mean values are shown.

The present disclosure provides an HODMD-based algorithm for identifying the frequencies of two or more superimposed frequency-modulated signals subject to Modulation Transfer Function (MTF) effects. The usefulness of this technique has been demonstrated using the application of deflectometry. In comparison to conventional DFT-based approaches, the HODMD-based technique has various advantages, including, unlike DFT-based Fourier Spectrum analysis, HODMD can be used for thinner samples and to reduce the processing time in thicker samples. Additionally, HODMD is robust against user-defined settings. In contrast to DFT, no peak-finding algorithms are used to obtain optimization starting points. Additionally, HODMD produces lower frequency leakage and, thereby, provides accurate optimization starting points and faster optimization of the deflectometry result that doesn't get trapped in local minima. Additionally, HODMD's inherent ability to extract temporal information makes it ideal for describing MTF effects without using a specific MTF model (i.e. inherent data-driven MTF modeling) during the estimation of the initial values. Additionally, HODMD's robustness against frequency leakage and reliability in finding the frequency components allows it to handle non-flat samples that may produce a varying frequency separation across the samples with different fringe tilts unlike flat surfaces [144]. Additionally, HODMD offers an intuitive mode decomposition compared to methods including complex filtering [145], because it inherently represents signal dynamics as a combination of non-static oscillating components. Additionally, HODMD achieves a frequency resolution of $\Delta f/2$, where $\Delta f$ is the frequency resolution of the DFT approach. A higher frequency resolution may be obtained for exemplary signals (i.e. $\Delta f/4$ as in FIG. 12).

Applications for the techniques described herein are not limited to deflectometry alone but can also be applied to other areas that use frequency estimations without peak-finding. Examples are frequency-shifting interferometry, Light Detection and Ranging (LIDAR), Optical Frequency Domain Reflectometry (OFDR), Optical Coherence Tomography (OCT), or Fourier transform infrared (FTIR) spectroscopy. Other applications that would benefit from frequency estimations (but have no MTF-like degradation) are Laser Wavelength Stabilization, Raman spectroscopy, Photoluminescence (PL) Studies, Absorption and Emission Spectra Analysis, Fiber Bragg Grating (FBG) Sensors, Astronomical Spectroscopy, or Fluorescence Microscopy with multiple dyes.

Vision ray metrology is a technique for measuring free-form optics in transmission. The present disclosure examines converting geometric wavefronts into height measurements, emphasizing the impact of sample back surface flatness and telecentricity on accuracy. Vision ray metrology [146] leverages the analysis of ray deflections for wavefront measurement. By utilizing a straightforward 3D line-fitting approach to determine the deflection of the vision rays ($V_x$, $V_y$) of a telecentric imaging system due to the power of a transmissive sample, the geometrical wavefront, W, can be calculated using $(V_x, V_y) = \vec{\nabla} W$ [146]. Unlike Phase Measuring deflectometry [147], the calibration constraints aren't as stringent since the distance between the imaging system and screen doesn't remain constant, and the relative change may be known; on the other hand, no constraints of the location of the sample relative to the screen are used. This optical configuration reduces the complexity of the measurement principle.

Figure 41:
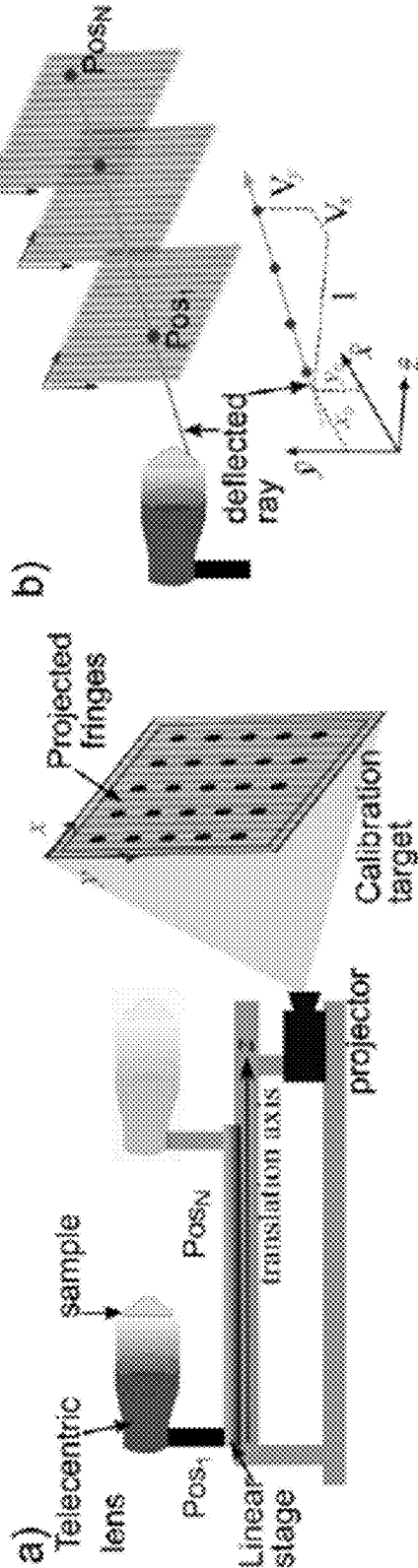
FIG. 41 shows one example of vision ray metrology.

FIG. 41 shows vision ray metrology, including (a) an experimental setup and (b) data collection, modeling, and fitting.

FIG. 42 shows a relationship between the vision rays of an ideal telecentric lens, and the ray deflected from an optical element with a back-plano surface.

Figure 43:
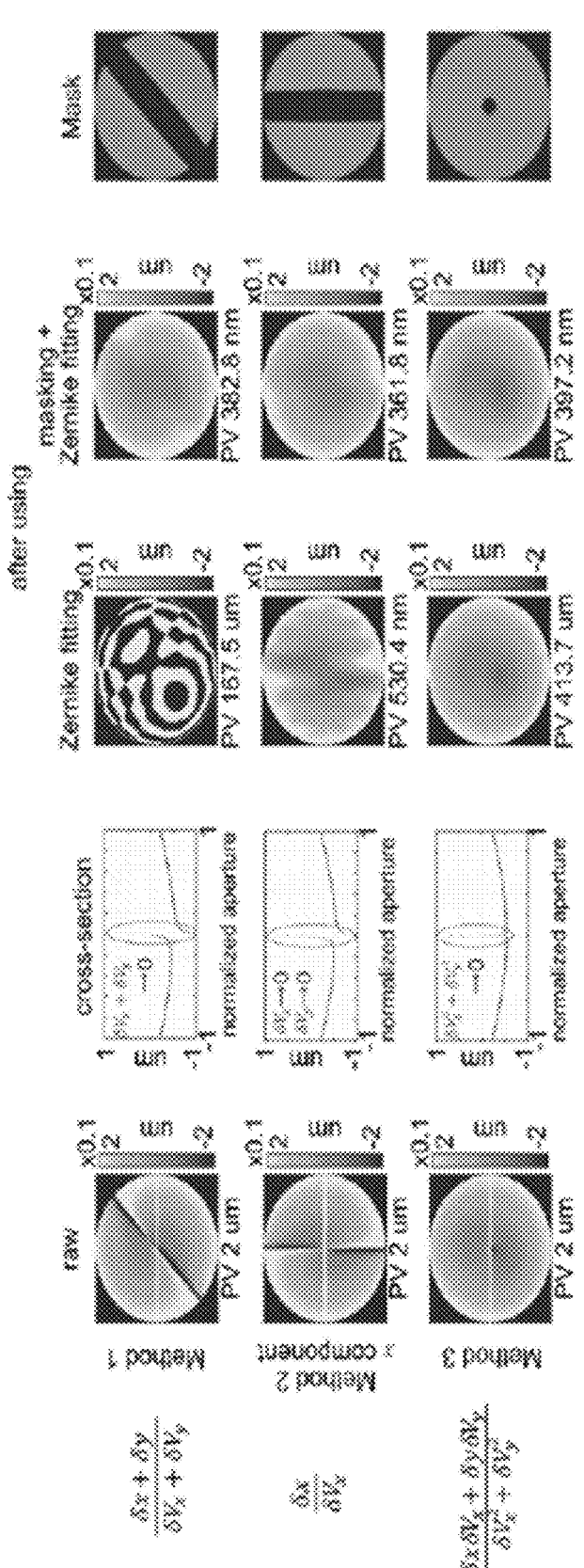
FIG. 43 shows one example of differences in a singularity region.

FIG. 43 shows difference in the singularity region where $(\delta V_x, \delta V_y) \to 0$ and its influence on surface reconstruction for the three methods.

Figure 44A:
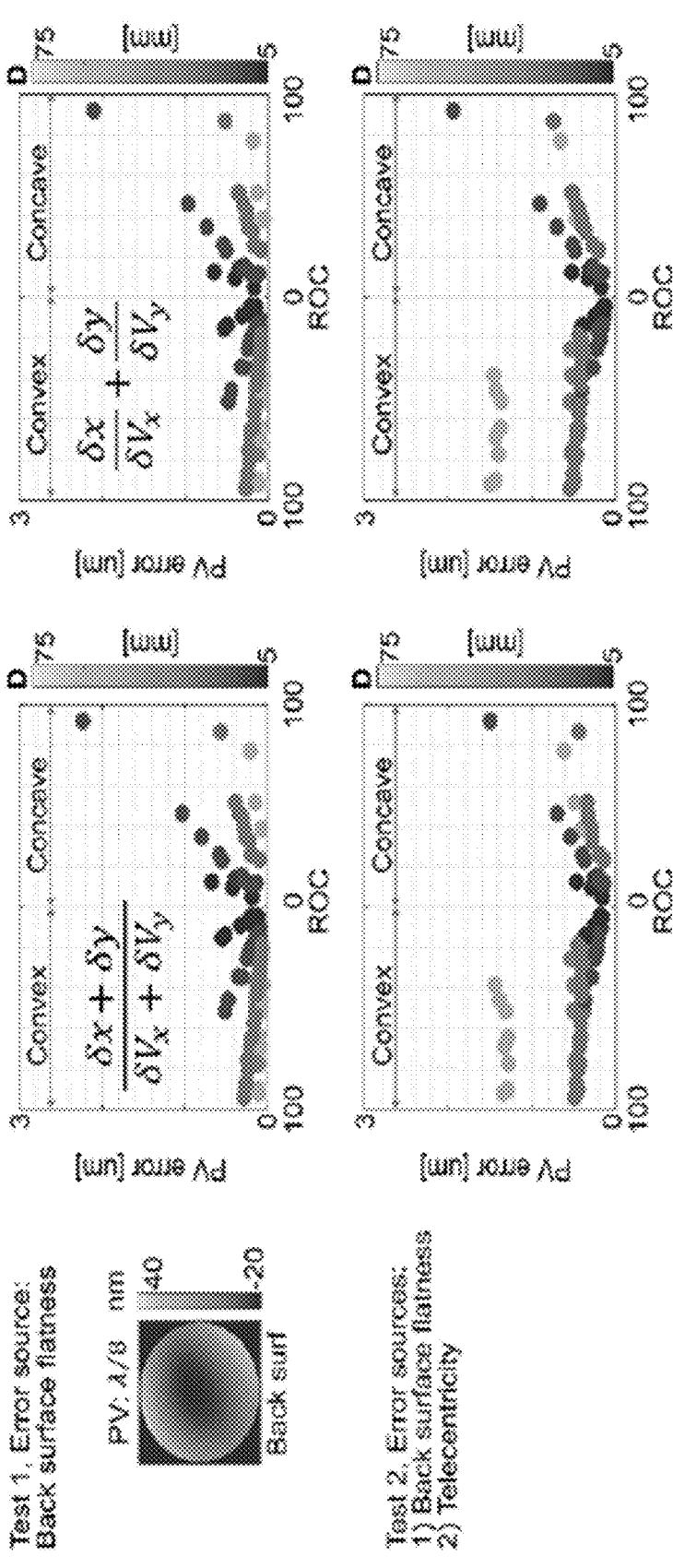
FIGS. 44A and 44B shows one example of difference in the peak-to-valley (PV) of reconstruction error for various methods.
Figure 44B:
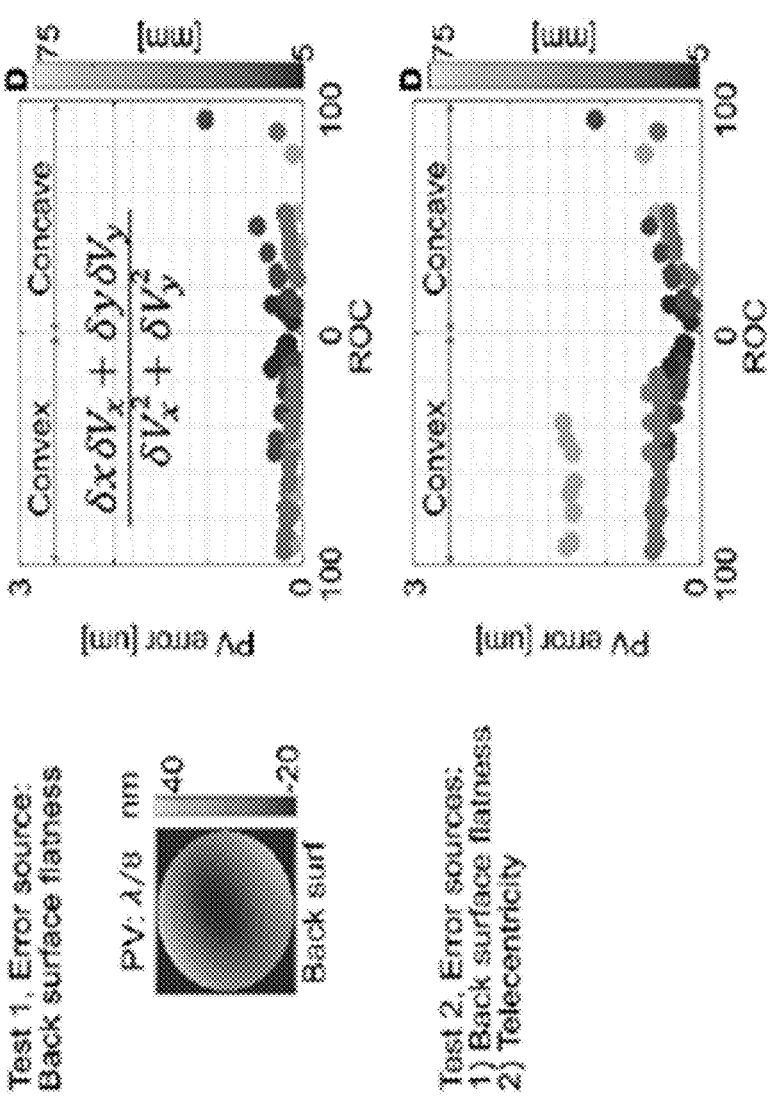

FIGS. 44A and 44B show difference in the PV of reconstruction error for the 3 methods. All methods behave the same when telecentricity dominates the error, while Method 3 outperforms the other two if telecentricity is not considered (i.e. for systems where the telecentricity is calibrated).

The measurement configuration in FIG. 41 allows us to approximate the surface sag of transmissive samples that have a nominal flat back surface if this is facing the imaging system, as shown in FIG. 42. Firstly, assuming a perfectly flat surface on the sample's plano side and ideal telecentric (parallel) rays, measure the vision rays ($\vec{V}_t$) of the imaging system (telecentric lens), then the sample is introduced, and the xy coordinates ($\vec{q}$) are gathered to find the direction of the deflected rays ($\vec{V}_s$). Thus, at any linear stage position $\vec{p} = \vec{q} + \Delta z \vec{V}_s = \Delta z \vec{V}_t + \vec{t}$, with the surface sag $h(x, y) = \Delta z$ measured relative to the target plane. Thus, the corresponding height can be calculated using the xy components simultaneously, Method 1: $\Delta z = (\delta x + \delta y)/(\delta V_x + \delta V_y)$; or by averaging the individual components, Method 2: $\Delta z = 0.5(\delta x/\delta V_x + \delta y/\delta V_y)$; or using the representation of Gaussian regression $A^T A x = A^T b$, Method 3: $\Delta z = (\delta x \delta V_x + \delta y \delta V_y)/[(\delta V_x)^2 + (\delta V_x)^2]$. These equations implicitly say that the front surface is responsible for the refractive power; thus, any refraction on the back surface reduces the accuracy of this approximation. Consequently, the back surface's flatness and the imaging system's telecentricity affect the surface reconstruction. The present disclosure quantifies this accuracy without considering any errors in the vision rays, ($\vec{V}_t$, $\vec{V}_s$), and coordinates ($\vec{q}_t$, $\vec{q}_s$), Since there are well-known procedures for systematic error calibration, and random errors are reduced (e.g., minimized) by filtering the data or averaging multiple measurements.

Although the three methods are capable of accurately reconstructing the surface when no errors are presented, the refraction from the 1st surface due to back surface flatness error or/and the telecentricity expands the singularity region where $(\delta V_x, \delta V_y) \to 0$. Additionally, the numerical implementation reshapes the vicinity of this area, which then shapes the reconstruction error. The shape of the regions ($\delta y$, $\delta x$, $\delta V_x$, $\delta V_y) \to 0$ for the three methods are shown in FIG. 42, both systematic errors were used for this case. The singularity and its vicinity can be managed by 1) fitting an orthogonal basis on the raw data or 2) masking this region and then applying the fitting. Here, the latter is used. The threshold for the masking is based on the max value of ($\delta V_x$, $\delta V_y) \to 0$.

A recently reported vision ray metrology technique [Opt. Express 29, 43480-43501 (2021)], measures geometric wavefronts with high precision. This paper introduces a method to convert these wavefront data into height information, focusing on the impact of back surface flatness and telecentricity errors on measurement accuracy. Systematic errors from these factors affect height measurements. Using ray trace simulations, reconstruction errors were estimated with various plano-concave and plano-convex elements. The present disclosure provides a calibration technique to mitigate telecentricity errors, achieving submicron accuracy in surface reconstruction. The present disclosure provides practical insights into vision ray metrology systems, highlighting validity constraints, emphasizing the importance of calibration for larger samples, and establishing system alignment tolerances. The techniques described herein for the conversion of geometric wavefronts to surface topography employs a direct non-iterative ray-tracing-free method. It is suited for reference-free metrology with application to freeform optics manufacturing.

Many modern optical systems incorporate aspheric or freeform surfaces [148,149] to enhance performance in areas like beam shaping for illumination and imaging applications [148-152]. To provide for manufactured surfaces that align with their original design intent, metrology is used for freeform surface manufacturing. Interferometry provides accurate measurements for optics manufacturing but uses a reference (i.e., computer-generated holograms (CGHs) [153] or a spatial light modulator (SLM) [154] to produce an optical null. Nevertheless, competitive freeform solutions may be cost-effective, and the challenge in the case of metrology is that the costs are directly related to the measurement time and the complexity of the metrology solutions. High-end applications may justify costly solutions such as CGH-based interferometry or CMMs; however, for low-volume productions, this is not cost-effective. As a result, non-interferometric freeform metrology solutions continue to evolve. A popular technique is based on ray tracing for metrology in scenarios where the camera used for measurements can be accurately calibrated [155]. The Null-screen methods [156-158] involve designing a set of geometric figures (the null-screen) that, upon reflection or refraction by a known optical surface (the reference), generates an image comprising regularly distributed circles or lines. Departures on the test surface with respect to the reference will change the spacing of the designed screen on the imaging plane, which is used with ray tracing methods to estimate the characteristics of the test surface. Deflectometry [159-161] is another null-free approach that measures specular and refractive objects using ray tracing. The surface details are encoded on the change of sinusoidal fringe patterns displayed on a screen near the surface under test. Experimental Ray Tracing (ERT) [162] uses a single narrow, collimated beam that probes a surface, and the change in direction of the light ray is used to determine the surface properties. Inspired by this, the vision ray metrology approach [163] directly quantifies ray deflections, bypassing the use of a standard model and utilizing an optical setup that streamlines the reconstruction algorithms. Additionally, vision ray metrology routinely achieves 10s of megapixel wavefront resolutions and is, in principle, constrained by the camera pixel count. This is an advantage when compared to Shack-Hartman Sensors (680×504 pixels) [164], or the Phasics Wavefront Sensor (360×416 pixels) [165]. This property allows vision ray metrology to highlight finer structures, i.e. MSF errors [163].

Furthermore, recent research has explored the application of vision ray solutions in other techniques [166,167] to reduce measurement errors. While initially designed for wavefront recovery [168,169], the vision ray metrology approach offers distinct advantages over traditional deflectometry methods that use extensive calibration and optimization solvers [161,170,171]. For instance, the deflectometry system in [172] estimates surface profiles and pose parameters through a computational self-calibration approach using a stereo imaging system and ray tracing to model the measurement setup. In [173,174] the projection center of the imaging system is modeled as a point light source, which may use precise alignment on the optical axis of the refractive element. Additionally, [173] uses ray tracing with a nominal surface model, and knowledge of the sample-to-screen distance to calculate ray deflection. In contrast, [174] translates the screen to a second position and then optimizes the screen locations, assuming a planar surface. The computer-aided deflectometry approach in [171], combines CMM measurements with optical software and numerical optimization to refine system geometry and reduce systematic error. A second optimization determines coefficients defining the front and back surfaces of the refractive element as the superposition of an orthogonal basis using four measurements (front, back, 30-degree rotations around the xy-axis). Similarly, this group had previously recovered effective wavefronts [161]. A detailed description of the calibration procedure that combines the initial geometrical parameters of the system (from a CMM), the ray tracing model, and optimization is found in [175]. Nevertheless, the use of a CMM for calibration (e.g. after a thermal drift) increases the system costs.

The present disclosure provides a technique to convert the wavefront information recovered with vision ray metrology (vision ray metrology) to height information from a plano lens without any additional change to the measurement setup and without the use of iterative optimization techniques. The present disclosure introduces the surface reconstruction process of optical surfaces using vision ray metrology and its slope constraints and details the conditions used to test the impact of flatness error on the plano side of the lens, as well as the telecentricity errors of the imaging system. The data describes the processing technique and provides simulation results to quantify the effect of systematic errors and assess the validity constraints of the wavefront to height conversion.

Figure 45:
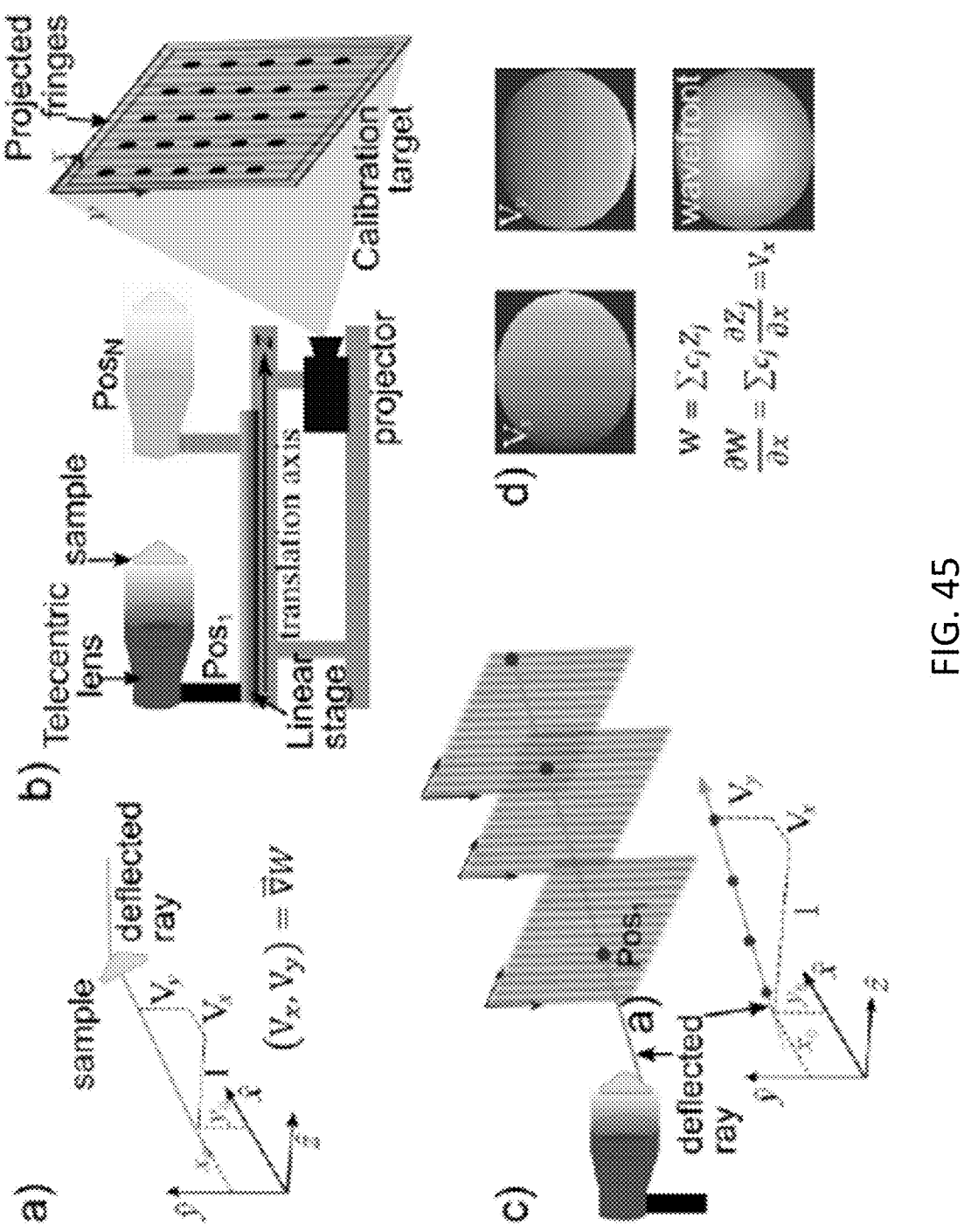
FIG. 45 shows one example of vision ray metrology.

FIG. 45 shows vision ray metrology. In FIG. 45, (a) shows the measurement principle, (b) show the experimental setup, (c) shows data collection, modeling, and fitting, and (d) shows the measurement output. Vision ray metrology [163] measures wavefront from transmissive samples by quantifying the direction of the ray deflected by the sample, as shown in FIG. 45. In vision ray metrology, a pixel (e.g., every pixel) of the imaging system of the vision ray metrology measurement system has a single vision ray assigned [155]. By employing ray tracing in reverse (see similar approach in deflectometry [159]), the properties of the sample under test can be described. Thus, a pixel (e.g., every pixel) that sees the sample is defined as a vision ray that passes through the sample (in jargon). The sample is characterized by tracking the changes to the vision ray metrology line of sight (for each pixel) induced by the sample. This is achieved by keeping the distance between the sample and imaging system constant and stepping the calibration target along the translation axis. At each plane, the (x, y) coordinates of each vision ray are recovered. The final vision ray is then calculated by fitting a line in 3D space with the form of $\vec{r}=\vec{o}_c+z\vec{v}_c$, where $\vec{o}_c=[x_o, y_o]$ and $\vec{v}_c=[V_x, V_y]$ is the ray origin (offset) and the ray direction (slope), respectively. The values of $(V_x, V_y)$ are then used to calculate the geometrical wavefront (W) using numerical integration [176], because they are related to the gradient of the geometric wavefront $\vec{\nabla}W$ as $\vec{\nabla}W=(V_x, V_y)$.

To illustrate the principle of surface reconstructions with vision ray metrology, consider the case of FIG. 46, where an ideal telecentric imaging system (parallel rays) is used for vision ray metrology. In that setup, the sample has a perfectly flat surface on the sample's plano side and an unknown surface on the other side. This measurement configuration is used to estimate the height map based on the geometrical properties of the setup: once the vision rays ($\vec{V}_t$) of the imaging system (telecentric lens) are known, then the sample-induced deflection is measured using the (x, y) coordinates ($\vec{q}$) that are gathered to find the direction of the deflected rays ($\vec{V}_s$). The vectors ($\vec{V}_t$) and ($\vec{V}_s$) are measured using the method in reference [163]. To compute the surface sagh(x, y)=$\Delta z$, the (x, y) coordinates ($\vec{q}$) at any given plane: $\vec{p}=\vec{q}+\Delta z\vec{V}_s=\Delta z\vec{V}_t+\vec{t}$ were obtained, where, for convenience, the very first measurement plane is used, as shown in FIG. 46.

FIG. 46 shows the relationship between the vision rays of an ideal telecentric lens, and the ray deflected from an optical element with a back-plano surface.

It can be seen that the surface sag detected by the pixel (u,v) at the sensor plane depends on i) the change in the XY coordinates $\vec{q}-\vec{t}$, and ii) the change in the direction $\vec{V}_t-\vec{V}_s$, seen by each pixel after the ray is deflected by the sample with respect to the telecentric image system. Solving this problem (for each pixel) is equivalent to a general regression problem Ax=b, with the matrix A and the vector b. Hence, the height can be calculated using Gaussian regression, $A^TAx=A^Tb$, and for $(\Delta\vec{V}_x+\Delta\vec{V}_y)\Delta z=(\Delta x+\Delta y)$, this leads to $\Delta z=(\Delta x\Delta\vec{V}_x+\Delta y\Delta\vec{V}_y)/[(\Delta\vec{V}_x)^2+(\Delta\vec{V}_y)^2]$, which can be rewritten as $$\Delta z = \langle \vec{s}, \vec{V}\rangle/\|\vec{V}\|_2^2,$$

with $\vec{s}=[\Delta x, \Delta y]$ and $\vec{V}=[\Delta\vec{V}_x,\Delta\vec{V}_y]$.

These equations implicitly say that the front surface performs the refractive power, and the sag of the optical sample can be calculated directly. It should be noted that there is a fundamental slope constraint for the reconstruction. For the case of FIG. 46, where the flat surface faces the telecentric system, there is a threshold (e.g., limit) for the maximum surface slope that can be measured. This constraint exists because, for large angles, the transmitted light from the target side doesn't match the acceptance angles of the telecentric system (<1 deg), see (b) of FIG. 45. The specific threshold depends on the material's refractive index; a ray trace in reverse can be used to estimate this threshold

US 12,646,191 B2

Figure 47:
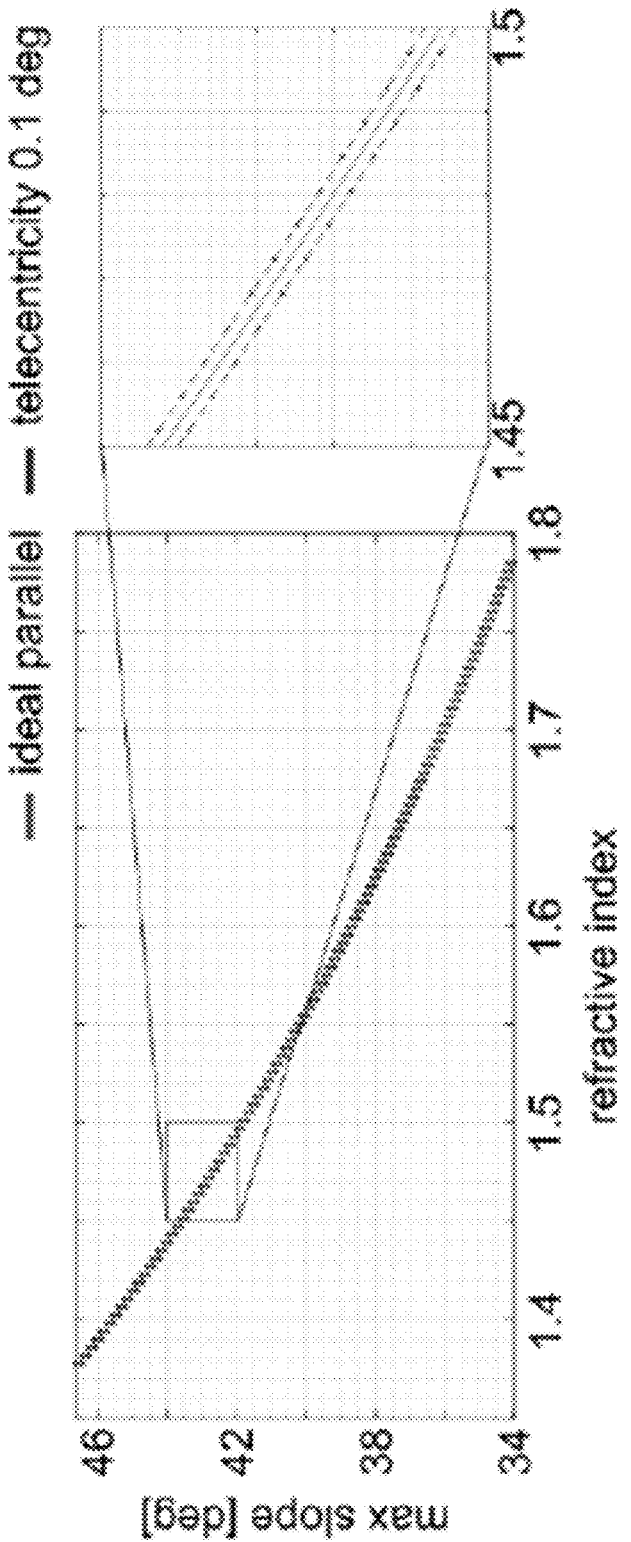
FIG. 47 shows one example of a maximum slope measured via vision ray metrology.

39 where the critical angle as a function of the refractive index gives the maximum slope that can be measured, as shown in FIG. 47. Nevertheless, the previous approach has validity constraints once systematic errors are considered. Examples are sample back surface flatness or a non-perfect telecentricity of the imaging system. In the presence of those errors, the accuracy of the height maps is impacted.

The following sections analyze how the accuracy of the height measurement decreases as a function of the back surface flatness and the telecentricity to establish the constraints of this reconstruction method.

FIG. 47 shows the maximum slope that the vision ray metrology can measured using the approximation in FIG. 26. This study uses ray trace in reverse simulations on FRED [177]. Multiple plano-concave and plano-convex elements from the Thorlabs catalog [178] have been used to estimate the error in surface reconstructions under more realistic conditions. The flatness error is modeled as a superposition of the Zernike basis available in FRED optical engineering software. Two cases were modeled. Case I considers the first ten Zernike polynomials, and in Case II, the first 37 polynomials were used (simulations were performed using FRED version 22.40.4). The first 37 Zernike terms provide a reasonably comprehensive representation of various types of low-order aberrations that can occur in optical systems. Neither piston, tip, nor tilt was included. In this analysis, different PV values of the back surface flatness were modeled to understand how the error in the reconstruction of the front surface scales. Due to the nature of the ray trace in reverse, the imaging system was modeled using vision rays. For that purpose, a 1″ charge-coupled device (CCD) sensor with 20 MP resolution (3648×5472) on a FOV of ~115.7 mm (diagonal) was selected. The distribution of vision ray parameter $(x_o, y_o, V_y, V_x, V_y)$ of the telecentric lens that was measured in reference [163] with various maximum values of $(V_x, V_y)$ was used to model two off-the-shelf telecentric systems (maximum telecentricity is 0.1 or 0.0123 deg). These cases, Case A and Case B, are shown in (c) of FIG. 4.

The overall study starts with a simulation to retrieve the surface reconstruction error when using $$\Delta z = \langle \vec{s}, \vec{V} \rangle / \|\vec{V}\|_2^2$$

on data that includes the exemplary flatness errors for Cases I and II. Then, the telecentricity is added using Cases A and B for the back surface error of Case I. An overview is shown in the Table of FIG. 49 1. Subsequently, a comparison between the two telecentricity cases is performed to evaluate the influence of the telecentricity on the total reconstruction error. Then, a calibration process is used to reduce (e.g., minimize) the telecentricity errors. Furthermore, sources of misalignment errors during the calculation of the calibration parameter were considered and their impact was quantified, allowing for guidelines to simplify the data processing and reduce the error in this case.

Figure 48:
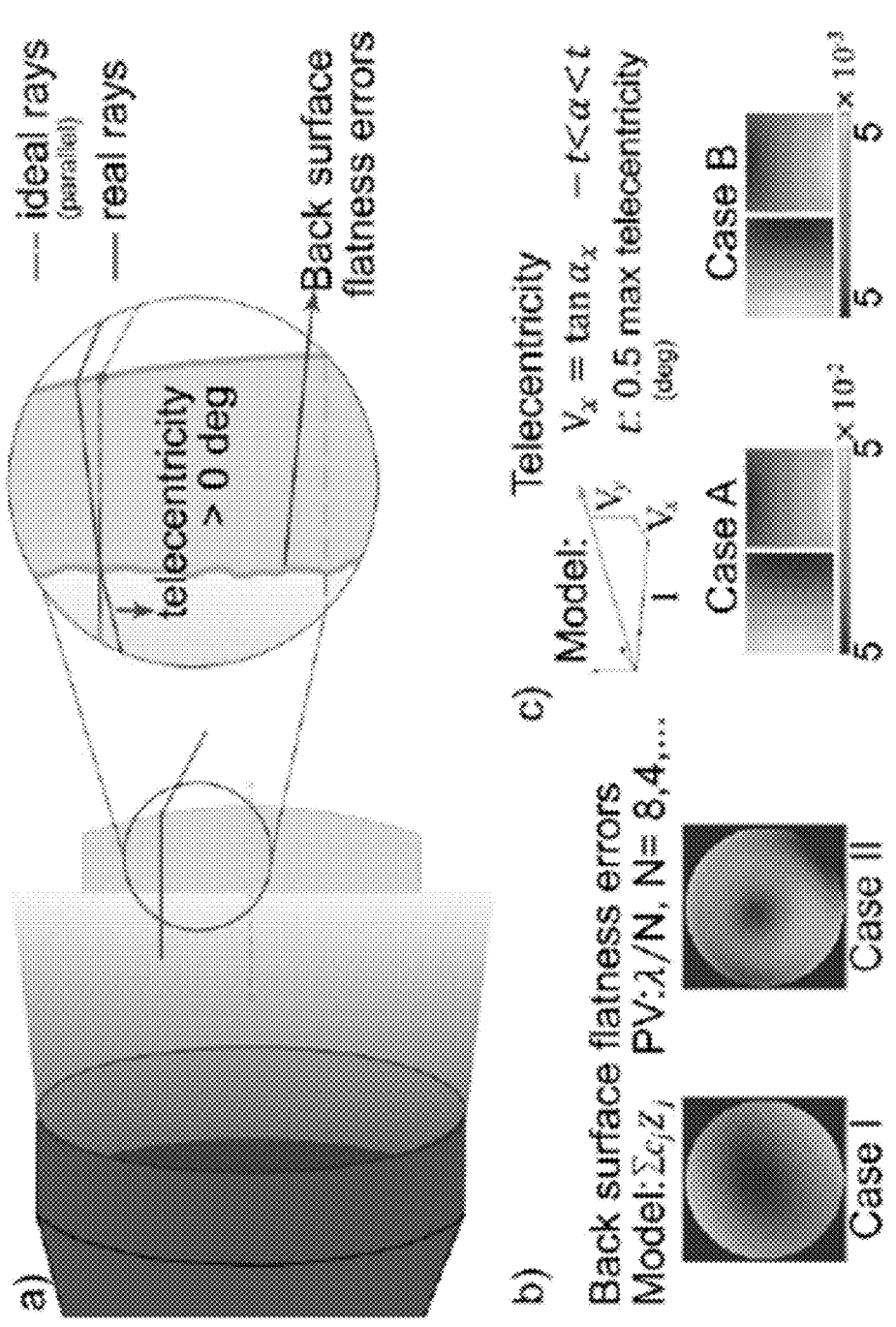
FIG. 48 shows one example a schematic of systematic error.

FIG. 48 shows a schematic of systematic error studied: i) flatness error of the back surface on the sample, and ii) the telecentricity of the imaging system. Ray trace in reverse was used for modeling: the imaging system is modeled as a source. In FIG. 48, (a) shows the flatness that was modeled as a superposition of two arbitrary Zernike sets of coefficients; and (b) shows the imaging system was modeled using the telecentricity specs from off-the-shelf lenses with max telecentricity 0.0123 and 0.1 deg.

40

Figure 52:
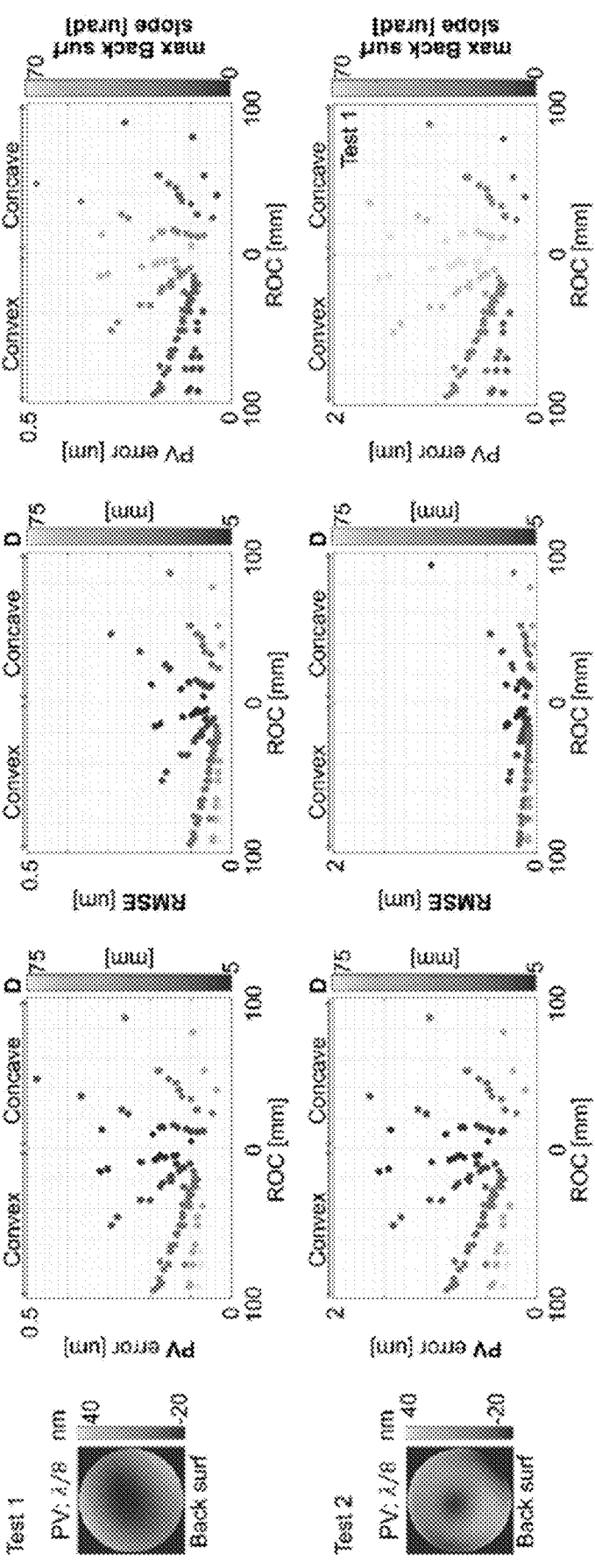
FIG. 52 shows one example of error after surface height map reconstruction.

FIG. 49 shows a table providing an overview of the systematic error configuration for each test. The height maps are reconstructed by applying $$\Delta z = \langle \vec{s}, \vec{V} \rangle / \|\vec{V}\|_2^2$$

to a pixel (e.g., every pixel) on the telecentric systems that pass through the sample. Close to the regions where the sample-induced deflections minimally change the direction of the rays $(\Delta y, \Delta x, \Delta V_x, \Delta V_y) \to 0$, the reconstruction is highly sensitive to errors. This area is referred to herein as the singularity region, as highlighted in FIG. 6. As can be seen from $$\Delta z = \langle \vec{s}, \vec{V} \rangle / \|\vec{V}\|_2^2,$$

this region is dominant in the center of the sample. However, these points with $(\Delta V_x, \Delta V_y) \to 0$ can be masked out when applying an orthogonal basis decomposition. Alternatively, it is possible to apply a weighted fitting (giving less weight to points where $(\Delta V_x, \Delta V_y) \to 0$). For simplicity, in this study, data points were removed so that at least 90% of the data was maintained regardless of the sample aperture size. The mask is selected using a threshold based on the maximum value of $((\Delta \vec{V}_x)^2 + (\Delta \vec{V}_y)^2$, as shown in FIG. 52. The threshold used here was based on $$\|\vec{V}\|_2^2,$$

using a value of min $$\min\left(100/\|\vec{V}\|_2^2\right).$$

Figure 50:
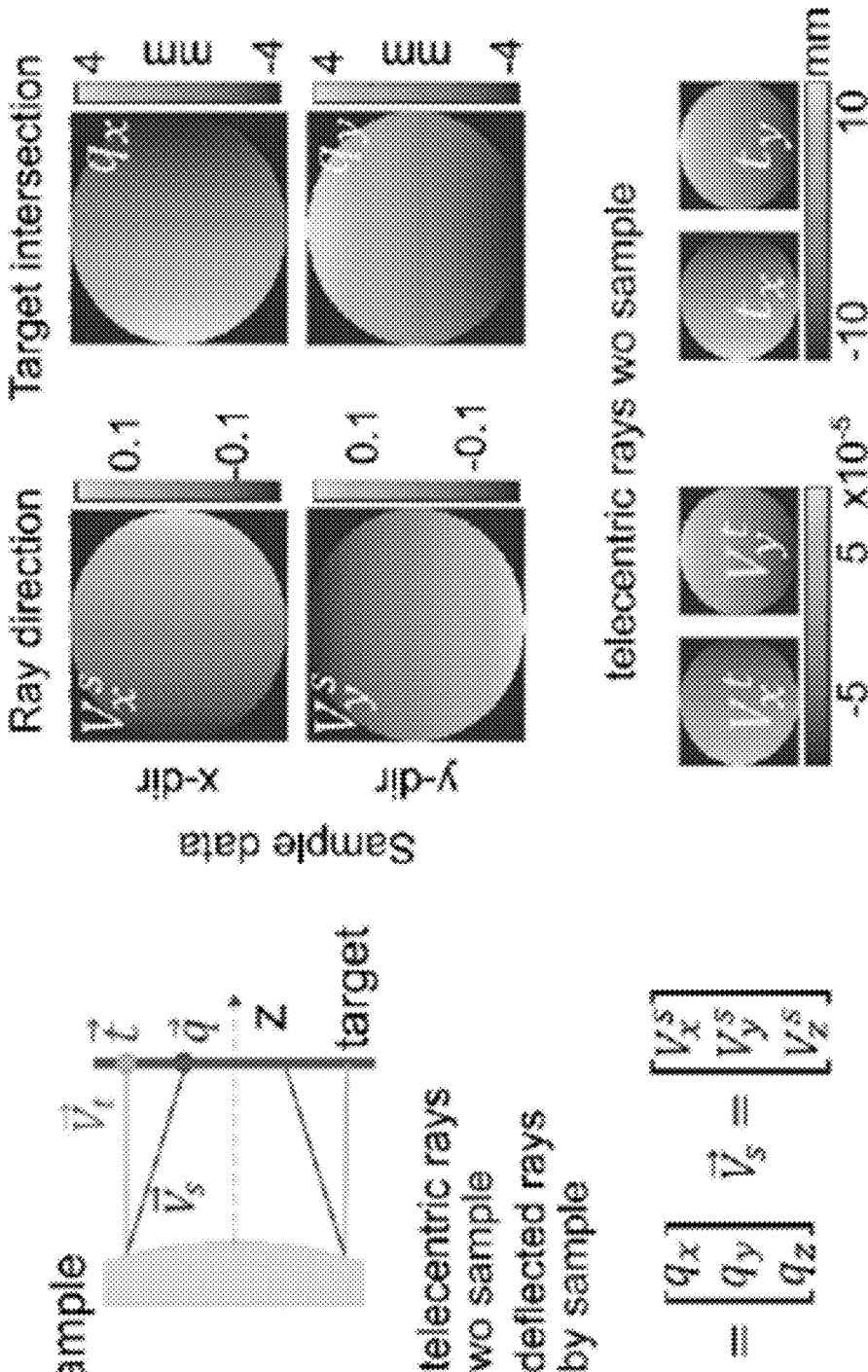
FIG. 50 shows example of data used for a surface height map reconstruction process on an arbitrary convex sample.

FIG. 50 shows example of the data used for the reconstruction process on an arbitrary convex sample using $$\Delta z = \langle \vec{s}, \vec{V} \rangle / \|\vec{V}\|_2^2.$$

Figure 51:
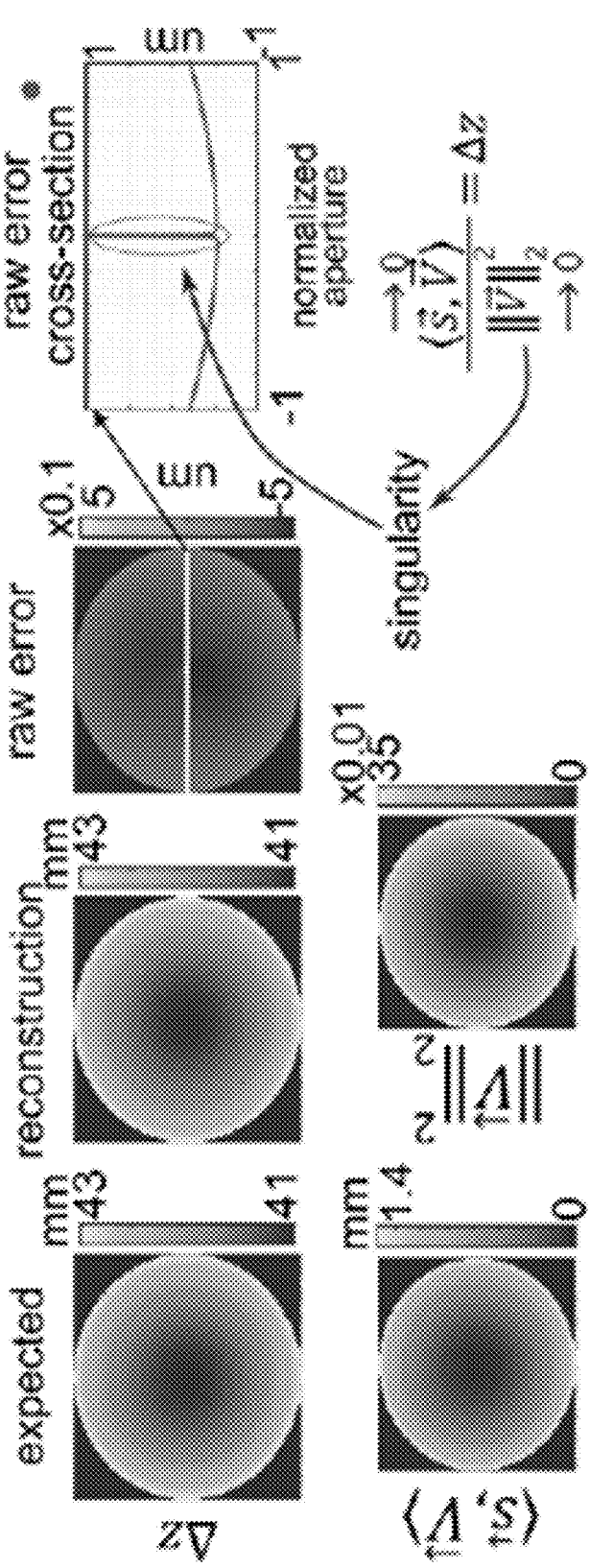
FIG. 51 shows one example of data used for surface height map reconstruction.
Figure 53:
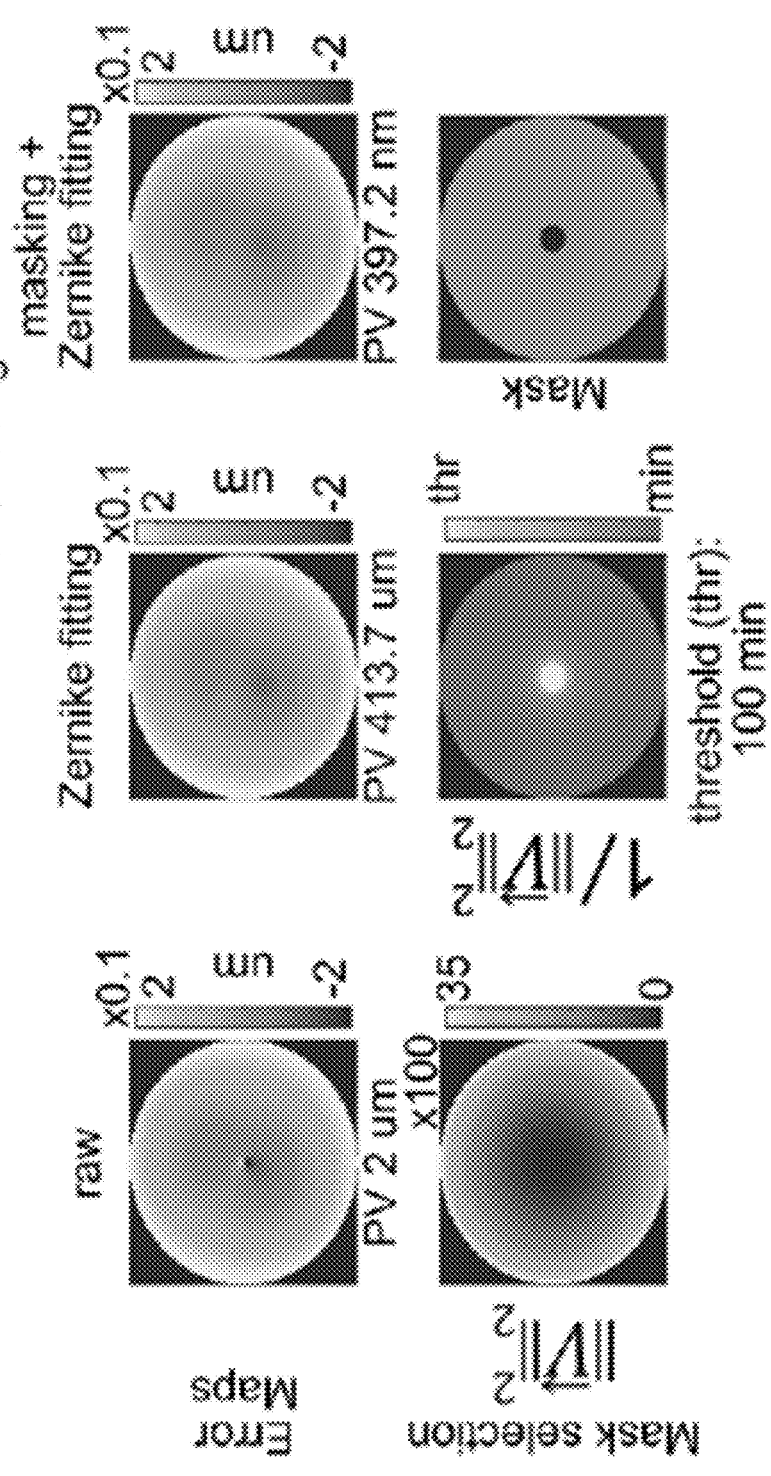
FIG. 53 shows one example of a singularity.

FIG. 51 shows data used for reconstruction has a singularity region that produces a large error, as seen in its cross-section. In this region, sample induced deflection is diminutive, thus $(\Delta y, \Delta x, \Delta V_x, \Delta V_y) \to 0$. The case of back-surface reconstruction errors is analyzed in test 1 and 2 for a vast number of plano-concave and plano-convex surfaces with different radius of curvature (ROC) and refractive index. The results are shown in FIG. 52. The results show that the error decreases with increasing aperture size. This is expected, assuming optics manufacturers can reliably produce a flatness of $\lambda/8$. This behavior can be highlighted by considering the case where the error from the back surface is the same when looking at normalized aperture sizes. When scaling the surface normalized coordinates $(x_n, y_n)$ to the real coordinates. The slope is then proportional to $\partial z/\partial x$ or $(\partial z/\partial x_n)(\partial x_n/\partial x)$. If the aperture size is doubled, then the normalized aperture goes from $x_n = x/r$ to $x_n = x/2r$ thus $(\partial x_n/\partial x)$ adds a factor of ½. Hence, a larger aperture has a smaller slope, deflecting less the original vision rays. Another result that can be extracted from FIG. 53 is that the error increases with |ROC|. This behavior in the reconstruction error is explained by the relative error in [$\Delta V_x, \Delta V_y$], which originates from the error in $\vec{V}_t$. In accordance with the equation $$\Delta z = \langle \vec{s}, \vec{V} \rangle / \|\vec{V}\|_2^2,$$

it can be assumed that $\vec{V}_t$ remains undisturbed until it reaches the front surface. This implies that the modulation of the rays is assumed to be caused by the front surface. Nevertheless, the 1st surface does indeed refract the real $\vec{V}_t$. Furthermore, in real experiments, $\vec{V}_t$ are measured without the sample present, and therefore, the error in $\vec{V}_t$ depends on the back surface's flatness.

FIG. 52 shows error after reconstruction from Tests 1 and 2 (e.g., back surface flatness error only). The back surface flatness has a PV of $\lambda/8$ @587 nm. Samples have an aperture size (D) from 5 to 75 mm (see color bars). PV and RMS are plotted vs ROC and D. The error decreases with D due to the back surface slope: a larger aperture has a smaller slope and thus the error introduced from the refraction on the back surface is smaller. Test 2 has a larger back surface slope than Test 1, resulting in a larger error.

Figure 54:
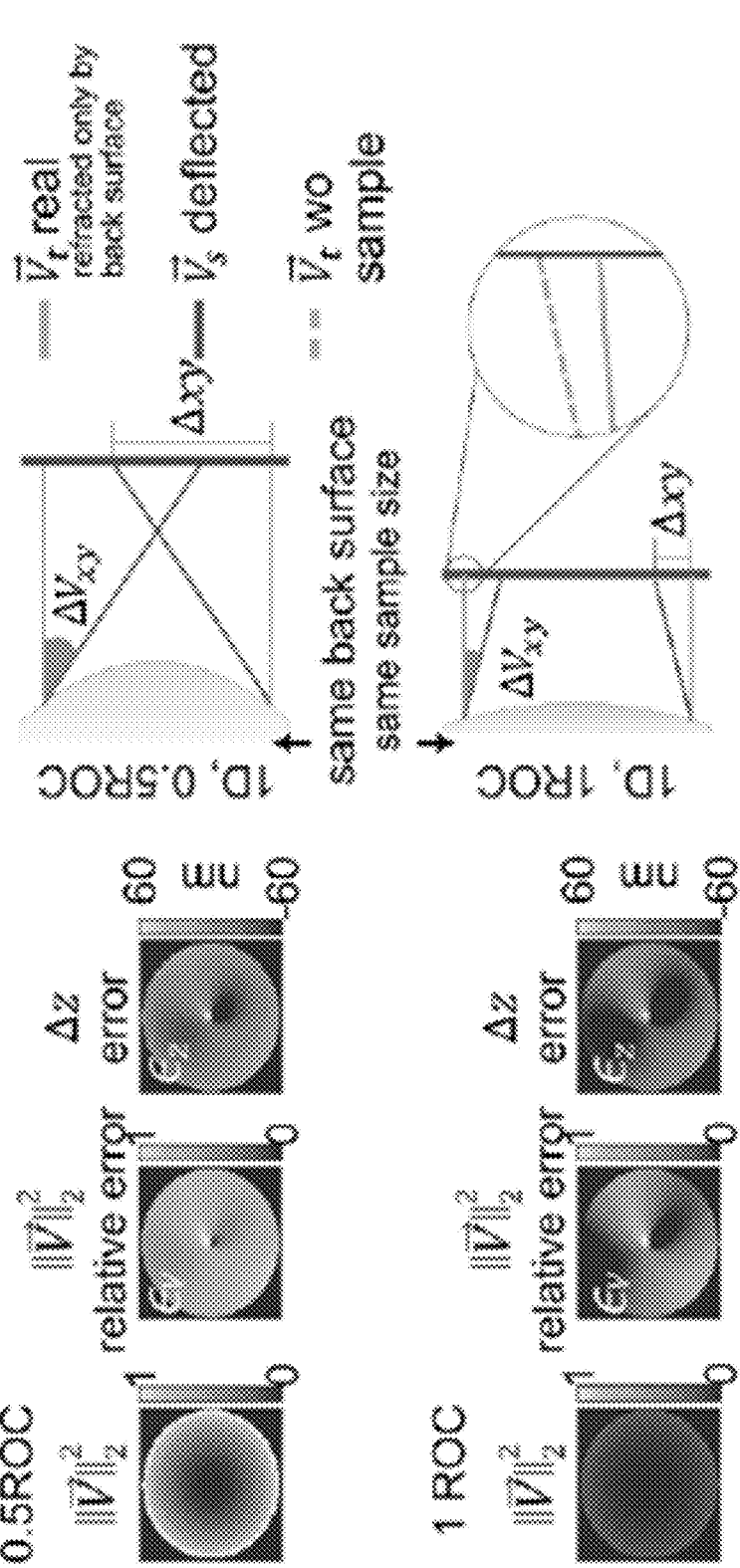
FIG. 54 shows one example of how error increases with radius of curvature (ROC).

FIG. 53 shows the singularity and its vicinity can be managed by 1) using a Zernike fitting on the raw data or 2) masking this region and then applying the Zernike fitting. For the mask selection, the points near the singularity region were removed entirely. Samples with larger optical power have then a smaller relative error in $\Delta V_{xy}$, see FIG. 54. Additionally, the singularity region where $$\left( \langle \vec{s}, \vec{V} \rangle / \|\vec{V}\|_2^2 \right) \to 0$$

influences the error in the center of the sample because a larger |ROC| produced a smaller deflection of the vision rays, which results in a smaller ($\Delta V_x, \Delta V_y$), see FIG. 54. The overall behavior is the same for both curvatures, but the error increases faster with ROC for concave samples.

FIG. 54 shows how the error increases with |ROC|. For a pair of samples with the same aperture size but different ROC, the relative error in the measured change of the ray direction increases with a larger ROC since the sample deflects the rays in a smaller amount. For illustration purposes, $$\|\vec{V}\|_2^2$$

of two samples with the same D, and ROC is a multiple of the other, was normalized and plotted on the same scale, similarly for its relative error $\in V$ (independently, so the normalized magnitude of $\in_v$ is not scaled with $$\|\vec{V}\|_2^2.$$

Another result of FIG. 53 is that the error caused by normalized back surface flatness is more sensitive to aperture size than to the |ROC|. When comparing the rate at which both variables increase the error, it becomes apparent that the error increases faster with decreasing sample diameter than for increasing |ROC|. An example is as follows: For a given sample with normalized back surface errors and given ROC, a higher error may be obtained if the diameter is decreased by half with the same ROC than for the same diameter but twice the ROC.

A result is that, when considering back-surface errors, the reconstruction error of the front surface scales linearly with PV of the back surface flatness. In other words, assuming a back surface flatness S(x,y) with a PV error of $\lambda/N$ produces a PV error of X, the double amount of back surface flatness errors (i.e. 2 S(x,y)) would produce a PV error of 2X. Many simulations verify this trend, as shown in FIG. 55.

Figure 56:
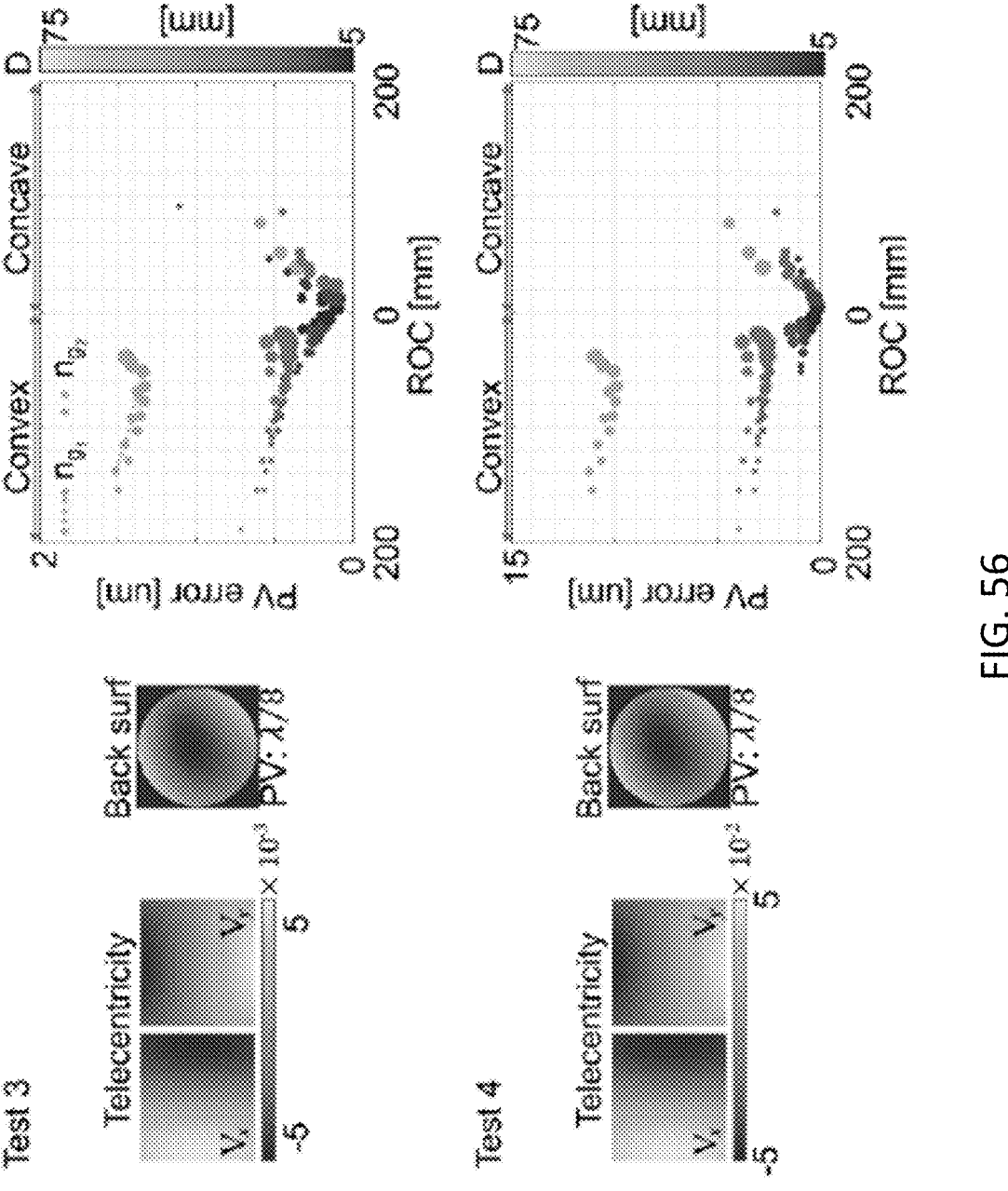
FIG. 56 shows one example of PV error when the back surface flatness and the telecentricity are present during reconstruction.

The behavior of back-surface reconstruction errors (Case I) is analyzed in the presence of telecentricity errors (Case A and Case B), the results are shown in FIG. 56. Overall, for convex samples, the error still increases with |ROC| independently of the refractive index and aperture size. However, there is an inflection point for ROC/D~1, which is the case for slopes larger than ~30 degrees on the convex region (for n=1.43,1.38,1.48, and 1.5). In the region where the error increases with smaller |ROC|, the telecentricity completely dominates the error, while beyond that inflection point (i.e., at larger |ROC|), the error results from both the back surface flatness and the telecentricity. This agrees with the behavior observed in FIG. 58 and FIG. 59. In regions where the influence of the telecentricity is larger, the slope of the function $PV_e(|ROC|)$ is smaller since the telecentricity damps the error of the back surface flatness. Thus, larger values of the telecentricity errors further decrease the impact of the back-surface flatness error, resulting in a minimal change with increasing |ROC| as is the case for the results of Test 4 (shown in FIG. 56).

Figure 55:
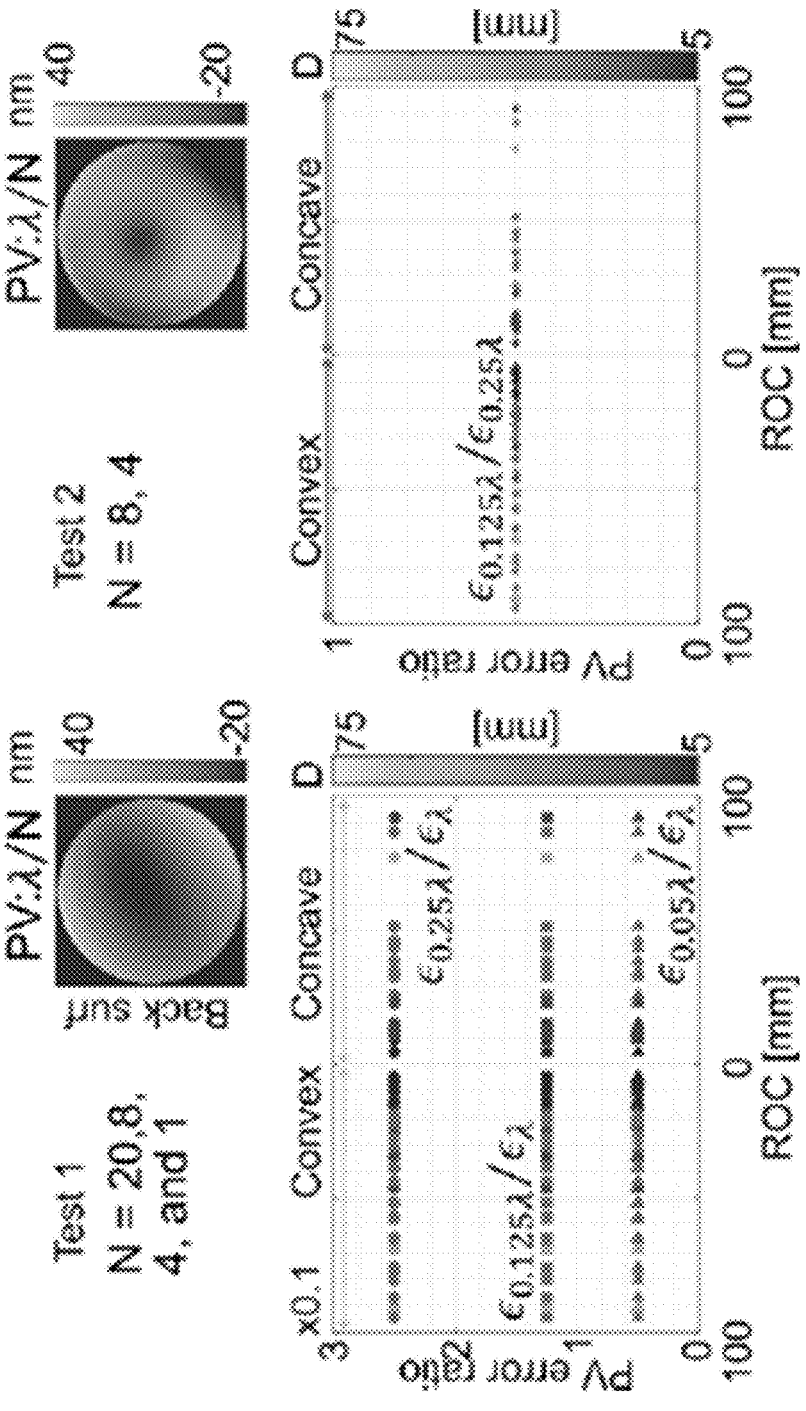
FIG. 55 shows one example of error behavior for multiple PV values.

FIG. 55 shows error behavior for multiple PV values of the back surface flatness error for the same superposition of Zernike coefficients $$S(x, y) = f \sum_{j=1}^{m} c_j Z,$$

the factor $f$ is selected to produce a PV of A N, with N=1, 4, 8, or 20. For Test 1, N=1, 4, 8, and 20; for Test 2, N=4, and 8. In the cases, the error scales linearly with the PV of the back surface flatness error independently from the sample's characteristics. The local oscillations of the PV for each D as function |ROC| are dependent on the refractive index. A larger refractive index gives a smaller error. For the same aperture size and comparable ROC, the material with a larger refractive index bends the rays more; a larger bend means a smaller relative error in $\Delta V_{xy}$.

FIG. 56 shows PV of the error from Test 3 and 4, when the back surface flatness (case I) and the telecentricity are present during the reconstruction. The diameter of the dots in the graph is proportional to the maximum slope on the sample. FIG. 56 also shows that the error increases for larger values of D. This is contrary to the case when (only) flatness errors are present. Thus, telecentricity errors are responsible for this behavior. This effect is explained by the fact that the telecentric lenses have a ray divergence that increases as the distance from its optical axis increases; in other words, the angular span of the rays that intersect the sample is larger, as shown in FIG. 57.

Figure 57:
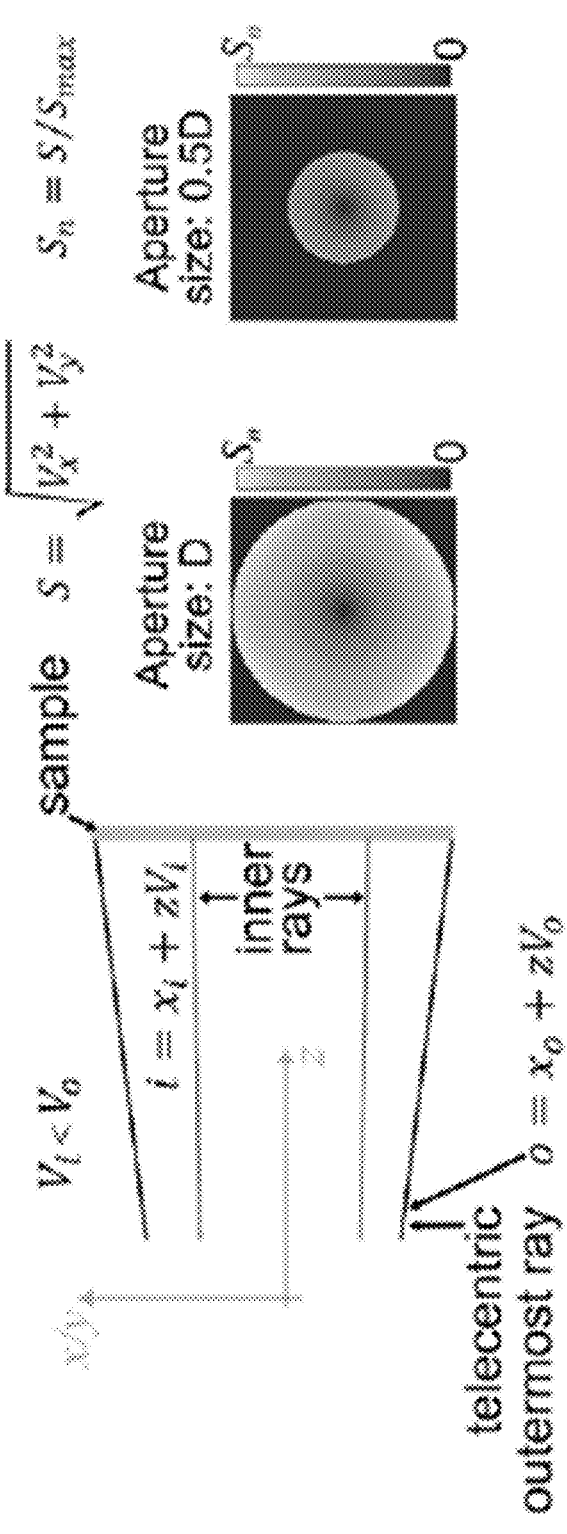
FIG. 57 shows one example of how the acceptance angle of the telecentric system increases for pixels further from the optical axis.

FIG. 57 shows how the acceptance angle of the telecentric system increases for pixels further from the optical axis. For larger samples, the pixels observing the outermost part of the sample have larger acceptance angles or incidence angles on the sample back surface (when ray tracing in reverse). Notably, when looking at the results of Test 3, the value of ROC for which the telecentricity dominates the error depends on the sample aperture size. For Test 4, telecentricity dominates samples other than those with D<10 mm. It is also interesting to notice that when telecentricity dominates the error, the reconstruction error appears to have a strong presence of a systematic defocus term. In the other cases, the error maps resemble the back surface slope as seen in FIG. 58.

Figure 58:
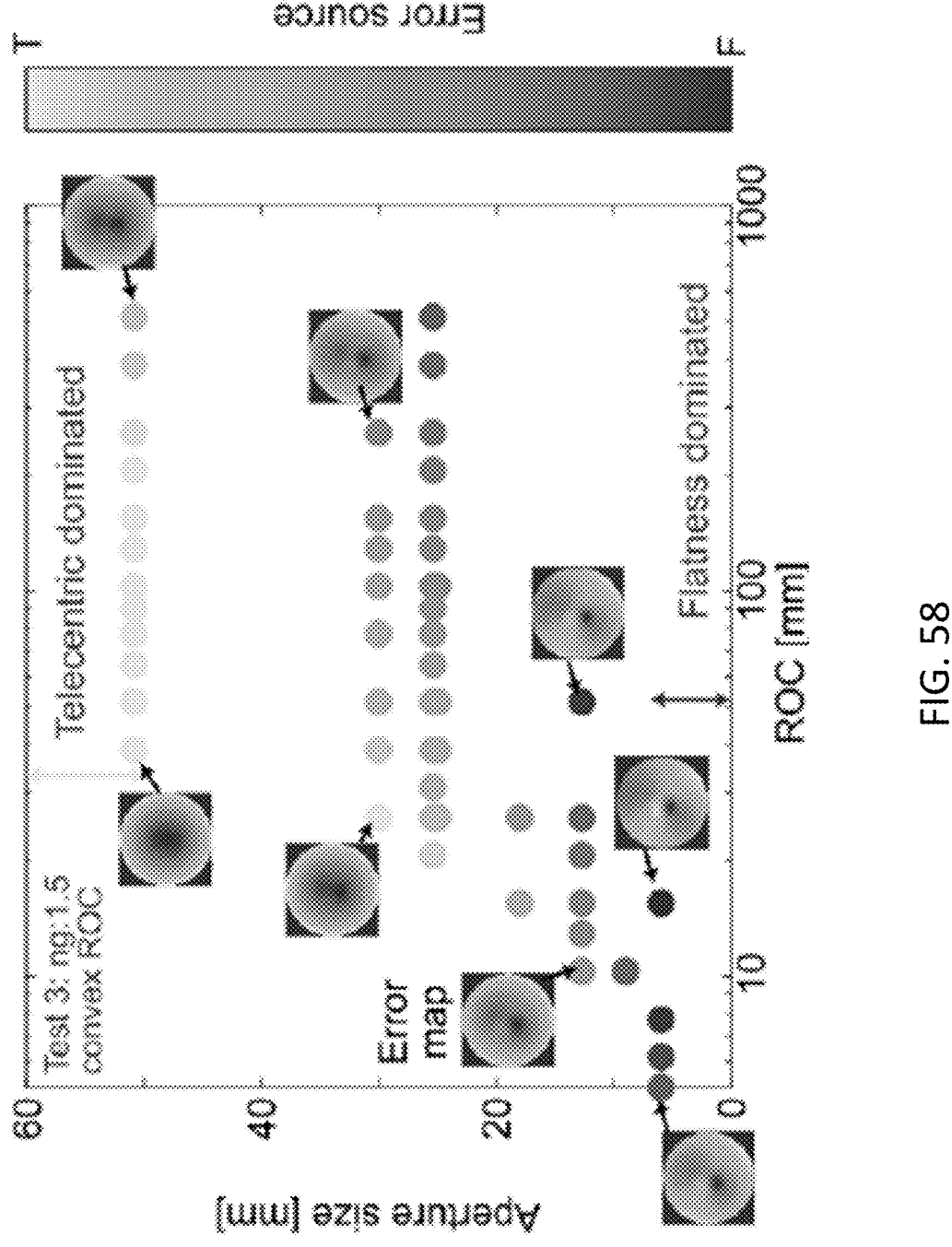
FIG. 58 shows one example of a distribution of the primary source of error for a convex surface.

FIG. 58 shows a distribution of the primary source of error for convex surface in Test 3. The telecentricity dominates the error toward the yellow color, resulting in defocus-like error maps. The color bar visualization was produced using a scaled product of the sample size, max sample slope, and normalized defocus term of the error. Preliminary modeling of the system's telecentricity errors on a large pool of samples can help determine whether to calibrate the errors depending on the aimed reconstruction accuracy. When comparing the results from Tests 3 and 4, as done in FIG. 59, for small samples with aperture size <0.1×FOV of the imaging system, the telecentricity does not influence the reconstruction.

Figure 59:
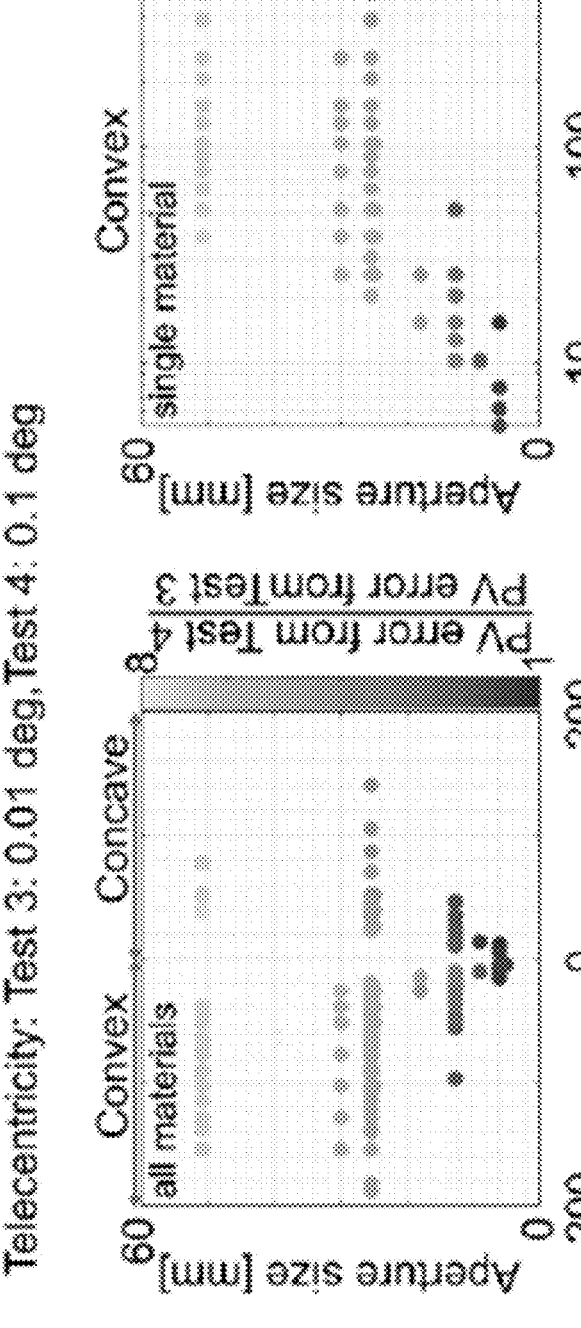
FIG. 59 shows one example of a ratio of PV error.
Figure 60:
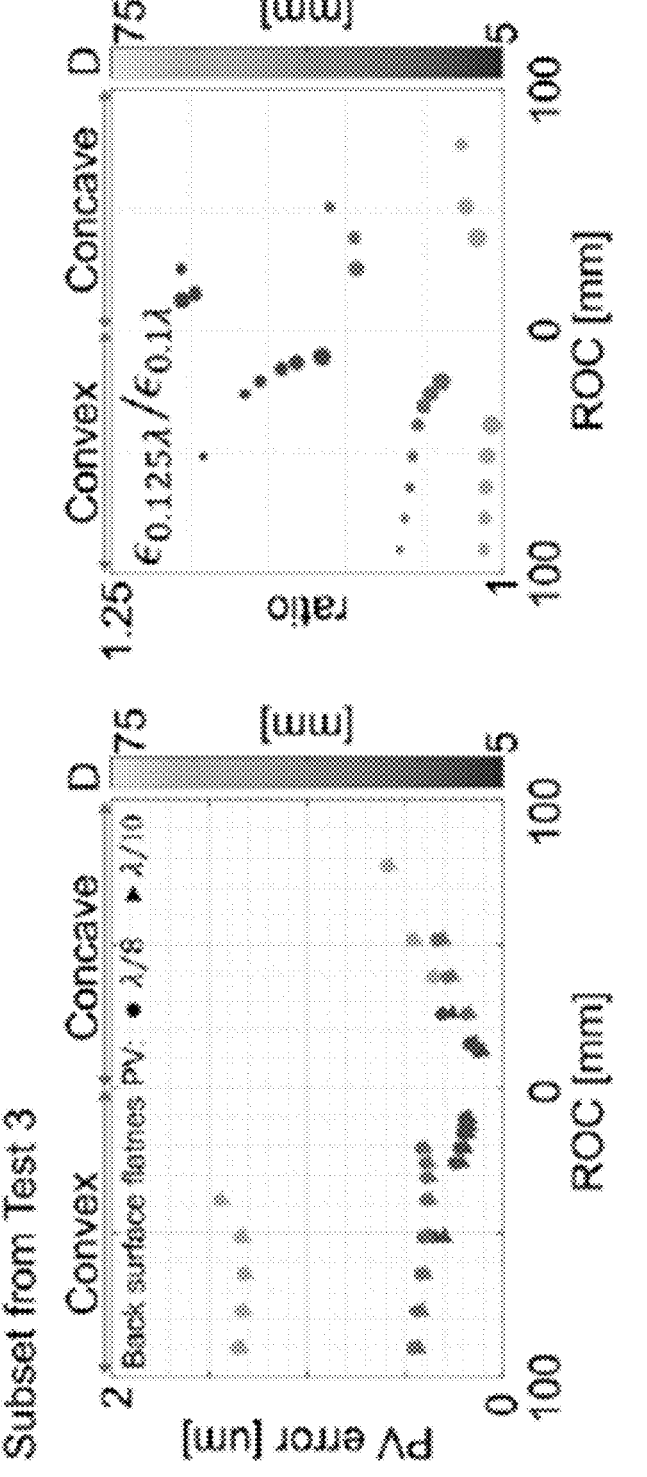
FIG. 60 shows one example of a comparison of the accuracy of a height map reconstruction on a single material.

FIG. 59 shows the ratio of the PV error from Test 4 and Test 3. The tests differ in the telecentricity error, whereas Test 4 has a larger telecentricity error. A higher ratio value in these results indicates a larger influence of the telecentricity. In contrast, values ~1 show the error is minimally dependent on it (thus, flatness error is dominant, and there is minimal change), which agrees with the figure of merit shown in FIG. 58. These simulations also reveal that in the presence of telecentricity error, the linearity of the reconstruction error with respect to the back surface slope is lost, as shown in FIG. 60. This is different from the case of FIG. 55.

FIG. 60 shows a comparison of the accuracy of the reconstruction on a single material and a few aperture sizes (2", 1" and 0.5") for the same structure on the back surface flatness (Case I) but different PV: $\lambda 8$ and $\lambda 10$. Once telecentricity is introduced, the error loses linearity with the flatness error, and the behavior is dependent on the aperture size.

Figure 62:
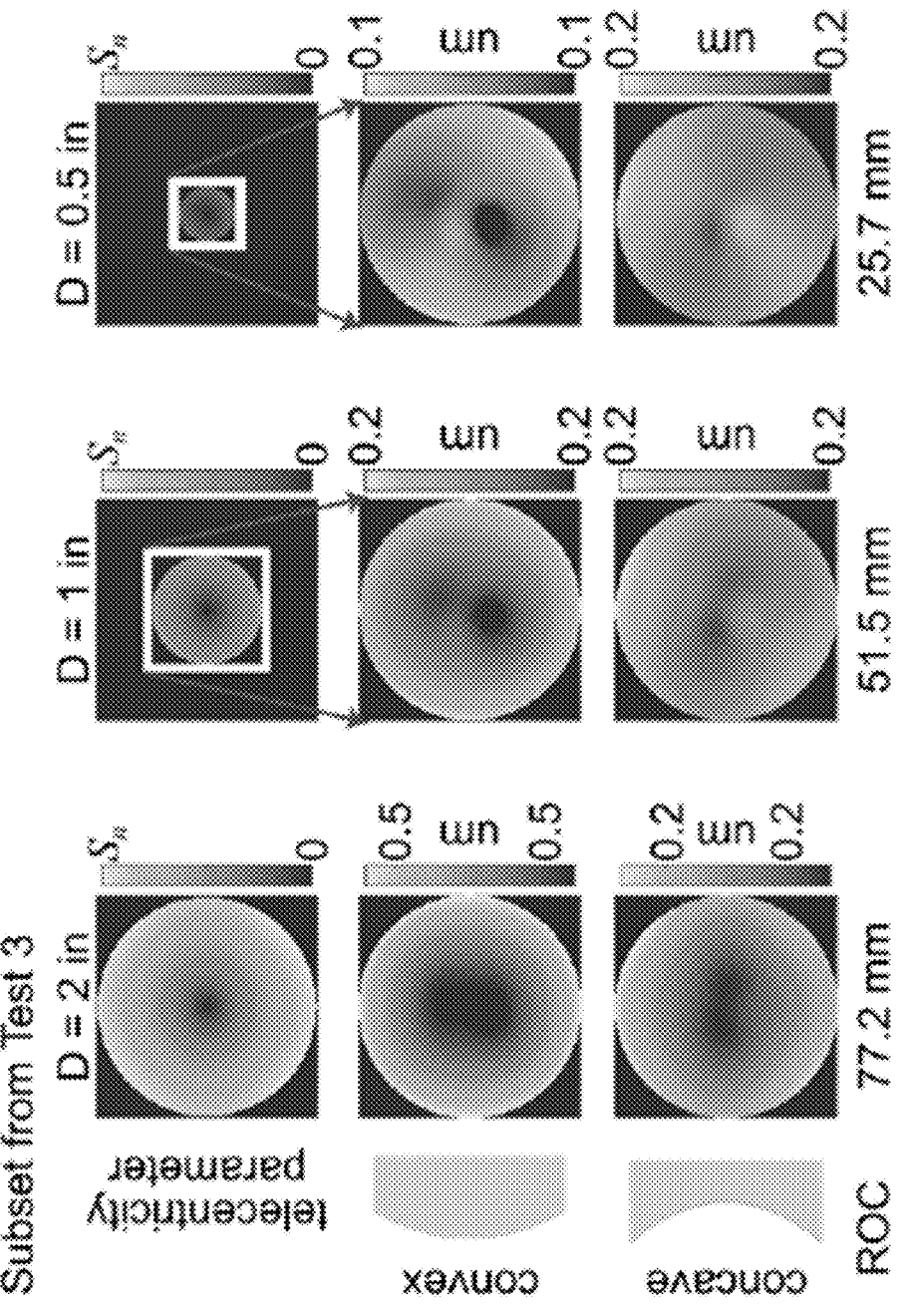
FIG. 62 shows an example error map comparison between various aperture sizes.
Figure 63:
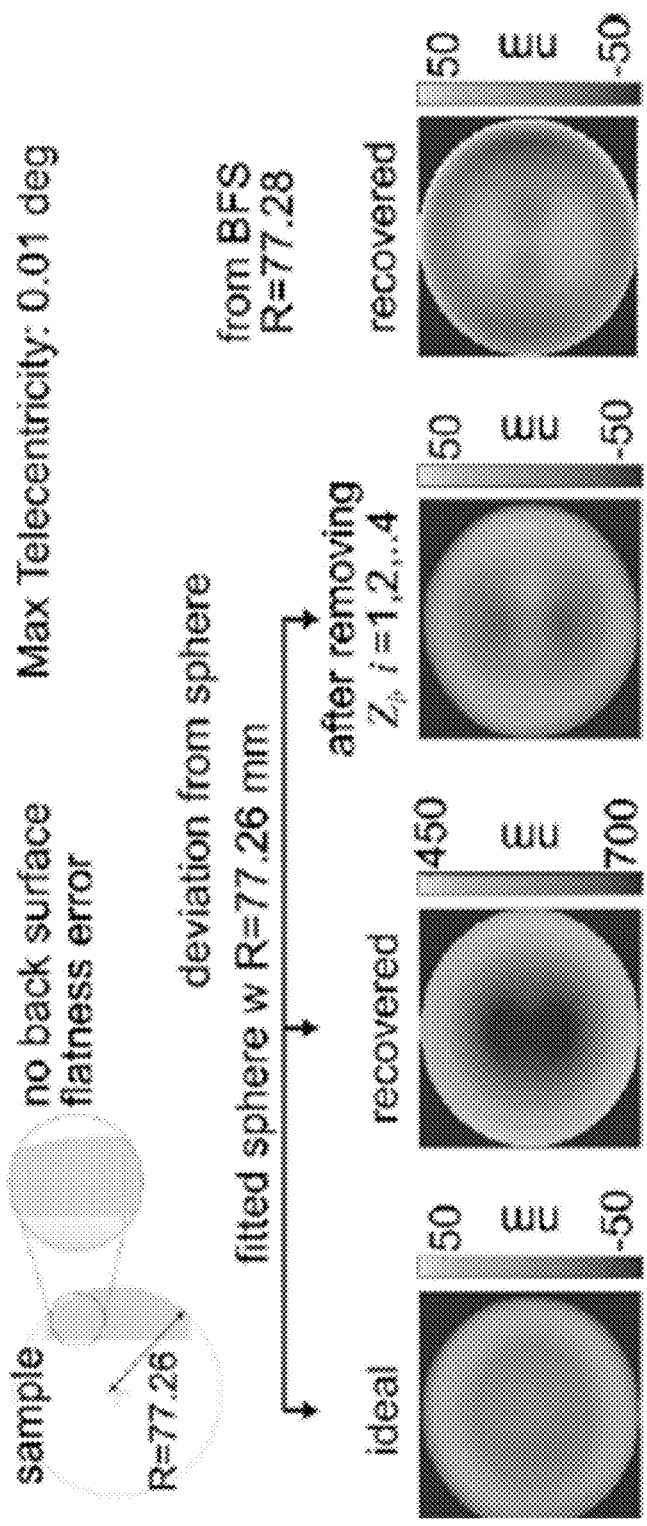
FIG. 63 shows one example of a comparison between the ideal and the reconstructed deviations from a sphere of a 1" convex sample with ROC=77.26 mm.

For FIG. 62, the samples were selected such that the |ROC| is larger for both curvatures, which is the case when the error is maximum for the concave samples, as seen in FIG. 60. This helps identify the major contributor to the error from the reconstruction. The results show that the telecentricity error affects convex samples more rapidly than concave elements with increasing |ROC|. The telecentricity errors of the imaging system adds a defocus-like error term, as seen in FIG. 63, thus removing a sphere with a different radius of curvature, such that the nominal is not enough to reveal the deviations from the nominal shape of the sample. Consequently, calibration is used to reduce (e.g., minimize) reconstruction errors.

Figure 61:
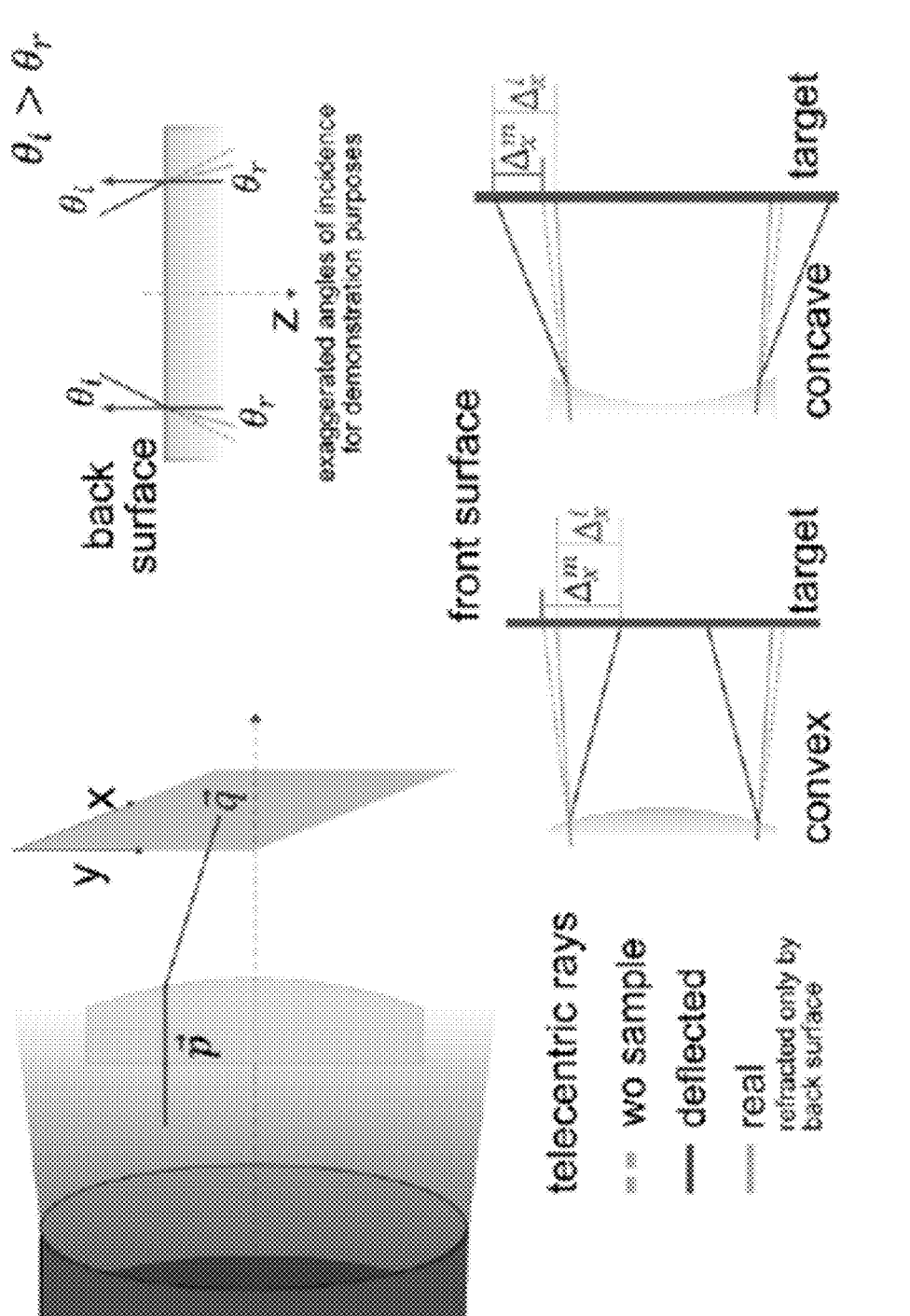
FIG. 61 shows one example of a diagram explaining the reason behind the larger error on convex samples for larger aperture sizes.

FIG. 61 shows a diagram explaining the reason behind the larger error on convex samples for larger aperture sizes (for cases where the telecentricity dominates the error). The relative error in $\Delta xy$ on the convex samples is larger than for concave samples once the telecentricity is considered: the ideal value of $$\Delta_{xy}^{i}$$

is larger than the measured value $$\Delta_{xy}^{m}$$

in concave samples. This effect is reduced once the incidence angle of the outmost rays that pierces the sample is smaller (as the sample decreases). In this case, the difference in the error between the concave and convex samples also decreases.

FIG. 62 shows error maps comparison between three aperture sizes (2", 1" and 0.5") for the same structure on the back surface flatness (Case I) with PV: $\lambda 8$. The defocus term is an effect of the influence of the telecentricity on the imaging system; for smaller samples where the flatness of the back surface dominates, the error shows the impact of the back surface slope and the singularity region.

FIG. 63 shows a comparison between the ideal and the reconstructed deviations from the sphere of a 1" convex sample with ROC=77.26 mm. The back surface of the sample is perfectly flat. The telecentricity adds a piston, spherical, and other low-order terms to the reconstruction. The present disclosure provides a calibration technique that applies to industrial practice, where time-efficient but still accurate solutions are needed. The telecentricity can be calibrated to reduce (e.g., minimize) the error such that it depends on the back surface flatness of the sample under test; here, a Tikhonov regularization-like approach is used, and the surface is estimated as $$\Delta z = \langle \vec{s}, \vec{V} \rangle / \left[ \|\vec{V}\|_2^2 + \lambda \right].$$

The calibration parameter $\lambda$ can be found by, firstly, recovering the telecentric vision rays and performing a ray tracing of the measurement system model with similar geometrical parameters as the actual system, and then using a model of the tested element (with nominal parameters) to find $\lambda$ for each pixel such that the cost function $f(\lambda)$ in $$f(\lambda)\Delta z_{model} - \langle \vec{s}, \vec{V} \rangle / \left[ \|\vec{V}\|_2^2 + \lambda \right]$$

is reduced (e.g., minimized).

The main difference between this approach and similar methods is that a single parameter is optimized for each pixel (2D $\Lambda$ map) instead of modeling the system's aberrations. Hence, this overcomes the need for sophisticated and iterative ray-tracing-based calibration methods. Instead, this 2D $\lambda$ map is generated from a model of the reference sample (e.g., the prescription or the computer-aided design (CAD) model). This 2D $\lambda$ map is robust against deviations from its ideal value due to misalignments and enables the vision ray metrology technique to measure errors that originate during manufacturing. When using this calibration approach, it is possible to reduce the error to the case where the back surface flatness is present, as shown in (a) of FIG. 64. For comparison, for the ideal case, where the back surface of the sample is perfectly flat, the error is below 1 nm as shown in (b) of FIG. 64.

Figure 64:
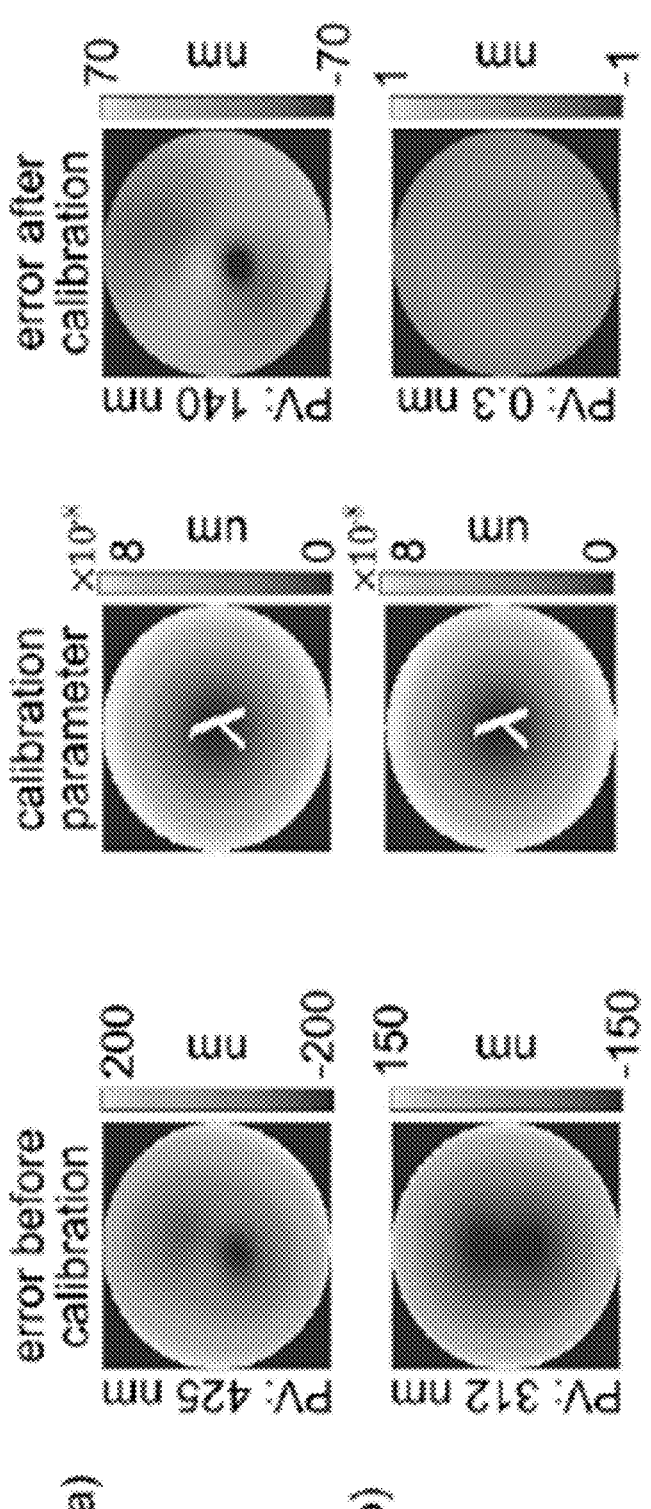
FIG. 64 shows one example of a calibration of the telecentricity for a 1" diameter BK7 sample.

FIG. 64 shows a calibration of the telecentricity for a 1" diameter BK7 sample. In FIG. 64, (a) shows that the sample has a back surface flatness and telecentricity as in Test 3 and (b) shows that the sample has a perfectly flat back surface and telecentricity as in Test 3. The calibration parameter was obtained from the sample model (neither flatness errors on the back surface nor front surface deviation from the perfect sphere are considered). It should be noted that after calibration, the results from Tests 3 and 4 return to the PV error levels as those found on Test 1 (see FIG. 65 and FIG. 52 for comparison), i.e., telecentricity errors are fully overcome.

Figure 65:
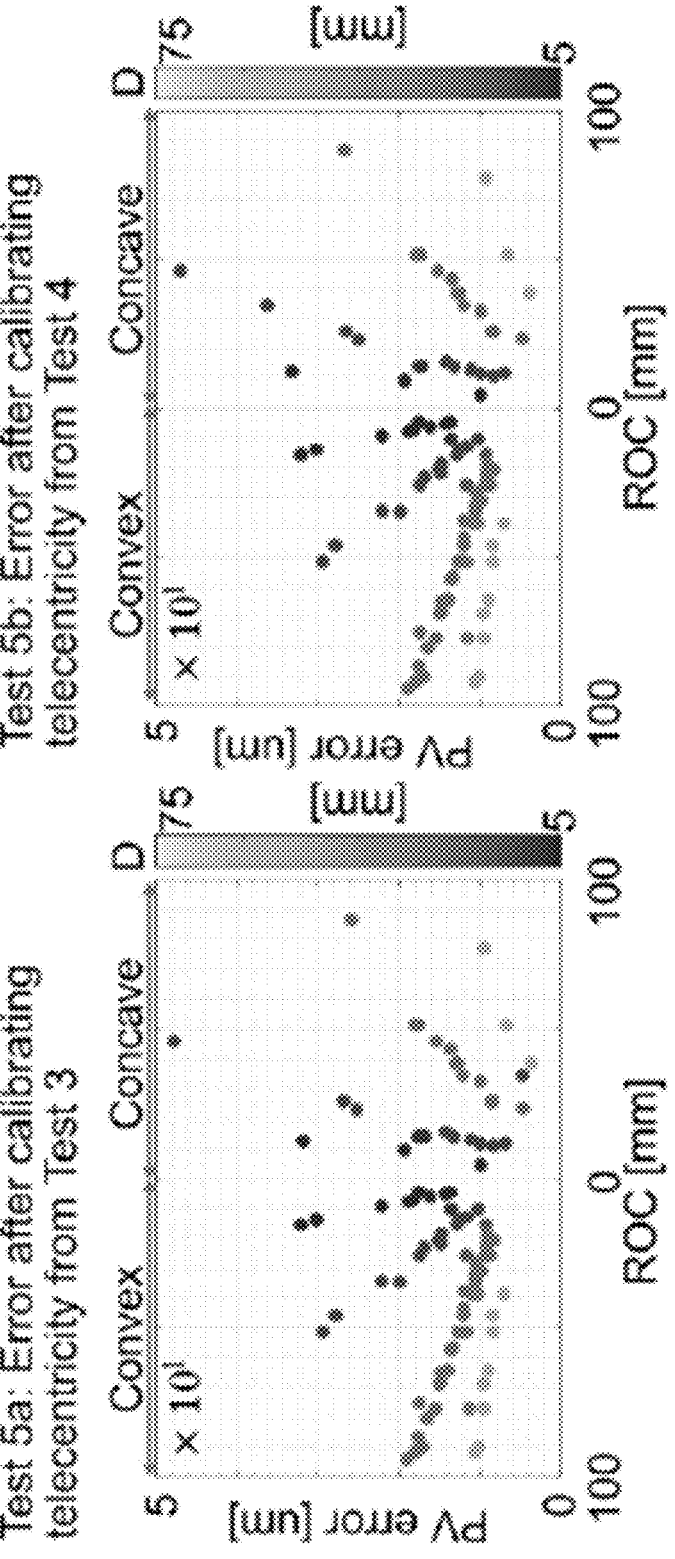
FIG. 65 shows one example of error after calibrating the telecentricity of the imaging system.

FIG. 65 shows error after calibrating the telecentricity of the imaging system used in Tests 3 and 4. The calibration parameter was found from ideal conditions. The calibration parameter depends on the geometrical arrangement, specifically the sample location relative to the imaging system and screen. The direction of the vision rays of the deflected vision rays depends on the incident angle on the 1st surface; thus, the calibration parameter depends on the relative location of the sample with respect to the imaging system, $z_{is}$. For a given $z_{is}$, although the direction of the rays doesn't change (meaning the error in $\Delta V_{xy}$ is constant) the xy coordinates seen by each pixel are dependent on the target location ($z_{st}$). Thus, the calibration parameter is a function of these two distances, $\lambda=f(x, y, z_{is}, z_{st})$. The dependency is determined between the reconstruction error and the calibration parameter sensitivity using simulations to assess the effects of axial and lateral displacement errors on system configuration.

Figure 66:
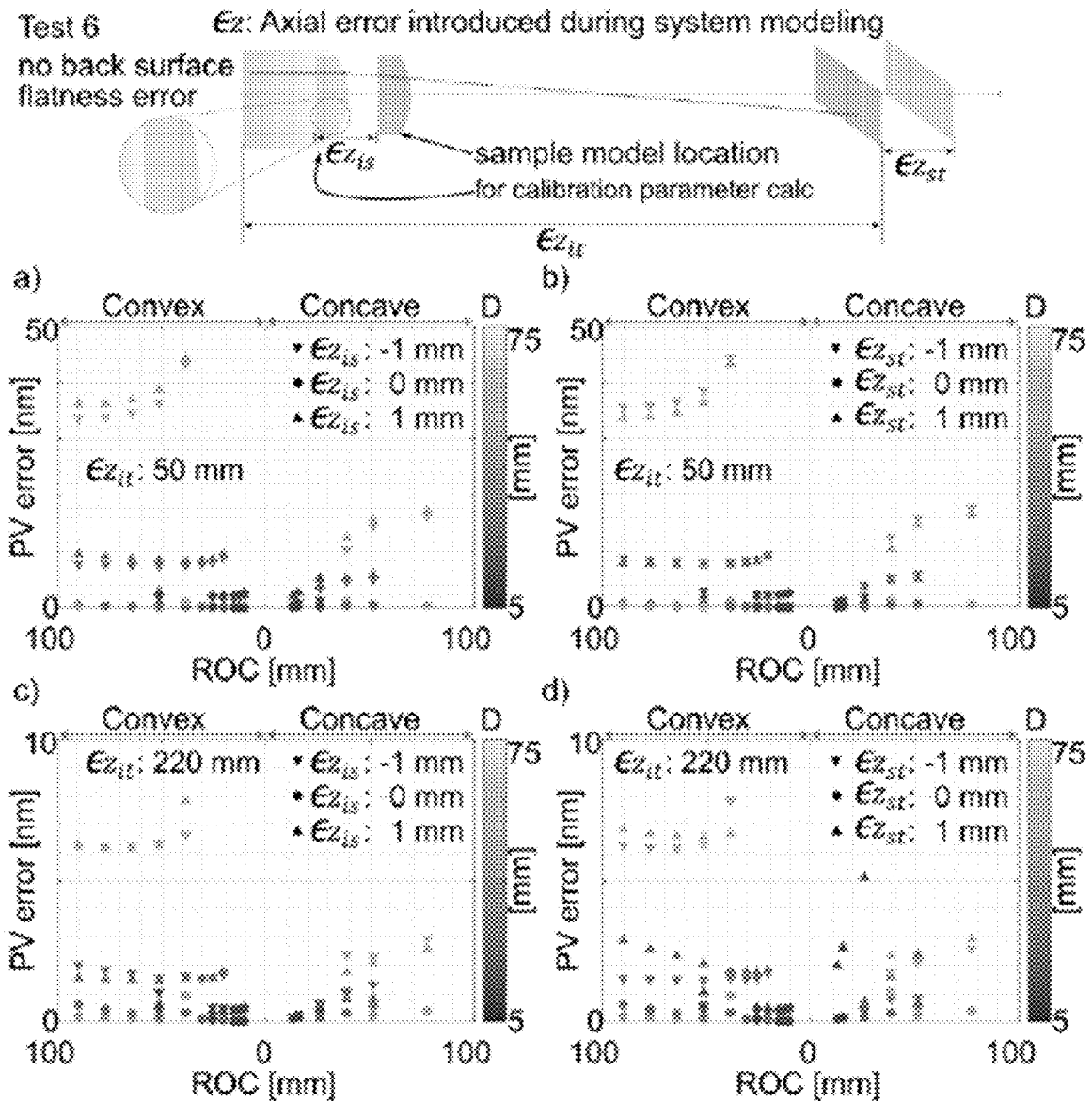
FIG. 66 shows one example of the effect of axial errors on the calibration parameter for 0.0123 degrees max telecentricity.

FIG. 66 shows the effect of axial errors on the calibration parameter for 0.0123 deg max telecentricity. The pair telecentric/sample is at ($\in$zit) 50 mm in a) and b), or 220 mm from the target in (c) and (d). In FIG. 66, (a) and (c) show the distance between the imaging system and the target is constant; the lens location is modeled to have an error along the z-axis. In FIG. 66, (b) and (d) show the error along the z-axis is modeled on the target location.

To identify the contribution of the error on the location of the sample while calculating λ, a subset of the samples used in previous Tests were selected. Additionally, these samples have a flat back surface, and ±1 mm axial error was investigated during the simulations. This assumption is reasonable, because as discussed in reference [179] "table top optomechanical mounts usually rely on visual alignment $$\hat{a}\in\frac{1}{1}$$

it could be reasonably assumed that it is possible to center at resolution of ½0'th of the clear aperture of the optomechanical mount without any special tooling. This corresponds to about ±1 mm for a 25.4 mm diameter lens mount."

The reconstruction error is larger with increasing sample aperture size; however, a single axial error during the calibration parameter of ±1 mm produces less than 50 nm PV error in the reconstructed surface even for 2" samples for the smallest telecentricity of 0.0123 deg, as seen in FIG. 66. For simplicity, the same study was performed for the imaging system with a larger telecentricity (i.e., max: 0.1 deg) for the sample with the largest error shown in FIG. 66. (D/ROC: 2"/38.6 mm) with $\in$zit=50 mm, because it represents the largest reconstruction error. In this configuration, the errors are <400 nm. Placing the sample at an off-center position induces an asymmetry in the reconstruction that prevents a proper surface fitting. The asymmetry can be removed by applying a tilt and offset to the recovered raw data before applying $$f(\lambda)\Delta z_{model}-\langle \vec{s}, \vec{V}\rangle/\left[\|\vec{V}\|_2^2+\lambda\right]$$

for the reconstruction. However, this implies that extra steps may be taken to calculate the calibration parameter λ (i.e., find the location of the sample and include this during the modeling of the system).

Figure 67:
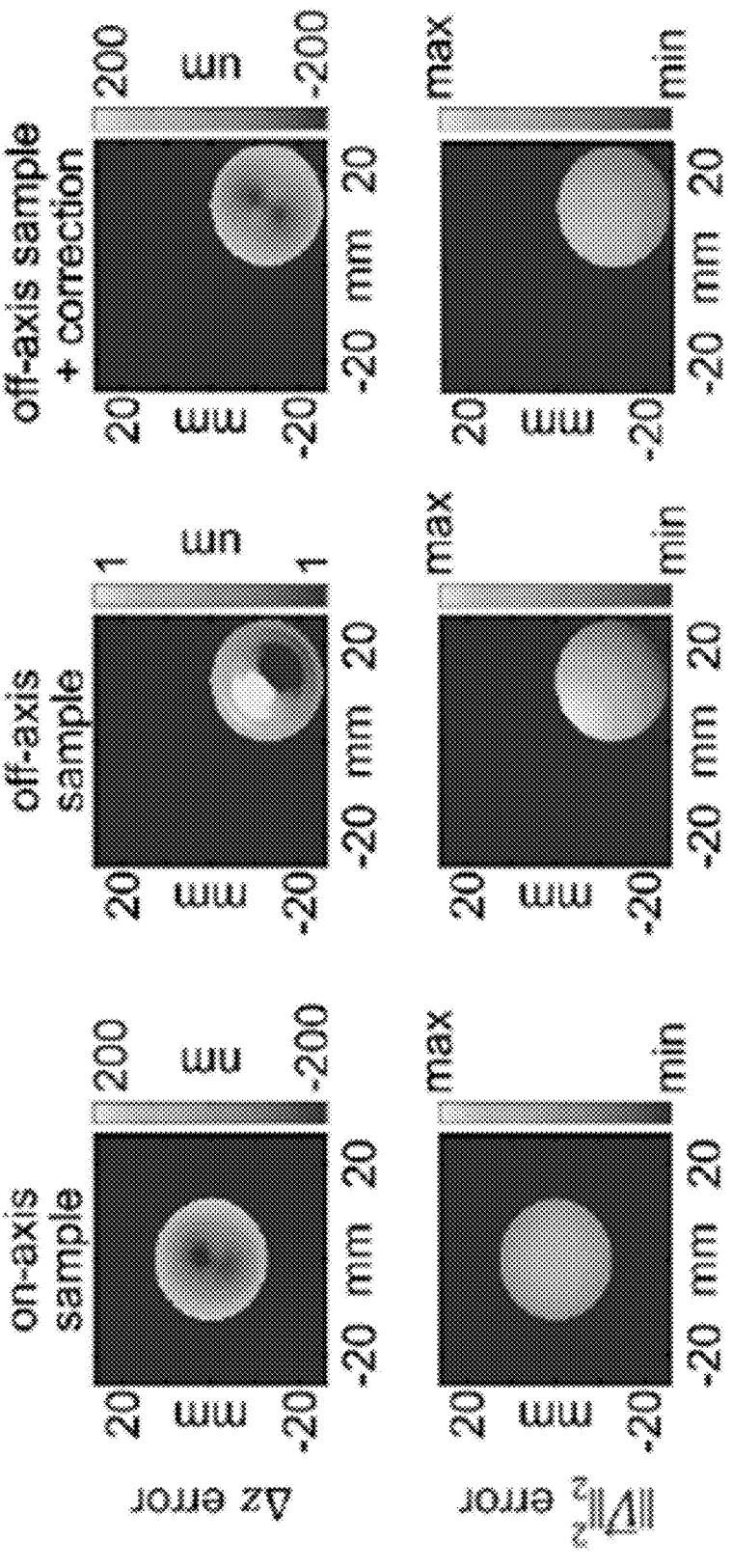
FIG. 67 shows one example of a comparison of the error for a convex 1" diameter BK7 sample when measured on- and off-axis.

FIG. 67 shows a comparison of the error for a convex 1" diameter BK7 sample when measured on- and off-axis. The center of the samples was translated off-axis radially ~12.7 mm. An extra step may be taken before calibrating the telecentricity: set the pixel at the center of the sample as the optical axis of the imaging system to the origin of the measurement coordinate system. For simplicity, the sample may be kept close to the on-axis location to avoid dealing with this extra step and then applying the calibration parameter from on-axis models. Off-the-shelf manual XY translation stages easily allow 10 um resolution (e.g., Thorlabs ST1XY); here, 30 um radial decenter was tested. The error from the system without telecentricity calibration, FIG. 68, shows an error change of less than 5% regardless of the sample size and max slope.

Figure 68:
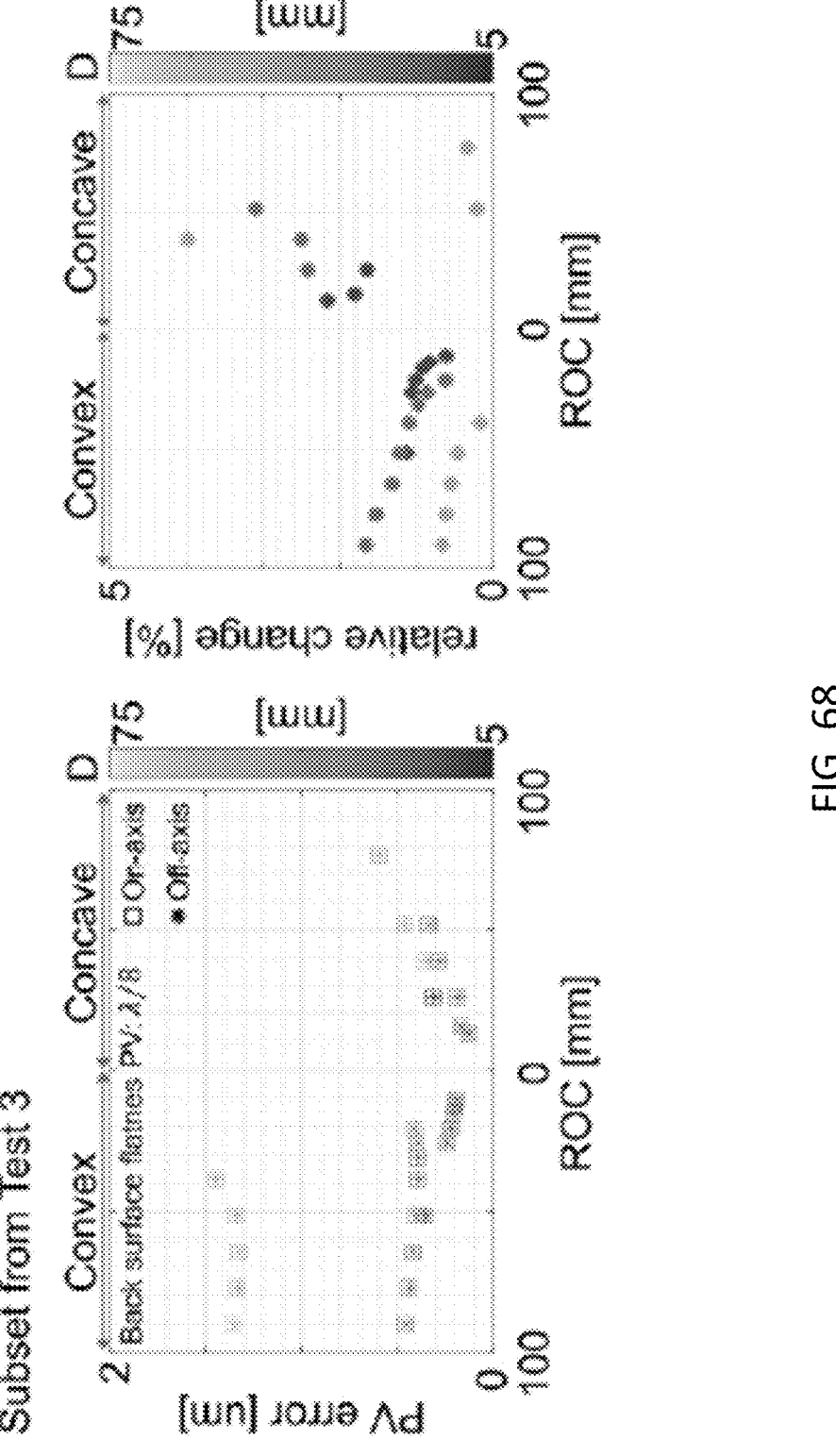
FIG. 68 shows one example of a comparison between on-axis and off-axis samples.

FIG. 68 shows a comparison between the on-axis and off-axis samples. The center of the samples was moved off-axis radially ~30 um (~1.7 pixels w pixels size 17.6 um). Suppose the calibration parameter from a modeled on-axis sample is applied to an off-axis element (FIG. 69) with an offset between 1.5 and 2 pixels. In that case, the error increases by about 10% on convex samples with a 1" diameter, and this value decreases with aperture size.

Figure 69:
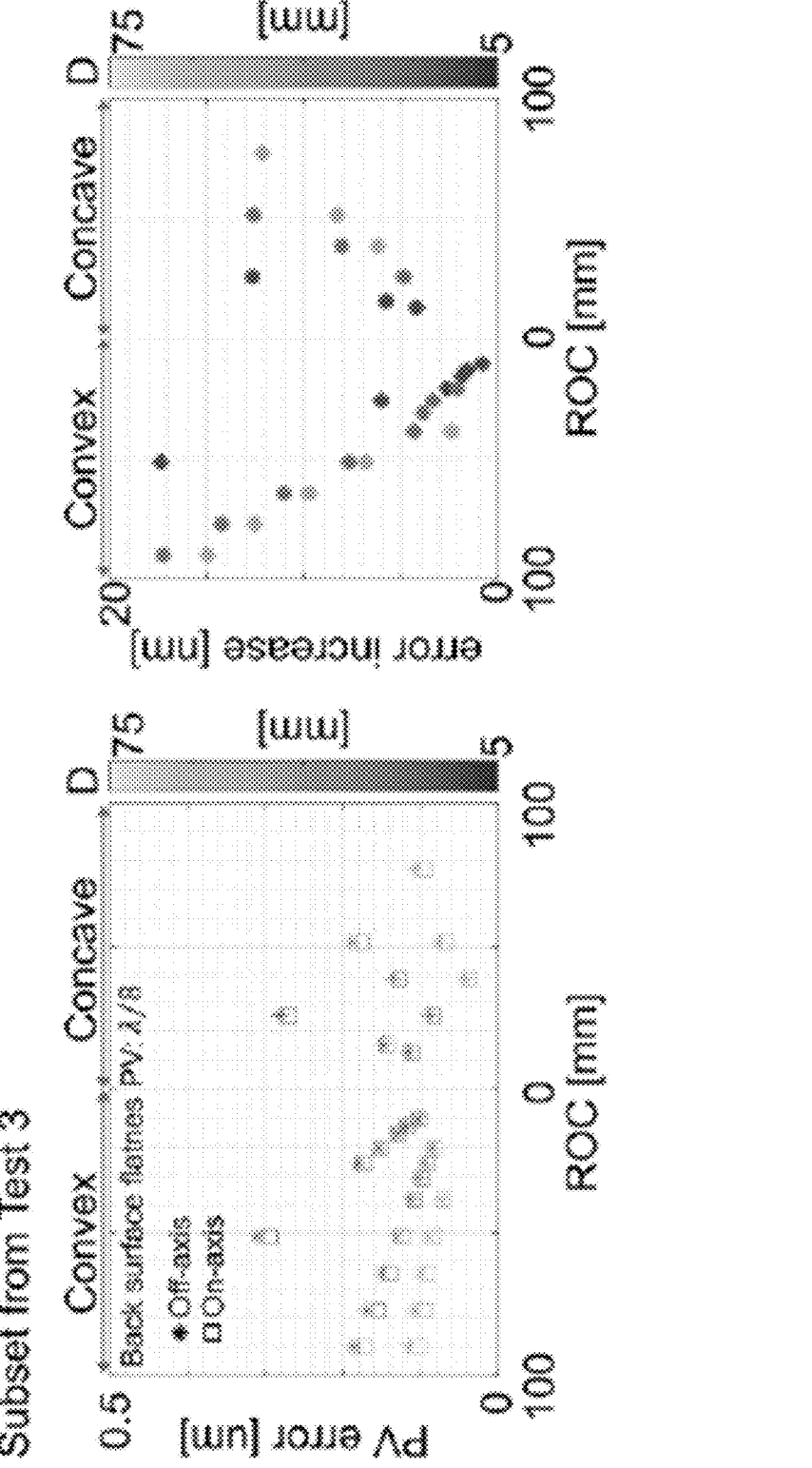
FIG. 69 shows one example of a comparison of the error when ignoring the off-center calibration procedure.

FIG. 69 shows a comparison of the error when ignoring the off-center calibration procedure. Here, the telecentricity calibration parameter found for on-axis samples was applied to on-axis samples (squares) and off-axis samples (asterisk). To conclude the second telecentricity case (max telecentricity 0.1 instead 0.01), the reconstruction error introduced to a convex 0.5" sample with ROC 51.5 mm was considered since this represents a relatively bad (e.g., the worst) case found for the lower telecentricity in Test 6b. For this configuration, the PV error is 443 nm. The error before calibration is 950 nm, calibration without misalignment error reduces this value to a PV of 300 nm, thus the lateral misalignment for the larger telecentricity produces a relative change ~48% or an increase of 143 nm.

Vision ray metrology (vision ray metrology) is a technique for measuring the wavefront of transparent optical samples by quantifying how light rays are deflected by the sample. This paper presents a new method to convert this wavefront information into the sample's surface height. The reconstruction method assumes that the front surface is solely responsible for the refraction of the rays, and therefore, any deviations from flatness on the back surface can introduce errors in the calculation. An analysis of the impact of these systematic errors, specifically those caused by back surface flatness and imaging system telecentricity, on the accuracy of surface reconstruction was performed.

The findings presented herein provide practical insights and recommendations for the operation of vision ray metrology systems. For instance, the telecentricity error may not impact small samples, but calibration becomes crucial for larger ones or for systems with larger telecentricity errors. For example, an increase of the sample diameter from 1" to 2" for convex ROC increases the reconstruction PV error of the front surface between 3 to 4.4 times for Case A (telecentricity 0.1 deg) and between 2 to 3.5 times for Case B (telecentricity 0.01 deg). An increase of the telecentricity error (without calibration) from 0.01 degrees to 0.1 degrees can increase the error more than 7 times for samples with D>30 mm. On the other hand, small samples (D<10 mm) see an increase of a factor ~2.

An interesting finding is that the telecentricity error disproportionately affects convex surfaces compared to concave surfaces, particularly with larger apertures. This is explained by the impact on the telecentricity errors; the relative error in real deflected rays is greater for convex samples than for concave samples due to the change of diverging rays to converging rays. However, this effect lessens as the angle at which the outermost rays enter the sample decreases (i.e., as the sample size is reduced). In such cases, the difference in error between concave and convex samples also becomes smaller. Consequently, increasing the diameter from 1 inch to 2 inches for concave samples approximately doubles the PV error in front surface reconstruction when the telecentricity is 0.1 degrees (Case A). However, with a smaller telecentricity, the reconstruction is slightly affected compared to when back surface flatness is considered. This suggests that concave surfaces are less susceptible to errors caused by telecentricity, making them more robust to misalignment during calibration compared to convex surfaces. For convex surfaces, a 1 mm axial mis-alignment can result in a PV error close to 50 nm. In contrast, for concave surfaces with similar radii of curvature, the error is around 20 nm, in the scenario with a telecentricity of 0.01 degrees and the sample being close to the target. On the other hand, lateral misalignment error produced a mixed behavior that depends on the slope of the front surface and the aperture size. Overall, for misalignments, a relative change in reconstruction error of less than 20% is expected, with the concave samples and concave with small ROC being more heavily affected. Nevertheless, larger telecentricity values make the calibration process more sensitive to misalignment errors, especially for larger samples, because the rays from the outermost part of the samples (with reference to the optical axis) have a larger telecentricity error.

While the present disclosure describes techniques in the context of particular systematic errors (back surface flatness and telecentricity), it is to be understood that other potential error sources exist within the vision ray metrology system, such as target flatness and linear stage errors during vision ray recovery. However, similar measurement setups also grapple with these errors, and advancements made by the metrology community to address them will undoubtedly benefit vision ray metrology as well.

This study advances vision ray metrology (vision ray metrology) [163] by introducing a novel method to convert wavefront information into surface height and a calibration technique to mitigate telecentricity errors. The findings presented herein provide practical guidance for using vision ray metrology systems, particularly in establishing toler-ances for system alignment and highlighting the importance of calibration for larger samples. While one or more tech-niques provided herein may simplify front surface recon-struction, they may not capture the back surface, unlike transmission deflectometry systems such as [171]. However, deflectometry may include a complex calibration routine, and measurements commonly lead to low-frequency errors between a few hundred nanometers and 5 microns PV (first 12 Zernike polynomials) [173,180-182]. Hence, vision ray metrology is more accessible for high-precision metrology applications where back surface information may not be used.

The present disclosure introduces a calibration technique to mitigate telecentricity errors, demonstrating submicron accuracy in surface reconstruction for samples with slow back surface slopes. Additionally, the present disclosure provides insights into the impact of misalignments, helping to set tolerances for system alignment. While this calibration improves accuracy, the inherent flatness of the sample's back surface remains a factor in precisely determining surface sag using vision ray metrology.

In at least one example embodiment, an optical device for measuring optical characteristics using vision rays in pro-vided. The optical device may include a camera (e.g., with a lens, such as a telecentric lens) to form an imaging system generating vision rays, as well as a reference target system. In some examples, the optical device also includes a trans-lation stage (e.g., for stepping the reference target along the z-axis) and/or a rotational stage (e.g., for performing vision ray tomography). The reference target (of the reference target system) may be moved along the z-axis using the translation stage to record the vision rays of the camera-imaging system. A measurement sample may be positioned in front of the camera-imaging system and changes in the vision ray deflection caused by the sample may be recorded. In some examples, the optical device may be configured to measure the geometric wavefront of the measurement sample at different optical wavelengths and/or the measure-ment of sample-induced changes to the geometric wave-front.

In some examples, the optical device is an example of (or is included in) a system for measuring optical characteristics of an object using vision rays. For example, the system may include an optical imaging system and one or more proces-sors operationally coupled with the optical imaging system. In some examples, the optical imaging system includes a camera, a reference target system, a translation stage and/or a rotational stage. In some such examples, the system may be configured to perform a first one or more adjustments to a linear position of the reference target system relative to the camera via the translation stage. The system may be con-figured to generate a first set of multiple vision rays at a plurality of distances between the camera and the reference target system based on the first one or more adjustments, in which the first set of multiple vision rays originates from one or more pixels of the camera.

In some examples, phase measurements (e.g., absolute phase measurements) may be used to generate the vision rays. That is, in some examples, the system may be config-ured to project a set of phase-shifted fringe patterns via the reference target system and obtain, via the camera, phase information associated with the set of phase-shifted fringe patterns at the plurality of distances, in which the first set of multiple vision rays is based on the phase information.

In some examples, the optical device (e.g., system) is configured for transmission measurements and/or reflection measurements. That is, in some examples, the phase infor-mation may be obtained in accordance with a transmission configuration or a reflection configuration. In some examples, the optical device or (or another device, within the system, which is coupled to the optical device) is configured to apply an algorithm for reducing (e.g., elimi-nating) systematic errors associated with measurements by the optical device non-iteratively. For example, back-to-back differential measurements may be used to reduce systematic errors non-iteratively. That is, in some examples, the phase information includes differential phase informa-tion including a first set of phase information obtained in the presence of the measurement sample (e.g., an object) and a second set of phase information obtained in the absence of the object.

In some examples, a measurement sample may be posi-tioned in front of the camera-imaging system, and the changes in the vision ray deflection caused by the sample may be obtained (e.g., recorded). That is, in some examples, the system may be configured to determine one or more deflections of one or more vision rays of the first set of multiple vision rays induced by the object. In other words, the system may be configured to measure sample-induced changes to the geometric wavefront of the reference target. For example, the system may be configured to obtain a first one or more geometric wavefronts associate with the reference target system and obtain a second one or more geometric wavefronts associated with the object based on the one or more deflections, in which the second one or more geometric wavefronts are indicative of one or more object-induced changes to the first one or more geometric wavefronts.

In some examples, the system may be configured to measure the geometric wavefront at different optical wavelengths. That is, in some examples, the first one or more geometric wavefronts and the second one or more geometric wavefronts may be obtained using a plurality of optical wavelengths. In other words, the system may measure the vision rays at different wavelengths (e.g. using the red green blue (RGB) channels of the projector or a display) to obtain geometric wavefronts at multiple different wavelengths. In some such examples, geometric wavefronts may be obtained at multiple (e.g., three) different wavelengths.

In some examples, the system may be configured to perform a combination of vision ray metrology with multi-spectral analysis for enhanced optical characterization. That is, the system may be configured for enhanced optical characterization by combining vision ray metrology with multi-spectral analysis. For example, the system may capture optical properties at different wavelengths, allowing for a comprehensive analysis of material and surface properties. In some examples, the multi-spectral analysis may include characterizing optical properties beyond surface shape (e.g., refractive index variations, absorption).

In some examples, the system may be configured to perform a method for alignment of optical systems using vision ray data. For example, the object (e.g., the measurement sample) may include one or multiple optical elements in an imaging system. In such an example, the system may be configured to determine, based on the second one or more geometric wavefronts, a point spread function (PSF) associated with the imaging system and/or a modulation transfer function (MTF) associated with the imaging system. In some examples, the system may identify at least one adjustment to a position one or multiple optical element included in the imaging system based on the PSF and/or the MTF. In other words, the system may be configured to compute the PSF or MTF using the wavefront information of point. In some examples, the system may be configured to apply an algorithm for calculating the MTF and/or the local PSF of the imaging system.

In some examples, the system may be configured to apply an algorithm for computing the optical performance of the imaging system based on the geometric wavefront information. That is, the system may use the geometric wavefront information to perform adjustments to improve the optical performance. For example, the system may be configured to apply a first algorithm for calculating the MTF of the imaging system and/or a second algorithm for computing the local PSF of the imaging system. In such an example, the system may apply a third algorithm for determining (e.g., proposing) adjustments to the imaging system to improve the optical performance, the MTP, and/or the local PSF. In other words, the system may be configured to perform the at least one adjustment, in which a first level of performance obtained for the imaging system after the at least one adjustment is higher than a second level of performance obtained for the imaging system before the at least one adjustment.

In some examples, the first algorithm and/or the second algorithm may be configured compute the MTF or PSF, respectively, using wavefront information obtained by the system. For example, to compute the PSF from wavefront information (e.g., from wavefront aberrations), the system may measure the wavefront aberration, which may be represented as a phase distortion across the pupil of the optical system. The system may be configured to measure the wavefront aberration via interferometry, vision ray metrology, wavefront sensors, and/or calculated theoretically. The system may obtain the wavefront information using a geometric wavefront obtained via vision ray metrology and/or another type of wavefront (e.g., a regular wavefront) obtained via interferometry and/or wavefront sensors.

In some examples, to obtain the PSF, the system may be configured to apply a Fourier transform. In some such examples, the PSF may be the squared magnitude of the Fourier Transform of the complex pupil function, which includes both amplitude and phase information. The complex pupil function may include the exponential of the wavefront aberration (e.g., assuming a uniform amplitude). Additionally, or alternatively, to obtain the PSF, the system may be configured to compute the intensity. In some such examples, the PSF may be given by the square of the modulus of this Fourier transform, representing how light from a point source is distributed in the image plane. That is, mathematically, the intensity is the modulus squared of the Fourier transform of the complex pupil function. In some examples, the PSF describes how a point source of light is imaged by an optical system with a given wavefront aberration.

In some such examples, the system may perform alignment of optical systems autonomously. That is, in some examples, the system may provide for automated alignment of single- or multi-element optical systems using vision ray metrology. In some such examples, the system may automatically align single- or multi-element optical systems using vision ray data. For example, the system may identify misalignments in one or multiple optical elements and automatically adjusts their positions to optimize optical performance. In some such examples, the automated (real-time) alignment for multi-element systems may provide for enhanced system accuracy and reduced manual intervention. In some examples, by providing for the alignment of a multi-element imaging system, the system may provide for simultaneous evaluation of multiple optical components in the imaging system, as well as detecting misalignments and aberrations across multiple optical surfaces.

In some examples, the system is configured to apply vision ray metrology for asymmetric optical systems. For example, the system may be configured to align asymmetric optical systems using vision ray deflection data. In some such examples, the system may calculate wavefront aberrations caused by the asymmetry in the optical elements and determine (e.g., propose) corrective actions for alignment and performance optimization. For example, the system may identify, based on the second one or more geometric wavefronts, one or more wavefront aberrations associated with an asymmetry of the object and may identify at least one adjustment to a position of the object based on the one or more wavefront aberrations. In some such examples, the system may provide for improved performance of imaging systems including freeform optics and/or imaging systems with non-symmetric geometries.

In some examples, the system may be configured for reconstructing 3D shapes in an optical metrology system using the vision ray data. In some such examples, the system may be configured to apply a first algorithm for reconstructing 3D shapes based on the vision ray data and/or a second algorithm for measuring both the front and back surfaces of an optical sample. In other words, in some examples, the object is 3-dimensional and the system is configured obtain a 3D reconstruction of the object based on the first set of multiple vision rays. Additionally, in some examples, the object includes a first surface and a second surface. In some such examples, the second surface is substantially parallel to the first surface. That is, in some examples, the first surface and the second surface are not perpendicular to each other (e.g., do not intersect at a 90° angle). In some such examples, the system may be configured to obtain, based on the first set of multiple vision rays, at least one of a first reconstruction of the first surface or a second reconstruction of the second surface. For example, the system may be configured for measuring the top and bottom surface by using a reflection configuration (e.g., and one or more algorithms described herein). In such an example, the system may perform multi-surface measurements by placing the sample at different orientations. For example, in accordance with one or more techniques described herein, vision ray metrology may be used to distinguish between front and back surfaces, allowing for comprehensive analysis of multi-surface optics. In some examples, the analysis of multi-surface optics may include application of a dynamic mode decomposition algorithm (e.g., instead of the fast Fourier transform algorithm). In some examples, one or more components (e.g., the algorithms) of the analysis of multi-surface optics may be applied to deflectometry and/or vision ray metrology.

In some examples, the system may provide for multi-layer material inspection using vision ray metrology. For example, the object may include at least a first layer and a second layer in that is in physical contact with the first layer. In such an example, the first surface is associated with the first layer and the second surface is associated with the second layer. In some examples, the system may provide for inspecting multi-layered materials using vision ray tomography. In some such examples, the system may be configured to analyze the deflected rays as they pass through each layer, enabling the detection of internal defects, layer thickness, and layer boundary positions. In other words, the system may provide for on-surface and subsurface measurements, which may be used for multi-layer inspection of, for example, composite or transparent multi-layered materials.

In some examples, the system may provide for multi-layer inspection in non-optical materials using vision rays. For example, the system may be configured for inspecting multi-layer non-optical materials using vision rays. In some such examples, the system may be configured to evaluate both the top or bottom surface and one or more subsurface structures of non-optical materials, such as industrial coatings, plastics, and composite layers. In some examples, the non-optical materials may include biological materials, biomedical materials, and/or other types of organic materials that are non-biological.

In some examples, the system may provide for reconstructing 3D volumetric measurements of transparent samples. In some such examples, to reconstruct 3D volumetric measurements of transparent samples, the system may include a rotational stage that rotates the sample for capturing vision ray data from multiple angles. Additionally, the system may be configured to apply an algorithm for reconstructing the 3D refractive index distribution of the transparent sample based on the vision ray data. In other words, the system may include a rotational stage configured to rotate the object around one or more axes of rotation and, as such, may be configured to perform, via the rotational stage, a second one or more adjustments to an angular position of the object. Additionally, the system may be configured to generate a second set of multiple vision rays at a plurality of angles based on the second one or more adjustments and obtain a 3D refractive index distribution for the object based on the first set of multiple vision rays and a second set of multiple vision rays.

In some examples, the system may provide for evaluating geometrical properties of optical surfaces. For example, to evaluate the geometrical properties of an optical surface, the system may be configured to apply an algorithm for generating one or more quality index metrics (e.g., $$S = \sqrt{V_x^2 + V_y^2}$$

and/or $\alpha = $a$ \tan 2(V_y, V_x)$), which enable quality control of the optical surface without necessitating the computation of the (entire) surface geometry. In other words, the system may obtain one or more quality index metrics for the geometric surface based on the first set of multiple vision rays, in which the one or more quality index metrics include at least one of a direction vector amplitude or a direction vector angle associated with the geometric surface.

In some examples, the system includes an active target comprising a passive diffusive calibration target and a fringe projector. That is, the reference target system may include a passive diffusive calibration target and a projector configured to project a fringe pattern onto the passive diffusive calibration target. In some such examples, the system may avoid the cover glass ambiguity found in other setups and may provide for high-density spatial information from sparse features.

In some examples, the system may support one or more types of imaging system calibration. For example, the system may provide for a non-iterative approach to error correction using ray-tracing-free methods, which may provide for improved accuracy relative to other types of systems that rely on iterative solvers. In some examples, the non-iterative approach uses a Tikhonov regularization type calibration for one or more pixels (e.g., each pixel). For example, the system may be configured to obtain a respective calibration parameter for each pixel of the one or more pixels based on another plurality of vision rays. In such an example, the system may calibrate a telecentricity of the optical imaging system based on the respective calibration parameter for each pixel of the one or more pixels. Additionally, in some examples, the system may identify error associated with the first set of multiple vision rays based on the calibration. In some such examples, the error may be indicative of a back surface flatness associated with the object. In other words, the system may be configured to identify a calibration parameter $\lambda$ by recovering the telecentric vision rays, performing a ray tracing of the measurement system model with similar geometrical parameters as the system, and using a model of the tested object (with nominal parameters) to find $\lambda$ for each pixel such that the cost function $f(\lambda)$ is reduced (e.g., minimized). In some examples, the system may improve the accuracy of the surface height reconstruction through the calibration (e.g., in cases where the tested object is associated with telecentricity and flatness errors).

In some examples, the system may provide for enhanced resolution via subpixel vision ray data collection. For example, the system may provide for increasing the resolution of vision ray data by employing subpixel vision ray data collection techniques, enabling more precise surface reconstructions. In some such examples, the system may use high-resolution cameras and advanced fitting algorithms to capture data from individual subpixel areas of the imaging system. For example, the system may support the use megapixel resolution sensors.

In some examples, the system may provide for multi-angle calibration for reducing (e.g., eliminating) systematic errors. For example, the system may be configured to perform a system calibration using multiple angles of incidence to further eliminate systematic errors in vision ray metrology. In such an example, by rotating both the sample and the camera system, the system may reduce (e.g., minimize) angular-dependent calibration errors. In some examples, the system may perform the multi-angle calibration for multi-surface measurements (and provide error reduction via angle diversity). In some examples, the system may support adaptive error correction for dynamic environments. For example, the system may be configured to (dynamically) correct systematic errors in real-time using adaptive algorithms that recalibrate based on environmental changes, such as changes in temperature or mechanical drift, which may enable the system to maintain (or continuously improve) measurement accuracy. In some examples, the system may provide (real-time) 3D shape monitoring of optical surfaces using vision rays. For example, the system may provide for real-time monitoring of 3D shapes of optical surfaces using vision ray data. In such an example, the system may (continuously) capture and process the shape of optical surfaces during manufacturing or alignment processes, which may provide more frequent (e.g., immediate) feedback for quality control. In some examples, continuous monitoring may provide for adaptive, real-time error correction.

In some examples, the system may provide for non-destructive testing of gradient-index optics using vision ray metrology. For example, the system may be configured for non-destructive testing of gradient-index (GRIN) optical elements using vision ray deflection data. In such an example, the system may capture refractive index gradients and provide a 3D reconstruction of an internal index profile of the sample (e.g., without altering the sample). That is, the system may use vision rays to evaluate refractive index distributions for GRIN optics.

In some examples, the system may provide for a reduction (e.g., minimization) in systematic errors through cross-calibration using reference artifacts. For example, the system may be configured for reducing (e.g., minimizing) systematic errors in vision ray metrology by employing a reference artifact in one or more cross-calibration procedures, in which the reference artifact is used to recalibrate system components during real-time operation. In some examples, cross-calibration with reference artifacts may provide for improved precision in metrology systems. In some examples, cross-calibration with reference artifacts may be used for telecentricity correction based on prior knowledge of the reference artifact.

In some examples, the system may provide for the integration of machine learning for enhanced 3D surface reconstruction. That is, the system may provide for improved 3D surface reconstruction in vision ray metrology using machine learning algorithms. In some such examples, the system may leverage historical data and adaptive learning techniques to predict and correct surface measurement errors in real-time. In some examples, by integrating machine learning into the 3D surface reconstruction, the system may improve both speed and accuracy of 3D reconstructions (e.g., for complex or irregular surface).

In some examples, the system may provide for surface defect detection in transparent materials using vision rays. For example, the system may be configured to detect surface and subsurface defects in transparent materials using vision ray metrology or vision ray tomography. In some such examples, the system may use multi-angle ray deflections to identify anomalies such as cracks, inclusions, or voids in transparent samples. In some examples, by using multi-angle ray deflections, the defect detection of the system may extend beyond surface measurements. For example, the system may detect internal defects. In some examples, the system may provide for compensation of environmental variations in vision ray-based systems. For example, the system may be configured for compensating for environmental variations, such as temperature and vibration, in vision ray-based optical measurement systems. In some such examples, the system uses real-time environmental sensors to adjust measurement parameters (e.g., dynamically), thereby maintaining the accuracy of the system under fluctuating environmental conditions. In other words, the system may compensate for environmental instability and the impact of environmental variations on metrology accuracy.

In some examples, the system may provide for wavefront error reduction (e.g., minimization) in vision ray-based optical systems. For example, the system may be configured for reducing (e.g., minimizing) wavefront errors in optical systems by adjusting the vision ray parameters and incorporating a feedback mechanism to correct real-time aberrations in the optical wavefront. In some such examples, the system may extend wavefront sensing to include dynamic real-time error correction using vision rays, thereby improving the adaptability of the system, for example, in high-precision applications. In some examples, the system may provide for real-time surface gradient mapping using vision ray deflection. For example, the system may be configured to map surface gradients (e.g., in real-time) using vision ray deflection data. In some such examples, the system may capture and display the local surface gradient as the measurement is being performed, thereby providing feedback on the surface topography more quickly. In some such examples, the system may provide for surface gradients (e.g., rather than height reconstructions).

In at least one example embodiment, the presently disclosed subject matter is directed to an optical imaging system comprising: a camera; a reference target system; and a translation stage; and one or more processors operationally coupled with the optical imaging system, wherein the one or more processors are configured to cause the apparatus to: perform a first one or more adjustments to a linear position of the reference target system relative to the camera via the translation stage; and generate a plurality of vision rays at a plurality of distances between the camera and the reference target system based at least in part on the first one or more adjustments, wherein the plurality of vision rays originates from one or more pixels of the camera.

In at least one example embodiment, the object is positioned between the camera and the reference target system, and wherein the one or more processors are configured to cause the apparatus to: project a set of phase-shifted fringe patterns via the reference target system; and obtain, via the camera, phase information associated with the set of phase-shifted fringe patterns at the plurality of distances, wherein the plurality of vision rays is based at least in part on the phase information. In at least one example embodiment, the phase information is obtained in accordance with a transmission configuration or a reflection configuration.

In at least one example embodiment, the phase information comprises differential phase information including a first set of phase information obtained in the presence of the object and a second set of phase information obtained in the absence of the object. In at least one example embodiment, the object is positioned between the camera and the reference target system, and wherein the one or more processors are configured to cause the apparatus to: determine one or more deflections of one or more vision rays of the plurality of vision rays induced by the object.

In at least one example embodiment, the one or more processors are configured to cause the apparatus to: obtain a first one or more geometric wavefronts associate with the reference target system; and obtain a second one or more geometric wavefronts associated with the object based at least in part on the one or more deflections, wherein the second one or more geometric wavefronts are indicative of one or more object-induced changes to the first one or more geometric wavefronts. In at least one example embodiment, the first one or more geometric wavefronts and the second one or more geometric wavefronts are obtained using a plurality of optical wavelengths. In at least one example embodiment, the object comprises one or more optical elements in an imaging system, and wherein the one or more processors are configured to cause the apparatus to: determine, based at least in part on the second one or more geometric wavefronts, at least one of a point spread function (PSF) associated with the imaging system or a modulation transfer function (MTF) associated with the imaging system; and identify at least one adjustment to a position of at least one optical element of the one or more optical elements based at least in part on the at least one of the PSF or the MTF.

In at least one example embodiment, the one or more processors are configured to cause the apparatus to: perform the at least one adjustment, wherein a first level of performance obtained for the imaging system after the at least one adjustment is higher than a second level of performance obtained for the imaging system before the at least one adjustment.

In at least one example embodiment, the one or more processors are configured to cause the apparatus to: identify, based at least in part on the second one or more geometric wavefronts, one or more wavefront aberrations associated with an asymmetry of the object; and identify at least one adjustment to a position of the object based at least in part on the one or more wavefront aberrations. In at least one example embodiment, the object is 3-dimensional (3D), and wherein the one or more processors are configured to cause the apparatus to: obtain a 3D reconstruction of the object based at least in part on the plurality of vision rays. In at least one example embodiment, the object comprises a first surface and a second surface that is substantially parallel to the first surface, and wherein the one or more processors are configured to cause the apparatus to: obtain, based at least in part on the plurality of vision rays, at least one of a first reconstruction of the first surface or a second reconstruction of the second surface.

In at least one example embodiment, the object comprises at least a first layer and a second layer in that is in physical contact with the first layer, and wherein the first surface is associated with the first layer and the second surface is associated with the second layer.

In at least one example embodiment, the optical imaging system further comprises a rotational stage configured to rotate the object around one or more axes of rotation, and wherein the one or more processors are configured to cause the apparatus to: perform, via the rotational stage, a second one or more adjustments to an angular position of the object; generate a second plurality of vision rays at a plurality of angles based at least in part on the second one or more adjustments; and obtain a 3-dimensional (3D) refractive index distribution for the object based at least in part on the plurality of vision rays and the second plurality of vision rays.

In at least one example embodiment, the object comprises a geometric surface, and wherein the one or more processors are configured to cause the apparatus to: obtain one or more quality index metrics for the geometric surface based at least in part on the plurality of vision rays, wherein the one or more quality index metrics comprise at least one of a direction vector amplitude or a direction vector angle associated with the geometric surface.

In at least one example embodiment, the reference target system comprises a passive diffusive calibration target and a projector configured to project a fringe pattern onto the passive diffusive calibration target. In at least one example embodiment, the one or more processors are configured to cause the apparatus to: obtain a respective calibration parameter for each pixel of the one or more pixels based at least in part on another plurality of vision rays; calibrate a telecentricity of the optical imaging system based at least in part on the respective calibration parameter for each pixel of the one or more pixels; and identify error associated with the plurality of vision rays, wherein, based at least in part on the calibration, the error is indicative of a back surface flatness associated with the object. In at least one example embodiment, the presently disclosed subject matter is directed to a method for measuring optical characteristics of an object using vision rays, the method comprising: performing a first one or more adjustments to a linear position of a reference target system relative to a camera via a translation stage; and generating a plurality of vision rays at a plurality of distances between the camera and the reference target system based at least in part on the first one or more adjustments, wherein the plurality of vision rays originates from one or more pixels of the camera.

In at least one example embodiment, the method comprises: projecting a set of phase-shifted fringe patterns via the reference target system; and obtaining, via the camera, phase information associated with the set of phase-shifted fringe patterns at the plurality of distances, wherein the plurality of vision rays is based at least in part on the phase information.

In at least one example embodiment, the presently disclosed subject matter is directed to a non-transitory computer-readable storage medium having computer program code stored thereon that, in execution with at least one processor, is configured for: performing a first one or more adjustments to a linear position of a reference target system relative to a camera via a translation stage; and generating a plurality of vision rays at a plurality of distances between the camera and the reference target system based at least in part on the first one or more adjustments, wherein the plurality of vision rays originates from one or more pixels of the camera.

REFERENCES

1. J. Rolland, M. Davies, T. Suleski, C. Evans, A. Bauer, J. Lambropoulos, and K. Falaggis, "Freeform optics for imaging," Opt. Soc. Am. (2021), accepted for publication.
2. S. M. Arnold, "How To Test An Asphere With A Computer Generated Hologram," Hologr. Opt. Opt. Comput. Gener. 1052, 191 (1989).
3. C. B. Kreischer, "Retrace error: interferometry's dark little secret," Proc. SPIE 8884, 88840X (2013).
4. C. J. Evans and J. B. Bryan, "Compensation for Errors Introduced by Nonzero Fringe Densities in Phase-Measuring Interferometers," CIRP Ann. 42(1), 577-580 (1993).
5. H. Shahinian, C. D. Hovis, and C. J. Evans, "Effect of retrace error on stitching coherent scanning interferometry measurements of freeform optics," Opt. Express 29(18), 28562 (2021).
6. T. Blalock, B. W. Myer, I. Ferralli, M. J. Brunelle, and T. Lynch, "Metrology for the manufacturing of freeform optics," Proc. SPIE 10448, 1044817 (2017).
7. "Geometrical product specifications (GPS)—acceptance and reverification tests for coordinate measuring machines (CMM)," ISO 10360 (2020).
8. "Geometrical product specifications (GPS)—coordinate measuring machines (CMM): technique for determining the uncertainty of measurement," ISO 15530 (2011).
9. T. Bothe, W. Li, M. Schulte, C. von Kopylow, R. B. Bergmann, and W. P. O. Jiptner, "Vision ray calibration for the quantitative geometric description of general imaging and projection optics in metrology," Appl. Opt. 49(30), 5851 (2010).
10. C. Faber, E. Olesch, R. Krobot, and G. Häusler, "deflectometry challenges interferometry: the competition gets tougher!" Interferom. XVI Tech. Anal. 8493, 84930R (2012).
11. G. Hausler, C. Faber, E. Olesch, and S. Ettl, "deflectometry vs. Interferometry," Proc. SPIE 8788, 87881C (2013).
12. C. von Kopylow and R. B. Bergmann, "Optical Metrology-Micro Metal Forming," in F. Vollertsen, ed. (Springer Berlin Heidelberg, 2013), pp. 392-404.
13. R. B. Bergmann, J. Burke, and C. Falldorf, "Precision optical metrology without lasers," Int. Conf. Opt. Photonic Eng. (icOPEN 2015) 9524 (July 2015), 952403 (2015).
14. M. C. Knauer, J. Kaminski, and G. Hausler, "Phase measuring deflectometry: a new approach to measure specular free-form surfaces," Proc. SPIE 5457, 366 (2004).
15. M. Fischer, M. Petz, and R. Tutsch, "Evaluation of LCD monitors for deflectometric measurement systems," Opt. Sens. Detect. 7726, 77260V (2010).
16. L. Huang, M. Idir, C. Zuo, and A. Asundi, "Review of phase measuring deflectometry," Opt. Lasers Eng. 107, 247-257 (2018).
17. H. Canabal, "Automatic wavefront measurement technique using a computer display and a charge-coupled device camera," Opt. Eng. 41(4), 822 (2002).
18. M. C. Knauer, C. Richter, P. Vogt, and G. Häusler, "Measuring the refractive power with deflectometry in transmission," DGaO Proceedings 2008, pp. 7-8 (2008).
19. J. Vargas, J. A. Gómez-Pedrero, J. Alonso, and J. A. Quiroga, "Deflectometric method for the measurement of user power for ophthalmic lenses," Appl. Opt. 49(27), 5125-5132 (2010).
20. J. L. Flores, B. Bravo-Medina, and J. A. Ferrari, "One-frame two-dimensional deflectometry for phase retrieval by addition of orthogonal fringe patterns," Appl. Opt. 52(26), 6537-6542 (2013).
21. T. Liu, C. Zhou, Y. Liu, S. Si, and Z. Lei, "deflectometry for phase retrieval using a composite fringe," Opt. Appl. 44(3), 451-461 (2014).
22. J. L. Flores, R. Legarda-Saenz, and G. Garcia-Torales, "Color deflectometry for phase retrieval using phase-shifting methods," Opt. Commun. 334, 298-302 (2015).
23. L. Jiang, X. Zhang, F. Fang, X. Liu, and L. Zhu, "Wavefront aberration metrology based on transmitted fringe deflectometry," Appl. Opt. 56(26), 7396 (2017).
24. D. Wang, P. Xu, Z. Gong, Z. Xie, R. Liang, X. Xu, M. Kong, and J. Zhao, "Transmitted wavefront testing with large dynamic range based on computer-aided deflectometry," J. Opt. 20(6), 065705 (2018).
25. D. Wang, P. Xu, Z. Wu, X. Fu, R. Wu, M. Kong, J. Liang, B. Zhang, and R. Liang, "Simultaneous multisurface measurement of freeform refractive optics based on computer-aided deflectometry," Optica 7(9), 1056 (2020).
26. O. Huerta-Carranza, M. Avendano-Alejo, and R. Diaz-Uribe, "Null screens to evaluate the shape of freeform surfaces: progressive addition lenses," Opt. Express 29(17), 27921 (2021).
27. D. Wang, Y. Yin, J. Dou, M. Kong, X. Xu, L. Lei, and R. Liang, "Calibration of geometrical aberration in transmitted wavefront testing of refractive optics with deflectometry," Appl. Opt. 60(7), 1973 (2021).
28. A. Pak, "The concept and implementation of smooth generic camera calibration," Interferom. XVIII 9960, 99600I (2016).
29. T. F. Blalock, B. D. Cox, and B. Myer, "Measurement of mid-spatial frequency errors on freeform optics using deflectometry," Proc. SPIE 11056, 110561H (2019).
30. P. Su, Y. Wang, J. H. Burge, K. Kaznatcheev, and M. Idir, "Non-null full field X-ray mirror metrology using SCOTS: a reflection deflectometry approach," Opt. Express 20(11), 12393 (2012).
31. M. Fischer, Deflektometrie in Transmission—Ein neues Verfahren zur Erfassung der Geometrie asphärischer refraktiver Optiken (Shaker, 2016).
32. B. Komander, D. Lorenz, M. Fischer, M. Petz, and R. Tutsch, "Data fusion of surface normals and point coordinates for deflectometric measurements," J. Sensors Sens. Syst. 3(2), 281-290 (2014).
33. M. Petz, M. Fischer, and R. Tutsch, "Three-dimensional shape measurement of aspheric refractive optics by pattern transmission photogrammetry," Proc. SPIE 7239, 723906 (2009).
34. M. Petz and R. Tutsch, "Reflection grating photogrammetry: a technique for absolute shape measurement of specular free-form surfaces," Opt. Manuf. Test. VI 5869, 58691D (2005).
35. M. Petz, H. Dierke, and R. Tutsch, "Photogrammetric determination of the refractive properties of liquid crystal displays," Tech. Mess. 86(6), 319-324 (2019).
36. T. Reh, W. Li, J. Burke, and R. B. Bergmann, "Improving the Generic Camera Calibration technique by an extended model of calibration display," J. Eur. Opt. Soc. Rapid Publ. 9, 14044 (2014).
37. D. Maestro-Watson, A. Izaguirre, and N. Arana-Arexolaleiba, "LCD screen calibration for deflectometric systems considering a single layer refraction model," in 2017 IEEE International Workshop of Electronics, Control, Measurement, Signals and Their Application to Mechatronics (ECMSM) (IEEE, 2017), (1), pp. 1-6.

38. M. Petz, M. Fischer, and R. Tutsch, "Systematic errors in deflectometry induced by use of liquid crystal displays as reference structure," in 21st IMEKO TC2 Symposium on Photonics in Measurement (2013).

39. T. Zhou, K. Chen, H. Wei, and Y. Li, "Improved system calibration for specular surface measurement by using reflections from a plane mirror," Appl. Opt. 55(25), 7018 (2016).

40. J. Bartsch, M. Kalms, and R. B. Bergmann, "Improving the calibration of phase measuring deflectometry by a polynomial representation of the display shape," J. Eur. Opt. Soc. Rapid Publ. 15(1), 20 (2019).

41. Z. Zhang, Y. Liu, S. Huang, Z. Niu, J. Guo, N. Gao, F. Gao, and X. Jiang, "Full-field 3D shape measurement of specular surfaces by direct phase to depth relationship," Opt. Metrol. Insp. Ind. Appl. IV 10023, 100230X (2016).

42. S. Allgeier, U. Gengenbach, B. Kohler, K.-M. Reichert, and V. Hagenmeyer, "Reproducibility of two calibration procedures for phase-measuring deflectometry," Proc. SPIE 11490, 114900G (2020).

43. A. P. Fard, "Low Uncertainty Surface Area Measurement Using deflectometry," dissertation (The University of North Carolina at Charlotte, 2018).

44. L. Huang, J. Xue, B. Gao, C. Zuo, and M. Idir, "Zonal wavefront reconstruction in quadrilateral geometry for phase measuring deflectometry," Appl. Opt. 56(18), 5139 (2017).

45. L. R. Graves, H. Choi, W. Zhao, C. J. Oh, P. Su, T. Su, and D. W. Kim, "Model-free deflectometry for freeform optics measurement using an iterative reconstruction technique," Opt. Lett. 43(9), 2110 (2018).

46. M. Aftab, J. H. Burge, G. A. Smith, L. Graves, C. jin Oh, and D. W. Kim, "Modal Data Processing for High Resolution deflectometry," Int. J. Precis. Eng. Manuf.—Green Technol. 6(2), 255-270 (2019).

47. L. Huang, J. Xue, B. Gao, C. McPherson, J. Beverage, and M. Idir, "Modal phase measuring deflectometry," Opt. Express 24(21), 24649 (2016).

48. W. Li, P. Huke, J. Burke, C. von Kopylow, and R. B. Bergmann, "Measuring deformations with deflectometry," Interferom. XVII Tech. Anal. 9203, 92030F (2014).

49. R. Seßner, Richtungscodierte Deflektometrie durch Telezentrie (Erlangen, 2009).

50. G. Häusler and G. Schneider, "Testing optics by experimental ray tracing with a lateral effect photodiode," Appl. Opt. 27(24), 5160 (1988).

51. T. Binkele, R. Dylla-Spears, M. A. Johnson, D. Hilbig, M. Essameldin, T. Henning, and F. Fleischmann, "Characterization of gradient index optical components using experimental ray tracing," in Photonic Instrumentation Engineering VI, Y. G. Soskind, ed. (SPIE, 2019), p. 13.

52. M. D. Grossberg and S. K. Nayar, "General Imaging Model and a Method for Finding its Parameters," in Eighth International Conference on Computer Vision, 108-115 (2001).

53. P. Sturm and S. Ramalingam, A Generic Calibration Concept: Theory and Algorithms (INRIA, 2003).

54. S. Ramalingam, P. Sturm, and S. K. Lodha, Theory and Experiments towards Complete Generic Calibration (INRIA, 2006), p. 22.

55. W. Li, M. Schulte, T. Bothe, C. Kopylow, N. Kopp, and W. Juptner, "Beam based calibration for optical imaging device," in 2007 3DTV Conference (IEEE, 2007), 1, pp. 1-4.

56. A. Pak, "Towards smooth generic camera calibration," Joint Workshop of Fraunhofer IOSB and Institute for Anthropomatics, Vision and Fusion Laboratory 2014 (2014).

57. D. Uhlig and M. Heizmann, "A Calibration Method for the Generalized Imaging Model with Uncertain Calibration Target Coordinates," in Proceedings of the Asian Conference on Computer Vision (ACCV) (2020).

58. O. N. Stavroudis, The Mathematics of Geometrical and Physical Optics (John Wiley & Sons., 2006).

59. T. Reh, W. Li, A. Gesierich, and R. B. Bergmann, "vision ray Camera Calibration for Small Field of View," in Proceedings of the Deutsche Gesellschaft für Angewandte Optik (DGAO) (Brunswick, Germany, 21-25 May 2013), pp. A019-9. Available online at http://www.dgao-proceedings.de (accessed 29 Oct. 2021).

60. J. Bartsch, Y. Sperling, and R. B. Bergmann, "Efficient vision ray calibration of multi-camera systems," Opt. Express 29(11), 17125 (2021).

61. S. Zhang, "Active versus passive projector nonlinear gamma compensation method for high-quality fringe pattern generation," Proc. SPIE 9110, 911002 (2014).

62. J. H. Bruning, D. R. Herriott, J. E. Gallagher, D. P. Rosenfeld, A. D. White, and D. J. Brangaccio, "Digital wavefront measuring interferometer for testing optical surfaces and lenses," Appl. Opt. 13(11), 2693-2703 (1974).

63. M. Servin, J. A. Quiroga, and M. Padilla, Fringe Pattern Analysis for Optical Metrology: Theory, Algorithms, and Applications (Wiley, 2014).

64. C. E. Towers, D. P. Towers, and J. D. C. Jones, "Generalized frequency selection in multifrequency interferometry," Opt. Lett. 29(12), 1348 (2004).

65. K. Falaggis, A. H. Ramirez Andrade, R. Porras-Aguilar, D. P. Towers, and C. E. Towers, "Multi-wavelength phase unwrapping: a versatile tool for extending the measurement range, breaking the Nyquist limit, and encrypting optical communications," in Interferometry XIX, M. B. North Morris, K. Creath, J. Burke, and A. D. Davies, eds. (SPIE, 2018), (August), p. 39.

66. P. W. Holland and R. E. Welsch, "Robust regression using iteratively reweighted least-squares," Commun. Stat.—Theory Methods 6(9), 813-827 (1977).

67. L. W. Alvarez, "Two-Element variable-power spherical lens," U.S. Pat. No. 3,305,294 (21 Feb. 1967).

68. W. H. Southwell, "Wave-front estimation from wave-front slope measurements," J. Opt. Soc. Am. 70(8), 998 (1980).

69. G. A. Smith, "2D zonal integration with unordered data," Appl. Opt. 60(16), 4662 (2021).

70. J. Ye, W. Wang, Z. Gao, Z. Liu, S. Wang, P. Benítez, J. C. Miñano, and Q. Yuan, "Modal wavefront estimation from its slopes by numerical orthogonal transformation method over general shaped aperture," Opt. Express 23(20), 26208 (2015).

71. Z. Xia, X. Li, Q. Lu, C. Wei, J. Shao, and Z. Wu, "Wavefront reconstruction in square region based on improved two-dimension Legendre polynomials," Proc. SPIE 10839, 1083915 (2019).

72. M. Aftab, J. H. Burge, G. A. Smith, L. R. Graves, C. J. Oh, and D. W. Kim, "Chebyshev gradient polynomials for high resolution surface and wavefront reconstruction," Proc. SPIE 10742, 1074211 (2018).

73. L. Huang, M. Idir, C. Zuo, K. Kaznatcheev, L. Zhou, and A. Asundi, "Shape reconstruction from gradient data in an arbitrarily-shaped aperture by iterative discrete cosine transforms in Southwell configuration," Opt. Lasers Eng. 67, 176-181 (2015).

74. S. Ettl, E. Olesch, J. Kaminski, and H. S. G. Häusler, "Fast and robust 3D shape reconstruction from gradient data," DGaO Proceedings 108, 26 (2007).

75. K. R. Freischlad and C. L. Koliopoulos, "Modal estimation of a wave front from difference measurements using the discrete Fourier transform," J. Opt. Soc. Am. A 3(11), 1852 (1986).

76. A. Ramirez Andrade, R. Porras-Aguilar, and K. Falaggis, "Numerical integration of slope data with application to deflectometry," in Interferometry XX, M. B. North Morris, K. Creath, and R. Porras-Aguilar, eds. (SPIE, 2020), (August), p. 7.

77. M. Born and E. Wolf, Principles of Optics: Electromagnetic Theory of Propagation, Interference and Diffraction of Light, 7th expand (Cambridge University Press, 2000).

78. J. DelOlmo-Márquez, G. Castillo-Santiago, M. Avendaño-Alejo, I. Moreno, E. Román-Hernández, and M. C. López-Bautista, "Ronchi-Hartmann type null screens for testing a plano-freeform surface with a detection plane inside a caustic surface," Opt. Express 29(15), 23300 (2021).

79. J. Espinosa, D. Mas, J. Pérez, and C. Illueca, "Optical surface reconstruction technique through combination of zonal and modal fitting," J. Biomed. Opt. 15(2), 026022 (2010).

80. Jannick P. Rolland, Matthew A. Davies, Thomas J. Suleski, Chris Evans, Aaron Bauer, John C. Lambropoulos, and Konstantinos Falaggis, "Freeform optics for imaging," Optica 8, 161-176 (2021).

81. Logan R. Graves, Heejoo Choi, Wenchuan Zhao, Chang Jin Oh, Peng Su, Tianquan Su, and Dae Wook Kim, "Model-free deflectometry for freeform optics measurement using an iterative reconstruction technique," Opt. Lett. 43, 2110-2113 (2018)

82. Tian Zhou, Kun Chen, Haoyun Wei, and Yan Li, "Improved method for rapid shape recovery of large specular surfaces based on phase measuring deflectometry," Appl. Opt. 55, 2760-2770 (2016)

83. D. Wang, P. Xu, Z. Gong, Z. Xie, R. Liang, X. Xu, M. Kong, and J. Zhao, "Transmitted wavefront testing with large dynamic range based on computer-aided deflectometry," J. Opt. (United Kingdom) 20(6), (2018).

84. D. Wang, P. Xu, Z. Wu, X. Fu, R. Wu, M. Kong, J. Liang, B. Zhang, and R. Liang, "Simultaneous multisurface measurement of freeform refractive optics based on computer-aided deflectometry," Optica 7(9), 1056 (2020).

85. M. Fischer, "Deflektometrie in Transmission—Ein neues Verfahren zur Erfassung der Geometrie asphärischer refraktiver Optiken," (2016).

86. M. Petz, M. Fischer, and R. Tutsch, "Three-dimensional shape measurement of aspheric refractive optics by pattern transmission photogrammetry," in Three-Dimensional Imaging Metrology, J. A. Beraldin, G. S. Cheok, M.

87. M. Petz and R. Tutsch, "Reflection grating photogrammetry: a technique for absolute shape measurement of specular free-form surfaces," Opt. Manuf Test. VI 5869 (August 2005), 58691D (2005).

88. G. Hausler and G. Schneider, "Testing optics by experimental ray tracing with a lateral effect photodiode," Appl. Opt. 27(24), 5160 (1988).

89. T. Binkele, R. Dylla-Spears, M. A. Johnson, D. Hilbig, M. Essameldin, T. Henning, and F. Fleischmann, "Characterization of gradient index optical components using experimental ray tracing," in Photonic.

90. M. D. Grossberg and S. K. Nayar, "General Imaging Model and a Method for Finding its Parameters," in Eighth International Conference on Computer Vision (2001), pp. 108-115.

91. T. Bothe, W. Li, M. Schulte, C. von Kopylow, R. B. Bergmann, and W. P. O. Juptner, "Vision ray calibration for the quantitative geometric description of general imaging and projection optics in metrology," Appl. Opt. 49(30), 5851 (2010).

92. A. Pak, "The concept and implementation of smooth generic camera calibration," Interferom. XVIII 9960 (August 2016), 99600I (2016).

93. P. Sturm and S. Ramalingam, A Generic Calibration Concept: Theory and Algorithms (2003).

94. S. Ramalingam, P. Sturm, and S. K. Lodha, "Theory and Experiments towards Complete Generic Calibration," 22 (2006).

95. W. Li, M. Schulte, T. Bothe, C. Kopylow, N. Kopp, and W. Juptner, "Beam based calibration for optical imaging device," in 2007 3DTV Conference (IEEE, 2007), 1, pp. 1-4.

96. A. Pak, "Towards smooth generic camera calibration," 1, (2014).

97. D. Uhlig and M. Heizmann, "A Calibration Method for the Generalized Imaging Model with Uncertain Calibration Target Coordinates," in Proceedings of the Asian Conference on Computer Vision (ACCV) (2020).

98. J. Bartsch, Y. Sperling, and R. B. Bergmann, "Efficient vision ray calibration of multi-camera systems," Opt. Express 29(11), 17125 (2021).

99. Yang Yang, Yupei Miao, Xiaoli Liu, Giancarlo Pedrini, Qijian Tang, Wolfgang Osten, and Xiang Peng, "Intrinsic parameter-free calibration of FPP using a ray phase mapping model," Opt. Lett. 47, 3564-3567 (2022)

100. K. Falaggis, A. H. Ramirez Andrade, R. Porras-Aguilar, D. P. Towers, and C. E. Towers, "Multi-wavelength phase unwrapping: a versatile tool for extending the measurement range, breaking the Nyquist limit, and encrypting optical communications," in Interferometry XIX, M. B. North Morris, K. Creath, J. Burke, and A. D. Davies, eds. (SPIE, 2018), (August), p. 39.

101. H. Canabal, "Automatic wavefront measurement technique using a computer display and a charge-coupled device camera," Opt. Eng. 41(4), 822 (2002).

102. W. H. Southwell, "Wavefront estimation from wavefront slope measurements," J. Opt. Soc. Am. 70(8), 998 (1980).

103. L. Huang, J. Xue, B. Gao, C. Zuo, and M. Idir, "Zonal wavefront reconstruction in quadrilateral geometry for phase measuring deflectometry," Appl. Opt. 56(18), 5139 (2017).

104. J. Ye, W. Wang, Z. Gao, Z. Liu, S. Wang, P. Benítez, J. C. Miñano, and Q. Yuan, "Modal wavefront estimation from its slopes by numerical orthogonal transformation method over general shaped aperture," Opt. Express 23(20), 26208 (2015).

105. D. Malacara, Optical Shop Testing (Wiley, 2007).

106. W. Osten, "Optical metrology: the long and unstoppable way to become an outstanding measuring tool," in (SPIE-Intl Soc Optical Eng, 2018), p. 130.

107. C. Mercer, Optical Metrology for Fluids, Combustion and Solids (Springer Science & Business Media, 2003).

108. P. J. De Groot, "A review of selected topics in interferometric optical metrology," Reports on Progress in Physics 82, (2019).

109. Thomas. Kreis, Handbook of Holographic Interferometry: With an Emphasis on Digital Holography (Wiley-VCH, 2005).

110. W. Bösemann, "Industrial photogrammetry: challenges and opportunities," in Videometrics, Range Imaging, and Applications XI (SPIE, 2011), Vol. 8085, p. 80850H.

111. M. Peca, P. Psota, P. Vojtíšek, and V. Lédl, "Absolute and relative surface profile interferometry using multiple frequency-scanned lasers," in Optics and Measurement International Conference 2016 (SPIE, 2016), Vol. 10151, p. 101510H.

112. P. J. De Groot, Wavelength-Tuned Phase Shifting Interferometry Applied to the Measurement of Transparent Plates (2000).

113. J. F. de Boer, R. Leitgeb, and M. Wojtkowski, "Twenty-five years of optical coherence tomography: the paradigm shift in sensitivity and speed provided by Fourier domain OCT [Invited]," Biomed Opt Express 8, 3248 (2017).

114. A. F. Fercher, W. Drexler, C. K. Hitzenberger, and T. Lasser, Optical Coherence Tomography-Principles and Applications (2003), Vol. 66. 115. Y. Ling, M. Wang, X. Yao, Y. Gan, L. Schmetterer, C. Zhou, and Y. Su, "Effect of spectral leakage on the image formation of Fourier-domain optical coherence tomography," Opt Lett 45, 6394 (2020).

116. K. Banas, A. M. Banas, S. P. Heussler, and M. B. H. Breese, "Influence of spectral resolution, spectral range and signal-to-noise ratio of Fourier transform infra-red spectra on identification of high explosive substances," Spectrochim Acta A Mol Biomol Spectrosc 188, 106-112 (2018).

117. Barbara. Stuart, Infrared Spectroscopy: Fundamentals and Applications (J. Wiley, 20052004).

118. R. Wang, D. Li, K. Xu, X. Zhang, and P. Luo, "Parasitic reflection elimination using binary pattern in phase measuring deflectometry," Opt Commun 451, 67-73 (2019).

119. C. Faber, M. C. Knauer, and G. Hausler, Can deflectometry Work in Presence of Parasitic Reflections?DGaO Proc. 110, A10.

120. L. Huang and A. K. Asundi, "Phase retrieval from reflective fringe patterns of double-sided transparent objects," Meas Sci Technol 23, (2012).

121. J. Ye, Z. Niu, X. Zhang, W. Wang, and M. Xu, "In-situ deflectometic measurement of transparent optics in precision robotic polishing," Precis Eng 64, 63-69 (2020).

122. R. Wang, K. Xu, L. Tang, P. Chen, and D. Li, "Study on eliminating the effect of parasitic reflection on deflectometry measurement of planar optical element surface figure," 1084119, 372 (2019).

123. R. Wang, "Surface shape measurement of transparent planar elements with phase measuring deflectometry," Optical Engineering (2018).

124. W. Zheng, D. Li, R. Wang, X. Zhang, R. Ge, and L. Yu, "Front and back surface measurement of the transparent planar element based on multi-frequency fringe deflectometry," Opt Express 30, 35409 (2022).

125. Y.-C. Leung and L. Cai, "Untangling parasitic reflection in phase measuring deflectometry by multi-frequency phase-shifting," Appl Opt 61, 208 (2022).

126. T. Siwei, Y. Huimin, C. Hongli, W. Tianhe, C. Jiawei, W. Yuxiang, and L. yong, "Elimination of parasitic reflections for objects with high transparency in phase measuring deflectometry," Results Phys 15, (2019).

127. J. N. Kutz, S. L. Brunton, B. W. Brunton, and J. L. Proctor, Dynamic Mode Decomposition (Society for Industrial and Applied Mathematics, 2016).

128. J. M. Vega and S. Le Clainche, Higher Order Dynamic Mode Decomposition and Its Applications (Academic Press, 2020).

129. P. J. Schmid, "Annual Review of Fluid Mechanics Dynamic Mode Decomposition and Its Variants," Annu. Rev. Fluid Mech. 2022 54, 2021 (2022).

130. R. Kulkarni, "Phase-shifting interferometry based on dynamic mode decomposition," Appl Opt 62, 3197 (2023).

131. J. Ye, Z. Niu, X. Zhang, W. Wang, and M. Xu, "Simultaneous measurement of double surfaces of transparent lenses with phase measuring deflectometry," Opt Lasers Eng 137, (2021).

132. K. Falaggis, D. P. Towers, and C. E. Towers, Multi-wavelength Interferometry: Extended Range Metrology (2009), Vol. 34.

133. C. E. Towers, D. P. Towers, and J. D. C. Jones, Time Efficient Chinese Remainder Theorem Algorithm for Full-Field Fringe Phase Analysis in Multi-Wavelength Interferometry (2004).

134. C. E. Towers, D. P. Towers, and J. D. C. Jones, Optimum Frequency Selection in Multifrequency Interferometry (2003), Vol. 28.

135. C. Wagner, W. Osten, and S. Seebacher, Direct Shape Measurement by Digital Wavefront Reconstruction and Multiwavelength Contouring (2000).

136. S. Kuwamura and I. Yamaguchi, Wavelength Scanning Profilometry for Real-Time Surface Shape Measurement (1997).

137. J. M. Huntley and H. O. Saldner, Shape Measurement by Temporal Phase Unwrapping: Comparison of Unwrapping Algorithms (1997), Vol. 8.

138. L. R. Graves, H. Choi, W. Zhao, C. J. Oh, P. Su, T. Su, and D. W. Kim, "Model-free deflectometry for freeform optics measurement using an iterative reconstruction technique," Opt Lett 43, 2110 (2018).

139. S. Huang, Y. Liu, and X. Yu, "Parasitic Reflection Eliminating for Planar Elements Based on Multi-Frequency Phase-Shifting in Phase Measuring deflectometry," Sensors 24, (2024).

140. K. K. Chen, J. H. Tu, and C. W. Rowley, "Variants of dynamic mode decomposition: Boundary condition, Koopman, and fourier analyses," J Nonlinear Sci 22, 887-915 (2012).

141. T. Sayadi, P. Schmid, J. W. Nichols, and D. P. Moin, Dynamic Mode Decomposition of Controlled H- and K-Type Transitions (2013).

142. W. Zheng, D. Li, R. Wang, X. Zhang, R. Ge, L. Yu, and W. Zhao, "Parasitic reflection separation deflectometry based on harmonic analysis," Measurement 203, 111864 (2022).

143. L. Huang, J. Xue, B. Gao, C. McPherson, J. Beverage, and M. Idir, "Modal phase measuring deflectometry," Opt Express 24, 24649 (2016).

144. B. Jeong, H. Choi, S. Ordones, and D. Kim, "Optimizing deflectometry to suppress ghost signal noise," in (SPIE-Intl Soc Optical Eng, 2023), p. 46.

145. P. Yang, T. Chen, D. Wang, L. Ye, Y. Chen, W. Lang, and X. Zhang, "Recognition and separation of fringe patterns in deflectometric measurement of transparent elements based on empirical curvelet transform," Measurement 237, 115242 (2024).

146. A. H. Ramirez-Andrade, S. Shadalou, D. Gurganus, M. A. Davies, T. J. Suleski, and K. Falaggis, "Vision ray metrology for freeform optics," Opt Express 29, 43480 (2021).

147. C. Faber, E. Olesch, R. Krobot, and G. Hausler, "deflectometry challenges interferometry: the competition gets tougher!" Interferom. XVI Tech. Anal. 8493, 84930R (2012).

148. K. Falaggis, J. Rolland, F. Duerr, and A. Sohn, "Freeform optics: introduction," Opt Express 30, 6450 (2022).

149. J. P. Rolland, M. A. Davies, T. J. Suleski, C. Evans, A. Bauer, J. C. Lambropoulos, and K. Falaggis, "Freeform optics for imaging," Optica 8, 161 (2021).

150. J. Si, Z. Feng, D. Cheng, and Y. Wang, "Freeform beam splitting system design for generating an array of identical sub-beams," Opt Express 29, 29918 (2021).

151. S. Shadalou and T. J. Suleski, "General design method for dynamic freeform optics with variable functionality," Opt Express 30, 19974 (2022).

152. Z. Feng, D. Cheng, and Y. Wang, "Iterative freeform lens design for extended light source," 11895, 5 (2021).

153. K. Creath and J. C. Wyant, "Use of computer-generated holograms in optical testing," Handbook of Optics 2, 11-14 (1995).

154. R. Chaudhuri, A. Wansha, R. Porras-Aguilar, and J. P. Rolland, "Implementation of a null test for freeform optics using a high-definition spatial light modulator," Opt Express 30, 43938 (2022).

155. T. Bothe, W. Li, M. Schulte, C. Von Kopylow, R. B. Bergmann, and W. P. O. Jiptner, "Vision ray calibration for the quantitative geometric description of general imaging and projection optics in metrology," Appl Opt 49, 5851-5860 (2010).

156. O. Huerta-Carranza, M. Avendano-Alejo, and R. Diaz-Uribe, "Null screens to evaluate the shape of freeform surfaces: progressive addition lenses," Opt Express 29, 27921 (2021).

157. J. DelOlmo-Márquez, G. Castillo-Santiago, M. Avendaño-Alejo, I. Moreno, E. Román-Hernández, and M. C. López-Bautista, "Ronchi-Hartmann type null screens for testing a plano-freeform surface with a detection plane inside a caustic surface," Opt Express 29, 23300 (2021).

158. O. Huerta-Carranza, M. Campos-García, F.-S. Granados-Agustin, A. Santiago-Alvarado, A. Cornejo-Rodríguez, and M. Avendaño-Alejo, "Simple method for evaluating plano-convex aspherical lenses," 12619, 48 (2023).

159. M. C. Knauer, J. Kaminski, and G. Hausler, "Phase measuring deflectometry: a new approach to measure specular free-form surfaces," in Optical Metrology in Production Engineering, W. Osten and M. Takeda, eds. (2004), Vol. 5457, p. 366.

160. P. Su, R. E. Parks, L. Wang, R. P. Angel, and J. H. Burge, "Software configurable optical test system: a computerized reverse Hartmann test," Appl Opt 49, 4404 (2010).

161. D. Wang, P. Xu, Z. Gong, Z. Xie, R. Liang, X. Xu, M. Kong, and J. Zhao, "Transmitted wavefront testing with large dynamic range based on computer-aided deflectometry," Journal of Optics (United Kingdom) 20, (2018).

162. T. Binkele, D. Hilbig, M. Essameldin, T. Henning, F. Fleischmann, and W. Lang, "Characterization of specular freeform surfaces from reflected ray directions using experimental ray tracing," Journal of Sensors and Sensor Systems 10, 261-270 (2021).

163. A. H. Ramirez-Andrade, S. Shadalou, D. Gurganus, M. A. Davies, T. J. Suleski, and K. Falaggis, "Vision ray metrology for freeform optics," Opt Express 29, 43480 (2021).

164. Imagine Optic, HASO LIFT 680. https://www.imagine-optic.com/products/haso-lift-680-wavefront-sensor/

165. PHASICS S. A, "SID4 HR," https://www.phasics.com/en/product/sid4-hr-wavefront-sensor/.

166. R. Wang, D. Li, W. Zheng, L. Yu, R. Ge, and X. Zhang, "Vision ray model based stereo deflectometry for the measurement of the specular surface," Opt Lasers Eng 172, (2024).

167. J. Bartsch, Y. Sperling, and R. B. Bergmann, "Efficient vision ray calibration of multi-camera systems," Opt Express 29, 17125 (2021).

168. S. Velghe, J. Primot, N. Guérineau, R. Haidar, S. Demoustier, M. Cohen, and B. Wattellier, "Advanced wave-front sensing by quadri-wave lateral shearing interferometry," in Interferometry XIII: Techniques and Analysis (SPIE, 2006), Vol. 6292, p. 62920E.

169. M. Mansuripur, "The Shack-Hartmann wavefront sensor," in Classical Optics and Its Applications (Cambridge University Press, 2009), pp. 624-631.

170. L. Huang, J. Xue, B. Gao, C. McPherson, J. Beverage, and M. Idir, "Modal phase measuring deflectometry," Opt Express 24, 24649 (2016).

171. D. Wang, P. Xu, Z. Wu, X. Fu, R. Wu, M. Kong, J. Liang, B. Zhang, and R. Liang, "Simultaneous multisurface measurement of freeform refractive optics based on computer-aided deflectometry," Optica 7, 1056 (2020).

172. C. Wang, N. Chen, and W. Heidrich, "Towards self-calibrated lens metrology by differentiable refractive deflectometry," Opt Express 29, 30284 (2021).

173. L. Yu, D. Li, Y. Ruan, X. Zhang, R. Wang, and K. Xu, "Wavefront Aberration Measurement deflectometry for Imaging Lens Tests," Applied Sciences (Switzerland) 12, (2022).

174. L. Jiang, X. Zhang, F. Fang, X. Liu, and L. Zhu, "Wavefront aberration metrology based on transmitted fringe deflectometry," Appl Opt 56, 7396 (2017).

175. D. Wang, Y. Yin, J. Dou, M. Kong, X. Xu, L. Lei, and R. Liang, "Calibration of geometrical aberration in transmitted wavefront testing of refractive optics with deflectometry," Appl Opt 60, 1973 (2021).

176. H. Canabal, "Automatic wavefront measurement technique using a computer display and a charge-coupled device camera," Optical Engineering 41, 822 (2002).

177. FRED optical engineering software by Photon engineering LLC.

178. Thorlabs Lens Catalog in Zemax OpticStudio 22.1.

179. M. Grenier, N. Desnoyers, F. Lamontagne, B. Leduc, M. Legros, and S. Paradis, "Methods to achieve fast, accurate, and mechanically robust optical breadboard alignment," Optical Engineering 60, (2021).

180. L. R. Graves, H. Choi, W. Zhao, C. J. Oh, P. Su, T. Su, and D. W. Kim, "Model-free deflectometry for freeform optics measurement using an iterative reconstruction technique," Opt Lett 43, 2110 (2018).

181. X. Zhang, Z. Niu, J. Ye, and M. Xu, "Correction of aberration-induced phase errors in phase measuring deflectometry," Opt Lett 46, 2047 (2021).

182. A. Pouya Fard, "Low Uncertainty Surface Area Measurement Using deflectometry," Diss. The University of North Carolina at Charlotte (2018).

We claim:

1. An apparatus for measuring optical characteristics of an object using vision rays, the apparatus comprising:

an optical imaging system comprising:

a camera;

a reference target system, wherein the object is positioned between the camera and the reference target system; and a translation stage; and one or more processors operationally coupled with the optical imaging system, wherein the one or more processors are configured to cause the apparatus to:

perform a first one or more adjustments to a linear position of the reference target system relative to the camera via the translation stage;

project a set of phase-shifted fringe patterns via the reference target system;

obtain, via the camera, phase information associated with the set of phase-shifted fringe patterns at a plurality of distances, wherein the phase information is obtained in accordance with a transmission configuration or a reflection configuration, and wherein the phase information comprises differential phase information including a first set of phase information obtained in the presence of the object and a second set of phase information obtained in the absence of the object; and generate a plurality of vision rays at the plurality of distances between the camera and the reference target system based at least in part on the first one or more adjustments, wherein the plurality of vision rays originates from one or more pixels of the camera, and wherein the plurality of vision rays is based at least in part on the phase information.

2. The apparatus of claim 1, wherein the object is positioned between the camera and the reference target system, and wherein the one or more processors are configured to cause the apparatus to:

determine one or more deflections of one or more vision rays of the plurality of vision rays induced by the object.

3. The apparatus of claim 2, wherein the one or more processors are configured to cause the apparatus to:

obtain a first one or more geometric wavefronts associate with the reference target system; and obtain a second one or more geometric wavefronts associated with the object based at least in part on the one or more deflections, wherein the second one or more geometric wavefronts are indicative of one or more object-induced changes to the first one or more geometric wavefronts.

4. The apparatus of claim 3, wherein the first one or more geometric wavefronts and the second one or more geometric wavefronts are obtained using a plurality of optical wavelengths.

5. The apparatus of claim 4, wherein the object comprises one or more optical elements in an imaging system, and wherein the one or more processors are configured to cause the apparatus to:

determine, based at least in part on the second one or more geometric wavefronts, at least one of a point spread function (PSF) associated with the imaging system or a modulation transfer function (MTF) associated with the imaging system; and identify at least one adjustment to a position of at least one optical element of the one or more optical elements based at least in part on the at least one of the PSF or the MTF.

6. The apparatus of claim 5, wherein the one or more processors are configured to cause the apparatus to:

perform the at least one adjustment, wherein a first level of performance obtained for the imaging system after the at least one adjustment is higher than a second level of performance obtained for the imaging system before the at least one adjustment.

7. The apparatus of claim 4, wherein the one or more processors are configured to cause the apparatus to:

identify, based at least in part on the second one or more geometric wavefronts, one or more wavefront aberrations associated with an asymmetry of the object; and identify at least one adjustment to a position of the object based at least in part on the one or more wavefront aberrations.

8. The apparatus of claim 1, wherein the object is 3-dimensional (3D), and wherein the one or more processors are configured to cause the apparatus to:

obtain a 3D reconstruction of the object based at least in part on the plurality of vision rays.

9. The apparatus of claim 1, wherein the object comprises a first surface and a second surface that is substantially parallel to the first surface, and wherein the one or more processors are configured to cause the apparatus to:

obtain, based at least in part on the plurality of vision rays, at least one of a first reconstruction of the first surface or a second reconstruction of the second surface.

10. The apparatus of claim 9, wherein the object comprises at least a first layer and a second layer in that is in physical contact with the first layer, and wherein the first surface is associated with the first layer and the second surface is associated with the second layer.

11. The apparatus of claim 1, wherein the optical imaging system further comprises a rotational stage configured to rotate the object around one or more axes of rotation, and wherein the one or more processors are configured to cause the apparatus to:

perform, via the rotational stage, a second one or more adjustments to an angular position of the object;

generate a second plurality of vision rays at a plurality of angles based at least in part on the second one or more adjustments; and obtain a 3-dimensional (3D) refractive index distribution for the object based at least in part on the plurality of vision rays and the second plurality of vision rays.

12. The apparatus of claim 1, wherein the object comprises a geometric surface, and wherein the one or more processors are configured to cause the apparatus to:

obtain one or more quality index metrics for the geometric surface based at least in part on the plurality of vision rays, wherein the one or more quality index metrics comprise at least one of a direction vector amplitude or a direction vector angle associated with the geometric surface.

13. The apparatus of claim 1, wherein the reference target system comprises a passive diffusive calibration target and a projector configured to project a fringe pattern onto the passive diffusive calibration target.

14. The apparatus of claim 1, wherein the one or more processors are configured to cause the apparatus to:

obtain a respective calibration parameter for each pixel of the one or more pixels based at least in part on another plurality of vision rays;

calibrate a telecentricity of the optical imaging system based at least in part on the respective calibration parameter for each pixel of the one or more pixels; and identify error associated with the plurality of vision rays, wherein, based at least in part on the calibration, the error is indicative of a back surface flatness associated with the object.

15. A method for measuring optical characteristics of an object using vision rays, the method comprising:

performing a first one or more adjustments to a linear position of a reference target system relative to a camera via a translation stage, wherein the object is positioned between the camera and the reference target system;

projecting a set of phase-shifted fringe patterns via the reference target system;

obtaining, via the camera, phase information associated with the set of phase-shifted fringe patterns at a plurality of distances, wherein the phase information is obtained in accordance with a transmission configuration or a reflection configuration, and wherein the phase information comprises differential phase information including a first set of phase information obtained in the presence of the object and a second set of phase information obtained in the absence of the object; and generating a plurality of vision rays at the plurality of distances between the camera and the reference target system based at least in part on the first one or more adjustments, wherein the plurality of vision rays originates from one or more pixels of the camera, and wherein the plurality of vision rays is based at least in part on the phase information.

16. A non-transitory computer-readable storage medium having computer program code stored thereon that, in execution with at least one processor, is configured for:

performing a first one or more adjustments to a linear position of a reference target system relative to a camera via a translation stage, wherein an object is positioned between the camera and the reference target system;

projecting a set of phase-shifted fringe patterns via the reference target system;

obtaining, via the camera, phase information associated with the set of phase-shifted fringe patterns at a plurality of distances, wherein the phase information is obtained in accordance with a transmission configuration or a reflection configuration, and wherein the phase information comprises differential phase information including a first set of phase information obtained in the presence of the object and a second set of phase information obtained in the absence of the object; and generating a plurality of vision rays at the plurality of distances between the camera and the reference target system based at least in part on the first one or more adjustments, wherein the plurality of vision rays originates from one or more pixels of the camera, and wherein the plurality of vision rays is based at least in part on the phase information.

* * * * *